United States Patent [19]

Shobatake

[11] Patent Number: 5,506,847
[45] Date of Patent: Apr. 9, 1996

[54] ATM-LAN SYSTEM USING BROADCAST CHANNEL FOR TRANSFERRING LINK SETTING AND CHAINING REQUESTS

[75] Inventor: Yasuro Shobatake, Kawasaki, Japan

[73] Assignee: Kabushiki Kaisha Toshiba, Kawasaki, Japan

[21] Appl. No.: 233,520

[22] Filed: Apr. 26, 1994

[30] Foreign Application Priority Data

Apr. 26, 1993 [JP] Japan .................................. 5-120351
Dec. 29, 1993 [JP] Japan .................................. 5-349634

[51] Int. Cl.⁶ .................................................. H04J 3/24
[52] U.S. Cl. .......................... 370/94.3; 370/60; 370/94.1; 370/110.1
[58] Field of Search .................................. 370/94.3, 94.1, 370/60, 95.1, 91, 85.13, 85.6, 110.1

[56] References Cited

U.S. PATENT DOCUMENTS

| | | | |
|---|---|---|---|
| 4,813,038 | 3/1989 | Lee | 370/94.1 |
| 4,910,733 | 3/1990 | Sommani et al. | 370/94.1 |
| 5,130,984 | 7/1992 | Cisneros | 370/60 |
| 5,159,596 | 10/1992 | Itoh | 370/95.1 |
| 5,168,498 | 12/1992 | Adams et al. | 370/94.1 |
| 5,191,578 | 3/1993 | Lee | 370/85.6 |
| 5,274,641 | 12/1993 | Shobatake et al. | 37/94.1 |
| 5,353,412 | 10/1994 | Douglas et al. | 395/325 |

FOREIGN PATENT DOCUMENTS 5-47142  7/1993  Japan .

OTHER PUBLICATIONS

CCITT Recommendations; I.150 (Geneva) 1991 pp. 1–8. "B–ISDN Asynchronous Transfer Mode Functional Characteristics".
CCITT Recommendations; I.311 (Geneva) 1991; pp. 1–22. "B–ISDN General Network Aspects".
CCITT Recommendations; I.361 (Geneva) 1991 pp. 1–6. "B–ISDN ATM Layer Specification".

*Primary Examiner*—Douglas W. Olms
*Assistant Examiner*—Shick Hom
*Attorney, Agent, or Firm*—Oblon, Spivak, McClelland, Maier & Neustadt

[57] ABSTRACT

An ATM-LAN system in which nodes connect terminals located in a limited region, and communication among terminals is effected in asynchronous transfer mode. The system comprises a connection setting process for transmitting a VP/VC link setting request and a VP/VC link chaining request to any one of the terminals, a broadcast channel for connecting any node and any terminal so that these requests may be transferred from any terminal to any node, and a node setting process for setting and connecting a VP/VC link upon receipt of the requests transferred by the broadcast channel.

23 Claims, 39 Drawing Sheets

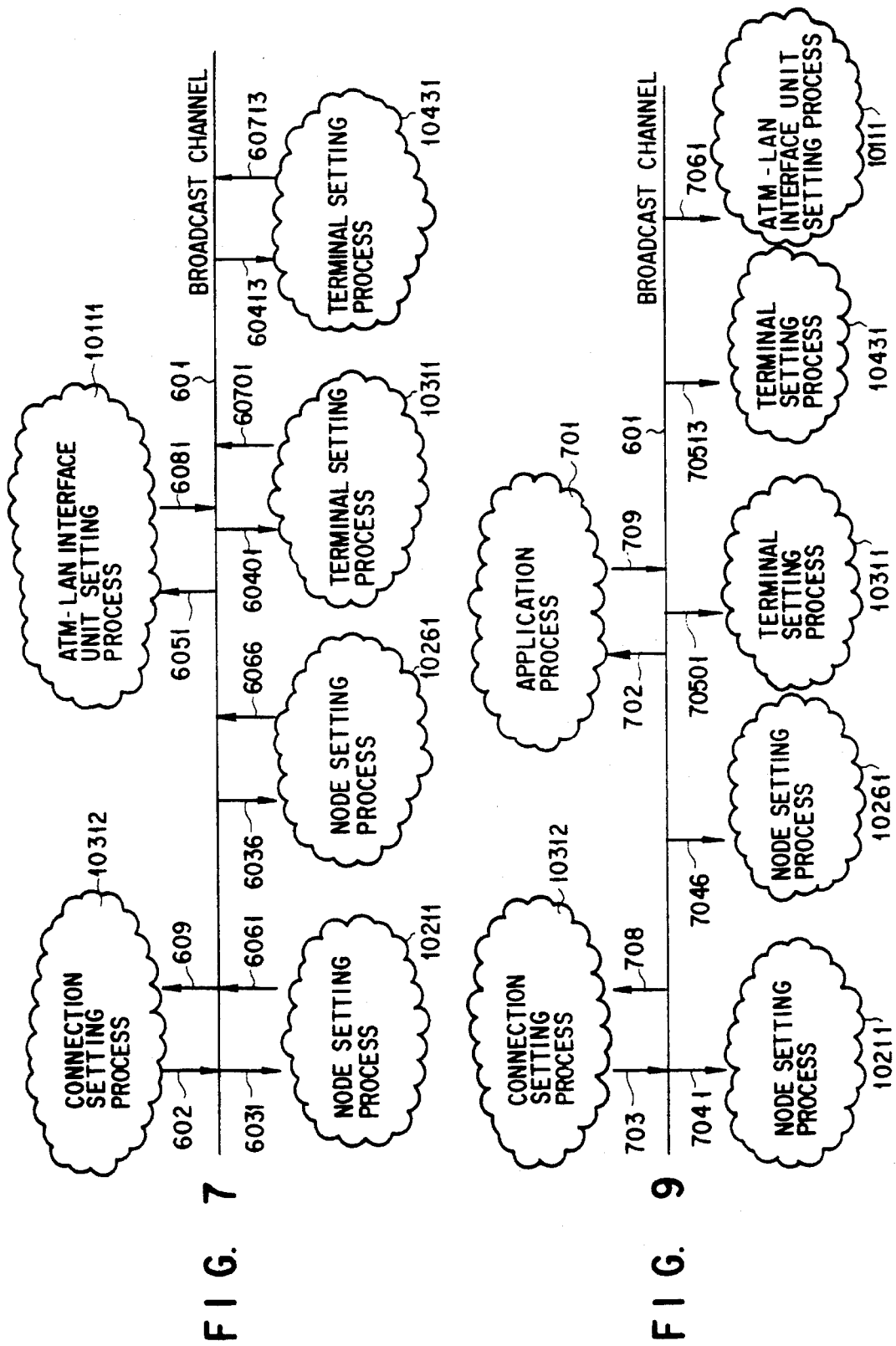

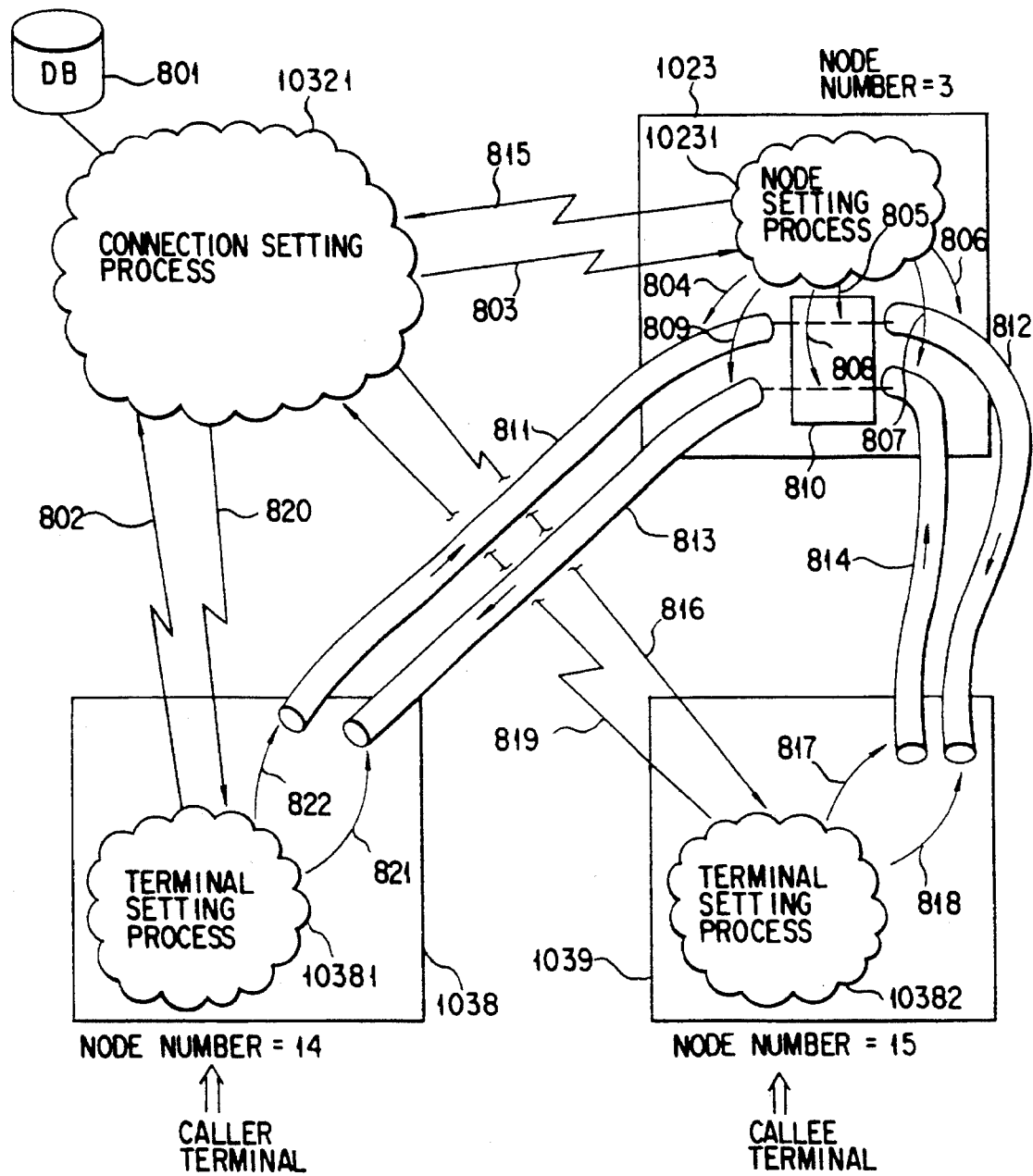
F I G. 10

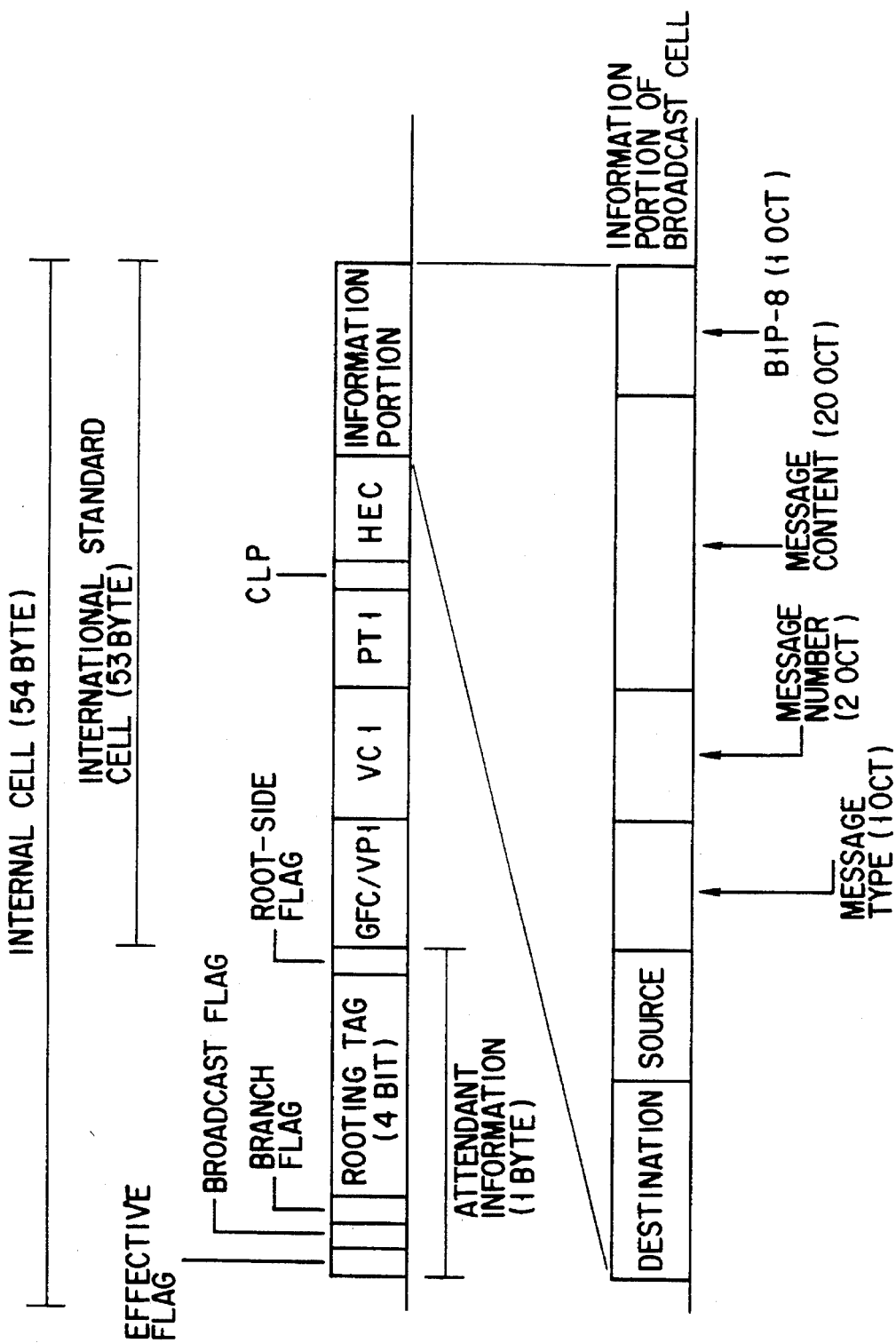
F I G. 27

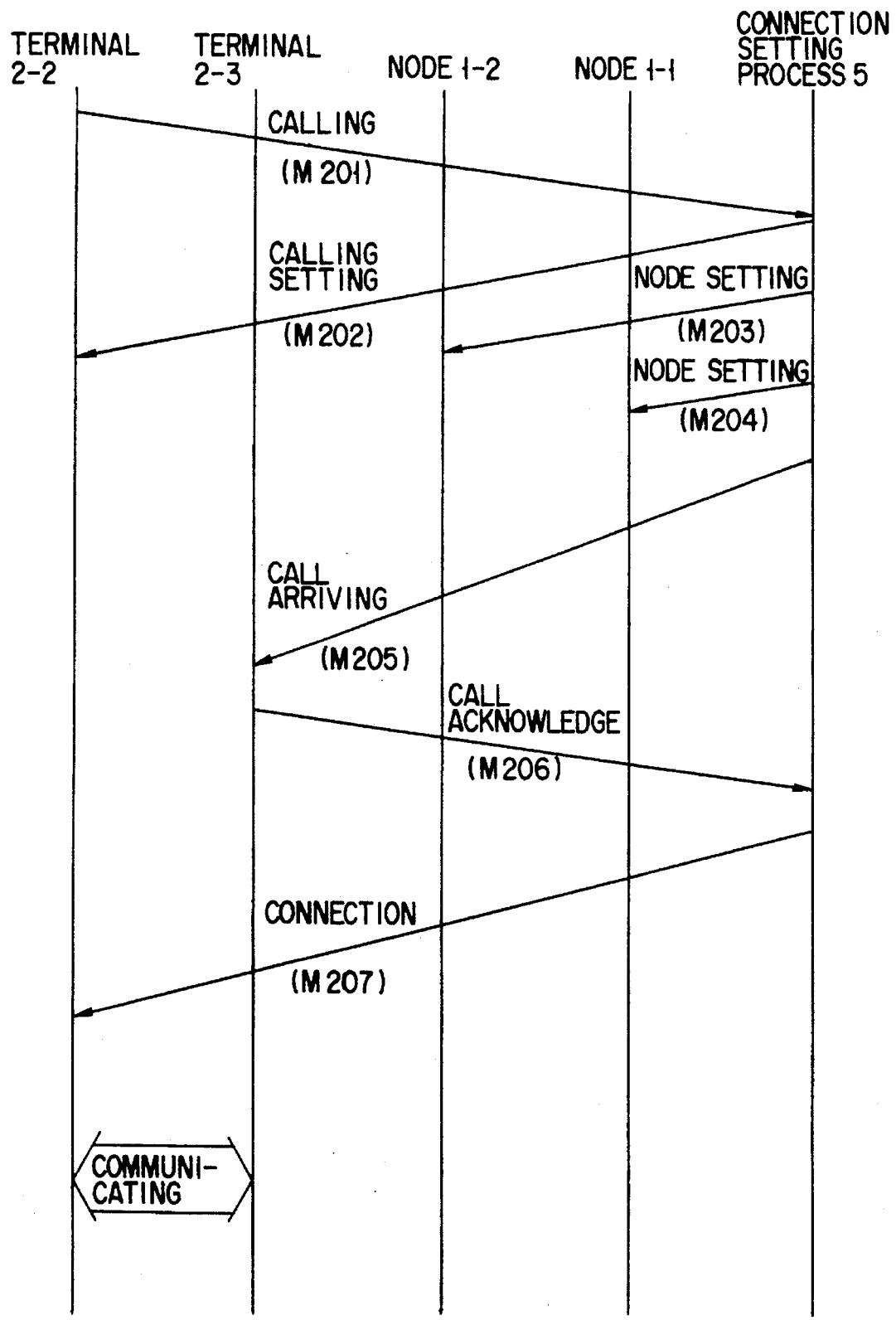
F I G. 34

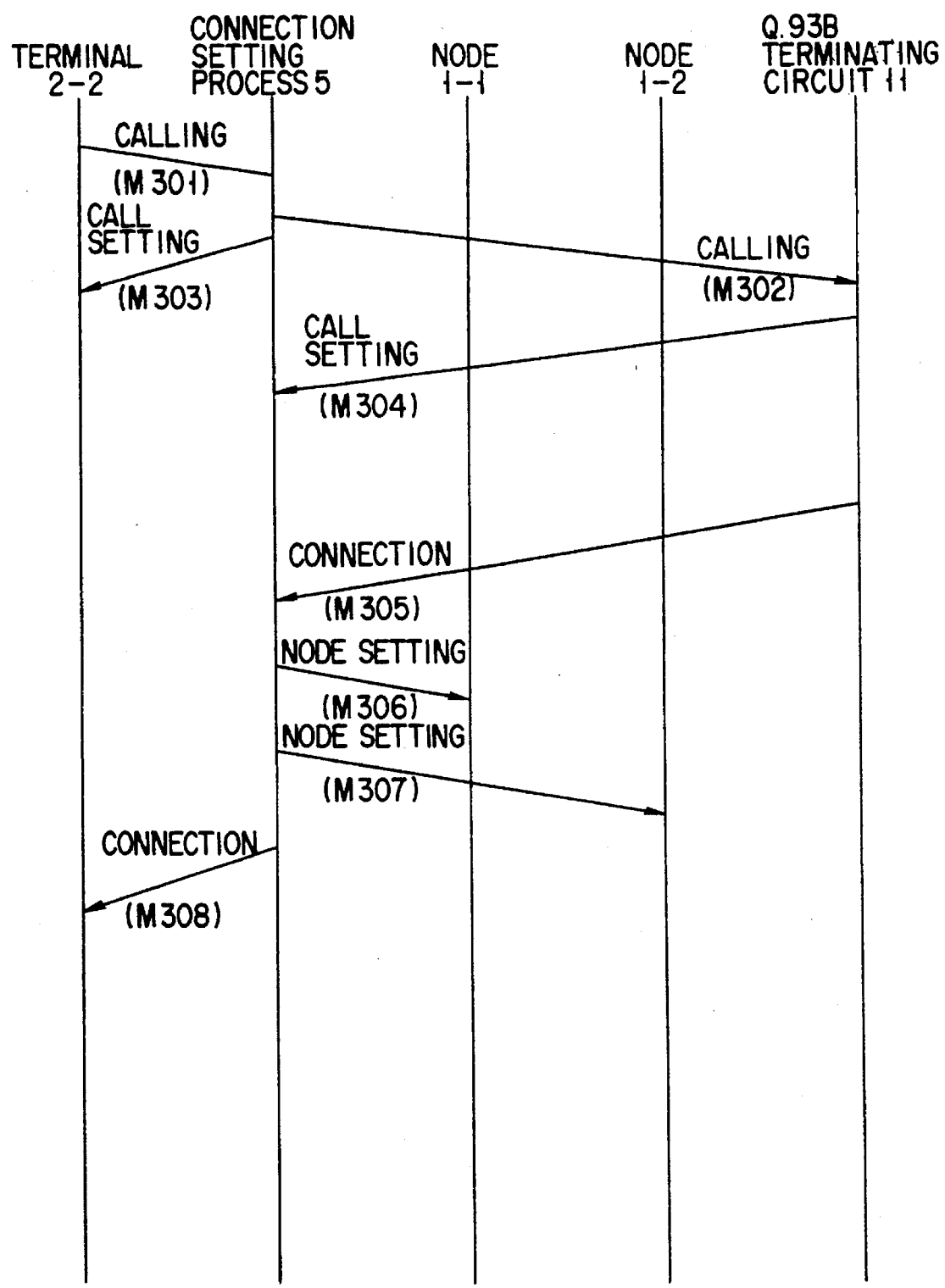
F I G. 35

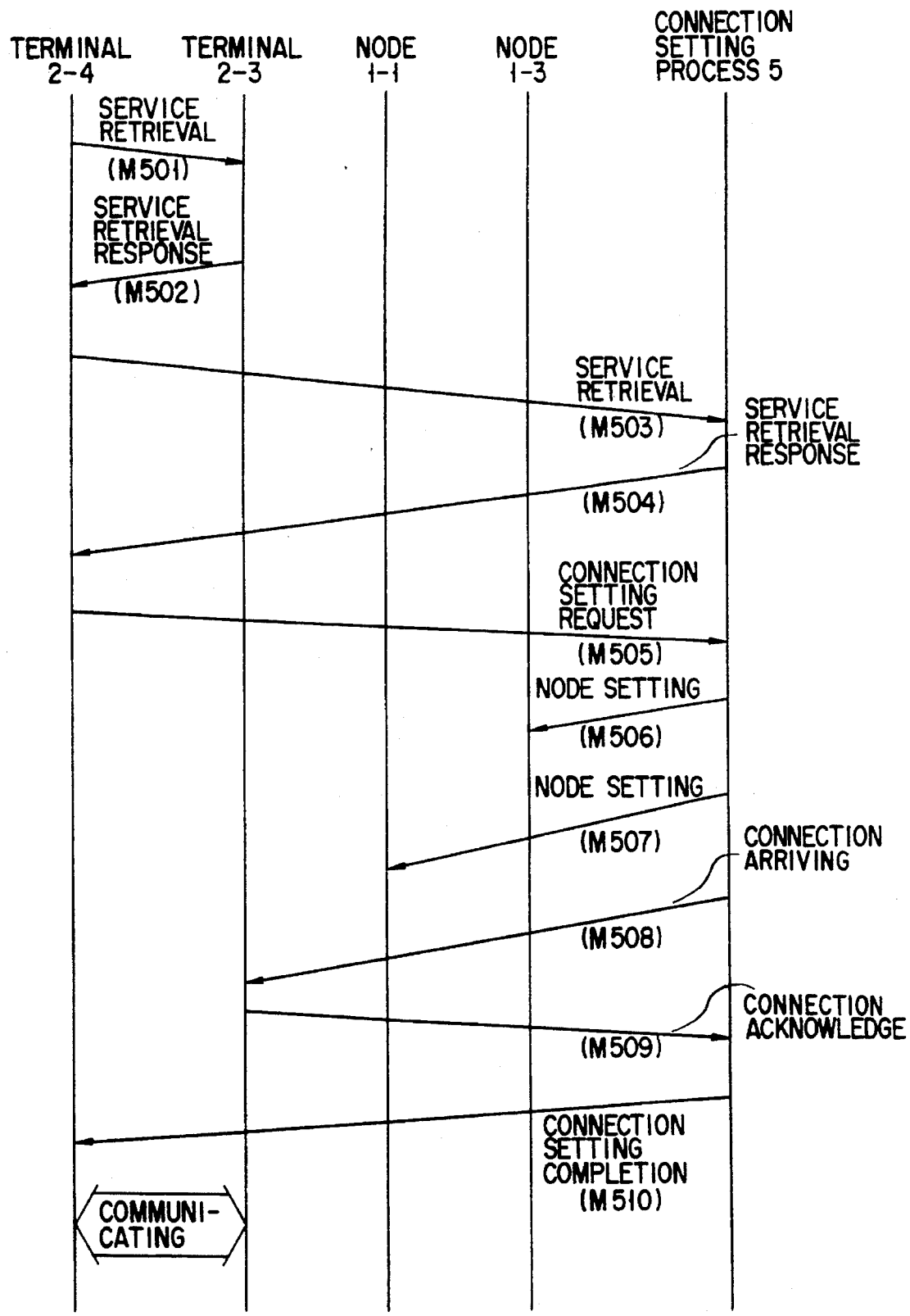
F I G. 37

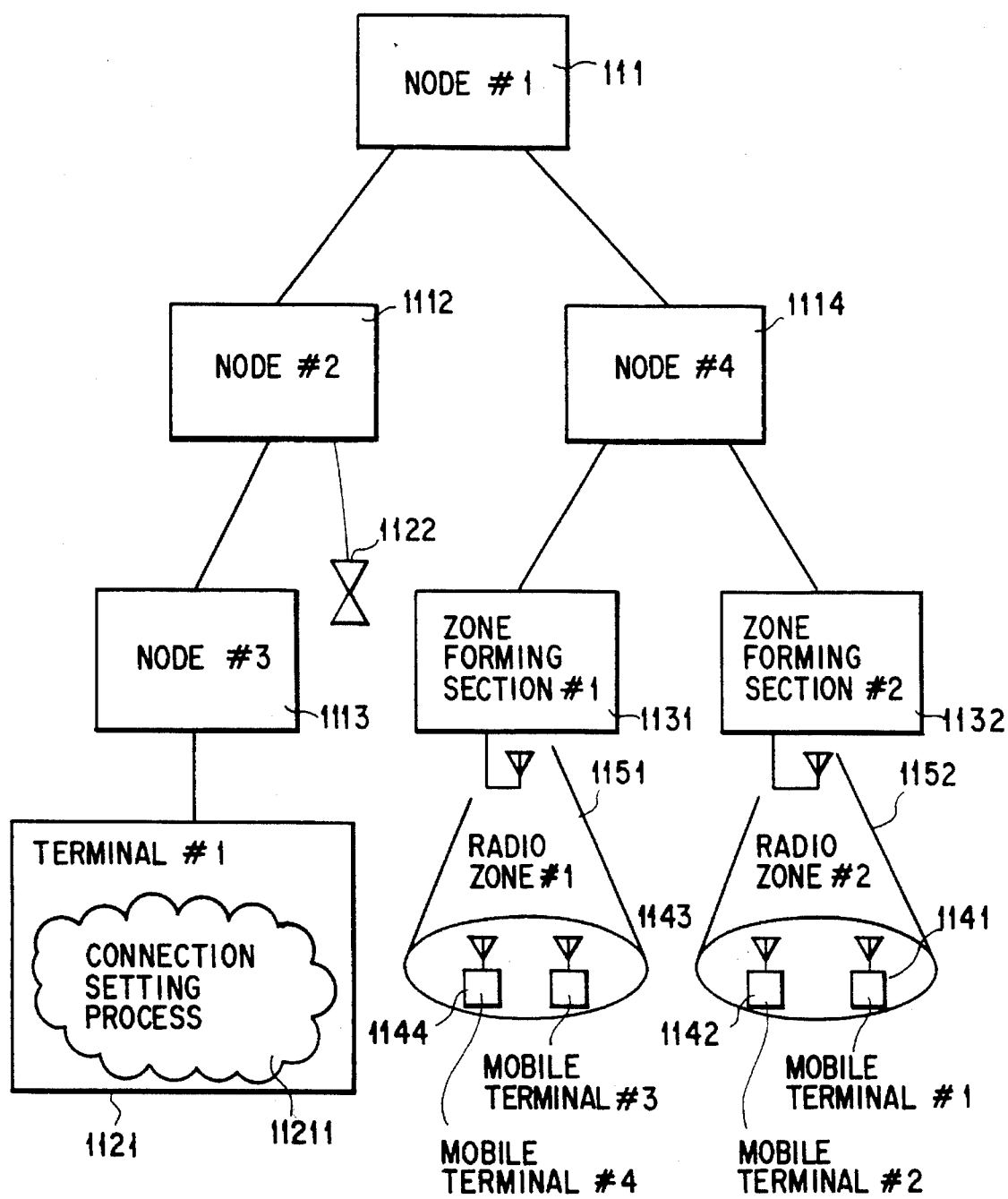
F I G. 38

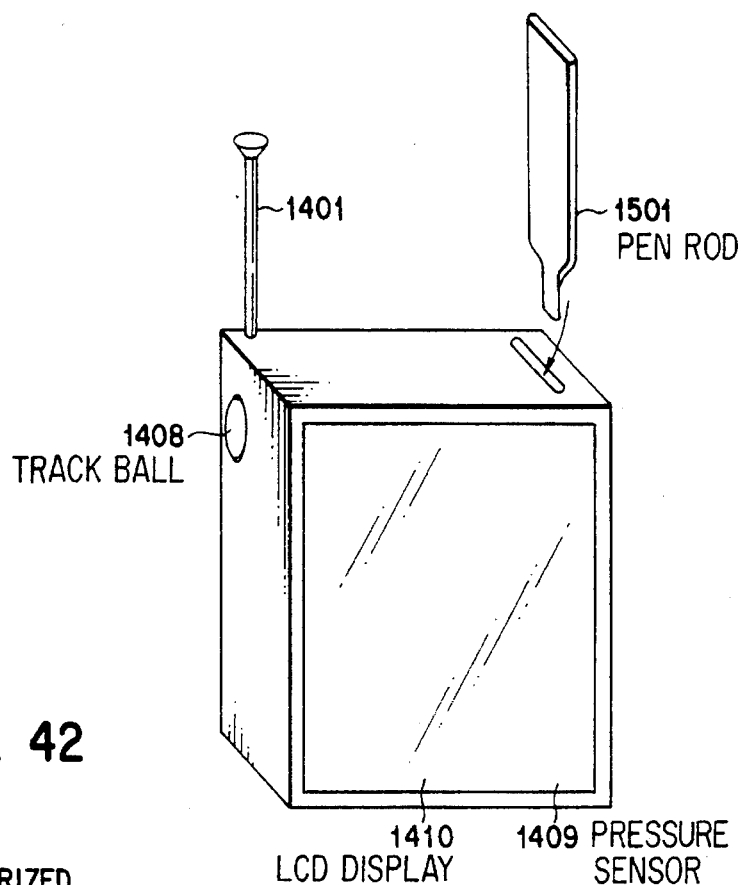
F I G. 42
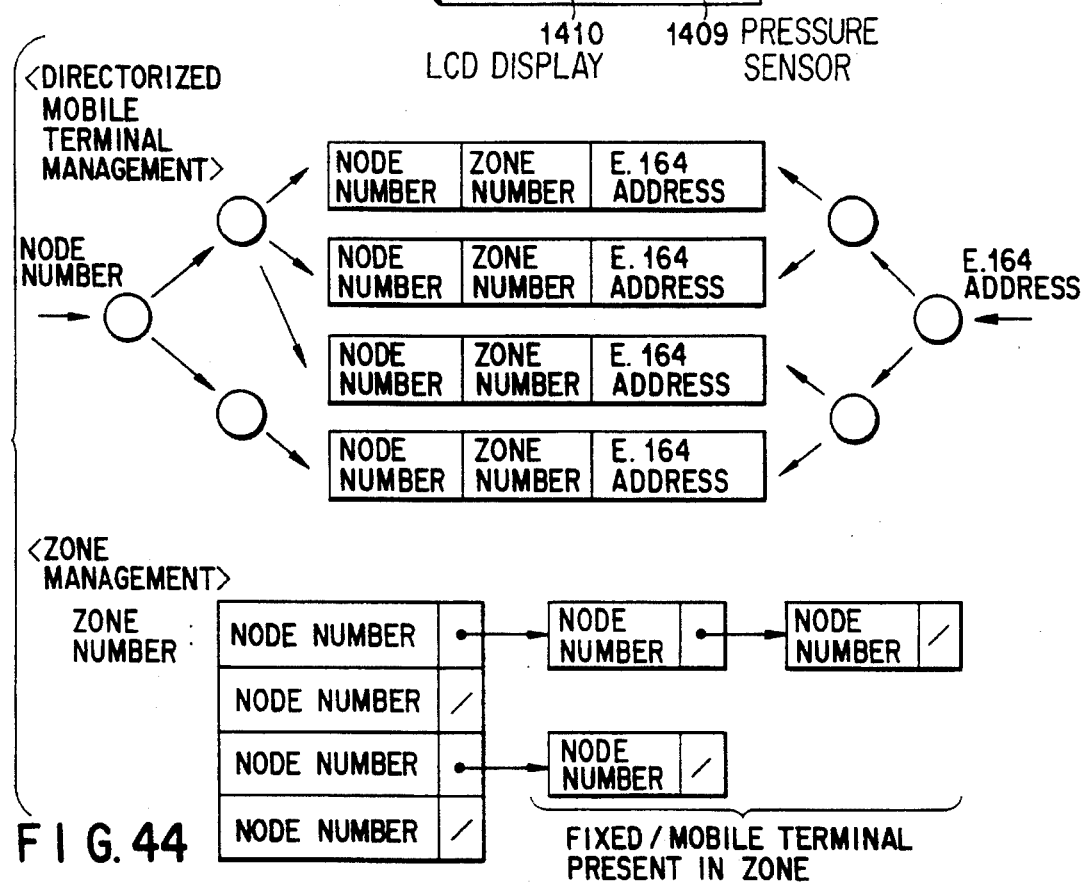
F I G. 44

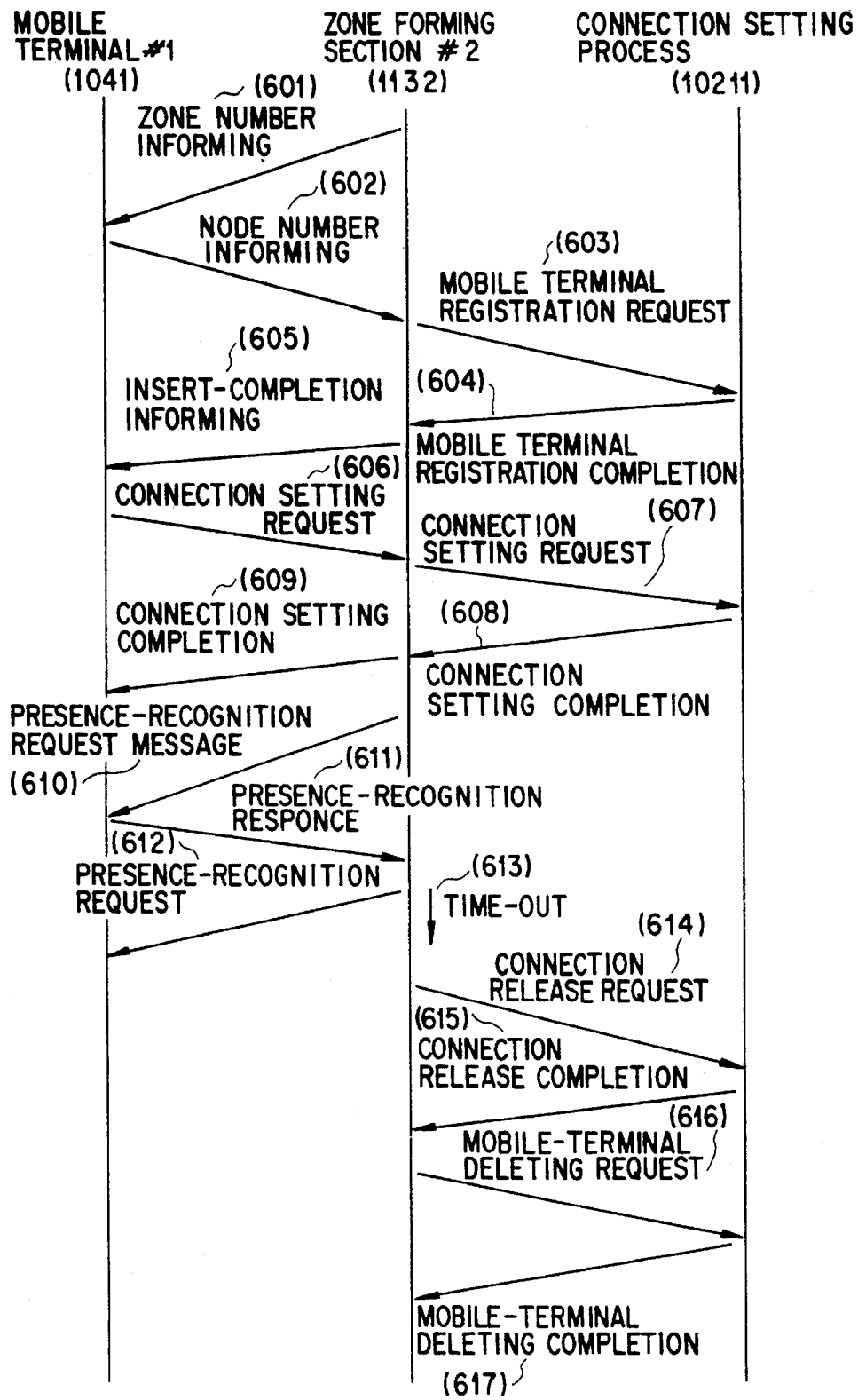
F I G. 43

5,506,847

ATM-LAN SYSTEM USING BROADCAST CHANNEL FOR TRANSFERRING LINK SETTING AND CHAINING REQUESTS

BACKGROUND OF THE INVENTION

1. Field of the Invention

The present invention relates to a local area network (LAN) system which comprises a plurality of terminals and achieves communication among the terminals, and more particularly to an ATM-LAN system which operates in asynchronous transfer mode (ATM) to accomplish communication among terminals.

2. Description of the Related Art

ATM (Asynchronous Transfer Mode) communication has been attracting attention as promising technique of increasing the speed of transfer/exchange operation. In the ATM communication, information is transferred from one terminal to another, in the form of fixed-length short packets generally known as "cells." The ATM communication is a technique of exchanging the packets by means of hardware in order to facilitate high-speed transfer/exchange of information.

ATM communication is considered to be "a promised solution" to the broadband aspects of an integrated services digital network (B-ISDN) which will be employed in the future. In recent years, active research and development have been conducted on so-called ATM-LANs which covers a limited region, for example, one floor, and to which ATM technique is applied to enhance the inter-operability so that the ATM-LANs may be incorporated into a larger communication network. However, the ATM-LANs thus far developed have the following problems.

Basically, an ATM communication network provides connection-orientated communication by means of an ATM layer. A conventional ATM-LAN has a so-called network side function which sets any connection to terminals connected to the ATM-LAN. The technique utilizing frequently networked services provided on the LAN, such as a distribution operating system, i.e., the technique of "when a certain terminal receives a specific service, searching for a host computer providing the specific service by means of intra-LAN broadcast" must be achieved by utilizing a system which is provided for performing a network side function. Each terminal has but a low independence with respect to the network side function. This results in a great problem that the network side function limits the function of services which are to be networked.

Known as a LAN in which the terminals are greatly independent of the network side function is Ethernet (trademark of Xerox). In Ethernet, as well known in the art, a plurality of terminals are connected to one another by a coaxial cable. Ethernet is assumed to utilize only the signal-transferring function of the coaxial cable as a one network side function. In Ethernet, the terminals are connected by the coaxial cables in accordance with a protocol which is generally known as "CSMA/CD." As widely known, in CSMA/CD, each terminal does not transmit a message via the coaxial cable before it determines that no other terminal is transmitting a message. If two or more terminals simultaneously started transmitting messages, the messages would collide with one another in the coaxial cable. Should they collide, the messages could no longer be transferred correctly. Thus, in Ethernet, each terminal determines whether or not messages are colliding in the coaxial cable, before it transmit a message through the coaxial cable. Collision of messages takes place with a certain probability. With Ethernet it is difficult to allocate the bandwidth on the coaxial cable to each terminal. This means that Ethernet cannot transfer data with a guaranteed QOS (Quality Of Service) among the terminals as is required in multimedia application.

Among LANs wherein bandwidth can be allocated to a certain terminal are a token ring network and a token path network. In both types of networks, the terminals exchange among themselves an access right called "token." The bandwidth on the coaxial cable can be allocated to each terminal, by changing the method for allocating the bandwidth to the terminal which has obtained the token. If errors are made in exchanging the token among the terminals, all terminals of the LAN can no longer communicate with one anther. To prevent this, the LAN should be provided a protocol for monitoring the exchange of the token and would inevitably be complex and expensive.

As has been indicated, the conventional ATM-LAN is disadvantageous in that each terminal is insufficiently independent of the network. On the other hand, the conventional ATM-LAN wherein each terminal is greatly independent of the network is disadvantageous in that the bandwidth cannot be allocated to the terminals, or in that it is complex and, hence, expensive, in order to enable the terminals to exchange tokens among themselves.

SUMMARY OF THE INVENTION

An object of the present invention is to provide an ATM-LAN system in which terminals are greatly independent of a network and a token needs not be exchanged among the terminals, and which can be installed at a low cost.

Another object of the invention is to provide nodes for use in an ATM-LAN system in which terminals can freely control the bandwidth and transfer delay of a broadcast channel for controlling the nodes and in which the delay of a broadcast channel is minimized.

Still another object of this invention is to provide an ATM-LAN system which can incorporate even terminals incapable of processing messages on a broadcast channel.

Another object of the present invention is to provide an ATM-LAN system which can incorporate mobile terminals.

A further object of the invention is to provide an ATM-LAN system which can serve as a radio interface in which relatively important transfer bandwidth can be allocated to mobile terminals designed to perform multimedia communication, in which each mobile terminal can set connections, and in which transfer bandwidth allocated to the mobile terminals can be guaranteed.

According to a first aspect of this invention, there is provided an ATM-LAN system wherein connections can be set by controlling VP/VC link setting function and VP/VP link connecting function in accordance with instructions supplied from terminals. In the ATM-LAN system, the terminals located in a limited region are connected to one another via nodes, and communication among the terminals is effected in asynchronous transfer mode (ATM). Each terminal has a request transmitting means for transmitting a link setting request for setting the link of a virtual path or the link of a virtual channel to at least one of the other terminals, and for transmitting a link chaining request for connecting that link to the other terminal.

In the ATM-LAN system, a broadcast channel is formed for two purposes: to connect the nodes and the terminals, and to transfer the link setting requests and link chaining requests from the terminals to the nodes. Each node has a link setting/connecting section designed to receive a link setting request and a link chaining request, both transferred from the broadcast channel, and to set and connect links in accordance with these requests.

In the ATM-LAN system having the basic structure described above, the nodes are connected in the form of a tree. Each node has a plurality of ports, each having a switch for connecting the port to any root side or any leaf side of the tree. Each node has two independent lines and a back-pressure applying means. The first line is used to transfer broadcast cells, and the second line to transfer cells other than the broadcast cells. The back-pressure applying means applies a back pressure on a stream of the cells other than the broadcast cells in order to insert the broadcast cell into the cell stream.

According to a second aspect of the invention, there is provided an ATM-LAN system which comprises transfer means for transferring broadcast cells from one of terminals to any other terminal or to a node setting means for controlling nodes other than the node of the one of the terminals, and for transferring user's cells along the connection set between any selected ones of the terminals; and competition control means for determining which cells should be transferred to a target interface point, the broadcast cell held in a first FIFO or the user's cells held in a second FIFO.

According to a third aspect of this invention, there is provided an ATM-LAN system in which a plurality of nodes are connected in the form of a tree, each node transfers the broadcast cells transmitted by one of terminals, to any other terminal and a node setting means for controlling any other node, and which comprises means for transferring user's cells along the connection set between any selected ones of the terminals, and means for transmitting the broadcast cells to all interface points except the interface point to which the broadcast cells have been input.

According to a fourth aspect of the present invention, there is provided an ATM-LAN system which comprises a connection setting means incorporated in at least one of terminals, for generating a node setting request for setting the link and connection of a virtual path or a virtual channel; a broadcast channel for transferring a node setting request from the connection setting means to a plurality of nodes; and a plurality of node setting means, each located in one node, for receiving the node setting request transferred by the broadcast channel and setting the link and connection of a virtual path or a virtual channel.

According to a fifth aspect of this invention, there is provided an ATM-LAN system, wherein the down link of a radio zone prepared by a zone preparing function assumes a frame structure including overheads which have predetermined lengths and between which a prescribed number of cells exist, and the up link of the radio zone consists of slots formed by dividing time intervals, which are synchronous with the frame defined on the down link, into as many units as the cells contained in the frame structure, and wherein a mobile terminal, if any existing in the radio zone, can freely transmit cells (i.e., information) onto the slots of the up link.

According to a sixth aspect of the invention, there is provided an ATM-LAN system in which, if a plurality of ATM communication networks are connected to an upper ATM communication network, an physical address effective in the upper ATM communication network is allocated to each mobile terminal and a home ATM-LAN is defined for the mobile terminal; when the mobile terminal designated by a physical address receives a call, the upper ATM communication network is controlled to transfer this call to the connection process provided for the home ATM-LAN; the connection setting means of the home ATM-LAN determines the ATM-LAN to which the information-receiving mobile terminal has moved, by utilizing the connection between the connection setting means, when the mobile terminal receives a call after moving from the home ATM-LAN; and the connection setting means of the home ATM-LAN requests that the upper ATM communication network set connection in an ATM-LAN away from the home ATM-LAN.

In the ATM-LAN system according to the sixth aspect of the invention, a link setting request and a link chaining request, both transmitted from a terminal, are transferred by means of a broadcast channel to each node, thereby setting the link and connection of a virtual path or a virtual channel. Therefore, the terminal can autonomously set a connection on an ATM-LAN. A connection can thereby set which is suitable for the application being used in the terminal. Hence, the terminals have improved independency in the ATM-LAN system.

In the ATM-LAN system according to the sixth aspect of the invention, nodes may be connected in the form of a tree, each having a plurality of ports each of which has a mechanical switch for connecting the port to any root side or any leaf side of the tree, and broadcast cells to be broadcasted to all terminals in a prescribed way may be handled in accordance with the data input by operating the mechanical switches. Then, each node can provide a broadcast channel capable of transmitting messages to all terminals immediately after the power supply switch of the node is turn on. This enables each terminal to obtain information required for setting connection, by utilizing the broadcast channel.

Furthermore, each node may have a line for transferring broadcast cells and another line for transferring cells other than the broadcast cells, and a back pressure may be applied on a stream of the cells other than the broadcast cells in order to insert the broadcast cells into the stream of the cells other than the broadcast cells. Then, the cells on the broadcast channel can be transferred prior to the cells other than the broadcast cells, without using a complex structure.

According to a seventh aspect of this invention, there is provided an ATM-LAN system which comprises a first FIFO for holding user's cells, a second FIFO for holding broadcast cells, and an arbitration control means for determining, by means of polling, a cycle in which to transmit cells held in the first or second FIFO. Thus, the bandwidth for the broadcast channel can be changed merely by altering the polling cycle, and transfer delay can be freely controlled only by adjusting the second FIFO for holding broadcast cells.

According to an eighth aspect of the invention, there is provided a node for use in an ATM-LAN system, which provides a broadcast channel which transfers no broadcast cell to the root of a broadcast tree and which therefore minimizes transfer delay.

Since a connection setting process has set a virtual channel connecting the connection setting process to a predetermined terminal, a message is transferred via the virtual channel to a terminal requesting for a call-setting in accordance with a protocol such as Q.93B other than that defined on a broadcast channel. The connection setting process can therefore temporarily terminate the protocol of this terminal, whereby even a terminal incapable of processing the message on the broadcast channel can be connected to the connecting process.

According to a ninth aspect of this invention, there is provided an ATM-LAN system, wherein a zone preparing function can be freely connected to the ports of each node, thereby to arrange the ports spatially, can prepare a radio zone at any location where services are needed, and can be controlled by a connection setting process in accordance with a broadcast cell. The ATM-LAN system can, therefore, incorporate mobile terminals in an economical fashion.

According to a tenth aspect of the present invention, there is provided an ATM-LAN system, in which a radio zone prepared by a zone preparing function have an up link and a down link, both provided in the form of cells, and service search can therefore be accomplished by means of a broadcast channel in the same way as in a terminal connected by a physical link, and which can provide services in a flexible manner so that the control section of each ATM-LAN need not hold services applicable to mobile terminals.

According to an eleventh aspect of the present invention, there is provided an ATM-LAN system, wherein a physical address effective in an upper ATM communication network is allocated to each mobile terminal, a home ATM-LAN is defined for the mobile terminal, and a call which the mobile terminal receives after moving from the home ATM-LAN is transferred to the home ATM-LAN, the upper ATM communication need not track the mobile terminal since the ATM-LAN can determines the location of the mobile terminal, and the response and service area of the mobile terminal can be enhanced and expanded without using the host ATM communication network, merely by grading up the connection setting process of the ATM-LAN.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a diagram explaining how a connection setting process interacts with a node setting process, a terminal setting process and the ATM-LAN accommodation unit setting process, in order to recognize the structure of the ATM-LAN;

FIG. 9 is a diagram explaining how the application process in a terminal retrieves connection setting service;

FIG. 10 is a diagram explaining how each terminal requests for a connection setting service;

FIG. 27 shows the format of an internal cell of the ATM-LAN;

FIG. 34 is a chart showing the sequence of setting a connection within the ATM-LAN in accordance with Q.93B;

FIG. 35 illustrates the sequence of steps in which the ATM-LAN requests that an upper ATM network set a connection in accordance with Q.93B;

FIG. 37 is a diagram illustrating a method in which the ATM-LAN sets a connection for transferring programs;

FIG. 38 is a diagram showing the structure of an ATM-LAN incorporating mobile terminals;

FIG. 42 is a perspective view of the mobile terminal shown in FIG. 41;

FIG. 43 is a diagram illustrating the sequence of exchanging messages among a mobile terminal, a zone preparing function and a connection setting process;

FIG. 44 is a diagram showing the data stored in the connection setting process and used to render the mobile terminal operative;

DETAILED DESCRIPTION OF THE PREFERRED EMBODIMENTS

An embodiment of the present invention will now be described, with reference to the accompanying drawings.

Figure 1:
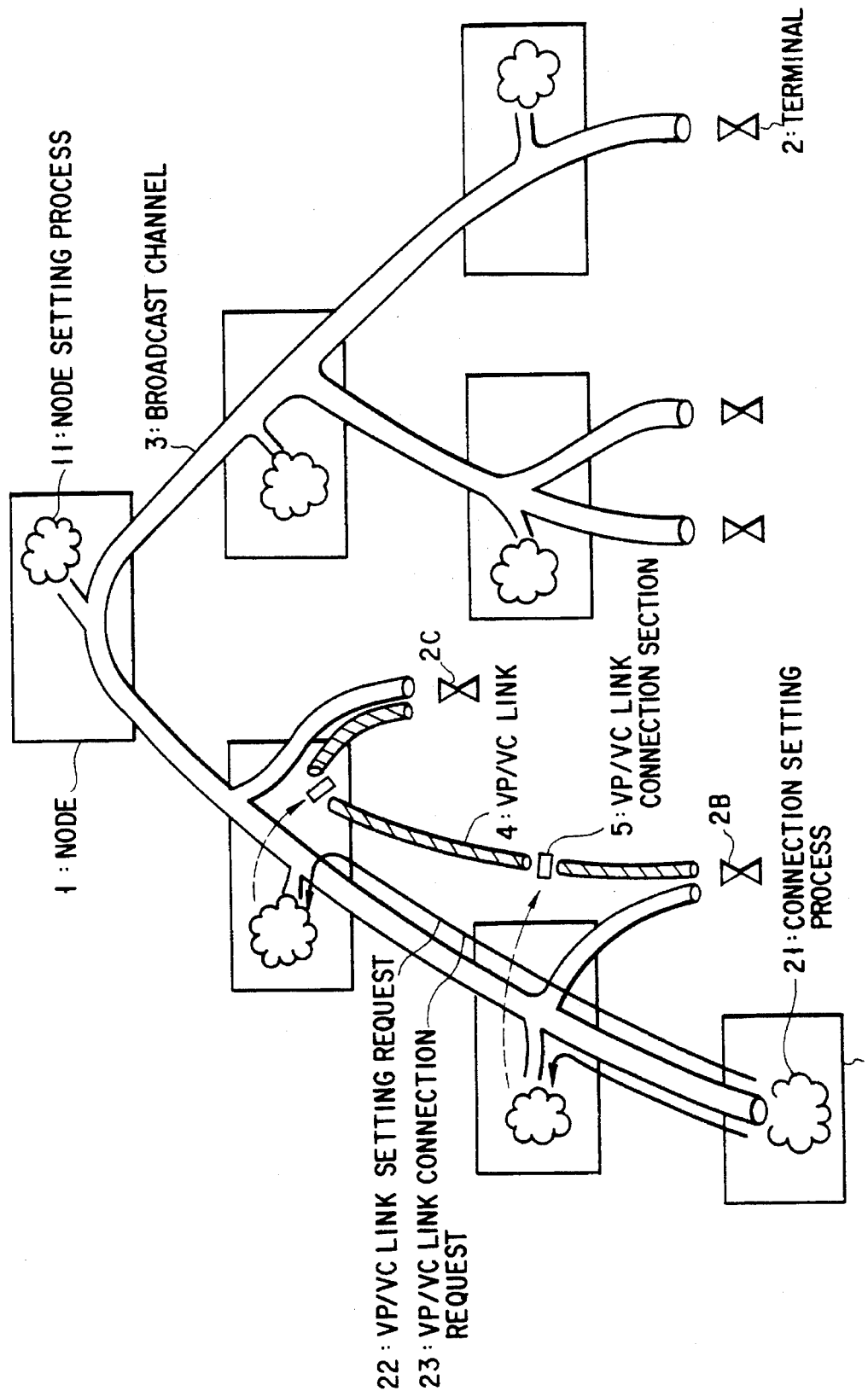
FIG. 1 is a diagram showing an ATM-LAN system according to a first embodiment of the present invention.

FIG. 1 illustrates the basic structure of an ATM-LAN system according to the present invention. As shown in FIG. 1, the ATM-LAN system comprises a plurality of nodes 1, a plurality of terminals 2 located in a limited region, and a broadcast channel 3. Each node 1 has a plurality of ports and a node setting process 11. At least one of the terminals 2 has a connection setting process 21 in addition to a terminal setting process.

The connection setting process 21 is designed to generate a VP/VC link setting request 22 and a VP/VC link chaining request 23. The VP/VC link setting request 22 is used to set a VP/VC link 4 for a VP (Virtual Path) or a VC (Virtual Channel) link for any desired node 1. The VP/VC link chaining request 23 is used to connect the VP/VC link 4 to a VP/VC link connection section 5. The node setting process 11 is designed to receive the link setting request 22 and the link chaining request 23 and to set a VP/VC link and connect the link 4 to a connection section 5 in accordance with the requests 22 and 23.

Figure 2:
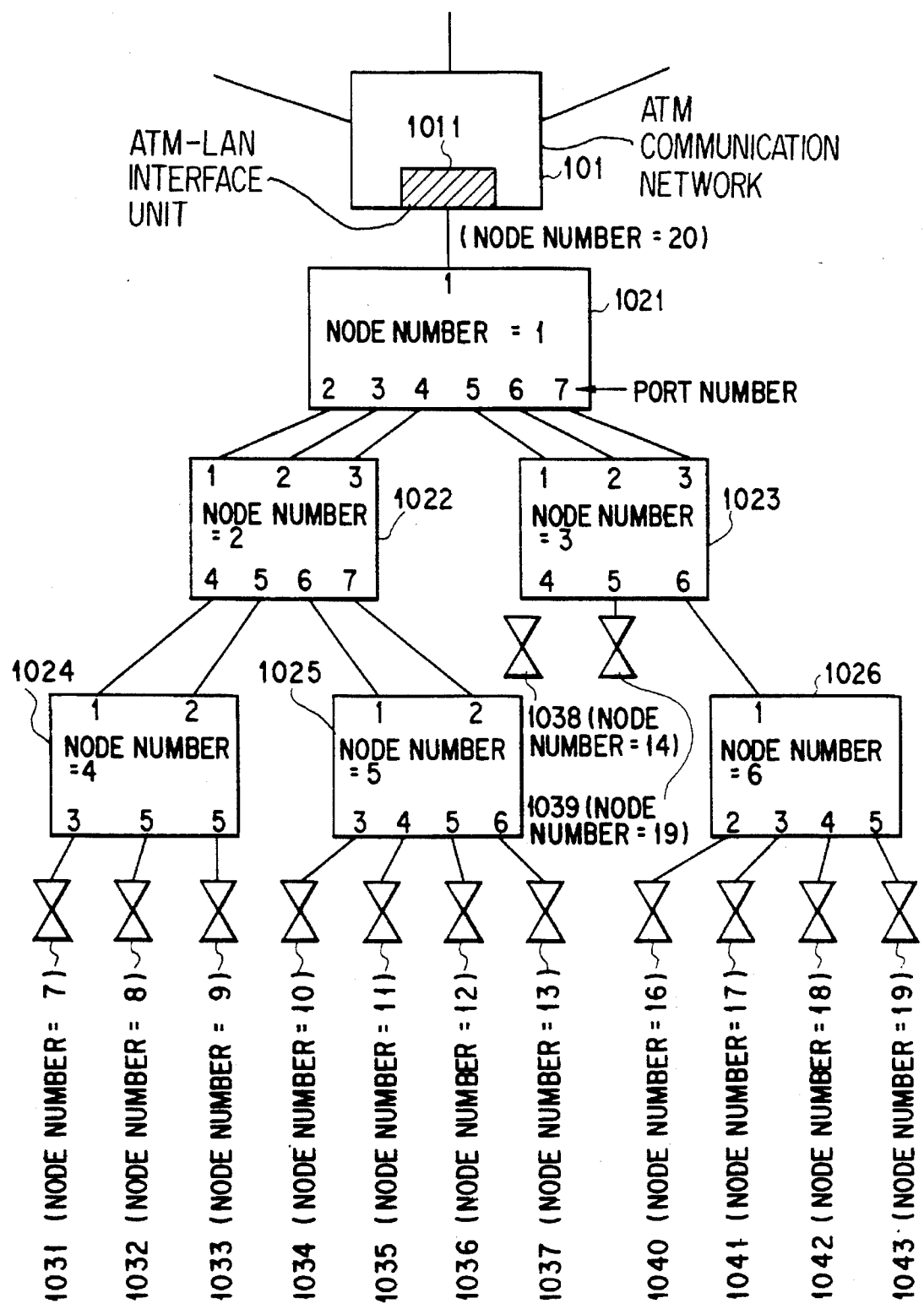
FIG. 2 is a diagram illustrating the ATM-LAN system of FIG. 1 in greater detail.

FIG. 2 is a diagram illustrating another structural aspect of the ATM-LAN system shown in FIG. 1. As shown in FIG. 2, the ATM-LAN system comprises an upper ATM communication network 101, an ATM-LAN interface unit 1011 incorporated in the network 101, nodes 1021 to 1026, and terminals 1031 to 1043. The system is characterized in that the nodes 1021 to 1026 are connected by transmission lines, forming a tree structure. As well known, a tree topology is of such nature that the throughput of the entire network is determined by the throughput near the root. To solve this problem inherent in the tree topology, the present embodiment has a plurality of transmission lines for connecting the nodes located near the root of the tree structure, to thereby increase the throughput in the vicinity of the root. The optimal number of transmission lines for connecting the nodes largely depends on the type of the distribution application employed in the ATM-LAN and the traffic amount in the ATM-LAN. With the ATM-LAN system of FIG. 2 it is possible for a user to set the number of transmission lines at any desired value. This greatly characterizes the present embodiment.

As shown in FIG. 2, the ATM-LAN interface unit 1011 is located at the root of the ATM-LAN having a tree structure. The unit 1011 is so located in order to prevent the traffic in the ATM-LAN from being restricted by the traffic in the terminals 2 or the traffic in the upper ATM communication network 101.

The function, operation and structure of the ATM-LAN system will be described in detail, with reference to FIG. 2.

In the ATM-LAN according to the invention, the function of setting a VP/VC connection in response to a request made by a terminal (hereinafter referred to as "connection setting process") is defined as a user-side function, whereas the connection setting process is a network-side function in the conventional ATM-LAN as described above. This is one of the major characterizing points of the present invention. Thus, the connection setting process is installed in one of the terminals 1031 to 1043, for controlling the nodes 1021 to 1026 in order to setting a VP/VC connection, that is, a connection between a terminal and another terminal or a connection between a terminal and the ATM-LAN interface unit 1011.

A node setting process is installed in each node, which is a function of setting and connecting VP/VC links under the control of the connection setting process. Furthermore, a terminal setting process and an ATM-LAN interface unit setting process are installed in each terminal and also in the ATM-LAN interface unit 1011. The terminal setting process is a function of controlling the ATM layer function of the terminal under the control of the connection setting process, to thereby set a VP/VC link for the terminal. The ATM-LAN interface unit setting process is a function of controlling the ATM layer function of the ATM-LAN interface unit 1011 under the control of the connection setting process, to thereby set a VP/VC link for the unit 1011.

In the present embodiment, a node number, which is globally unique, is assigned to each node at the time the node is manufactured. Similarly, a node number is assigned to each terminal at the time the terminal is manufactured; this node number is also globally unique and exists in the same number space as the node number of the node. Further, a node number is assigned to the ATM-LAN interface unit 1011; the node number is also globally unique and exists in the same number space as the node number of the node. Using these node numbers, the connection setting process identifies the node setting process, the terminal setting process, and the ATM-LAN interface unit setting process. For clarity of explanation, it is assumed here that those node numbers specified in FIG. 2 are assigned to the ATM-LAN interface unit 1011, the nodes 1021 to 1026, and the terminals 1031 to 1043. The node numbers can be used as a part of file identifiers used in distribution operating system.

Each of the nodes 1021 to 1026 has a plurality of ports, to which port numbers are assigned. In FIG. 2, the port numbers are indicated at the upper ends of solid lines which represent the physical links (connections) of the neighborhood nodes.

Interaction among the connection setting process, the node setting processes, the terminal setting processes and the ATM-LAN interface unit setting process will be described below in detail, based on the assumption that the connection setting process is installed in the terminal 1031. It should be noted that the connection setting process may be installed in each of the other terminals 1032 to 1043.

Figure 3:
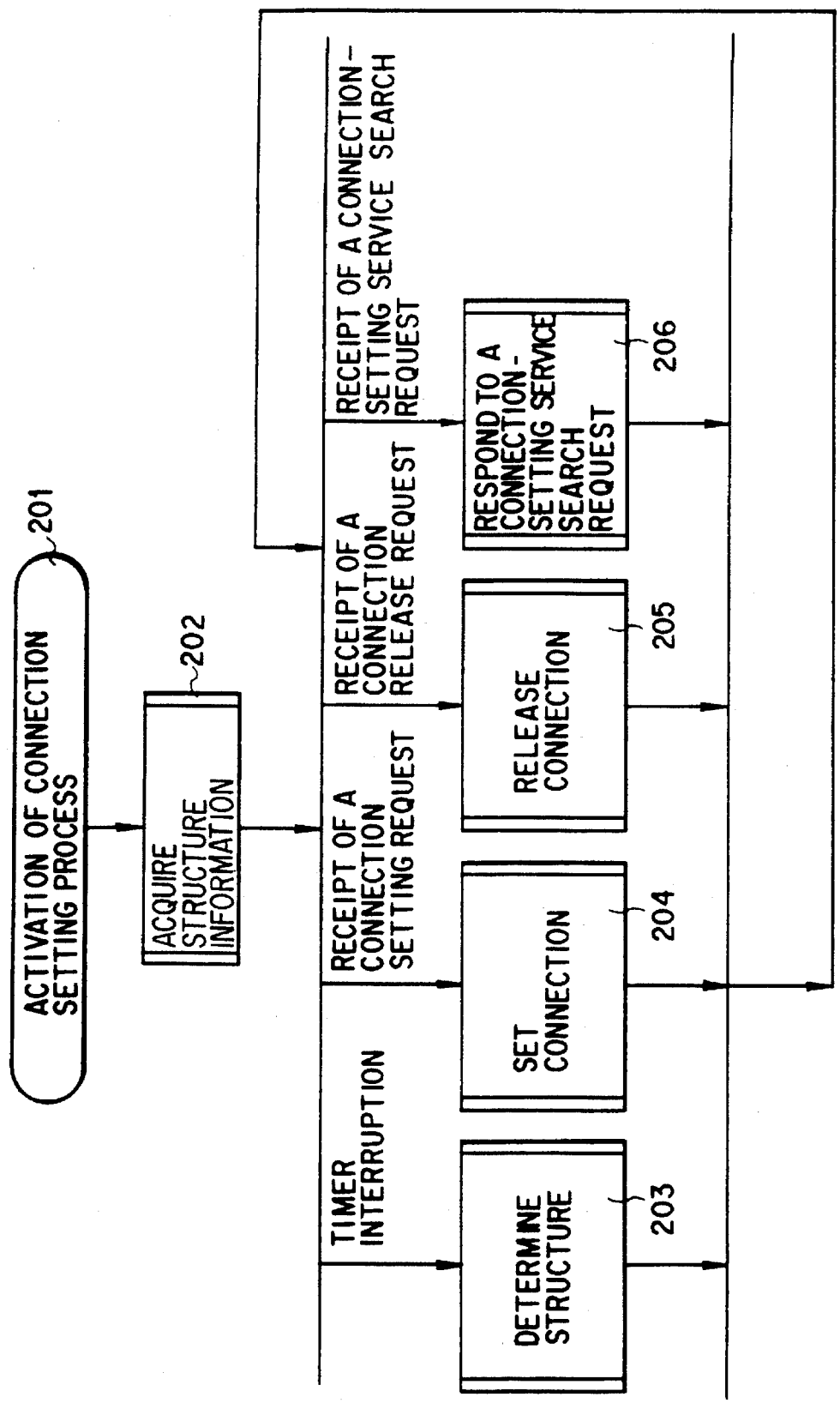
FIG. 3 is a diagram explaining how the connection setting process operates in the ATM-LAN system shown in FIG. 1.

It will be described how the connection setting process operates, with reference to the flow chart of FIG. 3.

In Step 201, the connection setting process is activated in the terminal 1031. Then, in Step 202, the connection setting process starts acquiring information showing the structure of the ATM-LAN in which the process can set VP/VC connection. In Step 203, the connection setting process determines the structure of the ATM-LAN from the information it has acquired in Step 202, and the process performs its function in response to a connection setting request sent from any external device. Thereafter, when the connection setting process receives a request from any external device, it performs the operation defined by the request.

In Step 204, upon receipt of a connection setting request from any external device, the connection setting process sets a connection between the terminals, between the nodes, or between a terminal and an ATM-LAN interface unit. More precisely, the connection setting process generates a VP/VC link setting request, which is transmitted to the terminals, the nodes, or the terminal and the interface unit by means of the broadcast channel. Next, the process generates a VP/VC link chaining request. The VP/VC link chaining request is transmitted to the terminals, the nodes, or the terminal and the interface unit by means of the broadcast channel.

In Step 205, upon receipt of a connection release request from an external device, the connection setting process releases the connection. To be more specific, the process generates a link release request, which is transmitted by means of the broadcast channel to the terminals, the nodes, or a terminal and the ATM-LAN interface unit, in order to release the VP/VC link which is on the transmission line connecting terminals, nodes, or a terminal and an ATM-LAN interface unit. Then, the process generates a VP/VC link connection release request, which is transmitted by means of the broadcast channel.

In distributed environment, the user can learn the service which any other user is offering and can receive that service. That is, service networking can be achieved in the distribution environment. In the ATM-LAN of this embodiment, the connection-setting service, as well as other services (for example, network file service and the like), can be offered by means of service networking. Hence, in Step 206, the connection setting process can respond to a connection-setting service search request sent from an external device.

In Step 203, the structure of the ATM-LAN may be repeatedly recognized at prescribed intervals of, for example, one minute, so that any structural change of the ATM-LAN can be detected. The time intervals can easily set by, as well known in the art, applying timer interruption to the processor which is executing the connection setting process.

Figure 4:
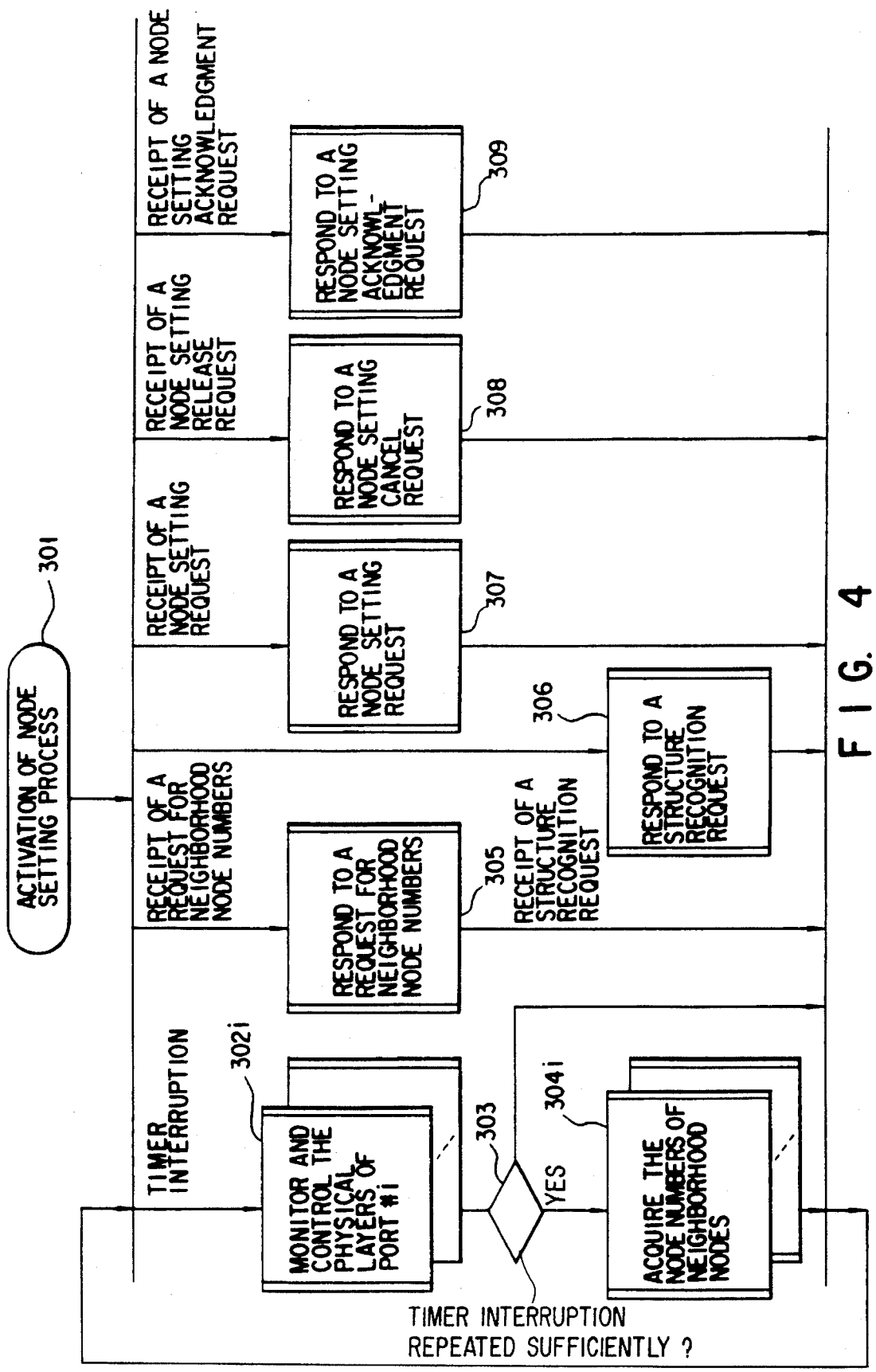
FIG. 4 is a diagram explaining how a node setting process operates in the ATM-LAN system of FIG. 2.

The node setting process will now be described briefly, with reference to the flow chart of FIG. 4.

When the node setting process installed in any one of the nodes 1021 to 1026 is activated in Step 301, the process waits for a request from an external device. Upon receipt of an request, the node setting process performs the operation defined by each content of the request. Timer interruption is applied to the node setting process at predetermined intervals of, for example, one second. In Step 302i, at every timer interruption, the node setting process monitors and controls the physical layer functions (i.e., bit synchronization, frame synchronization, cell synchronization) of the ports of the node in which the process is installed. The function-monitoring and -controlling method need not be a particular one. This is because, although the method largely depends on the physical layer functions, it imposes no influence on the efficiency of the present invention. It is assumed that the physical layer function on the sending side sends out at all times a train of bits which can be set into bit synchronization, frame synchronization and cell synchronization in the receiving devices when the power of the node setting process has been turned on.

In Step 303, upon completion of the monitoring of the physical layers of all ports, it is determined whether or not the number of times the timer interruption has been repeated satisfies a predetermined condition. (This condition is, for instance, that the remainder obtained when the number of times is divided by 128 is nil.) If No, the operation returns to the step in which the node setting process waits for a request from an external device. If Yes in Step 303, the operation goes to Step 304i.

In Step 304i, the node setting process acquires the numbers of the neighborhood nodes if the physical layer of each port can communicate with the neighborhood node (i.e., the node directly connected to the node by the transmission line), with a terminal, or with an ATM-LAN interface unit—that is, if the transmission line is set in bit synchronization, frame synchronization and cell synchronization. Based on the node numbers of the neighborhood nodes the connection setting process recognizes, in Step 203, the structure of the ATM-LAN which the connection setting process controls. Step 304i is repeated periodically, whereby the node setting process can automatically inform that a terminal, a node or an ATM-LAN interface unit has been connected to or disconnected from the ATM-LAN.

Suppose a neighborhood node generates a request for the node number in Step 304i. Then, in Step 305, the node setting process outputs the message generated from its number, to the port which has requested for that message. Hence, each node can acquire the node numbers of the neighborhood nodes.

When the connection setting process generates a structure recognition request in Step 203, this recognition request is transferred to each node. In Step 306, upon receipt of the structure recognition request, each node setting process transmits information such as the numbers of the neighborhood nodes, which the process has acquired, to the connection setting process. The details of this information will be described later.

When the connection setting process sends a VP/VC link request and a VP/VC link chaining request in Step 203 to the designated node regarding the connection setting in step 307, a VP/VC link is set in and connected to the designated node in accordance with these requests.

when the connection setting process sends a VP/VC link release request and a VP/VC link chaining release request in Step 204 to the designated node regarding the connection release in step 308, a VP/VC link setting is released in the designated node in accordance with the requests.

In the case where connection setting process and the node setting process are executed in distributed fashion, a message may be destroyed due to, for example, bit errors. As a result, there may be discrepancy between the group of the VP/VC links acknowledged by the connection setting process as having been requested and the group of the VP/VC links actually set by the node setting process. To detect this discrepancy, the connection setting process can generate and transmit a request to each node setting process, so as to acknowledge the group of the VP/VC links set in the node. In Step 309, upon receipt of the node setting acknowledge request, the node setting process sends the information showing the VP/VC links set in the node, as a message, to the connection setting process.

Figure 5:
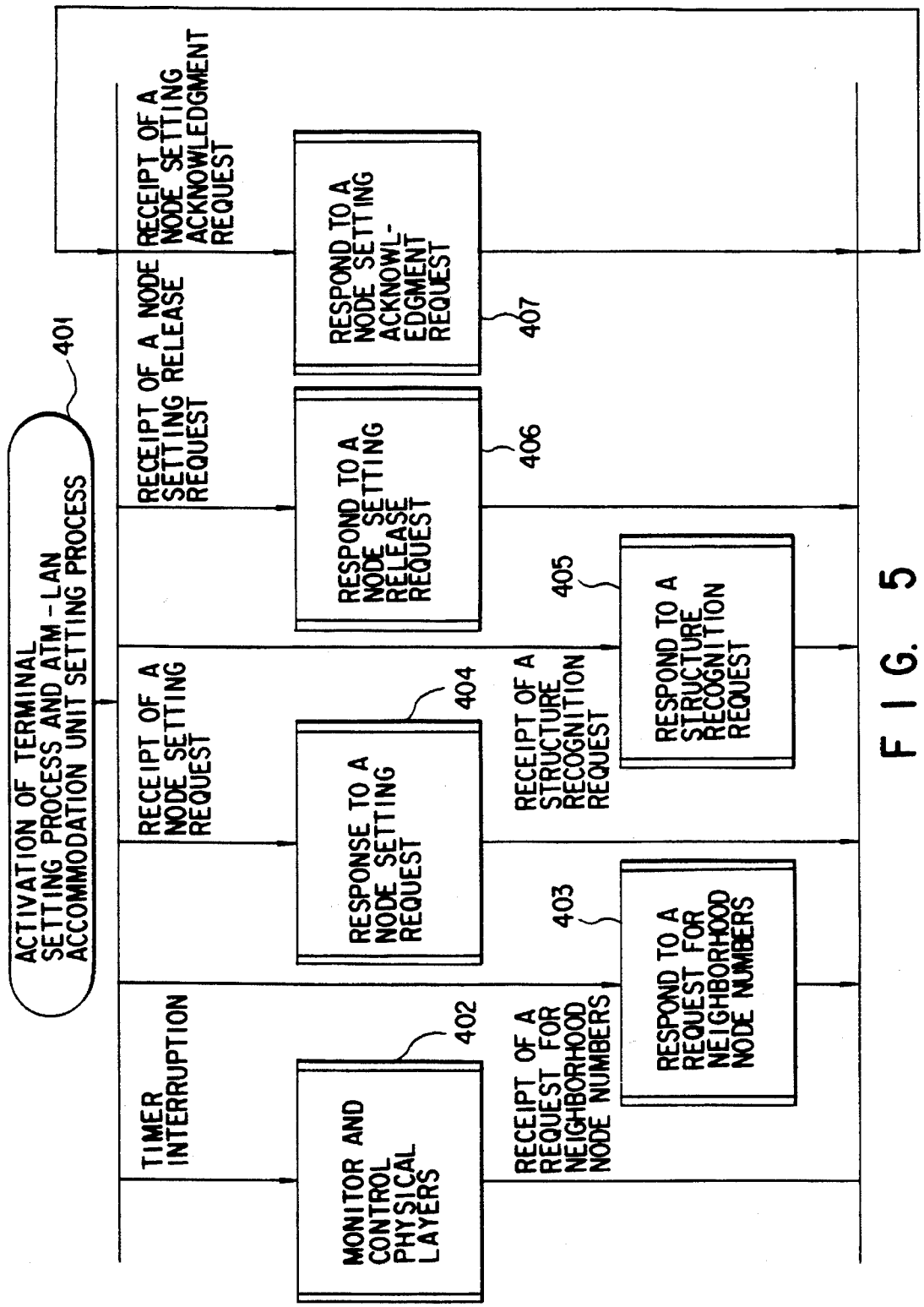
FIG. 5 is a diagram explaining how a terminal setting process and the ATM-LAN accommodation unit setting process perform their function in the ATM-LAN system of FIG. 2.

The terminal setting process and the ATM-LAN interface unit setting process will be outlined below, with reference to the flow chart of FIG. 5.

When the terminal setting processes installed in the terminals 1031 to 1043 and the ATM-LAN interface unit setting process installed in the ATM-LAN interface unit 1011 are activated in Step 401, the terminal setting processes and the ATM-LAN interface unit setting process wait for a request from external device. Upon receipt of the request, the process performs the operation defined by each content of the request, almost in the same way as each node setting process. The process differs from each node setting process in two respects. First, they have only one port for monitoring and controlling a physical layer. Secondly, it performs no step of acquiring information representing the node numbers of the neighborhood nodes. They need not obtain that information, because the node setting process can inform the connection setting process of the structure of the entire ATM-LAN if it acquires the node numbers of the neighborhood nodes.

The steps illustrated in FIGS. 3, 4 and 5 will be explained in more detail. To perform these steps and to achieve interaction among the connection setting process, the node setting process, the terminal setting process and the ATM-LAN interface unit setting process, each of the nodes constituting the ATM-LAN of the present embodiment can perform the following functions, as well as the basic ATM-exchange function which the present inventors disclose in U.S. Pat. No. 5,274,641, i.e., the function of transferring a cell from a given input port to a target port and rewriting the VPI/VCI region of the cell to a predetermined value at the same time.

That is, each node of ATM-LAN has the function of transferring a message generated by a node setting process, a terminal setting process, or an ATM-LAN interface unit setting process, to the other node setting processes, the other terminal setting processes and the other ATM-LAN interface unit setting processes—all belonging to the ATM-LAN. This function is called "broadcast channel." How to perform this function will explained later in detail.

When the broadcast channel is used, it is possible to determine the number of that one of the terminals belonging to the ATM-LAN of this embodiment which offers a service designated or which has a node name designated, and also to determine the node name assigned to the device which has the node number designated. A "node name" is assigned to each terminal, each node and each ATM-LAN interface unit, is easy to learn, and serves as an identifier for identifying the terminal, the node and the interface unit.

The steps illustrated in FIGS. 3, 4 and 5 will be explained in greater detail. The messages used in performing these steps will be defined below, and their formats will be described later in detail.

First, Step 304i and Step 403 which the node setting process performs to acquire neighborhood node information and to respond to a request for this information will be explained.

Figure 6:
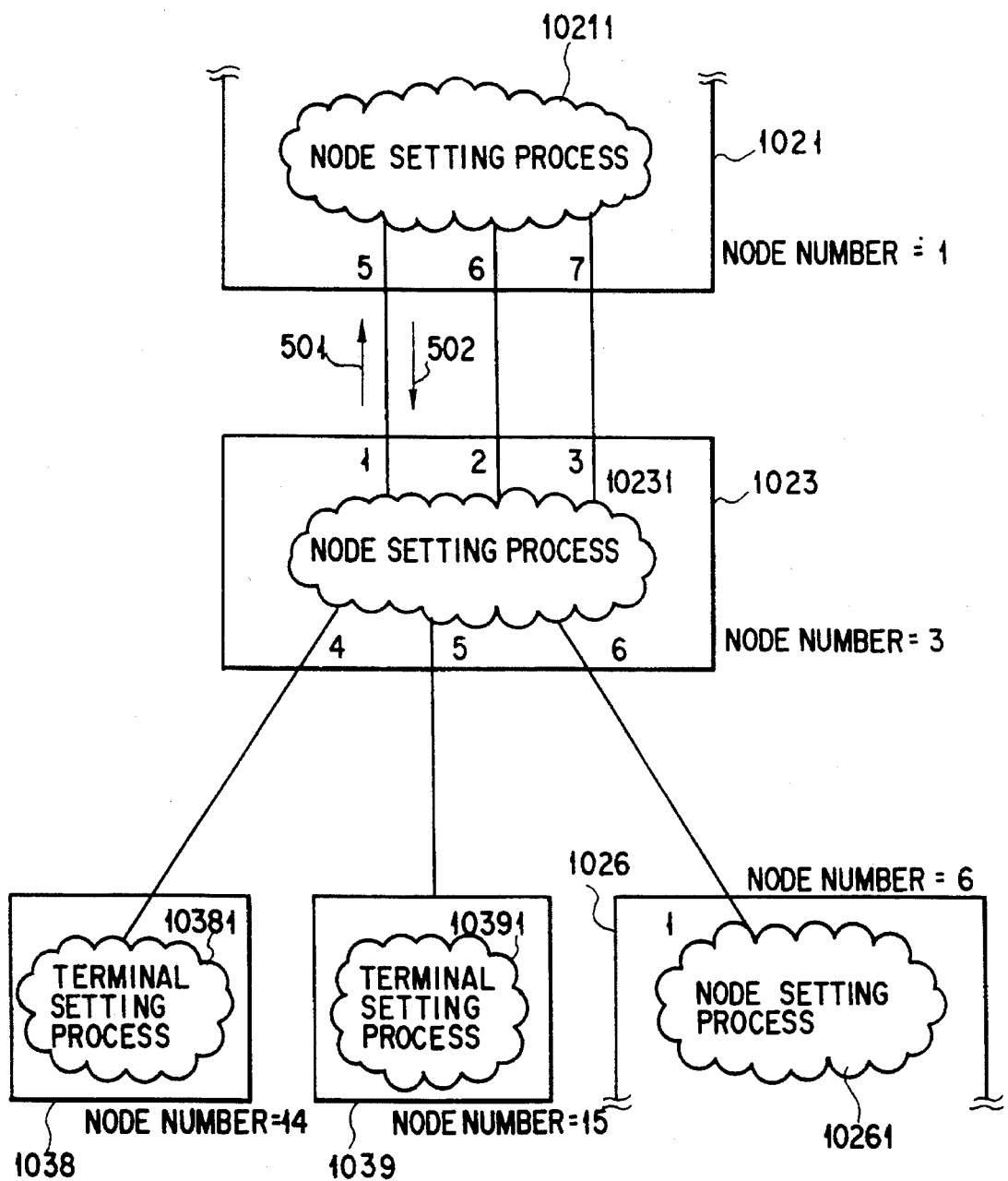
FIG. 6 is a diagram illustrating how a diagram explaining how each node setting process acquires the number of a neighborhood node.

FIG. 6 illustrates how each node obtains the information about the neighborhood nodes. Shown in this figure are the ATM-LAN connected to the node 1023 which has the node number of 3. As is shown in FIG. 6, a node setting process is installed in each node of the ATM-LAN, and a terminal setting process in each terminal of the ATM-LAN. Needless to say, an ATM-LAN interface unit setting process is installed in the ATM-LAN interface unit of the ATM-LAN.

As can be understood from FIG. 6, bidirectional transmission lines are provided for the node setting process in each node and also for the terminal setting process in each terminal, after the power has been turn on, thereby attaining the bit/frame/cell synchronization of physical layers. Using the transmission lines provided among neighborhood nodes, each node setting process requests for the node number of each neighborhood node. The node setting process, the terminal setting process, and the ATM-LAN interface unit setting process respond to the neighborhood node number request.

The node setting process installed in the node 1023 having the node number of 3 acquires the numbers of the neighborhood nodes, by performing various steps in the sequence described below. It should be noted that the node setting process carries out these steps, independently of the node setting process which is installed in any other node of the ATM-LAN.

When the power of the node 1023 is turned on, the node setting process 10231 installed in the node 1023 is activated and starts executing predetermined steps to achieve the bit/frame/cell synchronization of the physical layer of each port. Immediately after the power of the node 1023 has been turned on, from the sending side of the port of each node is transmitted a bit train by which a bit/frame/cell synchronization is established. Thus, once the bit/frame/cell synchronization is established, the node setting process in the node 1023 can determine that the power supply switches of the neighborhood nodes have also been turned on.

After the bit/frame/cell synchronization has been established, the node setting process 10231 transmits a neighborhood-node-number request message to the ports of the node setting process 10211 as indicated by an arrow 501 in FIG. 6, in order to obtain the node number of the neighborhood node 1021.

In the meantime, the node setting process 10211 of the node 1021 having the node number of 1 is executing a prescribed sequence of steps to establish bit/frame/cell synchronization after the power of the node 1021 has been turned on. When the process 19211 establishes bit/frame/cell synchronization, the neighborhood-node-number request message transmitted from the node 1023 is immediately transferred to the node setting process 10211 installed in the node 1021.

Upon receipt of the neighborhood-node-number request message, the node setting process 10211 generates a neighborhood-node-number response message containing the node number (=1) of the node 1021 which has the node setting process 10211. The process 10211 transmits this message to the node setting process 10231 of the node 1023 which has the node number of 3, as is indicated by an arrow 502 in FIG. 6.

As described above, the node setting process 10231 performs the predetermined sequence of steps for establishing the bit/frame/cell synchronization. It can therefore receive the neighborhood-node-number request message generated by the node setting process 10211, after the bit/frame/cell synchronization has been established. By performing the steps described above, the node setting process of each node acquires the numbers of the neighborhood nodes.

Steps 202 and 203 which the connection setting process performs to recognize the structure of the ATM-LAN which the process controls, and also Step 306 which the node setting process performs to respond to a structure recognition request will now be explained.

Figure 8:
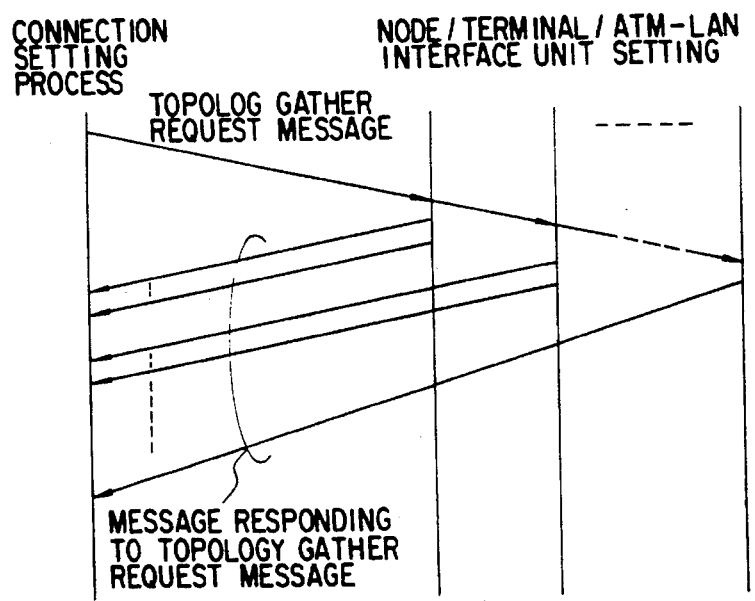
FIG. 8 is a diagram explaining how the structure of an ATM-LAN is recognized.

FIG. 7 and 8 outline the structure recognition executed in the connection setting process. More specifically, FIG. 7 schematically shows the data transmission achieved by the broadcast channel among the connection setting process, the node setting process, the terminal setting process and the ATM-LAN interface unit setting process. FIG. 8 is a diagram representing how the connection setting process interacts with the node setting process, the terminal setting process and the ATM-LAN interface unit setting process, in order to recognize the structure of the ATM-LAN. In FIG. 7, the logical structure of the broadcast channel is expressed in the form of a bus.

To recognize the structure of the ATM-LAN, the connection setting process 10312 installed in the terminal 1031 transmits a topology gather message to the broadcast channel 601 as indicated by an arrow 602 in FIG. 7, to thereby informing all ATM-LANs that their structures are to be recognized.

The topology gather message is transferred from the broadcast channel 601 to the node setting processes 10211 to 10261 installed in the nodes 1021 to 1026, respectively, to the terminal setting processes 10311 to 10431 installed in the terminals 1031 to 1043, respectively, and to the ATM-LAN interface unit setting process installed in the ATM-LAN interface unit setting process 10111, as is indicated in FIG. 7 by arrows 6031 to 6026, arrows 60401 to 60413, and an arrow 6051.

In each of the node setting processes, each of the terminal setting processes, and the ATM-LAN interface unit setting process, cell synchronization has been established with respect to the physical layer of any port included in the device containing the process. Upon receipt of the topology gather message, any process that can achieve communication by using the physical layer generates a message responding to the topology gather message and transmits this response message to the broadcast channel 601 as is indicated in FIG. 7 by arrows 6061 to 6066, arrows 60701 to 60713 and an arrow 6081. The message responding to the topology gather includes the node number of the node whose structure is identified by the message, the number of the port whose structure is identified by the message, the data which represents the physical properties of that port, the number which indicates the type of the device (a node, a terminal or an ATM-LAN interface unit), and the node number assigned to the device which is connected to the port.

Messages, each responding to a topology gather and transmitted to the broadcast channel 601, are sequentially transferred to the connection setting process 10312 as indicated by an arrow 609 in FIG. 7. In accordance with these response messages the connection setting process 10312 prepares or updates a data base which stores the structure of the ATM-LAN.

FIG. 8 illustrates the sequence of steps, described above, in conjunction with the time axis which extends downward.

The connection setting process transmits a topology gather message to the broadcast channel. Upon receipt of this message, any node setting process, any terminal setting process and the ATM-LAN interface unit setting process generates response messages, each responding to the topology gather message. The response messages are transmitted to the broadcast channel and sequentially transferred to the connection setting process.

As a result, the connection setting process can recognize the structure of the ATM-LAN which the process is controlling. In the instance shown in FIG. 2, the connection setting process acquires information about the node 1023 having the node number of 3, which represents the following facts:

a. The device having the node number of 3 is a node.
b. The device having the node number of 1 is connected to the port 1 having the node number of 3.
c. The device having the node number of 1 is connected to the port 2 having the node number of 3.
d. The device having the node number of 1 is connected to the port 3 having the node number of 3.
e. The device having the node number of 14 is connected to the port 4 having the node number of 3.
f. The device having the node number of 15 is connected to the port 5 having the node number of 3.
g. The device having the node number of 6 is connected to the port 6 having the node number of 3.

The connection setting process acquires items of similar information for all other nodes which constitute the ATM-LAN in which the process can set VP/VC connection. Based on information items it acquires, the connection setting process can prepare a data base relating to the structure of the ATM-LAN. Utilizing the data base, the connection setting process can perform further operations.

In the embodiment described above, the structures of all devices containing the ATM-LAN are recognized at the same time. To adapt the data base about the structure of the ATM-LAN controlled by the connection setting process to the structure which the ATM-LAN has when the structures of the devices are recognized, it is desirable to execute a protocol which reads "recognize the structures of all devices at the same time." If this protocol is executed, however, an enormous number of messages responding to a topology gather message will be generated, inevitably reducing the throughput of the connection setting process.

With the present invention it is possible to adopt a protocol which may enhance the throughput of the connection setting process. This protocol enables the connection setting process to selects one of two alternative methods of transferring a topology gather message in one embodiment of the present invention. The first method is to transfer the request message to all terminals (broadcast mode). The second method is to transfer the request message to only devices which have a certain node number. In the case where the connection setting process is activated when the power is turned on, all terminals acquire the structure of the ATM-LAN. During the subsequent timer interruption, the topology gather message is transferred to only the devices having the node numbers which are contained in the messages received after the preceding structure recognition and until the start of the timer interruption and which do not exist in the data base concerning the ATM-LAN. These devices generate response messages in reply to the topology gather message. In accordance with these response messages, the data base is updated.

Step 206, which the connection setting process executes to respond to a connection-setting service search request, will now be explained.

In the ATM-LAN according to this embodiment, the connection setting process is a user-side (or terminal-side) function. This is the most prominent feature of the present embodiment. Thus, which terminal of the ATM-LAN contains the connection setting process is unknown, in principle, to the application process installed in any other terminal. Unless the application process in a terminal recognizes the terminal having the connection setting process, it cannot request for connection setting. To cope with this situation, the present embodiment performs the function of searching for terminals which offer not only connecting setting service but also other networked services, such as a terminal having the server process of an X-window, a terminal having the file server process of a network file system, and the like.

FIG. 9 is a diagram explaining how the application process in a terminal searches for connection setting service. To be precise, FIG. 9 schematically shows the data transmission achieved by a broadcast channel among connection setting processes, node setting processes, terminal setting processes, an ATM-LAN interface unit setting process and an application process, which are installed in the devices constituting the present embodiment. In FIG. 9, exactly as in FIG. 7, the logical structure of the broadcast channel is expressed in the form of a bus.

The application process 701 generates a service retrieval message in order to search for a terminal offering connection setting service. The message is transmitted to the broadcast bus 601 as indicated by an arrow 702 in FIG. 9. The service retrieval message on the bus 601 is transferred to the connection setting process 10312, the node setting processes 10211 to 10261, the terminal setting processes 10311 to 10431 and the ATM-LAN interface unit setting process 10111, as indicated by an arrow 708, arrows 7041 to 7046, arrows 70501 to 70513, and an arrow 7061, respectively. The process which offers the connection setting service designated by the service retrieval message, i.e., the connection setting process 10312, generates a response message responding to the service retrieval message and containing the number of the node having the process 10312. As indicated by an arrow 709, the response message is transferred from the broadcast channel 601 to the application process 701 which has just started searching for the connection setting service.

As a result, the application process can acquire the node number assigned to the terminal which offers the desired service.

Assuming two or more terminals offer the same service, the terminal which has transmitted a service retrieval message in order to search for that service receives a plurality of messages responding to the service retrieval message. In this case, the terminal may receive the service offered by the terminal which has transmitted the response message earlier than any other terminals which offer the same service. It is possible to apply different loads on the terminals which offer the same service so that the terminals may transmit the response messages at different times. If this is the case, load is automatically distributed in respect of that service.

Other search services can be offered by using the broadcast channel in the ATM-LAN according to the present embodiment. Among these search services is so-called "naming service" of determining the node number of a node the name of which is known, or determining the name of a node the node number of which is known.

The service of determining a node number from a node name (hereinafter referred to as "communication partner search service") is offered in the following way.

The application process, which needs to determine the node number of a node from the name thereof, generates a communication partner retrieval message and transmits the message to the broadcast channel. The message is transferred to all terminals. Each terminal compares the node name assigned to it with the node name contained in the message. If the node names compared are identical, the terminal generates a response message containing its node number and transmits the response message to the broadcast channel, thus responding to the communication partner retrieval message. The broadcast channel transfers the response message to the application process which has generated the communication partner retrieval message, whereby the node number of the terminal is supplied to the application process.

The service of determining a node name from a node number (hereinafter referred to as "node name notification service") is offered in the following way.

The application process, which needs to determine the name of a node from the number thereof, generates a node name inquiry message and transmits the inquiry message to the broadcast channel. The inquiry message is transferred to the terminals. Each terminal compares the node number assigned to it with the node number contained in the message. If the node numbers compared are identical, the terminal generates a response message containing its node name and transmits the response message to the broadcast channel, thus responding to the node name inquiry message. The broadcast channel transfers the response message to the application process which has generated the node name inquiry message, whereby the node number of the terminal is supplied to the application process.

Each of the devices constituting the ATM-LAN according to the present embodiment performs the abovementioned sequence of steps, thereby to determine the location, node number and node name of any other device which is offering a desired service.

To reduce the amount of messages transferred by the broadcast channel, each terminal may have two functions to perform. The first function is to monitor the service search response message, the communication partner search response message and the node name inquiry response message, all transferred to the terminal. The second function is to temporarily store the node number of any other terminal offering a desired service, or the node name of this terminal in association with the corresponding node number. When the terminal performs either function, however, it is possible that the terminal which offers a certain service may malfunction after generating a service search response message, or that the node name of the terminal which has a certain node number may alter after the terminal has generated a communication partner search response message or a node name inquiry response message. Thus, some measures must be taken to prevent such malfunction of the terminal or such alteration of the node name.

Step 204 in which the connection setting process sets a connection, and Step 307 in which the node setting process responds to a node setting request, will be explained below.

FIG. 10 is a diagram outlining the steps which each terminal performs to request for a connection setting service. More specifically, FIG. 10 explains how the terminal 1038 having the node number of 14 shown in FIG. 2 requests that the terminal 1039 having the node number of 15 set a connection. First, the terminal setting process 10381 of the terminal 1038 generates a connection setting request message, which is transferred to the connection setting process 10321 through the broadcast channel as is indicated by an arrow 802. Described in the connection setting request message are the node number (=14) of the receiving terminal 1038 and the node number (=15) of the sending terminal 1039. It should be noted that, if the terminal 1038 has acquired only the node name of the terminal 1039 or the information representing the service which the terminal 1039 can offer, not having acquired the node number of the receiving terminal 1039, it is sufficient for the sending terminal 1038 to transmits a connection setting request message after it has received the service retrieval message or the communication partner retrieval message since either retrieval message contains the node number of the receiving terminal 1039. Also described in the connection setting request message is the node number assigned to the terminal including the connection setting process 10321. To enable the terminal 1038 to generate a connection setting request message, it is necessary to search for a connection setting service. To this end, the terminal 1038 may perform the abovementioned service search to acquire the node number of the terminal which includes the connection setting process.

Upon receipt of the connection setting request message, the connection setting process 10321 extracts the node number of the sending terminal 1038 and that of the receiving terminal 1039. Then, the process 10321 refers to the data base (DB) 801 prepared by the structure recognition described above and includes data on the structure of the ATM-LAN, thereby determining which transmission lines should be used to connect the sending terminal to the receiving terminal. In the instance shown in FIG. 10, it is determined that the terminals 1038 and 1039, which have the node numbers of 14 and 15, can be connected by the node 1023 which has the node number of 3.

Next, in the connection setting process, it is confirmed 1) whether there is an empty area in VPI/VCI and 2) whether there remains bandwidth requested by a connection setting request message, on each transmission line of paths for setting connection. In the example shown in FIG. 10, it is confirmed 1) whether there is an empty area in VPI/VCI and 2) whether there remains bandwidth requested by a connection setting request message, on the transmission line between a sending terminal 1038 and a node 1023 of node No.=14 and on the transmission line between a receiving terminal 1039 and the node 1023 of node No.=14. If there is an available communication resource, a VP/VC link can be set in each transmission line, and a VP/VC connection can be set between desired terminals by coupling these VP/VC links by nodes on the lines.

If there is no available communication resource, a connection setting completion message to the effect that connection setting has failed is forwarded to the terminal setting process 10381 which is the origin of the connection setting request (not shown).

FIG. 10 illustrates the case where an empty portion is present in the aforementioned communication resource and the VP/VC connection can be set. In this case, in the connection setting process 10321, the VPI/VCI to be used on each transmission line is determined and, after the contents of DB801 is updated, a node setting request message is forwarded to the node setting process 10231 which is requested to effect setting and coupling of the VP/VC link (803).

Upon receiving the node setting request message, the node setting process 10231 effects processing (804, 806, 807, 809) for setting the VP/VC links (811,812, 813, 814) having the VPI/VCI determined by the connection setting process 10231, on the transmission lines between the node 1023 and sending terminal 1038 and receiving terminal 1039. Thus, these VP/VC links are coupled (805, 808). After these processing operations are completed, the node setting process 1031 sends the node setting completion message and tells to the connection setting process 10321 the completion of the work requested by this process (815).

Needless to say, in the case where there are a plurality of nodes on the line between the sending terminal and receiving terminal, the connection setting process 10321 sends node setting request messages to the respective nodes successively and requests setting and coupling of the VP/VC link to the node setting process on the nodes. In addition, similarly with the above-described operation, the node setting processes 10231, 10381 and 10382 of the respective nodes tell to the connection setting process 10321 the completion of the work requested by the connection setting process 10321 by means of the node setting completion message.

In the meantime, the setting and coupling of the VP/VC link executed by the node setting process are the following operations specifically.

Each node has at least the following functions. Specifically, the values of VPI/VCI input from each port are referred to, and the cell is forwarded to the port determined for each value of VPI/VCI. Then, the values of VPI/VCI are rewritten to new VPI/VCI to be output from the port. The setting of the VP/VC link on the transmission line, which is executed by the node setting process 10231, corresponds specifically to the maintenance of entries of a table by which the processing to the cell having the VPI/VCI, with respect to the VPI/VCI used on the respective ports among the aforementioned node functions. Besides, the coupling of the VP/VC link, which is executed by the node setting process 10231, corresponds to an operation of recording, to the entry of the aforementioned maintained table, information for transferring a cell with the VPI/VCI input from the port to port designated by the node setting message, a new VPI/VCI at the time of sending the input cell with the VPI/VCI, and control information (hereinafter referred to as "routing information") for transferring the cell from the designated port to port.

The node 1023 transfers the cell input from each port according to the information set by the node setting process 10231 to a desired port according to the VPI/VCI of the cell, and rewrites the cell to have the VPI/VCI designated at the time of output from this port. Thus, the cell transfer on the ATM connection is realized. The structural element within the node denoted by numeral 810 represents the function for effecting the cell transfer on the ATM connection.

By the above transactions, the setting and coupling of the VP/VC link is completed at all nodes on the path between the sending terminal and the receiving terminal. Then, the connection setting process 10321 prepares a connection arriving message representing arriving of connection, and sends it to the terminal setting process 10382 (816). When the terminal setting process 10391 of the receiving terminal 1039 has received the connection arriving message, the setting for the connection is effected on the port of the receiving terminal 1039. Then, the identifier of the connection is told to the process using the connection. Thereafter, the connection acknowledge message is sent to the connection setting process 10321, and the arriving of the connection setting is informed (819).

If the connection acknowledge message is received, the connection setting process 10321 informs the terminal setting process 10381 of the sending terminal 1038 by preparing a connection setting completion message that the connection setting has been completed (820). Thus, a series of operations relating to the connection setting from the sending terminal to the receiving terminal is completed. The connection setting completion message includes an identifier for identifying the connection requested by the message corresponding to the connection setting completion message, which was determined by the connection setting process 10321. When the terminal setting process 10381 has received the connection setting completion message, it extracts a newly set connection identifier from this message and effects the setting for treating the connection at the port of the sending terminal. Then, the identifier is given to the process using the connection.

Figure 11:
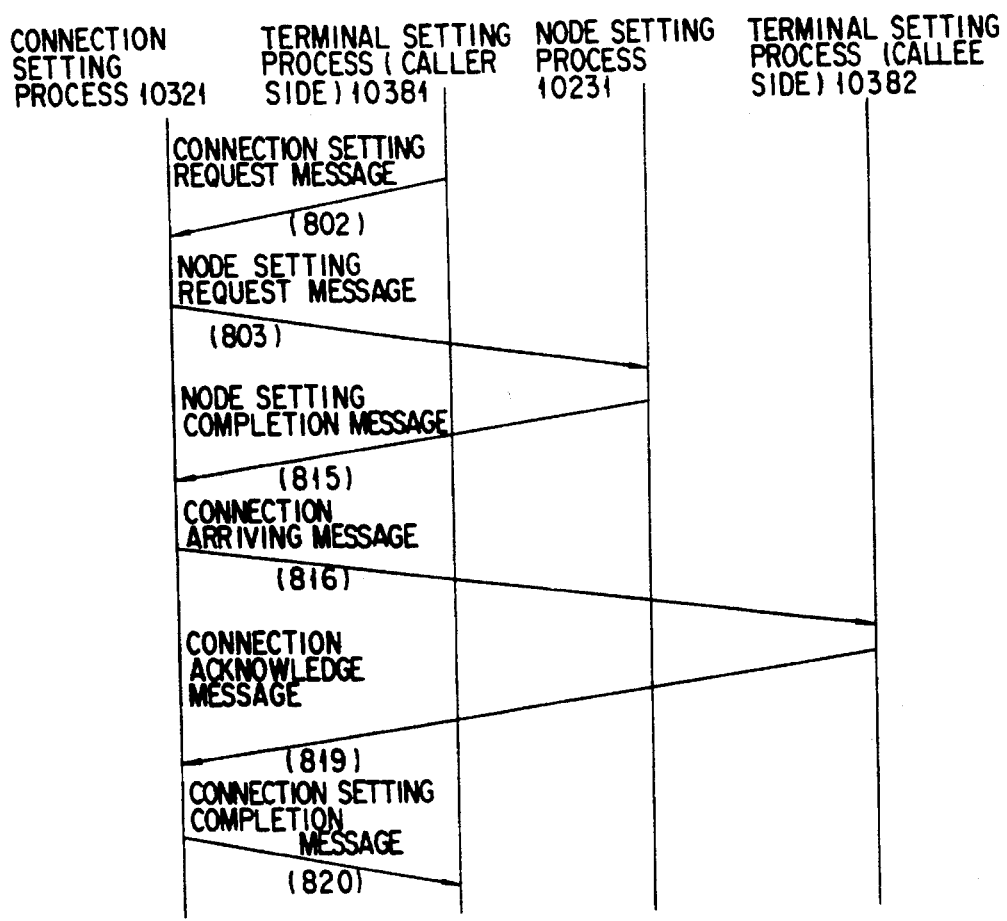
FIG. 11 is a chart explaining a sequence of messages used to set a connection.

According to the above procedure, the VP/VC connection is set on the ATM-LAN of the present embodiment. FIG. 11 shows, along the time axis, messages transmitted between the processes in connection with the operations illustrated in FIG. 10. It should be noted that all messages shown in FIG. 11 are transferred on the broadcast channel.

In the above procedure, the connection setting at the sending terminal is not the process using the connection actually, and the connection setting is executed via the terminal setting process. The connection setting, however, may be realized such that the process using the connection sends the message directly to the connection setting process 10321. This varies according to the inter-process communication function provided by the OS (operating system) of the terminal.

In addition, the method of coupling the process using the set connection and this connection, which is executed by the receiving terminal, varies according to the inter-process communication function provided by the OS of the terminal. In particular, the protocol requires, in advance, activation of the process for effecting communication by the set connection by using the broadcast channel with respect to the receiving terminal. The process for responding to the connection arriving message may be the process using the connection, and not the terminal setting process, as in the above case.

A description will now be given of step 205 for connection release effected by the connection setting process and the associated step 308 for responding to the node setting release function on the node setting process.

Figure 12:
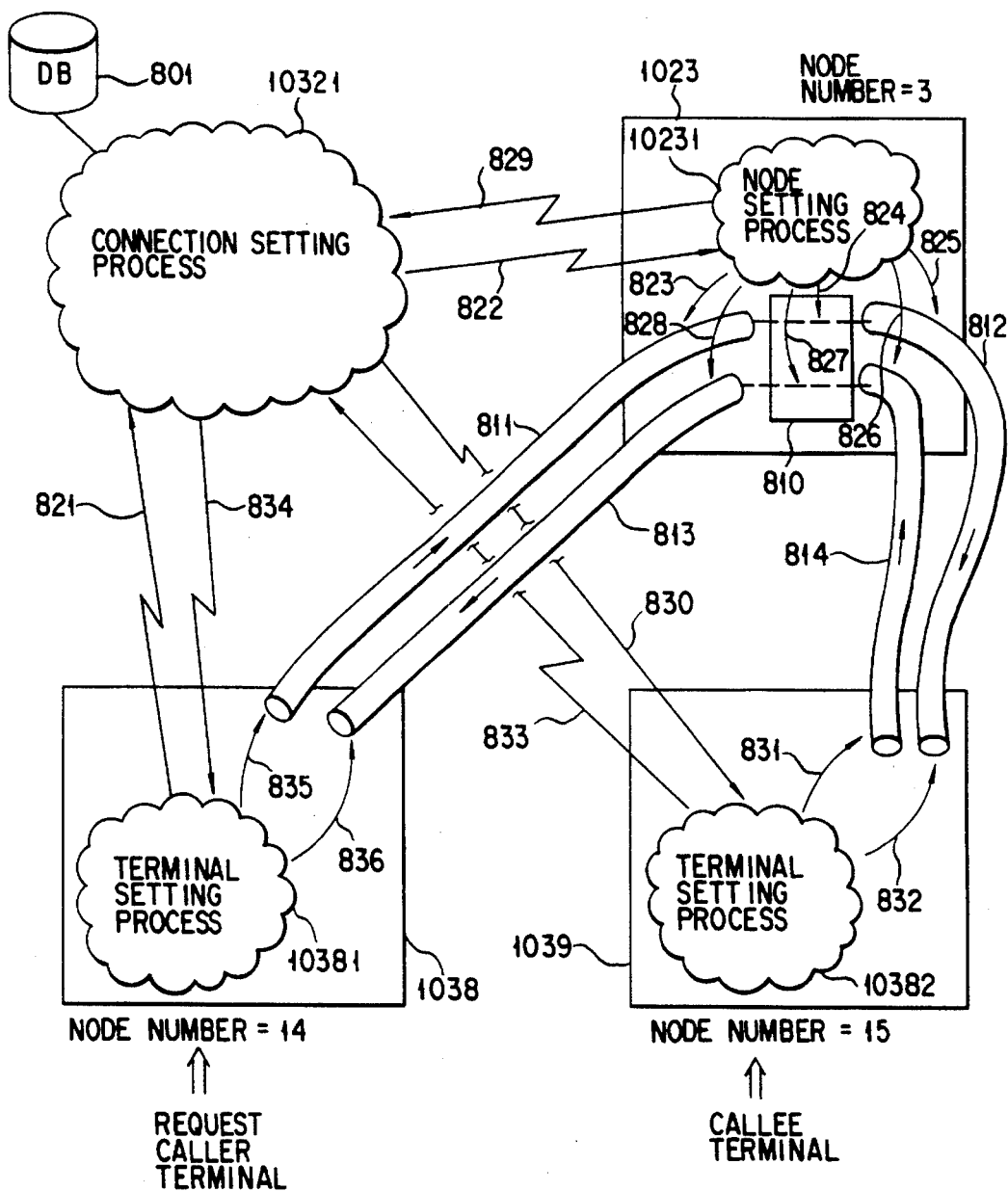
FIG. 12 is a diagram explaining how each terminal requests for a connection cancel service.

FIG. 12 illustrates the outline of the operation executed when the terminal requests the connection release service, and specifically the operation for requesting release of connection between the terminal 1038 of node No. 14 and the terminal 1039 of node No. 15, in the ATM-LAN shown in FIG. 2. FIG. 12 illustrates the procedures for releasing VP/VC links 811, 812, 813 and 814 set by the procedure illustrated in FIG. 10.

The connection release begins when the terminal setting process 10381 of the terminal 1038, which requests connection release, sends the connection release request message to the connection setting process 10321 via the broadcast channel (821). The connection release request message includes the identifier of the connection to be released.

When the connection setting process 10321 has received the connection release request message, it extracts the connection identifier from the message and accesses a data base (DB) 801, thereby acquiring information relating to the VP/VC link constituting the connection with the passage of the connection on which the release was requested. On the basis of the information relating to the VP/VC link, the node release request message is prepared and forwarded to each node (node 1023 alone in the example of FIG. 12) on the path (822).

Upon receiving the node release request message, the node setting process 10231 performs the processing (823, 825, 826, 828) for releasing the setting of the VP/VC links 811, 812, 813 and 814 constituting the connection to be released, and releases the coupling of these VP/VC links (824, 827). If these processing operations are completed, the node setting process 10231 sends the node release completion message and tells to the connection setting process 10321 the completion of the work requested by this process (829).

Needless to say, in the case where the path of the connection to be released extends via a plurality of nodes, the connection setting process 10321 sends the node release request messages to the respective nodes successively and requests setting and coupling of the VP/VC link to the node setting process on the nodes. In addition, similarly with the above-described operation, the node setting processes of the respective nodes tell to the connection setting process 10321 the completion of the work requested by the connection setting process 10321 by means of the node release completion message.

By the above transactions, the release of the setting and coupling of the VP/VC links at all nodes on the path of the connection to be released is completed. Subsequently, the connection setting process tells, though the connection to be released, to the receiving terminal 1039 communicating with the sending terminal 1038, which requested the connection release, the release of the connection by preparing and sending the connection release notice message (830). Upon receiving the connection release notice message, the terminal setting process 10391 of the receiving terminal 1039 releases the setting for treating the connection on the port of the receiving terminal 1039. Then, the process 10391 tells the completion of the connection release to the process which used the connection. Thereafter, the connection release confirmation message is sent to the connection setting process 10321, and the arriving of the connection release is told (833).

Upon receiving the connection release confirmation message, the connection setting process 10321 tells to the terminal setting process 10381 of the sending terminal 1038 the completion of the connection release by preparing the connection release completion message (834). Thus, a series of operations relating to the connection release between the sending terminal and the receiving terminal is completed. The connection release completion message includes an identifier for identifying the released connection. Upon receiving the connection release completion message, the terminal setting process 10381 extracts the identifier of the released connection from the message, and effects setting for releasing the connection at the port of the sending terminal. Then, the release of connection is told to the process which used the connection.

Figure 13:
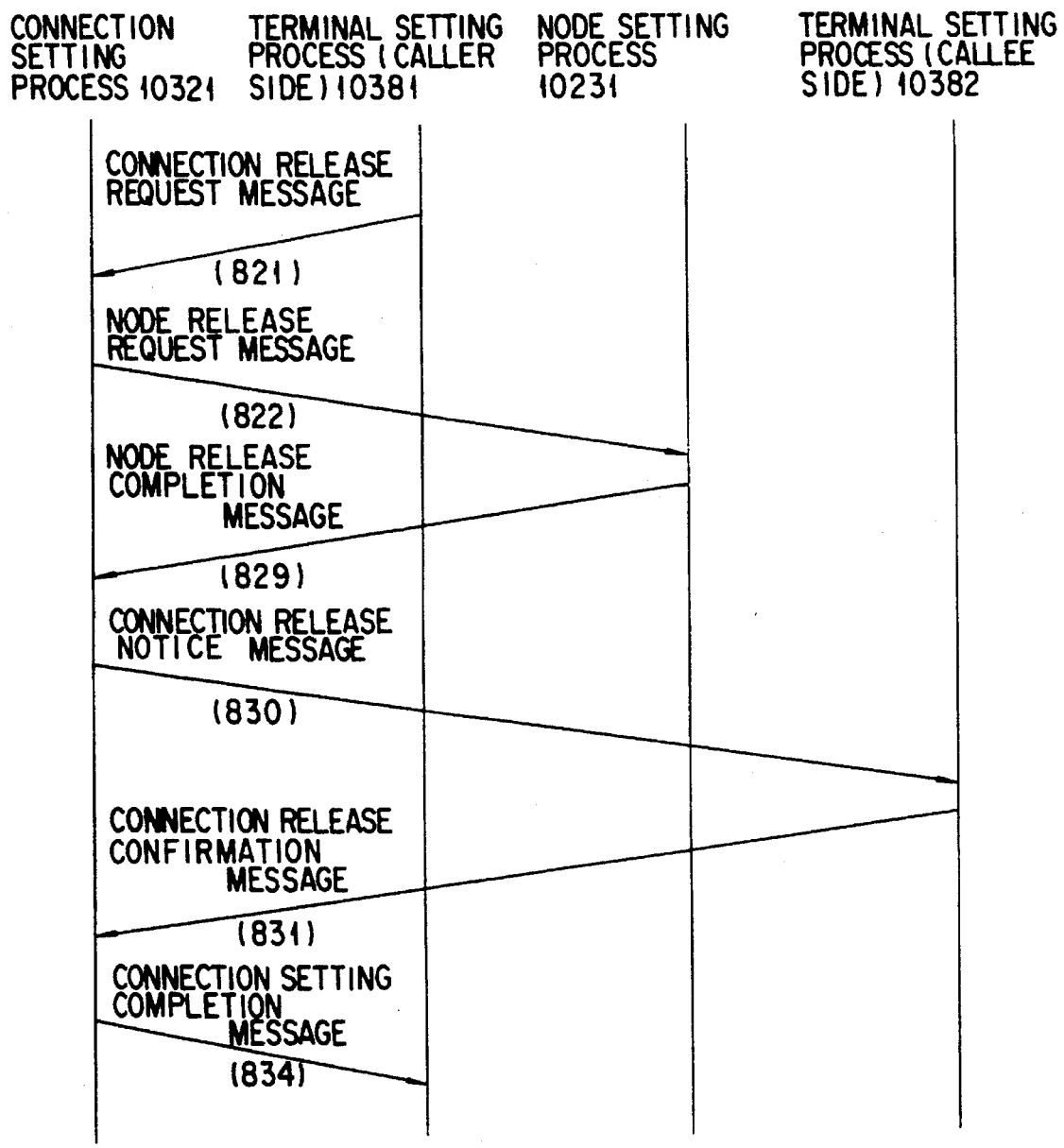
FIG. 13 is a chart explaining a sequence of messages used to release a connection.

By the above procedure, the VP/VC connection set on the ATM-LAN according to the embodiment of the invention can be released. FIG. 13 shows, along the time axis, messages transmitted between the processes in connection with the operations illustrated in FIG. 12. It should be noted that all messages shown in FIG. 13 are transferred on the broadcast channel.

Lastly, step 309 for responding to the node setting acknowledge request, which is executed by the node setting process, will now be described.

The node setting acknowledge request is a service provided to enable the connection setting process to compare information relating to coupling with respect to a group of connections recorded on the data base 801, the current setting of which is recognized by the connection setting process, and the setting of the VP/VC link currently retained by the node setting process 10231, and to enable the connection setting process 10321 to confirm the contents of the data base 801. For example, this service is performed at every connection setting operation or at predetermined time intervals. The node setting process, terminal setting process and ATM-LAN interface setting process return responses to themselves. This procedure is performed in the following manner.

The connection setting process prepares a node setting acknowledge message including information for designating VP/VC link setting/coupling to be confirmed, and forwards the message via the broadcast channel to the process which is requested to make acknowledge.

The process which received the node setting acknowledge message confirms the information relating to the VP/VC link setting/coupling designated by this message, prepares a node setting acknowledge response message according to the state of acknowledge, and forwards the prepared message to the connection setting process via the broadcast channel.

According to the above procedure, the node setting process can confirm the node setting.

Through the above transactions of the message group, the ATM-LAN according to this invention provides the terminals with a platform for setting/releasing/ managing the connection between the terminals accommodated by the ATM-LAN. According to the ATM-LAN of the present invention, the application process on the terminal can freely set the connection. Thus, the information processing performance to be possessed by the ATM-LAN itself may be relatively low, and the cost-effectiveness of the ATM-LAN is enhanced. Moreover, since the connection can be set in accordance with the states of the terminals which use the connection, a maximum degree of freedom of the ATM interface is obtained from the viewpoint of the terminal. This is advantageous for the application for which the networking on the terminal is desired.

A detailed description will now be given of the format of the message for effecting communication between the connection setting process, terminal setting process, node setting process and ATM-LAN accommodating apparatus process in the ATM-LAN according to the above-described embodiment.

At first, a general format of messages transmitted between the processes via the broadcast channel will now be described.

Figure 14:
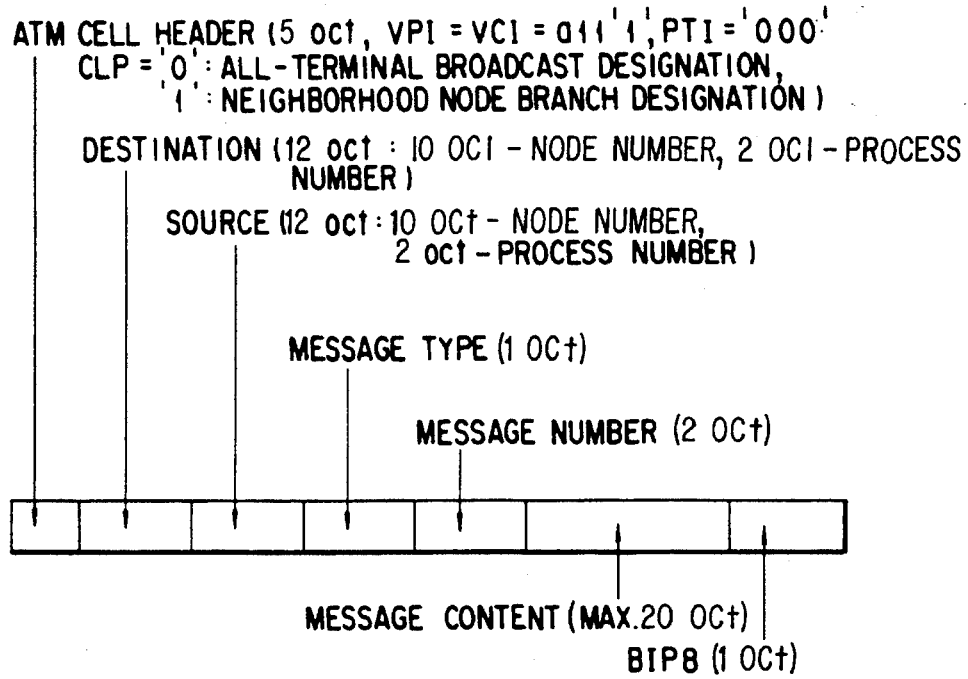
FIG. 14 illustrates a format of the messages on the broadcast channel.

FIG. 14 shows a general format of messages transmitted between the processes via the broadcast channel. As is shown in FIG. 14, the messages transmitted between the processes have a format to be stored in the cell of the ATM layer. In consideration of the fact that the functions of the ATM layer are set mainly by the transactions between the processes, it is desirable that the functions of the ATM layer be set by the messages of the ATM layer, and this desirable mode is achieved.

The first 5 octets of the message are a header of the ATM cell.

The ATM cell in the present embodiment is a so-called UNI cell. As is well known, according to I.361 of the CCITT standard, the top 4 bits of the UNI cell are a field for retaining flow control information of the ATM layer, which is called "GFC." The subsequent 8 bits are a field for retaining the VPI. The subsequent 16 bits are a field for retaining the VCI. The subsequent 3 bits are a field indicating the type of cell, etc., which is called "PTI." The next 1 bit is a field indicating the priority of abandonment for abandoning the cell, which is called "CLP." The last 8 bits are an error detection/correction code which is called "HEC."

In the ATM-LAN node of the present embodiment, the GFC field is transmitted transparently. When the flow control due to the GFC field is standardized by the CCITT, etc., the flow control may be effected by treating the GFC field in the ATM-LAN terminal of the present embodiment.

In the ATM-LAN of the present embodiment, the cell transmitted through the broadcast channel to effect setting of the ATM layer possesses the predetermined VPI/VCI and is thereby distinguished from the other cell on the normal VP/VC connection.

According to the CCITT standard, etc., the VPI and VCI of the normal connection are used successively from "0". In the present embodiment, on the basis of the fact that all bits of VPI/VCI are all "1", it is determined that the cell belongs to the broadcast channel.

The next PTI field is "000", i.e. "user information cell, no congestion; upper inter-user indication=0" according to the CCITT standard.

The next CLP field is information representing distinction between destinated-to-all-terminals broadcast designation and destinated-to-neighbor node designation in the present embodiment. Specifically, "0" indicates all-terminal broadcast designation and "1" indicates neighborhood node branching designation. Since this field is not used in the operation of the ATM-LAN, as will be described later in detail, the CLP field may be transmitted transparently.

The value calculated from the above value according to the CCITT standard is entered in the last HEC field.

The 48-octet information section of the ATM cell comprises a destination field of 12 octets from the top, a source field of 12 octets, a message type field of one octet, a message number field of 2 octets, a message content field of 20 octets, and a BIP8 field of one octet.

The destination field will now be described.

Information for indicating the destination to which the message is send is entered in the address field. This information comprises a node number sub-field of 10 octets, and a process number sub-field of two octets. The node number of the node/terminal/ATM-LAN interface unit, which is the destination of the message, is entered in the node number sub-field. The process number of the process providing service in the device designated by the node number sub-field, which is the destination of the message, is entered in the process number sub-field.

The node/terminal/ATM-LAN interface unit, which has received the message from the broadcast channel, observes the node number sub-field of this field. If the node number of itself is equal to the sub-field, the interface unit takes in the message as one directed to itself. Thereafter, the process number sub-field is referred to, the process to which the message is directed is determined, and the message is given to this process. With respect to each device contained in the ATM-LAN of the present embodiment, it is desirable that the process numbers of the node/terminal/ATM-LAN setting process and connection setting process be set at predetermined values, e.g. "1" for the node/terminal/ATM-LAN setting process, and "2" for the connection setting process.

The node number sub-field has the following two reserved values.

The first value is a value with all bits set at "0". This value is used to designate a branch at the neighborhood node. When the step for retaining the neighborhood node number is executed, the reserved value indicating "destination is the neighborhood node" is required since the node number of the neighborhood node is not known.

The second value is a value with all bits set at "1". This value is used to designate the broadcast. Within the broadcast channel, all messages are transmitted to all terminals. This reserved value is used in order to designate the action of taking the message in all received terminals.

Further, the following two values are reserved in the process number sub-field.

The first value is a value with all bits set at "1". This value represents the need to give the message to all processes (including the node/terminal/ATM-LAN interface unit setting process, connection setting process, etc.) within a certain terminal, which are intended to receive the message from the broadcast channel. Thereby, the service search can be effected.

The second value is a value with all bits set at "0". In this embodiment, this value is provided with a sense that the related process is not present. Thus, this value is not prohibited from appearing as the process number of the destination.

Next, the source field will now be described.

The node number of the node/terminal/ATM-LAN interface unit which issued the message and the process number of the process in the device having this node number which issued the message are entered in the source field. Making use of this field, the node/ terminal/ATM-LAN interface unit performs functions of 1) recognizing the sender by which the message is prepared when the message is received, and 2) recognizing whether the message is one issued by itself. The latter operation is performed for the following reason. On the broadcast channel by which the destinated-to-all-terminals broadcast function is achieved, the issued message is also returned to the sender which sent the message. In order to prevent the sender from responding to the message issued by itself the sender checks the received message whether it sent this message or not. Like the destination field, the source field comprises a node number sub-field of 10 octets and a process number sub-field of 2 octets. Besides, the value with all bits set at "0" and the value with all bits set at "1" are reserved for the node number and process number, as with the case of the destination field. The reason for this is that these node number and process number have special meanings and such node number and process number are not assigned to the processes of the respective devices.

The message type field will now be described.

Information indicating the type of the message, i.e. the neighborhood-node-number request message or neighborhood-node-number response message, etc. is recorded on the message type field.

The value "0" of the first one bit of the message type field indicates that the message requires some processing, and the value "1" thereof indicates that the requested processing is completed, although specific values will be described later.

Next, the message number field will now be described.

The lower 16 bits of the sequence number, which is employed to detect missing of message in the communication between the source side and the destination side on the source side requesting some processing owing to the cell missing due to, e.g. cell discarding, are recorded on the message number field.

The node/terminal/ATM-LAN interface unit counts the number of messages with the top bit of the message type field being "0", by means of messages sent to the broadcast channel, and uses the counted value as a sequence number. In the case of sending the message to the broadcast channel, if the top bit of the message type field is "0", the sequence number is told to the process which prepared the message and the lower 16 bits of the message are recorded in the message number field.

After the message is received and the operation designated by the message is performed, the process to which the processing was requested prepares the response message having value "1" of the top 1 bit of the message type which indicates the completion of the operation. The prepared message is sent to the broadcast channel. In this case, the message number of the message, which was a trigger for preparing the response message, is recorded on the message number field.

The process which requested the operation refers to the message number in the response message and recognizes that to which message this response message is directed. Thereby, the state of the destination process can be predicted at the source process, and, if necessary, the request can be issued once again or another request can be issued.

The message content field will now be described.

Parameters of the operation requested by the message type, which are necessary for each type of message, are recorded on the message content field. Actual parameters will be described later in detail.

Lastly, the BIP8 field will be described.

An error detection code for detecting an error of the information unit of the message (=ATM cell) is recorded on the BIP8 field. In the present embodiment, an error detection code called "BIP8", which is relatively easy to calculate, is adopted. Since the message in this case is a message flowing on the broadcast channel defined only on the ATM-LAN having a relatively narrow service range, the necessity for error correction is low.

Detailed formats of the individual messages will now be described successively.

Since the value recorded on the header portion of the ATM cell and the value recorded on the BIP field are as described above, only the details of the destination field, source field, message type field, message number field and message content field.

TABLE 1 shows a detailed format of the neighborhood node number request message, and TABLE 2 shows a detailed format of the neighborhood node number response message. These messages are used to enable each node to find the node number of the adjacent device prior to the structure recognition, as described above.

TABLE 1

Neighborhood-node-number request message

| Field | Contents |
| --- | --- |
| Destination (12oct) | Node number sub-field: all '0' (Neighborhood node branch designation) Process number sub-field: 1 (Node setting process designation) |
| Source (12oct) | Node number and process number of process which issued the message |
| Message type (1oct) number | 0000 0000 (Neighborhood node request message) |
| Message number (2oct) | Lower 2oct of message Sequential number at source side node |
| Message content (max. 20oct) | Port number of port which sends the message |

TABLE 2

Neighborhood node number request response message
(corresponding to neighborhood-node-number request message

| Field | Contents |
| --- | --- |
| Destination (12oct) | Node number sub-field: all '0' (Neighborhood node branch designation) Process number sub-field: 1 (Node setting process designation) |
| Source (12oct) | Node number and process number of process which issued the message |
| Message type (1oct) | 1000 0000 (Response neighborhood-node-number request message) |

TABLE 2-continued

Neighborhood node number request response message
(corresponding to neighborhood-node-number request message

| Field | Contents |
| --- | --- |
| Message number (2oct) | Message number of corresponding message |
| Message content (max. 20oct) | Node number (10oct) of node from which corresponding message was sent out port number (2oct) of port from which corresponding message was sent out |

The detailed format of the neighborhood node number request message will now be described.

If all bits of the node number sub-field of the destination field of the neighborhood-node-number request message are "0", the neighborhood node branch is designated. Each node/terminal/ATM-LAN interface unit branches the message having value "0" of all bits of the node number sub-field of the destination field. If the process number sub-field is "1", the node/terminal/ATM-LAN interface unit setting process is designated. In this case, each node/terminal/ATM-LAN interface unit performs the operation of transmitting the message to the process having the process number of the value designated to the process number sub-field.

The node number of the node including the process which issued the message (in the present embodiment, neither the terminal nor ATM-LAN interface unit issues this message) and the process number of the process which issued this message are recorded on the source field. By combining the node number and the process number, all processes present on the ATM-LAN of this embodiment can be identified definitely. In this sense, the combination of the node number and process number functions as process identifier.

On the message type field, the value indicating that the present message is the neighborhood node number request message, i.e. '0000 0000' in this embodiment, is recorded.

As described above, the sequence number, which is the lower two octets of the message sequential number at the source node, is recorded on the message number field in order to detect message missing.

The number of the port which sends the message at the node which issued the message is recorded on the message content field. By recording this information in a message which becomes a response to the present message, the node number of the neighborhood node can be made discriminable for each port.

A description will now be given of the detailed format of the neighborhood node number response message which is the response message to the neighborhood node number request message.

In the destination field of the neighborhood node number response message, like the neighborhood node number request message, all bits of the node number sub-field are set at "0", and the neighborhood node branch is designated. In addition, the node setting process is designated on the process number sub-field. Since the node number and process number of the process to which the response is to be transmitted has already been told to the response portion with the source field of the neighborhood node number request message, the node number and process number may be written in the destination field. However, if the node number is designated by the destination field by the method of realizing the broadcast channel in the ATM-LAN of the present embodiment, which will be described later, the message is forwarded to the entire ATM-LAN and the traffic amount of the entire ATM-LAN increases. In this embodiment, the ATM-LAN is designed such that all messages which may be branched by the neighborhood node are sent out, with the neighborhood node branch being designated.

The node number of the node (or the terminal, or the ATM-LAN interface unit) including the process which issued the present message and the process number of the process which issued this message, i.e. the identifier of the process which issued the present message, are recorded on the source field. By referring to this field, the process which receives this message can find the node number of the neighborhood node.

In the message type field, the value indicating that the message is the neighborhood node number response message, i.e. '1000,0000' in this embodiment, is recorded.

As has been described above, the contents of the message number field of the corresponding message are recorded on the message number field in order to detect message missing.

The port number recorded on the message content field in the corresponding neighborhood node number request message is recorded on the message content field. Thereby, it is possible to obtain information, e.g. to the effect that on the side of the node which issued the neighborhood node number request message corresponding to the message, the port X of this node is connected to the device of node number Y. Moreover, since the destination field indicates the neighborhood node branch designation mode, the node number of the node which issued the message corresponding to the present message is recorded to make doubly sure.

TABLE 3 shows a detailed format of a topology gather message, and TABLE 4 shows a detailed format of a topology gather response message. These messages are used for structure recognition in the connection setting process described above.

TABLE 3

Topology gather request message

| Field | Contents |
| --- | --- |
| Destination (12oct) | Node number sub-field: all '1' (Destinated-to-all-terminal broadcast designation) or node number of topology gather node<br>Process number sub-field: 1 (Node setting process designation) |
| Source (12oct) | Node number and process number of process which issued the message |
| Message type (1oct) | 0000 0001 (topology gather request message) |
| Message number (2oct) | Lower 2oct of message sequential number at source side node |
| Message content (max. 20oct) | Null (No significant information) |

TABLE 4

Topology gather response message (corresponding to topology gather message)

| Field | Content |
| --- | --- |
| Destination (12oct) | Source node number and process number of corresponding message |
| Source (12oct) | Node number and process number of process which issued the message |
| Message type (1oct) | 1000 0001 (topology gather response message) |

TABLE 4-continued

Topology gather response message (corresponding to topology gather message)

| Field | Content |
|---|---|
| Message number (2oct) | message number of corresponding message |
| Message content (max. 20oct) | Port number (2oct) of device having structure indicated by the message<br>Node number (10oct) of neighborhood device of the port<br>Information (16oct) of the port |

The detailed format of the topology gather message will now be described.

In the node number sub-field among destination fields of the topology gather message, all bits are set at "1" and the broadcast is designated. Each node/terminal/ATM-LAN interface unit takes in all messages having value "1" for all bits of the node number sub-field. The number "1" of the node setting process (or the terminal setting process, or the ATM-LAN setting process), which is supposed to transmit a response to the present message, is recorded on the process number sub-field.

The node number of the device including the source process which issued the present message (specifically, the terminal in the case of the present embodiment since this message is issued by the connection setting process and this connection setting process is present on the terminal) and the process number of the process which issued this message, i.e. the identifier of the process which issued the present message, are recorded on the source field.

In the message type field, the value indicating that the present message is the topology gather message, i.e. '0000, 0001' in this embodiment, is recorded.

In the message number field, as described above, the sequence number of the lower two octets of the message sequential number at the source node is recorded in order to detect message missing.

Significant information having no information to show any valid value is not recorded on the message content field. Any value may be recorded on this field to be sent out. For example, all bits are set at "0".

When the topology gather is effected for a part of the ATM-LAN in order to reduce the traffic amount in the ATM-LAN, the node number of the node (or the terminal, or the ATM-LAN interface unit) from which topology is gathered may be recorded on the node number sub-field of the destination field. In this case, this message is received by only the device having the node number designated by the destination field. The message of this format is used, for example, in the case where the connection setting request has occurred to the device having the node number which the connection setting process does not recognize within the ATM-LAN. Furthermore, in the case of the message of this type, the number of the port to be gathered may be designated on the message content field. When it is made possible to designate the port number, it would be convenient if designation of the port number and designation of all ports can be distinguished. To achieve this, the state that all bits of the port number is recognized as the state that all ports are designated.

The detailed format of the topology gather response message, which is the response message of the topology gather message, will now be described.

In the destination field of the topology gather response message, the content of the source field of the corresponding topology gather message is recorded. Thereby, this message can be forwarded to the portion requesting for processing.

The node number of the node including the process which issued the present message (or the terminal, or the ATM-LAN interface unit) and the process number of the process which issued this message, i.e. the identifier of the process which issued the present message, are recorded on the source field. By referring to this field, the process which receives this message can find the node number of the source sending the message.

In the message type field, the value indicating that the present message is the topology gather response message, i.e. '1000,0001' in this embodiment, is recorded.

As has been described above, the contents of the message number field of the corresponding message are recorded on the message number field in order to detect message missing.

The message content field comprises the port number of the device having the structure indicated by this message, the port type information of this port, and the node number of the neighborhood device connected by this port.

The topology gather response messages, which are responsive to the topology gather message, are sent out one by one for every port accommodated by the designated device. Thus, the port number of the port having the structure indicated by the message is recorded on the message content field.

Figure 15:
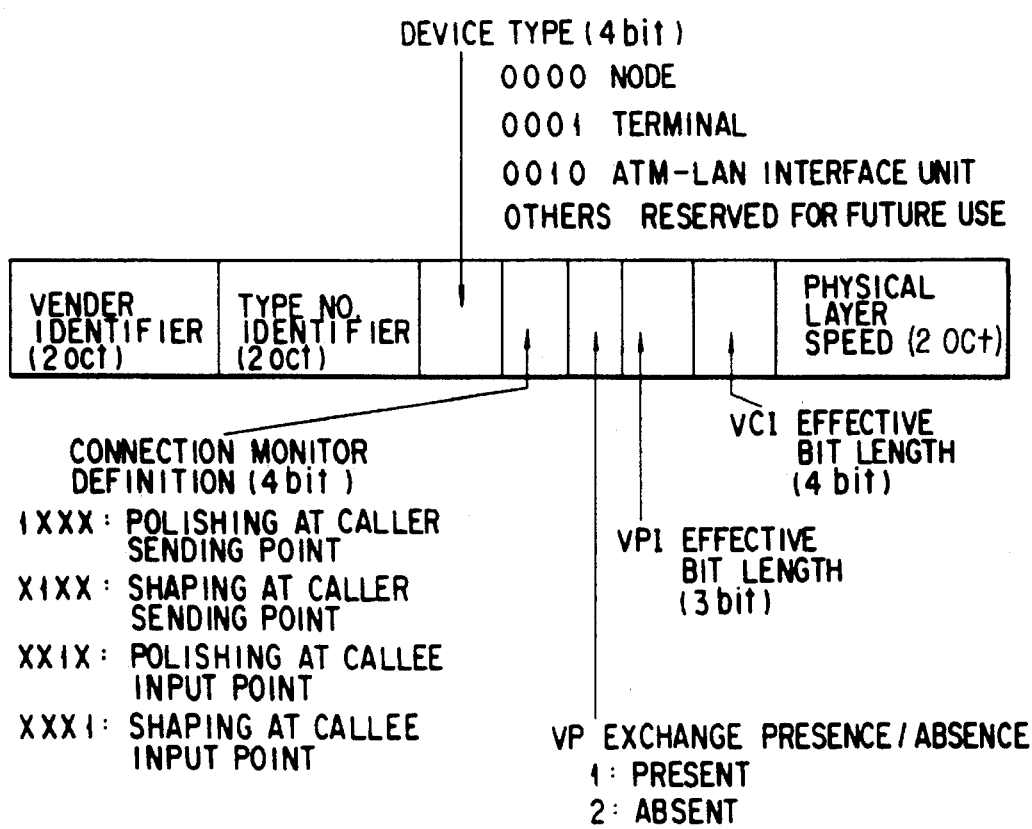
FIG. 15 shows a format of the port type information in the message content sub-field of the topology gather response message.

Specifically, the port type information may be as follows:

FIG. 15 shows a preferable mode of port type information in the ATM-LAN according to the present embodiment.

Four octets of 8 octets of the type information are used in the vender (device manufacturer). Two octets of the four octets are used as a vender identifier for identifying the vender, and the other two octets are used as a type number identifier indicating the type number of the port in the vender. The type of the port can be identified by the vender identifier and the type number identifier. If the connection setting process can have a data base capable of searching information (e.g. representing possibility of copy connection setting) outside the scope displayed by the information (described below), with the vender identifier and type number identifier as keys, a finer control can be effected. By the other four octets, basic information for managing connection of the ATM layer is displayed. The first four bits indicate the type of the device constituting the ATM-LAN (the node, or the terminal, or the ATM-LAN interface unit). The subsequent four bits indicate the type of connection monitoring at the interface point of the port. It is possible to perform polishing and shaping at the interface point, which is the transmission/sending point in the direction of sending a cell stream from the device side to the outside, and at the interface point, which is the reception/input point in the direction of inputting a cell stream from the outside to the device side. This field indicates these operations by independent bits.

This bit indicates whether simultaneous switching of VP and VC is possible or not. In the ATM-LAN of the present embodiment, it is assumed that connection is provided as VC. Thus, this bit indicates whether the VP processing, i.e. VP exchange, can be executed in the ATM-LAN of the present embodiment.

As disclosed in U.S. Bellcore, Technical Advisory, TA-NWT-001110, "Broad and ISDN Switching System Generic Requirements", Issue 1, August 1992, a node which execute VP switching and VC switching can be implemented.

The subsequent three bits of the VPI 8 bits indicate the number of VPI bits relating to the actual processing. The following four bits indicate the number of VCI bits relating to the actual processing in the VCI 16 bits. The VPI/VCI of the input cell is subjected to certain processing for identifying the connection to which the present cell belongs. These bits indicate the effective range of such processing.

The last two octets are a field indicating, by a multiple of 64 Kps, the capacity for transmission of the ATM cell.

As has been described above, by the structure recognition operation, the connection setting process can obtain information to the effect that the device of node number A is present in the ATM-LAN, the type thereof is B, the node number of the neighborhood device of the port C is D, the rate of the port is E, . . . Based on these information items, the connection setting process prepares a data base, and determines the possibility of connection setting while referring to the data base.

TABLE 5 shows a detailed format of the service retrieval message, and TABLE 6 shows a detailed format of the service retrieval response message. As described above, these messages are used for searching for a process providing service of various network services (including connection setting) provided on the ATM-LAN.

TABLE 5

Service retrieval message

| Field | Contents |
| --- | --- |
| Destination (12oct) | All '1' (all-terminal/all-process broadcast designation) |
| Source (12oct) | Node number and process number of process which issued the message |
| Message type (1oct) | 0000 0010 (service retrieval message) |
| Message number (2oct) | Lower 2oct of message sequential number at source side node |
| Message content (max. 20oct) | Service ID number (20oct) of Service to be searched for |

TABLE 6

Service retrieval response message (corresponding to service retrieval message)

| Field | Contents |
| --- | --- |
| Destination (12oct) | Source node number and process number of corresponding message |
| Source (12oct) | Node number and process number of process which issued the message (= identifier of process which provides service) |
| Message type (1oct) | 1000 0010 (Service retrieval response message) |
| Message number (2oct) | Message number of corresponding message |
| Message content (max. 20oct) | Service ID number (20oct) of Service to be searched for |

At first, the detailed format of the service retrieval message will now be described.

The destination field of the service retrieval message, as well as the node number sub-field and process number sub-field, is set in the destinated-to-all-terminals broadcast mode with all bits set at "1". Each node/terminal/ATM-LAN interface unit takes in this message and transmits the message to all processes which exchange messages with the broadcast channel.

The node number of the device including the process which issued the present message (in the case of the present embodiment, it is supposed that this message is issued mainly by the terminal) and the process number of the process which issued this message, i.e. the identifier of the process which issued the present message, are recorded on the source field. In the message type field, the value indicating that the present message is the service retrieval message, i.e. '0000,0010' in this embodiment, is recorded. In the message number field, as described above, the sequence number of the lower two octets of the message sequential number at the source node is recorded in order to detect message missing. The identifier (20 octets) of the service to be searched for is recorded in the message content field of this message. The process which has received this message compares the service identification number of the service provided by itself with the service identification number in the message. If these identification numbers coincide, the service retrieval response message (described later) is prepared and sent out.

With respect to the service identification number, for example, the first 8 octets may be vender information indicating a providing vender, the subsequent 4 octets may be an in-vender program identifier, the further subsequent 4 octets may represent a version, and the other 4 octets may be an identifier defined for each service. By setting all bits of each sub-field at "1", the information of the sub-field may be excluded from the scope of objects to be searched for. If this mechanism is introduced, it is possible, for example, to search for the portion providing the service of the service identifier D, which is provided by the vender A as program name B and version C, and to search for only the object with the service identifier D irrespective of the vender, program name and version.

Next, the detailed format of the service retrieval response message which is the response message to the service retrieval message will now be described.

The content of the source field of the corresponding service retrieval message is recorded on the destination field of the service retrieval response message. Thereby, this message can be transferred to the requesting processing portion. In the source field, the node number of the node including the process which issued the present message (or the terminal, or the ATM-LAN interface unit) and the process number of the process which issued this message, i.e. the identifier of the process which issued the present message, are recorded. By referring to this field, the process which receives this message can find the node number and the process number of the portion sending the message. In the message type field, the value indicating that the present message is the service retrieval response message, i.e. '1000, 0010' in this embodiment, is recorded. As has been described above, the contents of the message number field of the corresponding message are recorded on the message number field in order to detect message missing. The service identification number of the process which prepared the present message is recorded on the message content field.

With these messages used, it is possible to provide a framework wherein all processes on the ATM-LAN can recognize the fact that the process of the process number B on the device of the node number A provides service of the service identification number C in the ATM-LAN.

TABLE 7 shows a detailed format of the connection setting request message, and TABLE 8 shows a detailed format of the connection setting completion message. These messages are used to enable the process on the ATM-LAN to send a request for a setting connection to the connection setting process.

TABLE 7

Connection setting request message

| Field | Contents |
| --- | --- |
| Destination (12oct) | Node number and process number of the connection setting process |
| Source (12oct) | Node number and process number of |

TABLE 7-continued

Connection setting request message

| Field | Contents |
|---|---|
| | process which issued the message (= identifier of the sending process) |
| Message type (1oct) | 0000 0011 (connection setting request message) |
| Message number (2oct) | Lower 2oct of message sequential number at source side node (= caller) |
| Message content (MAX. 20oct) | Node number (10oct) of callee side process number (2oct) [NOTE 1] Connection type (1oct) Connection ID [VPI/VCI] (3oct) [NOTE 2] Connection request bandwidth (4oct) |

[NOTE 1] All '0' if decision is not possible because receiver process is not activated, etc.
[NOTE 2] New connection setting is requested by "all '0'" and preparation of branch for copy connection is requested when already set connection is designated.

TABLE 8

Connection setting completion message (corresponding to connection setting request message)

| Field | Contents |
|---|---|
| Destination (12oct) | Source node number and process number of corresponding message (= identifier of source process) |
| Source (12oct) | Node number and process number of process which issued the message (= identifier of connection setting process) |
| Message type (1oct) | 1000 0011 (connection setting Completion message) |
| Message number (2oct) | Message number of corresponding message |
| Message content (max. 20oct) | Node number (10oct) of destination side [NOTE 1] and process number (2oct) Connection type (1oct) [NOTE 2] Connection ID [VPI/VCI] (3oct) [NOTE 3] Connection request bandwidth (4oct) [NOTE 4] |

[NOTE 1] Connection setting rejection due to "not ready" of receiving side is indicated by node number = all '0'.
[NOTE 2] Connection setting rejection due to mismatch of connection type is indicated by connection type = all '0'.
[NOTE 3] Connection setting rejection due to VPI/VCI assignment failure on communication path is indicated by connection ID = all '0'.
[NOTE 4] Connection setting rejection due to deficiency of bandwidth on the path by connection request bandwidth = all '0'.

At first, the detailed format of the connection setting request message will now be described.

The destination field of the connection setting request message is an identifier (node number-process number pair) of the destination process (or connection setting process) to which the request for connection setting is sent. It should be noted that if the process which requests the connection setting does not recognize the position of the connection setting process, this position can be recognized by performing the aforementioned service search.

The node number of the device including the process which issued the present message (in the case of the present embodiment, it is supposed that this message is issued mainly by the terminal) and the process number of the process which issued this message, i.e. the identifier of the process which issued the present message, are recorded on the source field. Hereinafter, the process which issued the message is referred to as a sending process for the purpose of description. In the message type field, the value indicating that the present message is the connection setting request message, i.e. '0000,0011' in this embodiment, is recorded. In the message number field, as described above, the sequence number of the lower two octets of the message sequential number at the sender node is recorded in order to detect message missing. In the message content field of this message, information for designating the counterpart of communication of the sending process is recorded. The node number for designating the counterpart (hereinafter referred to as a receiving side) of communication and the process number are recorded on the first sub-field.

There are two methods of designating the callee side: 1) the process is designated and 2) the device alone is designated. In the case of designating the process, a pair of the node number and process number constitutes a process identifier. On the other hand, in the case of designating the device, with respect to the pair of the node number and process number, the node number of the device with which communication is to be effected is set, and all bits of the process number are set at "0". In the case of designating the device, it is possible that the receiving process which treats the connection to be set has not been activated at the time of issuing the connection setting request message. This state is expressed by setting all bits of the process number at "0".

In the next sub-field, information representing the type of connection to be set is recorded. The type of connection is determined by parameters representing, e.g. the distinction between the VP/VC, ensuring of request bandwidth, etc. The connection ID is recorded in the next sub-field.

On the terminal of the ATM-LAN of the present embodiment, the connection can be definitely identified by the combination of the node number and the connection ID. Thus, it is convenient to use the VPI/VCI of the connection as connection ID. In the present embodiment, the assignment of the VPI/VCI is performed by the connection setting process. In general, when the connection setting request message is sent out, the sending process does not recognize the VPI/VCI which becomes the connection ID. In this case, this connection ID is sent out with all bits set at "0".

There is a case where the sending process recognizes the VPI/VCI which is the connection ID. Specifically, in this case, a copying branch is added to the already set connection up to the receiving device or process. In the present case, the setting was already effected in this field, and the VPI/VCI or the identifier of the connection to which the copying branch is added is recorded. In the meantime, it is supposed that the receiving side of the copy connection refers to the terminal functioning as the source of generation of the information which has been subjected to distribution service by the copy connection. The receiving node number is designated by the message content field, and, by combining the node number with the connection ID, the copy connection within the ATM-LAN can be identified.

The combination of the node number and connection ID is used as information for identifying the connection, on the basis that the connection setting is not requested at the node constituting the ATM-LAN of the present embodiment since the functions are limited to reduce the cost. Communications requested by the nodes are all effected via the broadcast channel. If the terminal device has a plurality of connection ports for connection with the ATM-LAN, node numbers are assigned to the respective ports. It can be also thought that the node requests connection setting. In this case, the port number is required in addition to the node number and connection ID, and information necessary for identifying the connection increases.

In the next sub-field, the bandwidth requested by the connection is recorded. Four octets are reserved for this bandwidth. For example, values expressing the average bandwidth and peak bandwidth by multiples of 64 kbps may be recorded.

The detailed format of the connection setting completion message, which is the response message to the connection setting request message, will now be described.

In the destination field of the connection setting completion message, the content of the source field of the corresponding connection setting request message is recorded. Thereby, this message can be transferred to the sending process requesting for processing. The node number of the terminal including the process which issued the present message and the process number of the process which issued this message, i.e. the identifier of the process which issued the present message and specifically the identifier of the connection setting process, are recorded on the source field. In the message type field, the value indicating that the present message is the connection setting completion message, i.e. '1000,0011' in this embodiment, is recorded. In the message number field, as described above, the content of the message number field of the corresponding message is recorded in order to detect message missing.

The following information is recorded on the message content field.

In the first sub-field, the identifier of the receiving process of the communication by the setting-completed connection, i.e. the node number and process number, is recorded.

If the value, recorded in the corresponding connection setting request message, is written in the node number, success in the connection setting is indicated. If all bits of the node number are "0", for example, if the activation of the receiving process fails, the state in which the receiving side cannot accept the connection, i.e. the state in which the connection setting was rejected because of "not ready".

As will be described later, if the connection setting is told to the receiving side, the receiving terminal activates the process which treats the present connection (or determines the process which treats the present connection among the activated processes), and performs the operation for preparing the present connection. If the connection is normally set as a result, the process number of the existing process is set as process number.

If the connection is normally set, the connection type recorded in the corresponding connection setting request message is recorded on the second sub-field of the message content field. All bits of the value of the sub-field are "0" if the connection type does not coincide, for example, if the connection setting is rejected, e.g. for the reason that VP exchange was requested in the ATM-LAN in which VP exchange is not supported.

In the next sub-field, the VPI/VCI which is the connection ID is recorded. If a new connection has normally been set, the VPI/VCI assigned to the connection setting process is recorded on the sub-field. If a branch of the copy connection is added, the connection ID of the corresponding connection setting request message is recorded. If the connection setting is rejected because the assignment of the VPI/VCI failed on the communication path, all bits of this sub-field are "0".

In the next sub-field, the connection request bandwidth in the corresponding connection setting request message is recorded if the connection was formally set. If the connection setting is rejected because of the lack of capacity on the path with respect to which the connection is to be set, all bits of the sub-field are set at "0".

If the new connection is set and, as a result, the sending side is unable to treat the assigned VPI/VCI for some reason, the processing for releasing the present connection may be performed after this message is received.

TABLE 9 shows a detailed format of the connection arriving message, and TABLE 10 shows a detailed format of the connection acknowledge message. These messages are used to tell to the receiving device or process the fact that the connection setting process has set the connection according to the request by the caller process, as described above.

TABLE 9

| Connection arriving message | |
|---|---|
| Field | Contents |
| Destination (12oct) | Node number sub-field: node number (=receiving node number) of counterpart for which connection was set by sending request<br>Process number sub-field: receiving process number [NOTE 1] |
| Source (12oct) | Node number and process number of process which issued the message (= identifier of connection setting process) |
| Message type (1oct) | 0000 0100 (connection arriving message) |
| Message number (2oct) | Lower 2 oct of message sequential number at sending side node |
| Message content (max. 20oct) | Node number (10oct) and process number (2oct) of caller side<br>Connection type (1oct)<br>Connection ID [VPI/VCI] (3oct)<br>Connection request bandwidth (4oct)<br>[NOTE 2] |

[NOTE 1] All '0' when process ID of receiving process is not determined.
[NOTE 2] Shaping is performed by using this parameter if necessary.

TABLE 10

| Connection acknowledgement message (corresponding to connection arriving message) | |
|---|---|
| Field | Contents |
| Destination (12oct) | Node number and process number of corresponding message (=identifier of connection setting process) |
| Source (12oct) | Node number and process number of process which issued the message (=of receiving process) [NOTE 1] |
| Message type (1oct) | 1000 0100 (connection acknowledge message) |
| Message number (2oct) | Message number of corresponding message |
| Message content (max. 20oct) | Node number (10oct) and process number (2oct) of source side in corresponding message<br>Connection type (1oct) [NOTE 2]<br>Connection ID [VPI/VCI] (3oct) [NOTE 3]<br>Connection request bandwidth (4oct) [NOTE 4] |

[NOTE 1] Connection setting rejection due to "not ready" of receiving side is indicated by node number = all '0'.
[NOTE 2] Connection setting rejection due to mismatch of connection type is indicated by connection type = all '0'.
[NOTE 3] Connection setting rejection due to VPI/VCI assignment failure at terminal port is indicated by connection ID = all '0'.
[NOTE 4] Connection setting rejection due to efficiency of bandwidth at terminal port is indicated by connection setting bandwidth = all '0'.

First, the format of the connection arriving message will be described in detailed.

The destination field of the connection arriving message is used for identification data (node number, process number) of a process (destination side) for informing of a connection which has been set. The destination side for a copy connection refers to a terminal which is serving a distribution service by the copy connection, and serves as a data-generating source.

In the case where a sending process designates only the node number of the receiving side of a connection which requires to be set, and does not designate the process number, the bits of this process number are all 0.

In the source field, the identifier of the process which issued the message, i.e. the identifier of the connection setting process, is written. In the message type field, a value which indicates that the message is a connection arriving message, i.e. '0000 0100' in this embodiment, is written. In the message number field, a sequence number, which is lower 2 octets of a message sequential number in a sending node, is written for the purpose of detecting the missing of a message. In the message content field of this message, the following data are written. In its first sub-field, an identifier of a source process, whose opponent of communication is a destination process, is written. In the next sub-field, the type of the connection which has been set is written. In the next sub-field, a connection ID, i.e. VPI/VCI of a connection whose setting has been informed, for identifying the connection on the receiving side. In the next sub-field, the bandwidth in which the connection whose setting has been informed is used, is written. Occasionally, in the device to which the connection setting has been informed, the shaping is carried out using the parameter, if necessary.

Next, the format of the connection acknowledge message, which is a response message to the connection arriving message, will be described in detailed.

In the destination field of the connection acknowledge message, the content of the source field of the corresponding connection arriving message is written. Thus, it is rendered possible to transfer the message to a requiring process, i.e. connection arriving process. In the source field, the identifier of the process which has issued the message is written. The identifier of a process includes a node number and a process number. In the node number, the node number of the node which has issued the message is written. The process number has a value which may vary in accordance with the content of the connection arriving message. The process number written in the message will be described with reference to the operation of a terminal which received a connection post message.

The following is the operation of a terminal which received a connection arriving message.

First, the case where a process for dealing with the connection is designated by the connection arriving message will be described. In this case, the setting of the connection is informed to the designated process, and the connection is connected to the process. Further, in the source field, the process number of the process designated in the connection arriving message is written.

In the case where a process for dealing with the connection is not designated by the connection arriving message, the communication with the sending process is carried out as a function for connecting the connection to the process. The general-use process, which can change into a process having a function in accordance with a request for the sending process, is started, thus connecting the connection thereto. In this case, the process number of this general-use process is written in the source field. The general-use process communicates with the sending process to know the function of itself, which is requested by the sending process, and changes into a process which has such a function. Needless to say, the general-use process can be achieved by the same method for realizing a command which has a function of executing a command designated by the host remote, which is calledrsh in, for example, the UNIX operating system (trade mark).

The case where the bits in this field are returned all in 0, indicates that a designated process is not found in a receiving terminal, or the general-use process cannot be driven due to lack of memory, that is, the connection setting is not allowed, or the connection setting is rejected in the not-ready state.

In the message type field, a value which indicates that the message is a connection acknowledge message, that is, '1000 0100' in this embodiment, is written. In the message number field, the content of the message number field of a corresponding message is written for the purpose of detecting the missing of message. When the connection setting is admitted in the receiving side, in the message content field, the same content as in the message content field of a corresponding connection post message is written. When the connection setting is not admitted, the content is rewritten and the reason for rejection of the setting is displayed as shown in TABLE 10. When the connection setting is rejected due to that the terminal cannot handle the identifier of the set connection, all the bits in the connection identification sub-field are set at 0. When the connection setting is rejected due to that the terminal port cannot handle the identifier of the set connection, all the bits in the connection ID sub-field are set at 0. when the connection setting is rejected due to that the terminal cannot handle the bandwidth of the set connection, all the bits in the connection setting bandwidth are set at 0.

TABLE 11 shows a detailed format of the node setting request message, and TABLE 12 shows a detailed format of the node setting completion message. These messages are used for requesting from a necessary node that the connection setting process carry out the setting and connection of a VP/VC link in accordance with the request of the sending-side process as described above.

TABLE 11

| Node setting request message | |
| --- | --- |
| Field | Contents |
| Destination (12oct) | Node number sub-field: node number of node on which VP/VC link is set<br>Process number sub-field: 1 (node setting process designation) |
| Source (12oct) | Node number and process number of process which issued the message (= identifier of connection setting process) |
| Message type (1oct) | 0000 0101 (node setting request message) |
| Message number (2oct) | Lower 2oct of message sequential number at source side node |
| Message number | Lower 2oct of message sequential number of receiving node |
| Message content (max. 20oct) | Inlet port number (2oct), inlet VPI/VCI value (3oct) [NOTE 1]<br>Outlet port number (2oct), outlet VPI/VCI (3oct) [NOTE 2]<br>Connection setting bandwidth (polishing parameter, 4oct) [NOTE 3] |

[NOTE 1] All '0' indicates that VP link is set at inlet-side port.
[NOTE 2] VCI = '0' indicates that VP link is set at outlet-side port.
[NOTE 3] Connection setting bandwidth = all "0" indicates that monitoring by polishing is unnecessary.

TABLE 12

Node setting completion message (corresponding to node setting request message)

| Field | Contents |
| --- | --- |
| Destination (12oct) | Node number and process number of corresponding message (=identifier of connection setting process) |
| Source (12oct) | Node number and process number of process which issued the message [NOTE 1] |
| Message type (1oct) | 1000 0101 (node setting completion message) |
| Message number (2oct) | Message number of corresponding message |
| Message content (max. 20oct) | Inlet port number (2oct) & inlet VPI/VCI value (3oct) [NOTE 1] Outlet port number (2oct) & outlet VPI/VCI] (3oct) [NOTE 2] Connection setting bandwidth (polishing parameter, 4oct) [NOTE 3] |

[NOTE 1] VCI = all '0' indicates that VP link is set at inlet side port.
[NOTE 2] VCI = all '0' indicates that VP inlet-side port.
[NOTE 3] Connection setting bandwidth = all '0' indicates that monitoring by polishing is unnecessary.

The format of the node setting request message will be described in detail.

In the destination field of the node setting request message, the node number of a node which requests the setting and connecting of a VP/VC link, and the process number (=1) of the node setting process of the node are written. In the source field, the identifier of the process which issued the message, i.e. the identifier of the connection setting process, is written. In the message type field, a value which indicates that the message is a node setting request message, i.e. '0000 0101' in this embodiment, is written. In the message number field, a sequence number, which is lower 2 octets of a message sequential number in a sender node, is written for the purpose of detecting the missing of a message. In the message content field of this message, the following data are written. Written in its first sub-field, is the port number (inlet port number) of the inlet port to which one of the VP/VC links requiring the setting, which is closer to the sending process, is set. In the next sub-field, an identifier of the VP/VC link which is set on the inlet port, i.e. the value of VPI/VCI, is written. This value is called inlet VPI/VCI value. Written in its next sub-field, is the port number (outlet port number) of the port (outlet port) to which one of the VP/VC links requiring the setting, which is closer to the receiving process, is set. In the next sub-field, an identifier of the VP/VC link which is set on the outlet port, i.e. the value of VPI/VCI, is written. This value is called outlet VPI/VCI value.

According to the standardization at CCITT, it is necessary to pay attention to the fact that, when a VP/VC connection is set, a VP/VC connection, directed in an exactly opposite direction to that of the connection and the cell stream, must be always set by the same VPI/VCI value as of the connection. This node setting request message is designed to reduce the number of messages on a broadcast channel, by taking advantages of that VP/VC connections whose cell streams are exactly opposite to each other, always make a pair.

Figure 16:
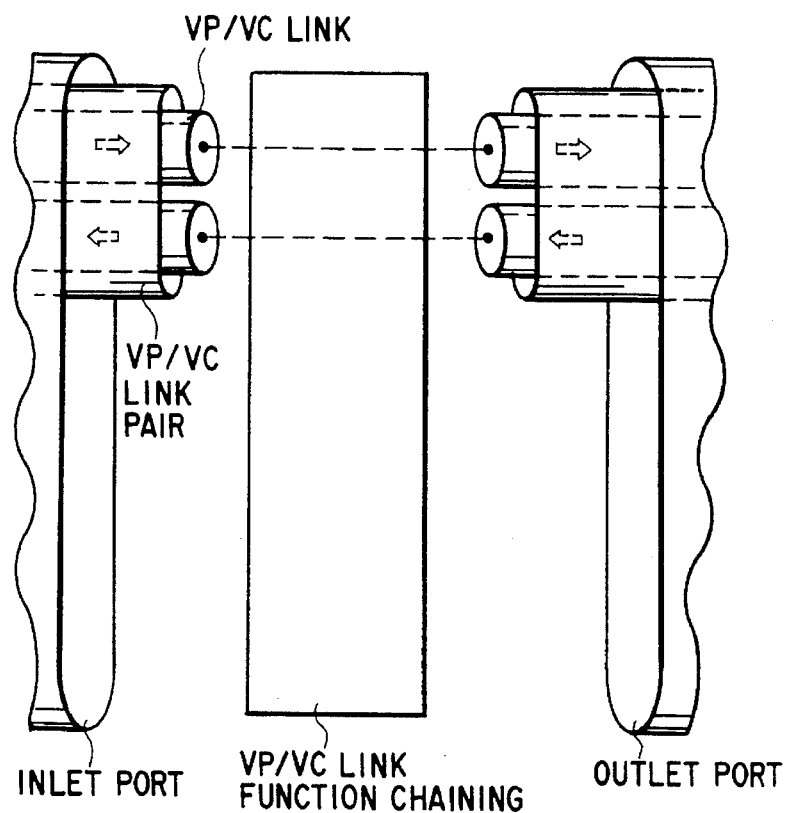
FIG. 16 is a diagram showing the relationship between a pair VP/VC links.

More specifically, by always setting another VP/VC connection having an opposite direction when one VP/VC connection is set, the setting of the VP/VC link, which is a structural element of a VP/VC connection, can be handled as a VP/VC link pair, i.e. two VP/VC links having cell flows opposite to each other as shown in FIG. 16. As the identifier assigned to the VP/VC link pair, this VPI/VCI can be used if ascending and descending VP/VC links are always set by the same VPI/VCI.

The above-described inlet VPI/VCI value is used as a VPI/VCI value assigned to a cell input to the interface point of an inlet port, and also as a VPI/VCI value assigned to a cell output towards the interface point of an inlet port. Similarly, the outlet VPI/VCI value is used as a VPI/VCI value assigned to a cell input to the interface point of an outlet port, and also as a VPI/VCI value assigned to a cell output towards the interface point of an outlet port.

It should be noted that the setting of all the bits of VCI of inlet VPI/VCI at 0 indicates that a VP link pair is set on an inlet port, and the setting of the bits of VCI of outlet VPI/VCI at all 0 indicates that a VP link pair is set on an outlet port.

In the last sub-field of the message content field of a node setting request message, the bandwidth of a VP/VC link to be set, is written. If necessary, the polishing is carried out using this value. In the case where a polishing operation is unnecessary, all the bits in this sub-field are set at 0.

The reason for limiting the operation to polishing is that only the reception input point is supposed to have the polishing function though a terminal is said to be held in each port of the ATM-LAN. For example, when an interface point with regard to the public network is held in each port of the ATM-LAN, it is a possibility that the shaping is performed at the transmission output point and the polishing is carried out at the reception input point; however, in such as case, a shaping parameter, in addition to the polishing parameter, is required. Further, it is another possibility that ascending and descending VCs have different capacities. In this case, it is required that each capacity should be able to be set separately.

In this embodiment, the message is designed so as to set a VP/VC link pair, for the purpose of reduction of the number of messages. However, it is also a possibility that a VP/VC link pair is enable to be set for each VP/VC link, in response to a request that ascending and descending VP/VC link be made to have different capacities. In this case, the definition of inlet port/outlet port should only be changed to that an inlet port is a port to which a cell which belongs onto a VP/VC connection is inputted, and an outlet port is a port from which a cell is output. Clearly, it is also a possibility that either a VP/VC link pair or a VP/VC link is selected for the setting in accordance with the characteristics of the connection to be set by the ATM-LAN, which is the present embodiment, with a distinction between a node setting request message for setting a VP/VC link pair and that for setting a VP/VC link in terms of message type.

Next, the format of the node setting completion message, which is a response message of the node setting request message will be described in detail.

In the destination field of the node setting completion message, the source field of the corresponding node setting request message, i.e. the identifier of the connection setting process, is written. Thus, it is rendered possible that the message is transferred to the process which requests the node setup, i.e. the connection setting process.

In the source field, the identifier of the process which issued the message, i.e. the node setting process which was requested the node setting from a message corresponding to the message, is written. In the message type field, a value which indicates that the message is a node setting completion message, i.e. '1000 0101' in this embodiment, is written. In the message number field, a sequence number, the content of the message number field of the corresponding message is written for the purpose of detecting the missing of message as mentioned before. When the node setting is allowed, the same content as in the message content field of the corresponding node setting message is written in the message content field of this message, whereas when the node setting is not allowed, as shown in Table 12, the content of the message content field is rewritten and the reason for rejection of the setting is displayed.

All the bits of the inlet VPI/VCI value sub-field are set to 0 when the setting is rejected due to the fact that the designated VPI/VCI is not handled by the port of the node. Similarly, all the bits of the outlet VPI/VCI value sub-field are set at 0 when the setting is rejected due to the fact that the designated VPI/VCI is not handled.

The connection setting bandwidth sub-field displays 0 at all the bits to indicate that a value within the designated bandwidth cannot be monitored by polishing (including the case where there is no such a function, or it is requested that the polishing is not necessary). In this case, the setting by the above-described inlet port number, the inlet VPI/VCI value, the outlet port number and the outlet VPI/VCI value (as long as these values have no problems) is executed.

TABLE 13 shows the detailed format of the connection release request message, and TABLE 14 shows the detailed format of the connection release completion message. These messages are used, as mentioned above, for that a process on the ATM-LAN requests the connection release of the connection setting process.

TABLE 13

Connection release request message

| Field | Contents |
| --- | --- |
| Destination (12oct) | Node number and process number of node offering connection release service |
| Source (12oct) | Node number and process number of process (=sending terminal) which issued the message |
| Message type (1oct) | 0000 0110 (connection release request message) |
| Message number (2oct) | Lower 2oct of message sequential number at sending side node |
| Message content (max. 20oct) | Node number (10oct) and process number (2oct) of communication node (opponent terminal) whose connection is released<br>Connection ID [VPI/VCI] (3oct)<br>[NOTE 1] |

[NOTE 1] In the case where designated connection is copy connection, only branch to request terminal is released.

TABLE 14

Connection release compilation message

| Field | Contents |
| --- | --- |
| Destination (12oct) | Node number and process number of node (=sending terminal) requesting connection release |
| Source (12oct) | Node number and process number of process which issued the message (= identifier of connection setting process) |
| Message type (1oct) | 1000 0110 (connection release completion message) |
| Message number (2oct) | Message number of corresponding message |
| Message content (max. 20oct) | Node number (10oct) and process number (2oct) of communication node (opponent terminal) whose connection has been released<br>Connection ID [VPI/VCI] (3oct)<br>[NOTE 1] |

[NOTE 1] VPI/VCI = all '0' indicates abnormal completion due to designated connection not present/node on communication line not responding.

The format of the connection release request message will be described in detail.

Written in the destination field of the connection release request message, is the identifier (node number, process number) of the process from which the connection release is offering (i.e. the connection setting process). If the process which offers the connection release, is not aware of this, it is possible to become aware of this by the before-mentioned service search. Written in the source field, the node number of the device in which the process which issued the message is present (in this embodiment, it is supposed that the message is issued mainly by a terminal), and the process number of the process which issued the message, i.e. the identifier of the process which issued the message. Hereinafter, for the sake of illustration, the terminal which issues the message is called a "caller side terminal", and the process called a "callee side process". In the message type field, a value which indicates that the message is a connection release request message, i.e. '0000 0110' in this embodiment, is written. In the message number field, a sequence number, which is lower 2 octets of a message sequential number in a caller node, is written for the purpose of detecting the missing of a message, as mentioned above. In the message content field of this message, the following data for designating the opponent with which the caller process is communicating, are written. Written in its first sub-field, are the node number and the process number for designating the opponent with which the caller process is communicating (this opponent is called a "opponent side" hereinafter for the purpose of explanation). In the next sub-field, the connection ID (VPI/VCI) of a connection to be released is written.

The opponent side in the copy connection means a terminal serving as a source of generation of data, whose distribution service is carried out by the copy connection. The canceling of the copy connection is carried out only on the branch set from the terminal serving as the data generation source to the caller terminal.

Next, the format of the connection release completion message, which is a response message to the connection release request message, will be described in detail.

Written in the destination field of the connection release completion message, is the content of the source field of the corresponding connection release request message. Thus, it is rendered possible to transfer the message to the caller side process.

Written in the source field, is the identifier of the process which issued the message, namely the node number and the process number, specifically, the identifier of the connection setting process.

In the message type field, a value which indicates that the message is a connection request completion message, i.e. '1000 0110' in this embodiment, is written.

In the message number field, the content of the message number field of the corresponding message is written for the purpose of detecting the missing of a message.

In the message content field of this message, the. following data are written. That is, in its first sub-field of the message content field, the identifier of the process of the communication opponent (=opponent side) by the released connection, i.e. the node number and the process number are written. If the connection is properly released, the connection ID (VPI/VCI) written in the corresponding connection setting request message is written in the second sub-field of the message content field. In the case where the connection release is completed in an improper way due to the designated connection is not set, or the node on a communication line is not yet responded, or the like, all the bits of the sub-field value are set at 0.

TABLE 15 shows the detailed format of the connection release notice message, and TABLE 16 shows the detailed format of the connection release confirmation message. These messages are used for informing an opponent side device or a process, of that the connection setting process released a connection based on the request from the sending side process as mentioned above.

TABLE 15

Connection release notice message

| Field | Contents |
| --- | --- |
| Destination (12oct) | Node number (10oct) of the opponent side terminal of the released connection and process number (2oct) of the process used for the released connection |
| Source (12oct) | Node number and process number of process which issued the message (= identifier of connection setting process) |
| Message type (1oct) | 0000 0111 (connection release notice message) |
| Message number (2oct) | Lower 2oct of message sequential number at the sending node |
| Message content (max. 20oct) | Node number (10oct) and process number (2oct) of node requesting the release (=sending side terminal) Connection ID [VPI/VCI] (3oct) [NOTE 1] |

TABLE 16

Connection release confirmation message
(corresponding to connection release notice message)

| Field | Contents |
| --- | --- |
| Destination (12oct) | Node number and process number of node issuing the corresponding message (=identifier of connection setting process) |
| Source (12oct) | Node number and process number of process which issued the message (= opponent terminal) |
| Message type (1oct) | 1000 0111 (connection release confirmation message) |
| Message number (2oct) | Message number of corresponding message |
| Message content (max. 20oct) | Node number (10oct) and process number (2oct) of node requesting the connection release Connection ID [VPI/VCI] (3oct) [NOTE 1] |

The format of the connection release notice message will be described in detail.

In the destination field of the connection release notice message, the identifier (the node number, the process number) of the process (opponent-side process or receiving side process) which informs of that the connection was released, is written.

In the source field, the identifier of the process which issued the message, i.e. the identifier of the connection setting process, is written.

In the message type field, a value which indicates that the message is a connection release message, i.e. '0000 0111' in this embodiment, is written.

In the message number field, a sequence number, which is lower 2 octets of a message sequential number in the sending node, is written for the purpose of detecting the missing of a message.

In the message content field of this message, the following data are written.

In its first sub-field, the identifier (the node number and the process number) of the callee side process is written.

In the next sub-field, the connection ID for identifying the connection of which the release was informed, on the opponent side, i.e. the VPI/VCI of the connection, is written.

Next, the format of the connection release confirmation message, which is a response message to the connection release notice message, will be described in detailed.

In the destination field of the connection release confirmation message, the content (the identifier of the connection setting process) of the source field of the corresponding connection release notice message is written. Thus, it is rendered possible to transfer the message to the connection setting process. In the source field, the identifier of the process which issued the message, i.e. the identifier of the opponent side process, is written. In the message type field, a value which indicates that the message is a connection release confirmation, i.e. '1000 0111' in this embodiment, is written. In the message number field, the content of the message number field of the corresponding message is written for the purpose of detecting the missing of a message.

In the message content field, the same content as the message content field of the corresponding connection release message is written.

TABLE 17 shows the detailed format of the node release request message, and TABLE 18 shows the detailed format of the node release completion message. These messages are used for requesting from a necessary node that the connection setting process releases the setting/connection of the VP/VC link in accordance with the request from the requesting side process.

TABLE 17

Node release request message

| Field | Contents |
| --- | --- |
| Destination (12oct) | Node number sub-field: node number of node which has VP/VC link setting to release of connection Process number sub-field: 1 (node setting process designation) |
| Source (12oct) | Node number and process number of process which issued the message (= identifier of connection setting process) |
| Message type (1oct) | 0000 1000 (node release request message) |
| Message number (2oct) | Lower 2oct of message sequential number at the sending node |
| Message content (max. 20oct) | Inlet port number (2oct), inlet VPI/VCI value (3oct), outlet port number (2oct) & outlet VPI/VCI] (3oct) |

TABLE 18

Node release completion message (corresponding to
node release request message)

| Field | Contents |
| --- | --- |
| Destination (12oct) | Node number and process number of node issuing the corresponding prmessage (=identifier of connection setting process) |
| Source (12oct) | Node number and process number of process which issued the message |
| Message type (1oct) | 1000 1000 (node release completion message) |

TABLE 18-continued

Node release completion message (corresponding to
node release request message)

| Field | Contents |
| --- | --- |
| Message number (2oct) | Message number of corresponding message |
| Message content (max. 20oct) | Inlet port number (2oct) & inlet VPI/VCI value (3oct) [NOTE 1]<br>Outlet port number (2oct) & outlet VPI/VCI] (3oct) [NOTE 1] |

[NOTE 1] VCI/VCI = all '0' indicates abnormal completion due to designated VPT/VCI not used.

The format of the node release request message will be described in detail.

In the destination field of the node release request message, the node number of a node which has the setting of a VP/VC link to release, and the process number (=1) of the node setting process of the node are written. In the source field, the identifier of the process which issued the message, i.e. the identifier of the connection setting process, is written. In the message type field, a value which indicates that the message is a node release request message, i.e. '0000 1000' in this embodiment, is written.

In the message number field, a sequence number, which is lower 2 octets of a message sequential number in the sending node, is written for the purpose of detecting the missing of a message, as mentioned before. In the message content field of this message, the following data are written. Written in its first sub-field, is the port number (inlet port number) of the port (inlet port) to which one of the VP/VC links requiring the release of the setting, which is closer to the sending side process, is set. In the next sub-field, the identifier of the VP/VC link pair which is set on the inlet port, i.e. the value of VPI/VCI, is written. This value is called inlet VPI/VCI value.

Written in its next sub-field, is the port number (outletsport number) of the port (outlet port) to which one of the VP/VC links requiring the release of the setting, which is closer to the receiving side process, is set. In the next sub-field, the identifier of the VP/VC link pair which is set on the outlet port, i.e. the value of VPI/VCI, is written. This value is called an "outlet VPI/VCI value".

Next, the format of the node release completion message, which is a response message to the node release request message, will be described in detail.

Figure 18:
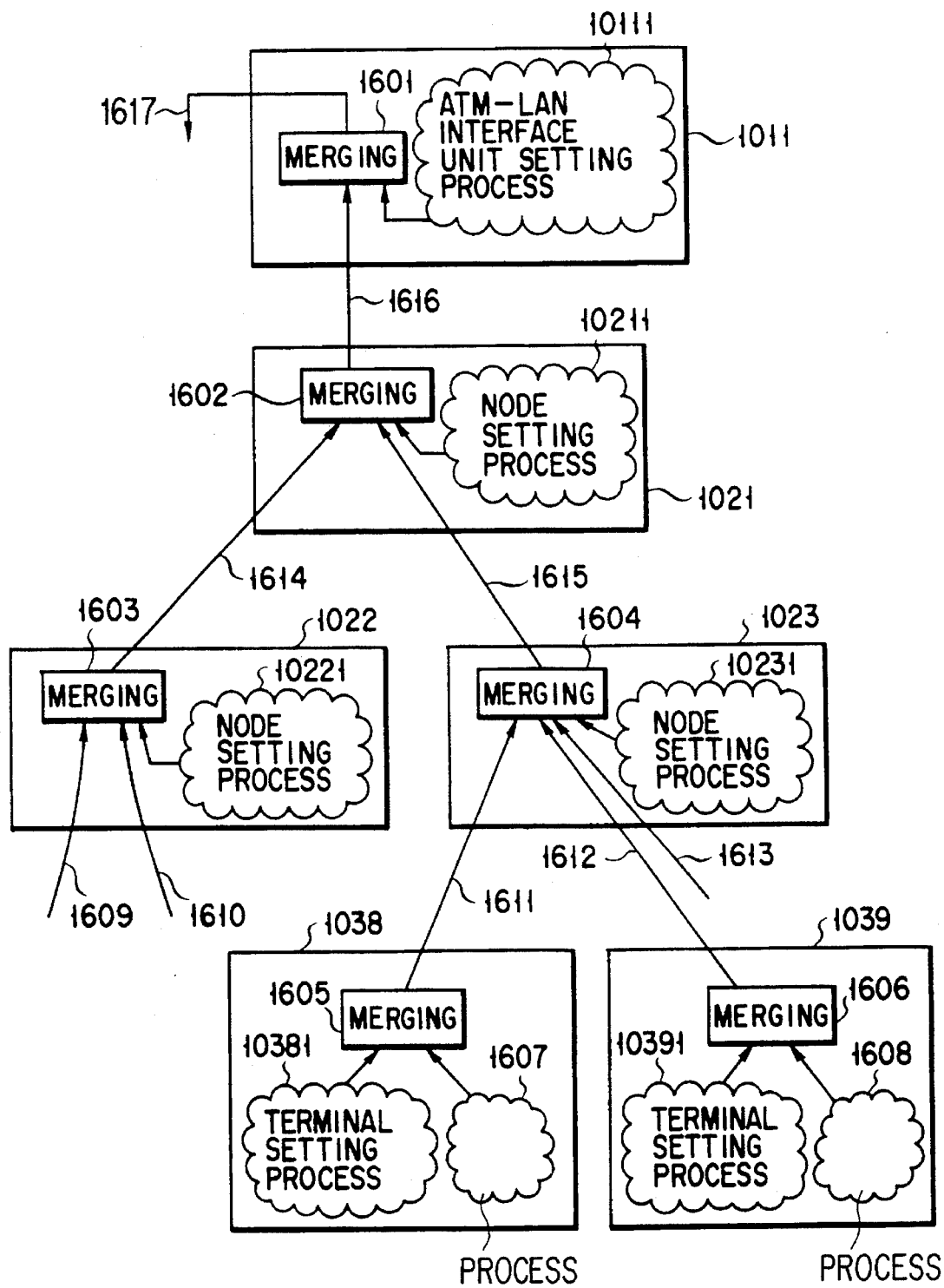
FIG. 18 is a diagram explaining how to achieve confluence of broadcast cells in the broadcast channel.

In the destination field of the node release completion message, the source field of the node release request message, i.e. the identifier of the connection setting process, is written. Thus, it is rendered possible to transfer the message to the connection setting process. Written in the source field, is the identifier of the process which issued the message, namely the node setting process from which the release of the node setting was requested by a message corresponding to the message. In the message type field, a value which indicates that the message is a node release completion message, i.e. '1000 1000' in this embodiment, is written. In the message number field, the content of the message number field of the corresponding message is written for the purpose of detecting the missing of a message. If the release of the node setting is properly completed, the same data as the message content field of the corresponding node release request is written in the message content field, whereas if the release of the node releasing is not properly completed, the content thereof is rewritten and the reason for rejecting the releasing is displayed, as shown in FIG. 18.

All the bits of the inlet VPI/VCI value sub-field are set to 0 in the case of a not proper completion due to the fact that a VP/VC link whose designated VPI/VCI is the identifier has not been set. Similarly, all the bits of the outlet VPI/VCI value sub-field are set at 0 in the case of a not proper completion due to the fact that a VP/VC link whose designated VPI/VCI is the identifier has not been set.

TABLE 19 shows the detailed format of the node setting acknowledge request message, and TABLE 20 shows the detailed format of the node setting acknowledge response message. These messages are used in the case where the connection setting state which the connection setting process is recognizing, needs to be compared with the connection setting state which each node setting process is holding.

TABLE 19

Node setting acknowledge request message

| Field | Contents |
| --- | --- |
| Destination (12oct) | Node number sub-field: node number of node which instructs connection setting acknowledge;<br>Process number sub-field: 1 (node setting process designation); |
| Source (12oct) | Node number and process number of process which issued the message (= identifier of connection setting process) |
| Message type (1oct) | 0000 1001 (node setting acknowledge message) |
| Message number (2oct) | Lower 2oct of message sequential number at sending side node |
| Message content (max. 20oct) | Inlet port number (2oct) & inlet VPI/VCI value (3oct) |

TABLE 20

Node setting acknowledge response message
(corresponding to node setting acknowledge request message)

| Field | Contents |
| --- | --- |
| Destination (12oct) | Node number and process number of node issuing the corresponding message (=identifier of connection setting process) |
| Source (12oct) | Node number and process number of process which issued the message |
| Message type (1oct) | 1000 1001 (node setting acknowledge response message) |
| Message number (2oct) | Message number of corresponding message |
| Message content (max. 20oct) | Inlet port number (2oct) & inlet VPI/VCI value (3oct) [NOTE 1],<br>Outlet port number (2oct) [NOTE 2] & outlet VPI/VCI] (3oct) [NOTE 3],<br>Connection setting bandwidth (4oct) [NOTE 4] |

[NOTE 1] VCI/VCI = all '0' indicates that designated VPI/VCI is not used.
[NOTE 2] Outlet port number = all "1" indicates that routing is not set.
[NOTE 3] VPI/VCI = all "0" indicates that outlet VPI/VCI is not set.
[NOTE 4] Polishing parameter = all "0" indicates that monitoring by polishing/shaping is not set.

The format of the node setting acknowledge request message will be described in detail.

In the destination field of the node setting acknowledge request message, the node number of a node which requests the acknowledgment of the state of the setting and connecting of a VP/VC link, and the process number (=1) of the node setting process of the node are written. In the source field, the identifier of the process which issued the message, i.e. the identifier of the connection setting process, is written. In the message type field, a value which indicates that the message is a node setting acknowledge request message, i.e.

'0000 1001' in this embodiment, is written. In the message number field, a sequence number, which is lower 2 octets of a message sequential number at the sending node, is written for the purpose of detecting the missing of a message, as mentioned before. In the message content field of this message, the following data are written. Written in its first sub-field, is the port number (inlet port number) of the designated port (which is called inlet port, meaning a port to which an acknowledge request is input) of one of the setting/connection of VP/VC link pairs requiring the acknowledgement of the setting. In the neighborhood sub-field, the identifier of the VP/VC link pair which requires the acknowledgement of the connection on the inlet port, i.e. the inlet VPI/VCI value, is written. The node, if it receives this message, searches the port number (outlet port number) of the port (which is called outlet port, meaning a port from which an acknowledge request is output) to which the VP/VC link pair is set, the designated VP/VC link pair of the designated port connected to this VP/VC link, the identifier of the VP/VC link pair, and the outlet VPI/VCI. Thus, this node prepares a node setting acknowledge response message to be output therefrom. In the destination field of the node setting acknowledge response message, the source field of the corresponding node setting acknowledge response message, i.e. the identifier of the connection setting process, is written. Thus, it is rendered possible to transfer the message to the connection setting process. Written in the source field, is the identifier of the process which issued the message, namely the node setting process from which the acknowledgement of the node setting was requested by a message corresponding to the message. In the message type field, a value which indicates that the message is a node setting acknowledgement response message, i.e. '1000 1001' in this embodiment, is written. In the message number field, the content of the message number field of the corresponding message is written for the purpose of detecting the missing of a message. In the message content field, the data indicating the setting and connection of VP/VC link pairs, designated by the node setting acknowledge message, are written. More specifically, the following data are written.

In each of the first sub-field and second sub-field, the inlet port number is written.

In the third sub-field, the outlet port number obtained by the search of a VP/VC link pair to which the VP/VC link pair designated by the inlet port number is connected, is written. In the fourth sub-field, the outlet VPI/VCI value is written.

In the last sub-field, if these VP/VC link pairs have been subjected to polishing/shaping, the parameter which indicates the monitoring bandwidth is written.

The case where all the bits of the inlet VPI/VCI value sub-field are set to 0 indicates that the VP/VC link pair is not set at the designated inlet VPI/VCI pair.

The case where all the bits of the outlet port number sub-field are set at 1 indicates that the outlet port for routing the designated VP/VC link pair is set.

The case where all the bits of the outlet VPI/VCI value sub-field are set to 0 indicates that the VPI/VCI of the link pair connected to the designated VP/VC pair is not set.

The case where all the bits of the connection setting bandwidth sub-field are set at 1 indicates that the monitoring by polishing/shaping is not carried out.

In the case where the connection of a VP link pair is checked, with VCI=0 in the inlet VPI/VCI value by the node setting acknowledge message, a number of VC link pairs are, in some cases, connected to the VP link pair. In this case, a number of node setting acknowledge response message are prepared and output to be presented to each one of the VC links connected to the VP link.

TABLE 21 shows the detailed format of the communication partner retrieval message, and TABLE 22 shows the detailed format of the communication partner search response message. These formats have similar to those of the service retrieval message shown in TABLE 5 and the service retrieval response message shown in FIG. 6, respectively, except that, in these formats, the process number (=1) of each of the node/terminal/ATM-LAN interface unit setting processes is set at the process number of the destination of the communication partner retrieval message; the message type field is expressed by numeral values which indicates the type of each of the messages; and the node name searched for is written in the message content field.

TABLE 21

Communication partner retrieval message

| Field | Contents |
| --- | --- |
| Destination (12oct) | Node number sub-field: all '1' (destinated-to-all-terminals broadcast designation)<br>Process number sub-field: 1 (node setting process designation) |
| Source (12oct) | Node number and process number of process which issued the message |
| Message type (1oct) | 0000 1010 (communication partner search message) |
| Message number (2oct) | Lower 2oct of message sequential number at the sending node |
| Message content (max. 20oct) | Node name (20oct) to be searched for |

TABLE 22

Communication partner search response message
(corresponding to communication partner search message)

| Field | Contents |
| --- | --- |
| Destination (12oct) | Node number and process number of the node issuing the corresponding message |
| Source (12oct) | Node number and process number of process which issued the message |
| Message type (1oct) | 1000 1010 (communication partner search response message) |
| Message number (2oct) | Message number of the corresponding message |
| Message content (max. 20oct) | Node name searched |

The communication partner search message is transferred to the node/terminal/ATM-LAN interface setting processes on the ATM-LAN. It is assumed that these processes have a mapping function for node name and node number, and of these process, those having a node name written in the message, prepare the communication partner search message, which will be output. The node name of a terminal may be stored in the hard disk device, and the node name of each of node/ATM-LAN interface units may be stored in the non-volatile RAM.

TABLE 23 shows the detailed format of the node name inquiry message, and TABLE 24 shows the detailed format of the node name inquiry response message. These messages are designed for carrying out reverse processes to those performed by the communication partner search message shown in TABLE 21, and the communication partner search response message shown in TABLE 22. The formats of these messages are also changed to respectively correspond thereto.

TABLE 23

Node name inquiry message

| Field | Contents |
|---|---|
| Source (12oct) | Node number sub-field: node number of device inquiring node name<br>Process number sub-field: 1 (designation of node setting process) |
| Destination (12oct) | Node number and process number of process which issued the message |
| Message type (1oct) | 0000 1011 (node inquiry message) |
| Message number (2oct) | Lower 2oct of message sequential number at the sending node |
| Message content (max. 20oct) | Null (no significant data) |

TABLE 24

Node name inquiring response message (corresponding to node name inquiry message)

| Field | Contents |
|---|---|
| Destination (12oct) | Node number and process number of the node issuing the corresponding message |
| Source (12oct) | Node number and process number of process which issued the message |
| Message type (1oct) | 1000 1011 (node inquiry response message) |
| Message number (2oct) | Message number of the corresponding message |
| Message content (max. 20oct) | Node name (20oct) obtained by search |

The formats of the messages on the broadcast channel, which are supposed in this embodiment, are as described above.

Apart from the above-described messages, it is convenient if a separate message which can set a node name from a terminal is defined with regard to the node/ATM-LAN interface unit of the ATM-LAN of the present embodiment.

Further, a message such as for monitoring the state of the physical layer of the port of each node/terminal, from the connection setting process on the terminal, may be defined. However, such a message will not be defined for the reasons described below.

In this embodiment, the broadcast channel is provided by using part of the transmission bandwidth of the transmission line between the node/terminal/ATM-LAN interface units. With this structure, it is rather meaningless in terms of the advantage of the invention, even if the above-described message is transferred by the broadcast channel which is subjected to the monitoring. Therefore, in this embodiment, the above-described message is not provided, and the monitoring of the physical layer is carried out by the step for maintaining the neighborhood node number between processes which sandwich one transmission line.

Moreover, in some cases, there are a number of processes which receive a message from a port used for connection with the ATM-LAN, in a terminal accommodated in the ATM-LAN of the present embodiment.

Figure 17:
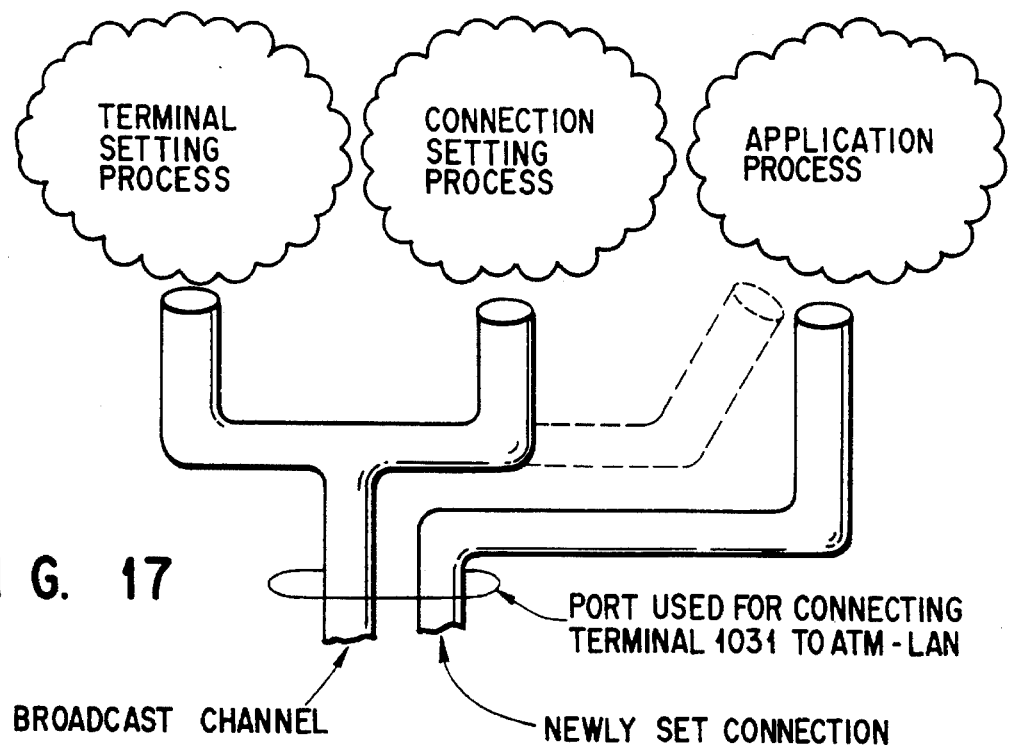
FIG. 17 is a diagram representing the relationship which a broadcast channel and a process have within a terminal.

FIG. 17 shows the above-mentioned situation. More specifically, this figure schematically shows the state of the terminal 1031 shown in FIG. 2, i.e. a terminal on which the connection setting process is present, in which the connection for conducting a communication via a port is set for an application process written by the user of the terminal.

As shown in this figure, there are a broadcast channel and a newly set connection coexist on one port. In the ATM-LAN of the present embodiment, the broadcast channel and the other connection are identified by using the VPI/VCI of the cell as mentioned above. More specifically, in the situation shown in FIG. 17, the broadcast channel and the newly set connection are identified by the VPI/VCI.

On the other hand, the message on the broadcast channel is transferred to the terminal setting process and the connection setting process. The application process written by the user may require the message on the broadcast channel, for example, so that the application process is subjected to service search or the like on the broadcast channel.

Therefore, there is needed a function for distributing the message on the broadcast channel to the desired processes. This distributing function must further include a function of selecting whether the message is passed to all the processes which exchange data with the broadcast channel, or the message is passed only to a designated process, on the basis of the value of the process number sub-field of the destination field, as described above.

Since there is one processor in a general work station, the transfer of messages from a number of processes to the broadcast channel will not be a problem since the messages are automatically allowed to flow together by the process scheduling in the OS.

Further, in the present embodiment, those messages which essentially require the standardization for maintaining the multi-vendor property are: the neighborhood-node-number request message and the neighborhood-node-number request response message; the topology gather message and the topology gather response message; the service retrieval message and the service retrieval response message; the node setting request message and the node setting completion message; the node release request message and the node release completion message; and the node setting acknowledge request message and the node setting acknowledge response message. As for the other messages, in particular, a message by which a process requests the connection setting/release from a connection setting process, it should be noted that messages other than those listed above can be used. For example, it is possible that the connection setting process sets the meta-signaling path (in CCITT standard) to all the terminals by the node setting message after the completion of recognition of the structure, and from then onward, sets the connection by the signaling protocol in accordance with the CCITT standard as described after. Further, it is also possible that the value of the message type field which was not used in the messages listed above is reserved for meta-signaling, and a protocol which can transmit the meta-signaling message onto the message content field is set up, thereby substituting the meta-signaling path with a broadcast channel. Since it is supposed that the connection setting process is on a terminal (for example, a work station), the user can freely select a protocol for connection setting, which is the main feature of the ATM-LAN of the present embodiment.

Further, it should be noted that when the broadcast channel, which is also a feature of the ATM-LAN of this embodiment, can be used for the synchronization between processes on the ATM-LAN by defining a message identified by a value of the message type field which was not used in the messages discussed before.

The method of realizing the broadcast channel of the ATM cell, which is a feature of the ATM-LAN of this embodiment, will now be described in detail.

It is required clearly that the broadcast channel have the following function in order to handle the messages discussed so far. That is the function by which the ATM-LAN of this embodiment only once transfers a cell designated to belong to the broadcast channel since all the bits of the VPI/VCI are 1, to all the devices which constitute the ATM-LAN system except for those output the cell to the broadcast channel, without a help from the connection setting process or the like, from the time when the power is turned on. Such a function cannot be realized by the ATM-LAN system of the conventional technique. The prior art ATM-LAN system does not have this function, and therefore no communications are possible without setting a connection on nodes which constitute the ATM-LAN system. Consequently, with terminals designed for conducting the interconnection in the ATM-LAN, the control subject for setting a connection cannot be moved from a node of the ATM-LAN despite the fact that the work station is a relatively high capacity computational resource, but the complex process of the connection setting function must be carried out on the node. Therefore, in spite of having a terminal having a high computational capacity and capable of lending the computational capacity to others, namely, a work station, it is still necessary to connect an expensive computer (generally, the same work station as the terminal are used) to the node, resulting in a high cost.

The broadcast channel which is a feature of the ATM-LAN system of this embodiment is introduced for the purpose of solving the above problem.

Further, in the ATM-LAN system of the present invention, the connection setting function can be freely realized on the terminal side, and therefore the application can freely set a connection, thus making it possible to limit the environmental condition which the application software assumes in the outside. Consequently, the property desirable for the networking of the application can be given to the ATM-LAN system.

In the ATM-LAN of the present embodiment, the node connection method is limited to achieve the function by which "the ATM-LAN only once transfers a cell on the broadcast channel to all the devices except for those output the cell from the time when the power is turned on". In other words, in the ATM-LAN, a node is connected by a topology which does not have a loop. In the case where a topology which does not have a loop is employed as the node connection method, it is easy to define a spanning tree in the ATM-LAN from the time when the power is turned on, by its physical connection method. Consequently, the broadcast channel which utilizes the spanning tree and starts it operation from the time when the power is turned on, can be easily achieved.

Well-known examples of the topology which does not have a loop are those of bus structure, tree structure and the like. In this embodiment, the tree structure, in which traffics of the entire network never concentrate on one transmission line, is employed.

Figure 19:
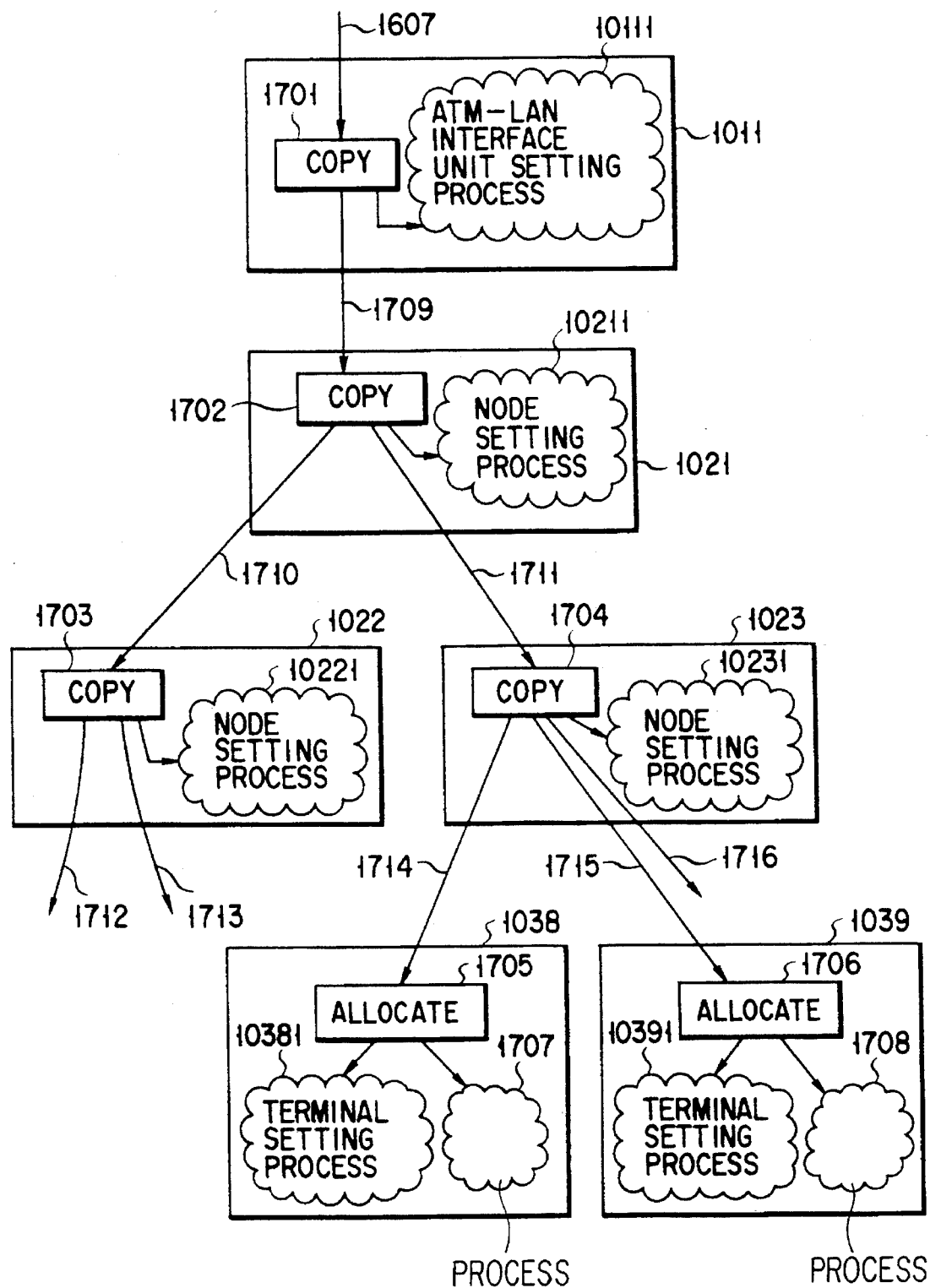
FIG. 19 is a diagram explaining how to distribute broadcast cells in the broadcast channel.

FIG. 18 and FIG. 19 illustrates the state of cells output to the broadcast channel from the devices which constitute the ATM-LAN of this embodiment, and transferred in the ATM-LAN. More specifically, these figures illustrates how cells are transferred by taking an example of the ATM-LAN having the constitution shown in FIG. 2, in regard with the ATM-LAN interface unit 1011, the node 1021 of the node number 1, the node 1022 of the node number 2, the node 1023 of the node number 3, the terminal 1038 of the node number 14, and the terminal 1039 of the node number 15.

For explaining an algorithm employing a tree structure, it is general to use terms such as root and leaf. As is well-known, the "root" is a root portion of the tree structure, and the "leaf" is a leaf portion thereof. In FIG. 18 and FIG. 19, the "leaf" is each of the ATM-LAN interface setting process 10111, the node setting processes 10211, 10221, and 10231, the terminal setting process 10381 and 10391, the terminal setting process which conducts communication by use of the broadcast channel, and processes 1607 1608 of the other terminals, whereas the "root", roughly stating, is the ATM-LAN interface unit 1011. The accurate position of the root will be clarified below. In connection with this, the cell transferring method in the broadcast channel will be described using terms such as root and leaf in accordance with the general custom.

FIG. 18 shows a step in detail wherein cells on the broadcast channel are allowed to once join. The node accommodated in the ATM-LAN of this embodiment serves to collect cells output to the broadcast channel (called as broadcast cell hereinafter) from processes which carry out communications by use of the broadcast channel; merge them together; and output the merged cells. In FIG. 18, the processes 10381 and 1607 which carry out communications by use of the broadcast channel on the terminal 1038 pass broadcast cells to the merging function circuit 1605 on the terminal 1038. The merging function circuit 1605 merges the broadcast cells together, and output (as indicated by the arrow denoted by reference numeral 1611) one after another. Similarly, on the terminal 1039, the merging circuit 1606 inserts the broadcast cells passed from the processes into each other, and output (as indicated by the arrow denoted by reference numeral 1612).

The merging function on the terminal can be easily conducted by means of the process switching for preparing the multi-process environment in the operating system for controlling the terminal, as described before.

Further, in the ATM-LAN of this embodiment, a node serves to insert broadcast cells input from the leaf side into each other, and output to the root side. At this time, in the broadcast cell output to the root side, a broadcast cell output from a leaf, which is the node setting process of the node, is also merged. In FIG. 18, the node 1023 serves to merge the broadcast cell 1612 output from the terminal 1039 and the broadcast cell 1613 input from other lead side into the broadcast cell output from the node setting process 10231, all together in the merging circuit 1604, and output (as indicated by the arrow denoted by reference numeral 1615). A similar operation is performed by the merging circuit 1603 of the node 1022, and the merging circuit 1602 of the node 1602. The realization of the merging circuit on a node in the present embodiment will be described in detail later. In the ATM-LAN interface unit, which is a structural element of the ATM-LAN system of this embodiment, the broadcast cell 1616 passed from the node 1602, and the broadcast cell output from the ATM-LAN interface unit setting process 10111, which is a leaf of itself, are merged in the merging circuit 1601 and output (as indicated by the arrow denoted by reference numeral 1617). The root of the broadcast channel of the ATM-LAN system of this embodiment, is designated accurately by the arrow 1617. The structure of the merging circuit 1601 in the ATM-LAN interface unit will be described in detail later.

With the above-described operation, the stream of the broadcast cells, indicated by the arrow 1607 and output from the merging circuit 1601, contains broadcast cells output from all the processes which use the broadcast channel on the ATM-LAN system of this embodiment. Naturally, all the broadcast cells can be merged with one another. The operation of the broadcast channel can be achieved by further transferring the merged broadcast cells to the leaves.

With reference to FIG. 19, the operation for transferring the merged broadcast cell to all the leaves will be described in detail. FIG. 19 has been already explained as to the same area as shown in FIG. 18 of the ATM-LAN system shown in FIG. 2.

The merged broadcast cell (1607) is first copied by the copy circuit 1701 in the ATM-LAN interface unit 1011, and output to outside (as indicated by the arrow 1709), and passed to the ATM-LAN interface unit setting process 10111, which is a leaf of the broadcast channel. When only those cells which are passed to the ATM-LAN interface unit setting process 10111, which can be known with reference to the destination field in the data portion of the broadcast cells, are filtered before passed to the process, unnecessary cells are not passed to the process. Therefore, needless to say, the execution efficiency of the process can be enhanced. Further, in this filtering, it is possible to check that the message is not the one output from the ATM-LAN interface unit setting process, with reference to the source field thereof, before the message is passed to the process. Thus, the reception of the message transmitted from itself can be avoided.

The broadcast cells output from the merging circuit 1601 in the ATM-LAN interface unit 1011 are input to the copy circuit 1702 of the node 1021. The copy circuit 1702 copies the input broadcast cell on the leaf side, and outputs (as indicated by the arrows 1710 and 1711). The broadcast cells are also passed to the node setting process 10221, which is a leaf of the broadcast channel. During this operation, those cells which are to be passed to the node setting process 10221 can be filtered out with reference to the destination/source fields in the data portion of the broad cast cells in the same manner as described above.

Similarly, copying function circuits 1703 and 1704 of the nodes 1022 and 1023 copy the broadcast cells (1710 and 1711) input from the root side to the leaf side and send the cells along a route indicated by arrows 1712, 1713, 1714, 1715, and 1716. At the same time, the copying function circuits 1703 and 1704 transfer the broadcast cells to the node setting processes 10221 and 10231 each serving as a leaf of the broadcast channel.

The terminals 1038 and 1039 have the cell allocating circuits 1075 and 1076. The cell allocating circuits 1075 and 1076 perform an operation for copying the transferred broadcast cells as needed and transferring the cells to the necessary processes, as described above.

With the above operation, the cells on the broadcast channels are transferred to all the processes on the leaf side of the broadcast channels.

The operation of each node required to operate the entire ATM-LAN as described above will be described below with reference to FIG. 20.

Figure 20:
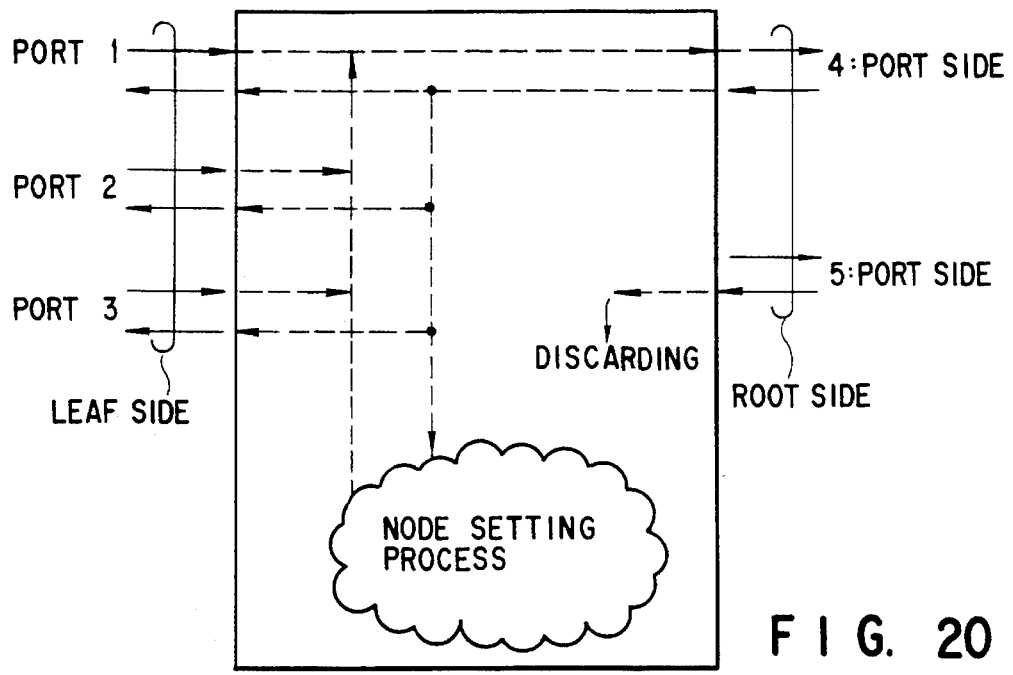
FIG. 20 is a chart explaining how broadcast cells are processed in each node.

FIG. 20 is a view showing a method of transferring a broadcast cell inside one node. In FIG. 20, ports 1, 2, and 3 are connected to the leaf side of the broadcast channel, and ports 4 and 5 are connected to the root side of the broadcast channel. As described above, the traffic tends to concentrate near the root in a tree structure. For this reason, a plurality of transmission lines toward the root side can be provided in the nodes near the root. This situation is shown in FIG. 20.

Each port of one node has information representing whether the port is connected to the leaf or root side. This information is set by the user using the mechanical switch at the time of node installation.

Broadcast cells input from each port designated to be connected to the leaf side broadcast cells sent from the node setting process are merged and output from one of the ports designated to be connected to the root side.

On the other hand, a broadcast cell input from one of the ports designated to be connected to the root side is copied and output to all the ports on the leaf side and also given to the node setting process.

All the nodes perform the above operation and the broadcast channel can be set throughout the ATM-LAN.

When an address filtering function is arranged to transfer only the cell destined to the node setting process in transfer of the broadcast cell from the root side to the node setting process, degradation of the throughput of the node setting process caused due to unnecessary broadcast cells can be prevented.

The operation for outputting the broadcast cell input from the leaf side plurality of ports designated to be connected to the root side and the operation for selecting a port for receiving and transferring the broadcast cells to the leaf side may be varied when the node setting process reads and selects at the power-ON time, or periodically reselects the state of the mechanical switch representing the node or leaf side. In addition, the network synchronization of the entire ATM-LAN may be ensured by synchronizing the node device to a clock pulse extracted from data input from the selected root-side port. This function can be executed by the node setting process using only information set in the mechanical switch of the node in which the node setting process is operated. As a matter of course, also by this method, the broadcast channel can be operated immediately after power-ON.

In an isolated ATM-LAN not connected to the ATM-LAN interface unit, a node having all mechanical switches on the leaf side may recognize that this node is the root of the broadcast channel, temporarily merges the broadcast cells input from all the ports, and then outputs the cells to all the ports. In this case, the network synchronization is ensured such that the nodes inside the ATM-LAN depend on a clock pulse generated by the node recognized as the root.

If the user erroneously sets the mechanical switch, the broadcast channel is halfway interrupted, or the broadcast cell loops through the broadcast channel to generate a large number of copies. To prevent such an error, the connection direction of each port may be fixed on the leaf or root side. In this case, however, the application form of the node is undesirably fixed.

The above mentioned algorithm for temporarily merging the broadcast cells in the root of the broadcast channel and copying the cells therefrom is employed. Therefore, when some failure has occurred in the root of the broadcast channel, this affects the entire ATM-LAN.

Figure 21:
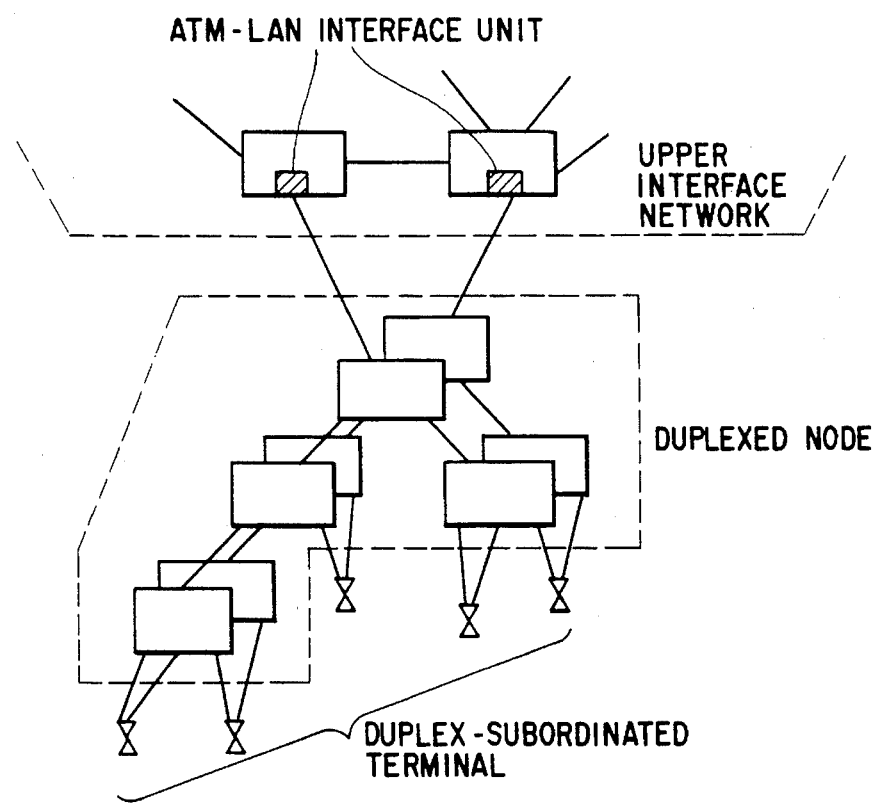
FIG. 21 is a diagram illustrating how to duplex the ATM-LAN system.

When the ATM-LAN of this embodiment is applied to an application requiring high reliability, this nature can be impermissible. To avoid this situation, for example, as shown in FIG. 21, the node devices of the ATM-LAN may be duplexed and each terminal may be double-subordinated to the respective ATM-LAN. In this case, as shown in FIG. 21, it is more preferable that the ATM-LAN interface unit is also duplexed and each unit is connected to another node of the upper network. The arrangement of the nodes as the constituent elements of the ATM-LAN according to this embodiment will be described below in detail.

Figure 22:
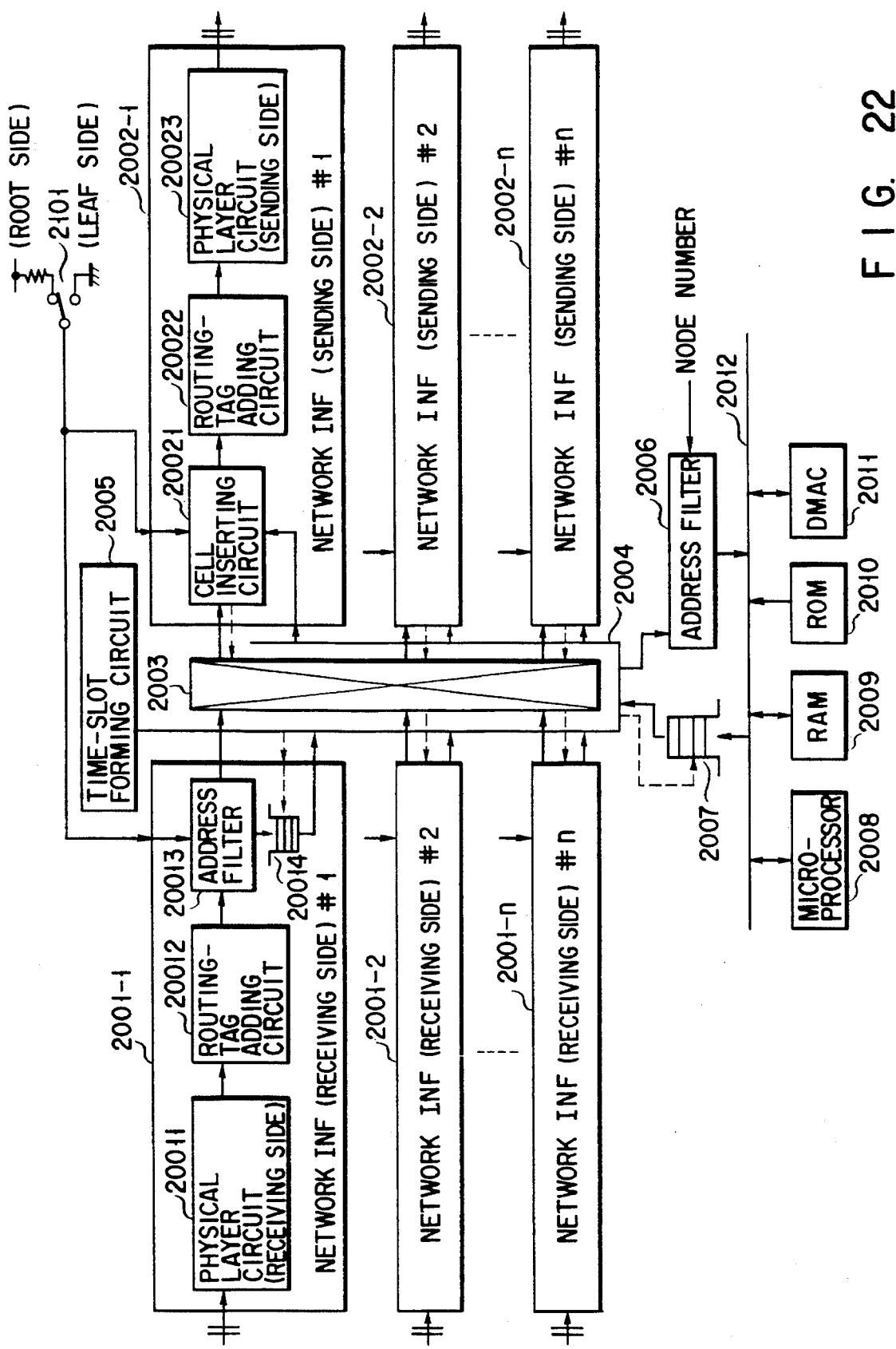
FIG. 22 is a block diagram showing the node structure of the ATM-LAN system.

FIG. 22 shows the arrangement of the node. The node is arranged such that the structure of an ATM exchange system proposed in U.S. Pat. No. 5,274,641 by the present inventors is simplified and a broadcast channel unique to the present invention is added.

Referring to FIG. 22, receiving side network INFs 2002-1 to 2001-n receive a cell stream from a neighborhood node, perform the following processing, and supply the cell stream to an ATM switch 2003. Source side network INFs 2002-1 to 2002-n receive the cell stream supplied from the ATM switch 2003, perform the following processing, and supply the cell stream to the neighborhood node. The ATM switch 2003 receives the cell stream from the receiving side network INFs 2001-1 to 2001-n and transfers cells to the desired sending side network INFs 2002-1 to 2002-n, respectively. A broadcast bus 2004 acquires the cells belonging to the broadcast channel branched from the receiving side network INFs 2001-1 to 2001-n and transfers the cells to a microprocessor 2008 or the sending side network INFs 2002-1 to 2002-n. A time-slot forming function circuit 2005 defines a time slot on the broadcast bus 2004 to give a right to send the cells to the broadcast bus 2004 to the microprocessor 2008 and one of the receiving side network INFs 2001-1 to 2001-n. A first address filter 2006 takes, from the cell stream on the broad cast channel, a cell having a destination node number field value representing all-terminal broadcast designation or neighborhood node branching designation or equal to the node number assigned to the node and satisfying the following condition to the microprocessor 2008 side. A first cell FIFO 2007 temporarily holds cells prepared by the microprocessor 2008. When the right to send the cells to the broadcast bus 2004 is given by the time-slot forming circuit 2005, the first cell FIFO 2007 sends one of the held cells to the broadcast bus 2004. The microprocessor 2008 monitors and controls the receiving side network INFs 2001-1 to 2001-n, the sending side network INFs 2002-1 to 2002-n, and the ATM switch 2003 to execute the operation designated by the cells input from the broadcast bus 2004, i.e., to perform the node setting process. A RAM 2009 is used as a working area for the operation of the microprocessor 2008. A ROM 2010 is used to hold a program for the operation of the microprocessor 2008. A DMAC (Direct Memory Access Controller) 2011 transfers the cells fetched to the microprocessor 2008 side by the first address filter 2006 to the RAM 2009 and transfers the cell prepared in the RAM 2009 by the microprocessor 2008 to the first cell FIFO 2007 in accordance with designation from the microprocessor 2008. A physical layer circuit 20011 on the receiving side receives, in the receiving side network INF, a bit stream from the neighborhood node and performs a process of bit synchronization, frame synchronization, and cell synchronization with respect to the bit stream, thereby reproducing the cell stream from the bit stream. A routing-tag adding circuit 20012 receives the cell stream from the physical layer circuit 20011 on the receiving side, analyzes the VPI/VCI values of each cell in the cell stream, selects a cell to be transferred from the sending side networks INF 2002-1 to 2001-n, and adds, to the cell, a routing-tag serving as information for designating transmission of the cell to the ATM switch 2003. The routing-tag adding circuit 20012 also rewrites the VPI/VCI values of the cell at the input time to the VPI/VCI values of the cell at the output time and sends out the cell. A second address filter 20013 receives the cell stream sent from the routing-tag adding circuit 20012. When a cell in the cell stream has VPI/VCI values in which all the bits are set at "1" to represent that this cell belongs to the broadcast channel, the second address filter 20013 transfers the cell to the broadcast bus 2004. Otherwise, the second address filter 20013 transfers the cell to the ATM switch 2003. A second cell FIFO 20014 receives and temporarily holds the cell sent from the second address filter 20013. When the right to send the cell to the broadcast bus 2004 is given by the time-slot forming circuit 2005, the second cell FIFO 20014 sends the cell to the broadcast bus 2004. A cell inserting circuit 20021 receives, of the cells on the broadcast bus 2004, a cell satisfying the following condition, inserts the cell into the cell stream from the ATM switch 2003, and outputs the cell stream. A routing-tag deleting circuit 20022 receives the cell stream from the cell inserting circuit 20021, deletes the routing-tag added by the routing-tag adding circuit 20012, and outputs the cell stream. A physical layer circuit 20023 on the sending side receives the cell stream output from the routing-tag deleting circuit 20022, calculates and rewrites the HEC field of the cells, and outputs the cell stream as a frame structure.

The operation of the node shown in FIG. 22 will be described below in detail.

A bit stream input from the receiving side of a network INF passes through the physical layer circuit (on the receiving side) 20011. After bit synchronization, frame synchronization and cell synchronization is performed, the bit stream is input to the routing-tag adding circuit 20012 as a cell stream. The routing-tag adding circuit 20012 refers to the header portion of each cell constituting the received cell stream to add a routing-tag representing the route of a cell inside the node. At the same time, the routing-tag adding circuit 20012 rewrites the header portion of the cell into the VPI/VCI values of the cell at the output port and outputs the cell to the second address filter 20013. It should be noted that a broadcast cell is output without rewriting the VPI/VCI values.

The address filter 20013 separates broadcast cells from the cell stream received from the routing-tag adding circuit 20012 and sends the broadcast cells to the second cell FIFO 20014. All cells except for the broadcast cells are sent to the ATM switch 2003 and transferred to ports designated by the routing-tags added by the routing-tag adding circuit 20012.

The cell stream output from the ATM switch 2003 is supplied to the cell inserting circuit 20021. The cell inserting circuit 20021 inserts the broadcast cells from the broadcast bus 2004 into the cell stream from ATM switch and supplies the cell stream to the routing-tag deleting circuit 20022. The routing-tag deleting circuit 20022 deletes the routing-tag added to the input cell to restore the form of a cell to be sent to an interface point and outputs the cell to the sending side physical layer circuit 20023. The sending side physical layer circuit 20023 performs a predetermined operation to the received cell, e.g., calculates the HEC value and writes the value in the HEC field, or formats the cell into the frame format defined on the transmission line to the neighborhood node, and then sends the cells to the interface point.

On the other hand, the broadcast cells separated by the second address filter 20013 are processed in the node as follows.

The second address filter separates the broadcast cells (represented by the VPI/VCI values in which all the bits are set at "1" in this embodiment). A mechanical switch 2101 represents whether the port is connected to the leaf or root side by the user. When the port is connected to the leaf side, a bit at a predetermined position in the routing tag added by the routing-tag adding circuit 20012 is caused to represent that the cell is input from the leaf-side port, and the cell is transferred to the second cell FIFO 20014.

On the other hand, when the mechanical switch 2101 designates that the port is connected to the root side, and the node setting process notifies that a broadcast cell input from this port is to be copied and transferred to the leaf side, a bit in the routing tag is caused to represent that the cell is input from the root-side port, and the cell is transferred to the second cell FIFO 20014. When the node setting process notifies that a broadcast cell input from this port is to be discarded, the broadcast cell is not transferred to the second cell FIFO 20014.

When the broadcast cell is transferred from the second address filter 20013 to the second cell FIFO 20014, the port number of the port from which the cell is input is also written at a predetermined position in the routing tag. The broadcast cell transferred to the second cell FIFO 20014 is temporarily held. The broadcast cell prepared by the microprocessor for mainly executing the node setting process is transferred to the first cell FIFO 2007 and temporarily held. At this time, as in the broadcast cell held in the second cell FIFO 20014, a predetermined bit in the routing tag is caused to describe the input from the leaf side and the port number supplied to the cell FIFO 20014. In addition, at a predetermined position in the routing tag of a destinated-to-neighborhood-node broadcast cell, the destinated-to-neighborhood-node broadcast cell and the port number of the port from which the broadcast cell is sent are described.

The cell outlet ports of the second cell FIFO 20014 in each network INF (on the receiving side) and the first cell FIFO 2007 are connected to the broadcast bus 2004. The time-slot forming circuit 2005 controls sending of the cells from these sending ports to the broadcast bus 2004. More specifically, the time-slot forming circuit 2005 sequentially gives an opportunity to send a cell to the broadcast bus 2004 to this cell FIFO group connected to the broadcast bus according to a predetermined method. The cell FIFO receiving the opportunity to send a cell sends, of the held broadcast cells, an oldest cell to the broadcast bus 2004.

The predetermined method of giving an opportunity to send a cell may be, for example, a simple method of sequentially giving an opportunity to send a cell to the cell FIFOs connected to the broadcast bus 2004, or a relatively complicated method of selecting a cell FIFO holding the largest number of cells to give an opportunity to send a cell.

With the above operation, all the broadcast cells output from all the ports except for those designated by the node setting process to discard the cells and the microprocessor 2008 are inserted in the broadcast bus 2004.

On the other hand, as a function of receiving a cell from the broadcast bus 2004, the cell inserting circuit 20021 in the network INF (on the sending side) and the first address filter 2006 are arranged.

The operation of the first address filter 2006 will be described below in detail.

The first address filter 2006 receives a broadcast cell from the broadcast bus 2004 in accordance with a predetermined condition, temporarily holds the cell, and issues a DAM request to the DMAC 2011. The DMAC 2011 receives the DAM request from the first address filter 2006 to perform an operation for transmitting the cell held by the first address filter 2006 to a predetermined area of the RAM 2009. The port number of a port from which the cell is input, which is added by the second address filter 20013, is simultaneously transferred to the RAM 2009. When the transmission of the broadcast cell to the RAM 2009 by the DMAC 2011 is completed, the node setting process operated on the microprocessor 2008 receives the cell and performs an operation designated by the cell.

The condition of cell reception by the first address filter 2006 is as follows. The first address filter 2006 receives, of broadcast cells input from the root side, a cell having a destination field value representing neighborhood node branching, all-terminal broadcast, or a node number allocated to the node, and a source field in which the node number for itself is not described. A broadcast cell having a bit in the routing tag representing that the cell is input from the leaf side is not received.

When the mechanical switches 2101 represent that all the network INFs accommodated in the node are connected to the leaf side, and the node is structured to operate as a root, the operation must be changed as follows as for the cell input from the leaf side. The node setting process detects that all the mechanical switches 2101 represent the leaf side and notifies it to the first address filter 2006. When all the mechanical switches 2101 represent the leaf side, the first address filter 2006 receives a cell having a predetermined bit in the routing tag representing the leaf side, a destination field value representing neighborhood node branching, all-terminal broadcast, or a node number allocated to the node, and a source field in which the node number of itself is not described.

The operation of the cell inserting circuit 20021 in each network INF (sending side) will be described below in detail.

The cell inserting circuit 20021 receives the broadcast cell from the broadcast bus 2004 in accordance with a predetermined condition, inserts the cell into the cell stream supplied from the ATM switch 20203, and sends the cell. When the cell is to be received from the broadcast bus 2004, a back pressure is applied to the ATM switch 2003 such that no cell is sent from the ATM switch. With this operation, the operation algorithm of the time-slot forming circuit 2005 can be simplified to obtain a preferable form. When the transmission capacity of the broadcast bus 2004 is sufficiently smaller than that of each input/output terminal of the ATM switch 2003, the broadcast cell does not limit the traffic of user cells.

On the other hand, a cell having a predetermined bit in the routing tag representing that the cell is input from the root side is received by a network INF to which the cell belongs. When the mechanical switch 2101 represents that the cell is connected to the leaf side, the broadcast cell is received by the leaf side.

The predetermined condition of cell reception from the broadcast bus 2004 by the cell inserting circuit 20021 is as follows.

As for a broadcast cell wherein the branch at the neighborhood cell is designated by a predetermined bit in the routing tag, the broadcast cell is designated at a predetermined position in the routing tag of the broadcast cell, and the port number of a port from which the cell is to be outputted is compared with the port number attached to the network INF to which the cell belongs. If the two port numbers coincide with each other, the cell is received by the network INF.

As for other broadcast cells, the cell inserting circuit 20021 is operated as follows.

A cell having a predetermined bit in the routing tag representing that the broadcast cell is input from the leaf side is received by the network INF to which the cell belongs. When the mechanical switch represents that the cell is connected to the root side, and the node setting process designates to output the broadcast cell to the root side, the broadcast cell is received to the root side.

When the mechanical switches 2101 represent that all the network INFs accommodated in the node are connected to the leaf side, and the node is to be operated as a root, the operation must be changed as follows for a cell input from the leaf side. The node setting process detects that all the mechanical switches 2101 represent the leaf side and notifies it to the cell inserting circuit 20021. When all the mechanical switches 2101 represent the leaf side, the cell inserting circuit 20021 receives a cell having a predetermined bit in the routing tag representing the leaf side.

Figure 23:
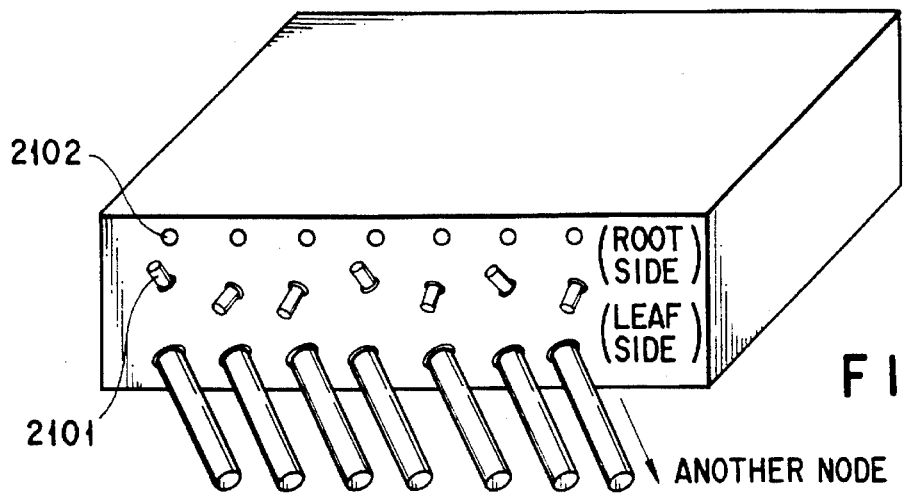
FIG. 23 is a perspective view of each node device incorporated in the ATM-LAN system.

When the node setting process on the node sends a neighborhood-node-information request message, information representing that the port from which the message is sent is connected to the leaf or root side by the mechanical switch 2101 is added to the message. This message is received by the node setting process. At this time, the port from which the message is input is connected in contradiction to the designation of the mechanical switch 2101, i.e., the port is connected to the root side although the neighborhood equipment designates the root side, or the port is connected to the leaf side although the neighborhood equipment designates the leaf side, for example, an indicator element 2102 such as an LED arranged in correspondence with the mechanical switch 2101 on the front panel of the case for accommodating the node unit, as shown in FIG. 23, is turned on to inform the user of the contradiction of port setting. Using this method, a failure in the broadcast channel caused due to erroneous setting of the mechanical switch 2101 can be prevented.

When the ATM-LAN of this embodiment has a copying function, the ATM switch 2003 shown in FIG. 22 must have a function of forming a copy connection, i.e., a function of transferring a cell input from one inlet port to a plurality of outlet ports in accordance with its routing tag. At the same time, VPI/VCI conversion performed by the routing-tag adding circuit 20012 must be performed by the routing-tag deleting circuit 20022. The routing-tag adding circuit 20012 must add a routing tag for a copy connection required by the ATM switch 2003 to the cell. At the same time, the routing-tag adding circuit 20012 must add a connection identifier in the node, which serves as a key for searching new VPI/VCI values to be rewritten.

Figure 24:
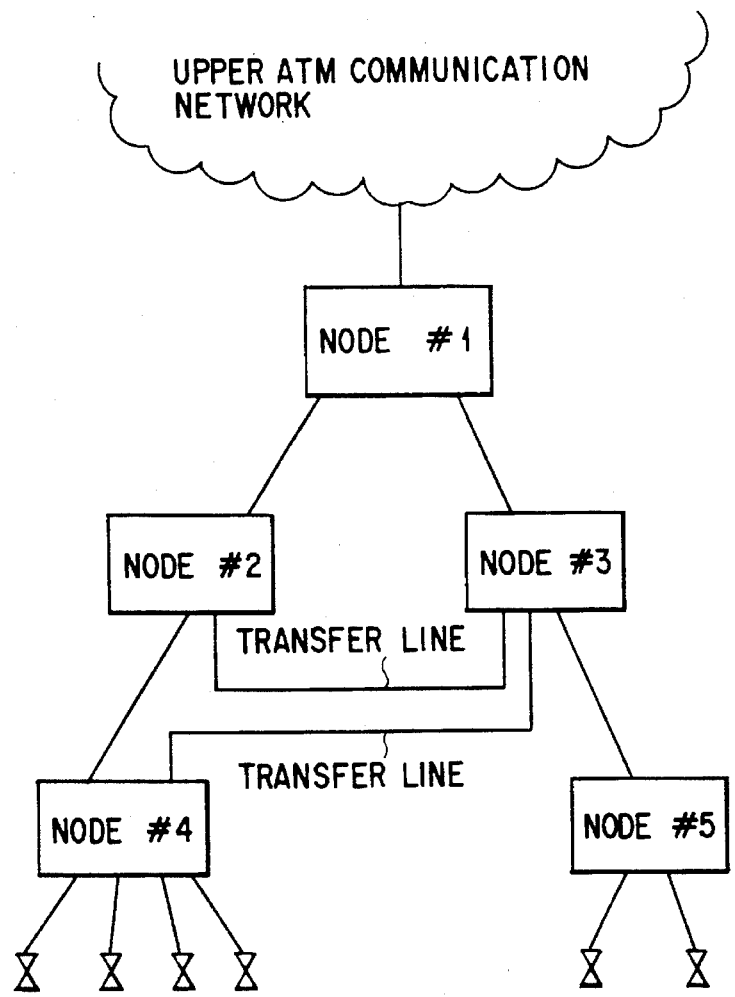
FIG. 24 is a diagram explaining how to form a connection paths in the ATM-LAN system.

In addition, in the ATM-LAN of this embodiment, for the purpose of increasing the number of terminals/nodes connected to one node, a transfer route may be set, as shown in FIG. 24, not to route the traffic to the root. In this case, the mechanical switch arranged to each port may have 2-bit information to represent whether each port is connected to the root or leaf side, or used as a transfer route. Even when no broadcast cell except for destinated-to-neighborhood-node broadcast cells is sent or received from a port to set a transfer route, the above-described broadcast channel can be realized by using the same method. When the 2-bit information of the mechanical switch is written in a neighborhood-node-number request message/neighborhood-node-number request response message, and setting of the corresponding node contradicts this information (i.e., although the information of the mechanical switch represents a transfer route, the corresponding node is not designated as a transfer route), erroneous setting by a maintenance operator can be easily found by providing LEDs on the front panel of the case for accommodating the node.

When a transfer route is set, some attention is required to recognize the structure of the ATM-LAN. Physical links except for transfer routes have a tree structure. First of all, the connection relationship between these physical links and nodes is recognized. The physical links serving as transfer routes are then added to the recognized tree structure. With this stepwise recognition, the structure of a loop structure portion can be recognized with little effort.

Finally, the function of the ATM-LAN interface unit as the third constituent element of the ATM-LAN of an embodiment of the present invention will be described.

The ATM-LAN interface unit is realized as an interface board of the upper ATM communication network. The ATM-LAN interface unit must have 1) a function of performing communication between an agent which sets a connection in the upper ATM communication network and the connection setting process of the ATM-LAN of an embodiment of the present invention, 2) a function of converting the VPI/VCI values of a cell transferred from the ATM-LAN to the upper ATM communication network, 3) a function of monitoring a connection set from the ATM-LAN to the upper ATM communication network, and 4) a function of performing loop back of a broadcast cell in the ATM-LAN.

Figure 25:
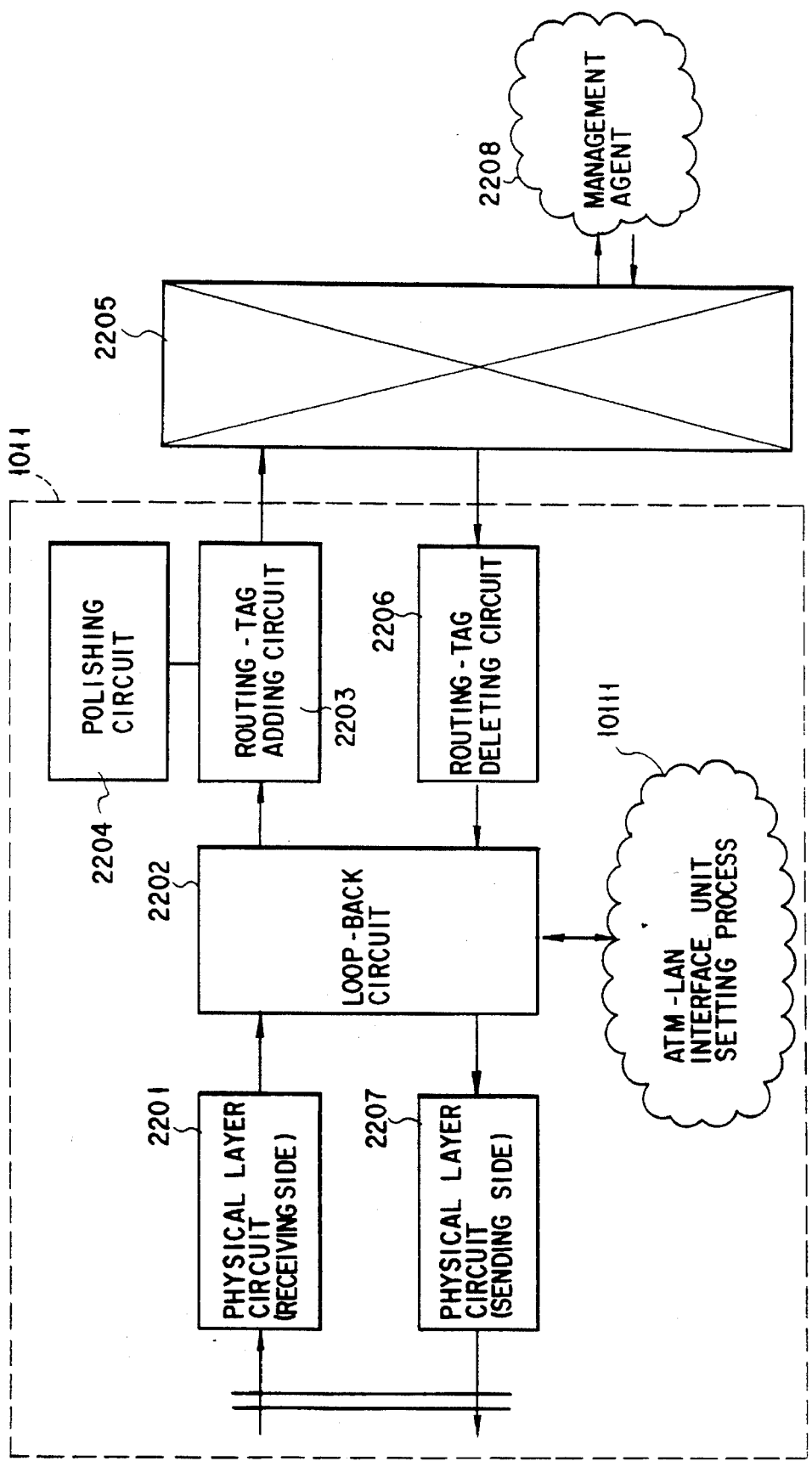
FIG. 25 is a block diagram illustrating the structure of the ATM-LAN interface unit of the ATM-LAN system.

FIG. 25 shows the structure of the ATM-LAN interface unit in the ATM-LAN of this embodiment. Referring to FIG. 25, a physical layer circuit (receiving side) 2201 performs a physical layer function such as bit synchronization, frame synchronization, and cell synchronization to a bit stream input through a receiving input point of an interface point and detects the start of a cell from the input bit stream. A physical layer circuit (sending side) 2207 performs a physical layer function such as HEC operation and frame overhead addition to the input cell stream and outputs the cell stream to a transmission sending point of the interface point. A loop back circuit 2202 receives the cell stream from the physical layer circuit (receiving side) 2201, separates a cell satisfying a predetermined condition, and inserts the cell into the cell stream to the physical layer circuit (sending side) 2207. A routing-tag adding circuit 2203 receives a cell not separated by the loop back circuit 2202, analyzes the VPI/VCI values of the cell, converts the VPI/VCI values in the ATM-LAN into those in the upper ATM communication network, and at the same time, adds a routing tag representing a port from which the cell is transferred. A polishing circuit 2204 observes the cell flow flowing in the routing-tag adding circuit 2203, causes the routing-tag adding circuit 2203 to discard some cells when the cell stream exceeds a predetermined bandwidth, and supervises the cell stream not to exceed the predetermined bandwidth. An ATM switch 2205 receives a cell from the routing-tag adding circuit 2203 and transfers the cell to a desired output port in accordance with the added routing tag. A routing-tag deleting circuit 2206 removes the routing tag from the cell transferred from the ATM switch, and at the same time, converts the VPI/VCI values of the cell in the upper ATM communication network into those in the ATM-LAN, and transfers the cell to be output to the transmission sending point through the loop back circuit 2202 and the physical layer circuit (transmission side) 2207. A management agent 2208 controls the upper ATM communication network in the upper ATM communication network. An ATM-LAN interface unit setting process 10111 controls the ATM-LAN interface unit.

As shown in FIG. 25, it is preferable that an ATM-LAN interface unit 1011 is directly connected to the ATM switch 2205 of one node of the upper ATM communication network from the viewpoint of cost reduction.

A bit stream input from the ATM-LAN is input from the physical layer circuit (receiving side) 2201. When the start of a cell is recognized, a cell stream is formed and input to the loop back circuit 2202. The loop back circuit 2202 transfers cells to the routing-tag adding circuit 2203, except for cells satisfying a predetermined condition, e.g, in an embodiment of the present invention, cells having VPI/VCI values in which all the bits are set at "1" to represent that these cells are broadcast cells in the ATM-LAN. The cells transferred to the routing-tag adding circuit 2203 are cells to be sent from the ATM-LAN to the upper ATM communication network, including communication cells between the management agent 2208 and the connection setting process of the ATM-LAN. The routing-tag adding circuit 2203 adds a routing tag to the input cell, and at the same time, rewrites the VPI/VCI values of the cell.

The reason why the routing-tag adding circuit 2203 must have a function of rewriting the VPI/VCI values is as follows.

The method of using the VPI/VCI values of a cell in the ATM-LAN can be different from that in the upper ATM communication network. For example, although in the ATM-LAN, only three lower bits of the VPI value and only four lower bits of the VCI value are effective for the sake of cost reduction, in the upper ATM communication network, six lower bits of the VP value and 10 lower bits of the VCI value are effective, and the VPI/VCI values allocated in the upper ATM communication network cannot be added in the ATM-LAN. Although the ATM-LAN performs only VC conversion, the upper ATM communication network performs only VP conversion. For this reason, the routing-tag adding circuit 2203 must have a function of converting the VPI/VCI values of the input cell from the VPI/VCI values in the ATM-LAN into those in the upper ATM communication network.

The polishing circuit 2204 observes the cell stream passing through the routing-tag adding circuit 2203 every connection and designates the routing-tag adding circuit 2203 to discard the cells as needed not to exceed the bandwidth reserved every connection. With this operation, a traffic overflow from the ATM-LAN is prevented. The ATM switch 2205 transfers the cell given by the routing-tag adding circuit 2203 to a desired port in accordance with its routing tag.

On the other hand, a cell to be transferred from the upper ATM communication network to the ATM-LAN is input to the routing-tag deleting circuit 2206, and the routing tag of the cell is deleted. At the same time, the VPI/VCI values of the cell are converted into VPI/VCI values effective in the ATM-LAN, and the cell is output to the loop back circuit 2202. VPI/VCI conversion at this time is also performed to absorb the difference of capability of VPI/VCI recognition between the ATM-LAN and the upper ATM communication network.

The loop back circuit 2202 transfers the cell stream received from the routing-tag deleting circuit 2206 to the physical layer circuit (sending side) 2207, detects an empty cell from the cell stream, and inserts a broadcast cell separated from the cell stream to the routing-tag adding circuit 2203. This is the correct root of the broadcast tree. The loop back circuit 2202 selects, of the broadcast cells, cells destined to the ATM-LAN interface unit setting process 10111 and transfers the cells to the process, and at the same time, outputs the broadcast cells sent from the process to the transmission sending point.

Communication between the management agent 2208 and the connection setting process of the ATM-LAN may be performed in accordance with a signaling protocol (Q.93B) defined by CCITT. In this case, a connection is set between the management agent 2208 and the connection setting process of the ATM-LAN through the ATM-LAN interface unit. In this case, the ATM-LAN interface unit may perform VPI/VCI conversion such that a meta-signaling cell output from the connection setting process is placed on the connection to the management agent 2208, and may add a routing tag.

According to the above embodiment, the ATM-LAN system can be constituted by connecting a plurality of nodes having a VP/VC link setting function and a VP/VC linking function. Therefore, a terminal can freely set connections on the ATM-LAN by using these functions to provide a highly flexible ATM-LAN system.

When the connection setting process which generally requires a high processing capability is shifted to the terminal side, the computational power of the terminal, which is remarkably improved in recent years, can be more effectively used, and the computational power prepared in the nodes can be minimized. Therefore, the node cost of the ATM-LAN can be reduced.

The nodes of the ATM-LAN are connected to have a tree structure, and the user can set the mechanical switch to connect each port of the nodes to the root or leaf side. Therefore, the nodes of the ATM-LAN can provide a broadcast channel to the terminals immediately after power-ON, thereby providing a communication function required to set connections to the terminals.

Since the broadcast channel uses only part of the bandwidth of the link between the nodes, the bandwidth can be allocated to the terminals by using the ATM connections. Therefore, a local area network optimal to a multimedia application can be provided.

Since this local area network uses the ATM technology, token exchange between the terminals becomes unnecessary, and the system cost can be reduced. Since the token exchange becomes unnecessary and the broadcast channel can be operated immediately after power-ON, the power supply can be freely disconnected in the ATM-LAN of the above embodiment, except for a terminal having the connection setting process. It is very advantageous in a local area environment in which an uninterruptible power supply is hardly assumed.

The route of broadcast cells is separated from that of the other cells inside the node of the ATM-LAM, and when the broadcast cells are output to the interface point, a back pressure is applied to the other cells. Therefore, the structure of the node can be simplified, thereby realizing an inexpensive system.

In the ATM-LAN of the above embodiment, a request about connection setting output from the terminal is transferred to a section for processing the request by ATM switching. It means that the time required to transfer the connection request can be reduced as compared to when the request is transferred after temporarily routed to the upper layer. In this case, latency related to connection setting can be minimized. Since all messages related to connection or node setting is transferred in a form of cell, a message transmission delay can be minimized as compared to the conventional ATM-LAN. This can also minimize the latency related to connection settings.

The summary of the features and operation of the ATM-LAN of the embodiment described above is follows.

Figure 31:
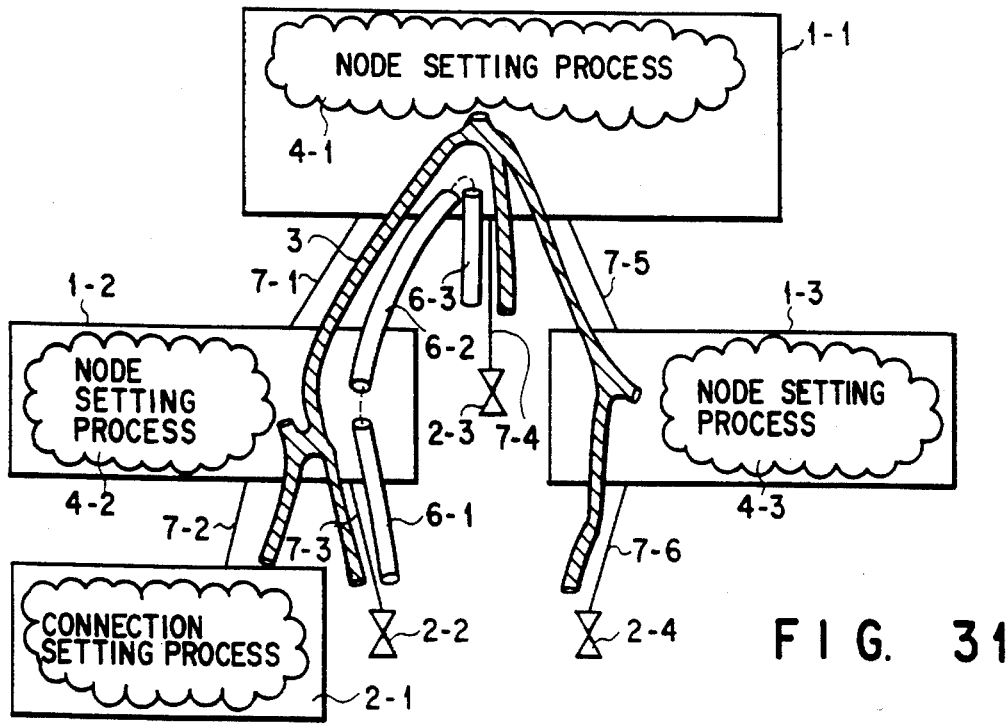
FIG. 31 shows the overall structure of the ATM-LAN.

As shown in FIG. 31, nodes 1-1, 1-2, and 1-3 have a function of preparing a broadcast channel 3 such that terminals 2-1, 2-2, 2-3, and 2-4 can designate the VP/VC link setting and linking functions of the nodes. In a message on the broadcast channel, the destination and source of the message are written. Each node refers to the destination of the message on the broadcast channel. When the message is destined to the node, the node receives the message and transfers the message to a node setting process 4-1, 4-2, or 4-3, thereby obtaining the designation from the connection setting process. A global-unique number allocated to the terminal or node at the manufacturing time, i.e., a number called a node number is written in the source and destination of the message. By using the number whose global uniqueness is assured at the manufacturing time as a destination, VP/VC link setting can be designated on the broadcast channel.

Broadcast cells are input from the interface point of each node together with user cells. By defining a cell having predetermined VPI/VCI values as a broadcast cell, the broadcast cells and the user cells are distinguished from each other.

The following three methods are prepared to indicate the destination of a broadcast cell.

In the first method, the node number of the destined node is used as a destination value. A broadcast cell having this type of destination value is temporarily transferred to all terminals/nodes. The terminals/nodes refer to the destination value, and only a terminal/node having a node number according with this destination value receives the broadcast cell.

In the second method, all terminals/nodes receive a broadcast cell. To represent this, the destination is set to be all "1". This destination value is used to, e.g., find a place where a service is offered in the ATM-LAN system.

In the third method, a certain broadcast cell is transferred to a node or terminal directly connected to a terminal/node which has inserted the cell by a physical link, and the broadcast cell is not transferred to other terminals/nodes. To represent this, the destination value is set to be all "0". For example, in the system shown in FIG. 31, a broadcast cell output from the node 1-2 to a physical link 7-2 to be transferred by the third method is transferred to only the terminal 2-1 and not to other nodes and terminals. A combination of this destination value and a node number is used by the connection setting process to recognize the structure of the ATM-LAN system.

To realize the above three destination designating methods, two types of broadcast cells, i.e., cells to be transferred to all the terminals/nodes and cells to be transferred to only a terminal/node directly connected by a physical link, must be defined. The former is called a destinated-to-all-terminal broadcast cell, and the latter is called a destinated-to-neighborhood-node broadcast cell.

The destinated-to-all-terminal broadcast cell can be distinguished from the destinated-to-neighborhood-node broadcast cell with reference to the destination field. However, to reduce the hardware for determining handling of a broadcast cell, it is preferable that the header portion of an ATM cell contains this information. Therefore, by using a CLP bit, the all-terminals broadcast destination is represented by CLP bit=0, and the next-node destination is represented by CLP bit=1.

As for a user cell, each node performs the same processing (to be described later) as in the conventional ATM-LAN system.

Each node refers to the VPI/VCI values of an input cell to find a VP/VC to which the cell belongs. When the node finds the VP/VC to which the cell belongs, the interface point where the cell belonging to the VP/VC is to be transferred and new VPI/VCI values at the sending interface point can be obtained. The node transfers the input cell to the interface point intended to output, and at the same time, rewrites the VPI/VCI values to the new VPI/VCI values. To perform this operation, each node has a table for holding information representing an interface point to which the cell belonging to the VP/VC is sent and information representing new VP/VC values, named a routing table. Upon reception of the above node setting message, the node setting process updates the routing table of the node to perform setting and linking of VP/VC links.

On the other hand, as for a broadcast cell, each node performs the following processing, thereby providing the broadcast channel 3 throughout the ATM-LAN system.

Figure 32A:
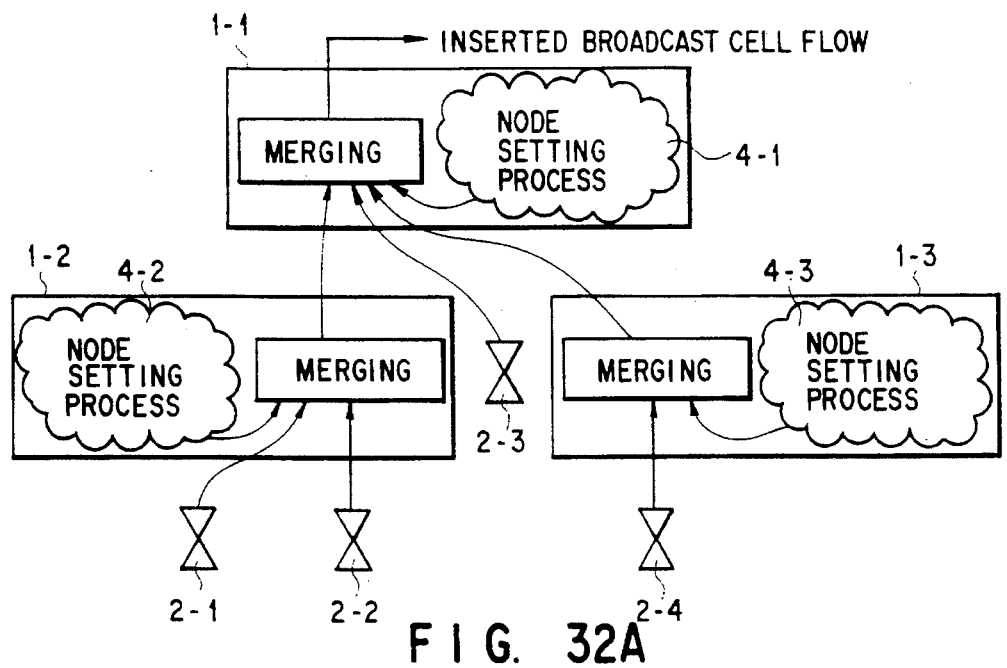
FIGS. 32A and 32B are diagrams explaining the method of operating a broadcast channel for use in the ATM-LAN.
Figure 32B:
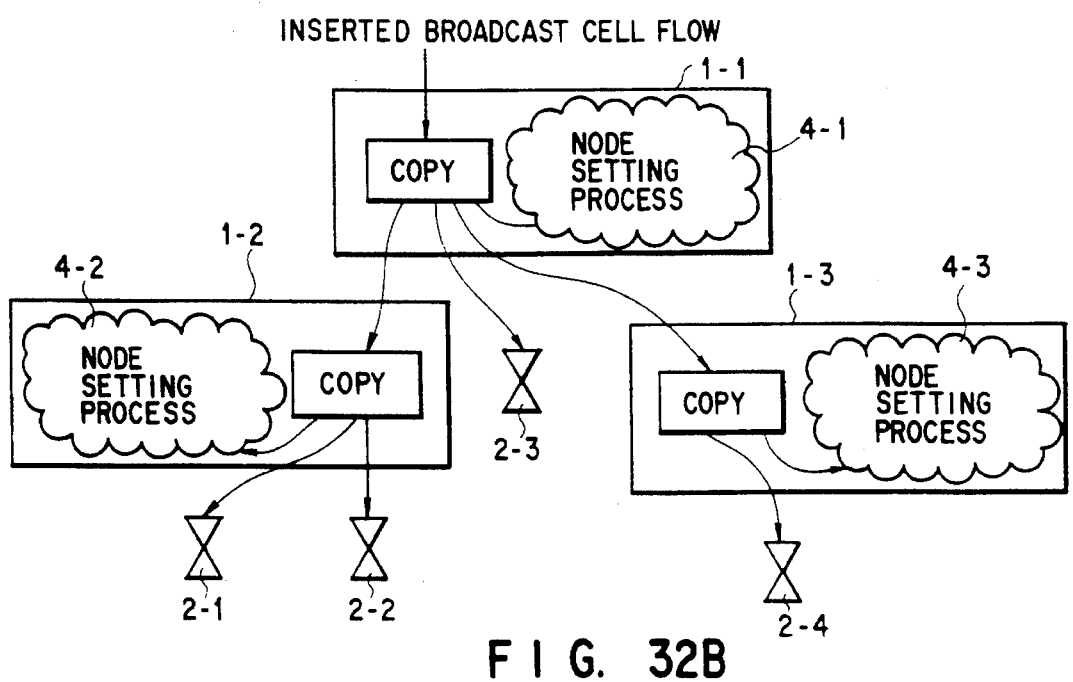

A broadcast cell must be transferred to all the node setting processes or terminals only once. In a well-known method of performing such broadcast, as shown in FIGS. 32A and 32B, a tree structure is defined in the ATM system, and broadcast cells are copied and transferred along the tree structure.

In the ATM-LAN system of the above embodiment, broadcast is executed in the following two steps.

Broadcast cells sent from the node setting process are transferred toward the root side of the broadcast tree while being merged in each node. As a result, at the root of the broadcast tree, a broadcast cell stream merging the broadcast cells sent from all the terminals and node setting processes can be obtained. This step is called a merging phase.

When the temporarily merged broadcast cell stream is obtained, the broadcast cell stream is copied in each node and transferred from the root to the leaf. The broadcast cells sent from all the terminals and node setting processes can be transferred only once. This step is called a copy phase.

When a broadcast channel is realized by using the above method, each node preferably processes a broadcast cell as follows.

a) A broadcast cell input from leaf the side: transfer to the root side b) A broadcast cell input from the root side: copy and transfer to all ports on the leaf side.

To realize a broadcast channel by the above method, information representing whether each interface point is connected to the root or leaf side of the broadcast tree is required. In the above embodiment, it is disclosed that, to reduce the node cost, the node connection topology is limited to the tree structure in principle to define a broadcast tree thereon, and the user sets information representing whether each interface point is connected to the root or leaf side of the broadcast tree by a manual switch for each interface point at the time of node installation.

A node constituting the ATM-LAN system of the above embodiment has a route different from the ATM switch, i.e., a bus structure in more detail, to prepare this broadcast channel. For this reason, it is difficult to extend the broadcast channel bandwidth such that the terminals can more frequently use the broad cast channel, or minimize the transmission delay of the broadcast cells. Therefore, it is difficult to cope with a change in bandwidth required by an application on the terminal or transmission delay.

In addition, because of the above algorithm for realizing broadcast channel, broadcast cells sent from the all terminals/nodes are temporarily concentrated at the root of the broadcast tree. For this reason, the broadcast cells pass through a large number of nodes to increase the delay of the broadcast channel.

In the method of realizing a broadcast channel shown in FIGS. 32A and 32B, since the broadcast cells are temporarily transferred to the root of the broadcast tree and then copied, the order of all the broadcast cells of the ATM-LAN can be defined. On the other hand, however, since all the broadcast cells are temporarily merged, the entire ATM-LAN system fails if a failure occurs in the route of the cells.

As the semiconductor technology advances in recent years, a pocket-sized electric equipment is remarkably improved in its performance. Such a terminal is preferably connected to the ATM-LAN system. When such a pocket-sized terminal is connected to the ATM-LAN system, it is preferable that when the user with this pocket-sized terminal enters into an area, he automatically enjoys services from the ATM-LAN system rather than, for example, connection through an optical fiber. As described above, when a user with a pocket-sized terminal enters into an area and automatically enjoys the services, this terminal is called a mobile terminal. In the ATM-LAN system of the above embodiment, however, such a mobile terminal cannot be accommodated.

As a conventional mobile terminal, a mobile terminal for a public network represented by a mobile phone has been conventionally known well. However, the system of the mobile terminal such as a mobile phone is basically constituted to provide voice communication within a relatively wide service area. For this reason, for example, a relatively free transmission bandwidth provided to a terminal for multimedia communication, or connection settings from a terminal assumed to be important in a private network are not realized.

In addition, the LAN for accommodating the mobile terminal is basically a system for replacement of Ethernet (trade name). In this system, a communication bandwidth given to a terminal assumed to be important for a multimedia cannot be assured.

As described above, in the nodes of the ATM-LAN of the above embodiment in accordance with a method of controlling the nodes from the terminals to set connection, the bandwidth and transmission delay of the broadcast channel are hardly controlled. Broadcast cells pass through a large number of nodes, and the delay of the broadcast channel is large.

In the next embodiment, therefore, there is provided a node of an ATM-LAN system in which the bandwidth and transmission delay of the broadcast channel can be freely controlled from a terminal and the delay of the broadcast channel is minimized.

There is also provided an ATM-LAN system capable of connecting a terminal which cannot process a message on a broadcast channel.

There is also provided an ATM-LAN system capable of connecting a mobile terminal.

Further, there is provided an ATM-LAN system for providing a radio interface in which a relatively important transmission bandwidth preferable to a mobile terminal for performing multimedia communication can be provided to the terminal, a connection can be set from the mobile terminal, and the transmission bandwidth provided to the terminal can be assured.

Figure 26:
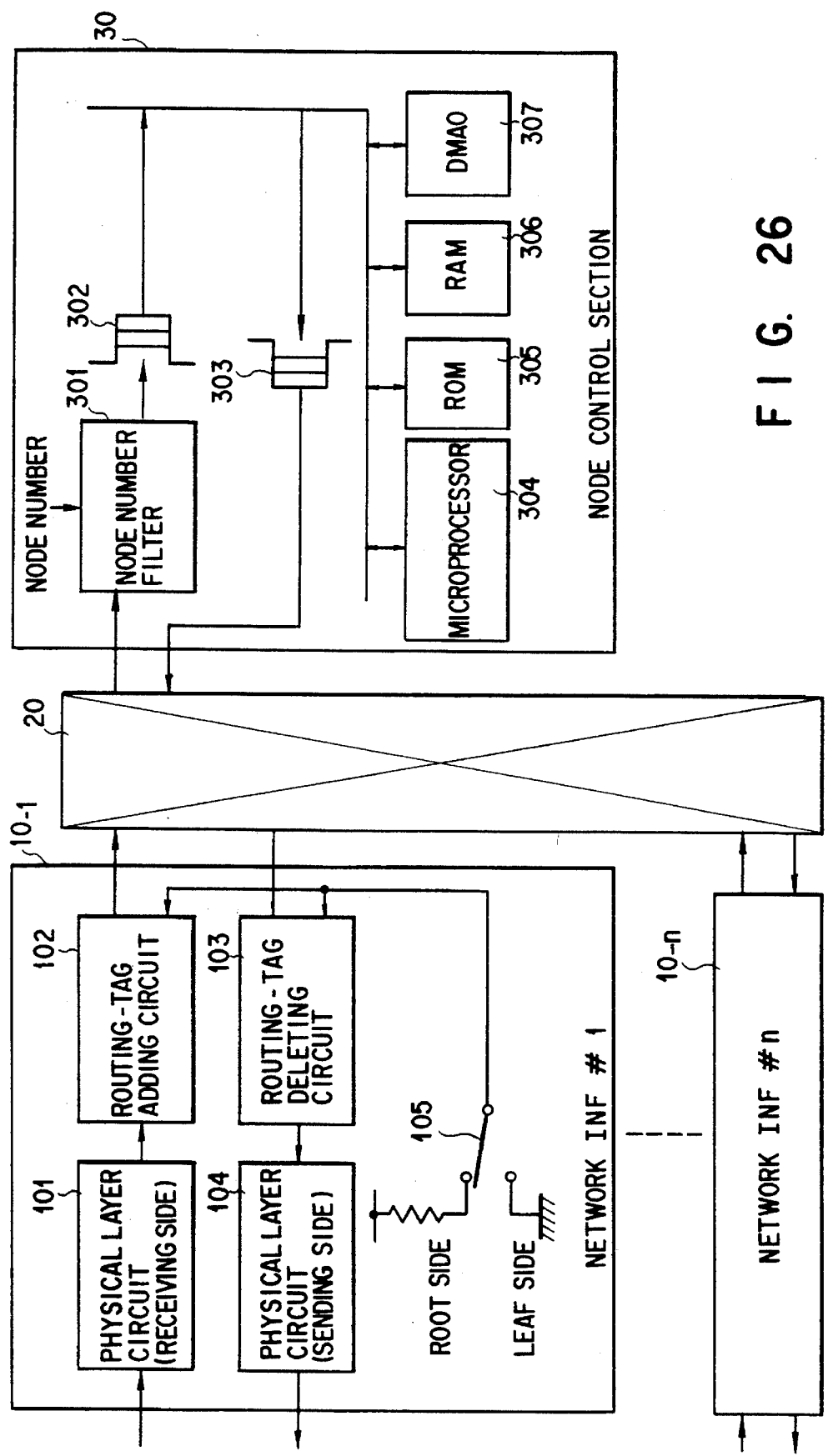
FIG. 26 shows the structure of one of the nodes of a ATM-LAN, which is another embodiment of the present invention.

According to an embodiment shown in FIG. 26, network INFs 10-1, ... 10-n for accommodating interface points are linked with a node control section 30 for controlling nodes through an ATM switch 20 for transferring an input cell to a desired port. Each of the network INF 10-1 ... 10-n has a (receiving side) physical layer circuit 101, a routing-tag deleting circuit 103, a (sending side) physical layer circuit 104, and a mechanical switch 105. The (receiving side) physical layer circuit 101 ensures bit synchronization, frame synchronization, and cell synchronization of a cell input from the interface point and outputs the cell. The routing-tag adding circuit 102 converts the cell input from the (receiving side) physical layer circuit 101 from an international standard cell having a cell format at an interface point into an internal cell having a format by adding information required for switching to the cell in order to the cell is switched by the ATM switch 20. At the same time, the routing-tag adding circuit 102 rewrites the VPI/VCI field in the international standard cell to the VPI/VCI values when the cell is sent to the sending point, and sends the cell to the ATM switch 20. The routing-tag deleting circuit 103 receives the cell switched by the ATM switch 20, converts the internal cell format into the international standard cell format, and outputs the cell. The (sending side) physical layer circuit 104 receives the cell output from the routing-tag deleting circuit 103, performs processing required for bit/frame/cell synchronization in an opposing node, and outputs the cell. When a plurality of nodes of an embodiment of the present invention are connected to constitute the ATM-LAN system, the mechanical switch 105 is used by the user at the time of installation to define a broadcast tree in this ATM-LAN and manually set whether the network INF is connected to the root or leaf side of the broadcast tree.

The node control section 30 is constituted by a node number filter 301, a receiving FIFO 302, a transmission FIFO 303, a microprocessor 304, a ROM 305, a RAM 306, and a DMAC (Direct Memory Access Controller) 307. The node number filter 301 receives the cell switched by the ATM switch 20 to determine whether the received cell is destined to the node control function of the node. When the cell is destined to the node control function of the node, the node number filter 301 outputs the cell. The receiving FIFO 302 receives the cell output from the node number filter 301 and temporarily holds the cell while waiting for transmission to the RAM 306 by the DMAC 307. The sending FIFO 303 receives the cell transferred from the RAM 306 by the DMAC 307 and temporarily holds the cell while waiting for transmission of the cell in accordance with the operation of the ATM switch 20. The microprocessor 304 executes a process for managing the node, i.e., a node setting process. The ROM 305 holds the code of the node setting process. The RAM 306 is a working area for executing the node setting process. The DMAC 307 performs transfer of the cell between the RAM 307, the receiving FIFO 302, and the sending FIFO 303.

The node of this embodiment is operated as follows.

A bit stream input from an interface point serving as a connection point with respect to another node or terminal is subjected to bit synchronization, frame synchronization, and cell synchronization in the network INFs 10-1, 10-2, ... 10-n. By these operation, a cell stream is obtained. Attendant information used for routing by the ATM switch 20 is then added to each cell in the cell stream, and the cell stream is transferred to the ATM switch 20. The ATM switch 20 refers to the attendant information to transfer the input cell to a desired output terminal. The cell output from the output terminal of the ATM switch 20 is transferred to the network INFs 10-1, 10-2, ... 10-n again and sent to the INF point accommodated in the network INF after the attendant information is deleted.

On the other hand, as a result of switching of the cells by the ATM switch 20, a broadcast cell including a command from the terminal to the node is transferred to the node control section 30 for mainly executing the node setting process. The node control section 30 interprets the transferred broadcast cell to perform an operation designated by the broadcast cell. The node control section 30 sends the result of the designated operation or the like to the ATM switch 20 again as a broadcast cell.

The operation of the node of an embodiment of the present invention will be described below in more detail in accordance with a cell stream input from the interface point.

A bit stream input from the interface point is input to the (receiving side) physical layer circuit 101 of the network INF, subjected to bit synchronization, frame synchronization, and cell synchronization, and transferred to the routing-tag adding circuit 102 as a cell stream.

The routing-tag adding circuit 102 determines whether each cell of the input cell stream is a user or broadcast cell. When the cell is a user cell, the routing-tag adding circuit 102 refers to a routing table (not shown) to rewrite the VPI/VCI field in the header portion of the cell to VPI/VCI values at the sending interface point.

In addition, the routing-tag adding circuit 102 adds attendant information used for routing by the ATM switch 20 to the input cell (broadcast or user cell) in accordance with the following method and converts the cell into an internal cell having a cell format for switching by the ATM switch 20.

The format of the internal cell in the node of the ATM-LAN of this embodiment is shown in FIG. 27. The internal cell includes a cell format on an interface point. In this format, above-described attendant information is added to the start of an international standard cell. Since the attendant information is 1-byte information, and the cell format on the interface point is 53-byte information, the format of the internal cell has 54-byte information. Since 54 is divided by 9, it is advantageous when, for example, a switch having eight inlet/outlet ports connected to terminals/nodes and one port connected to the node control section 30 is realized.

The content of the attendant information will be described below in detail.

The first bit of the attendant information is an effective flag representing whether the following 431-bit information is significant information. If this flag is set (value is "1"), it represents that significant information is included. If the flag is reset (value is "0"), it represents that there is no significant information (or this internal cell is an empty cell).

One bit next to the effective flag is a broadcast flag representing whether the corresponding cell is a broadcast cell. If this flag is set, the cell is represented as a broadcast cell. If the flag is reset, the cell is represented as a user cell.

One bit next to the broadcast flag is a branch flag representing whether the corresponding cell is output to the node control section 30. The branch flag is set to distinguish the destinated-to-neighborhood-node broadcast cell from the destinated-to-all-terminals broadcast cell. If this flag is set, the cell is represented as a destinated-to-neighborhood-node broadcast cell. If the flag is reset, the cell is represented as a destinated-to-all-terminals broadcast cell.

Four bits next to the branch flag represent a routing tag representing an interface point number to send this cell if the cell is a user cell. If the cell is a broadcast cell, the routing tag represents an interface point number through which the cell is input.

The last one bit is called a root-side flag and used to change processing of the cell at an outlet port. The method of using this flag will be described later in detail.

53 bytes subsequent to the attendant information represent an international standard cell. This format is equal to the format of a UNI cell or NNI cell defined in ITU-T recommendation I.361.

As described above, a broadcast cell is distinguished from a user cell by using values reserved as its VPI/VCI values. In an embodiment of the present invention, all the bits of the VPI/VCI values are set at "1" to represent a broadcast cell. In addition, as described above, in case of a broadcast cell, the CLP bit is set at "0" to represent a destinated-to-all-terminals broadcast cell, and the CLP bit is set at "0" to represent a destinated-to-neighborhood-node broadcast cell. Not all the bits of the VPI/VCI values are set at "1" to represent a user cell. In this case, the CLP represents the same meaning as in I.361.

The information portion of a broadcast cell has the following format.

The first 12 octets are used as a destination field representing an address to which the broadcast cell is to be transferred. The node number filter 301 of the node control section 30 refers to this field, and if a value written in the destination field of the cell is equal to the node number assigned to itself, the node number filter 301 outputs the cell to the receiving FIFO 302. In a destinated-to-neighborhood-node broadcast cell, all values of the destination field are set at "0". In a destinated-to-all-terminals broadcast cell, all values of the destination field are set at "1".

12 octets next to the destination field are used as a source field for holding the address of a node/terminal from which the broadcast cell is sent. One octet next to the source field is used as a message type field representing the type of the broadcast cell. Two octets next to the message type field are used as a message number field in which a sequence number used to detect discarding of the broadcast cell. 22 octets next to the message number field are used as a message content field in which the detailed content designated by the broadcast cell is described. The last one octet is used as a BIP-8 field to detect a bit error in the information portion of the broadcast cell.

In the internal cell in the node of the ATM-LAN of this embodiment, when attendant information is added to the start of the international standard cell, the HEC field may be deleted and 2-byte attendant information may be added while keeping the length of the internal cell 54 bytes. In this case, when the 4-bit routing tag is replaced with a 12-bit routing tag, a large scale ATM switch using, e.g., a multi-stage structure can be applied as the ATM switch of the node.

The routing-tag adding circuit 102 determines the content of attendant information added to an input cell as follows.

Routing-tag adding circuit 102 refers to the VPI/VCI values of the input cell to determine whether the input cell is a broadcast or user cell. When the input cell is determined as a broadcast cell, the routing-tag adding circuit 102 then refers to the CLP bit to determine whether the broadcast cell is a destinated-to-all-terminals broadcast cell or a destinated-to-neighborhood-node broadcast cell. When the cell is a destinated-to-all-terminals broadcast cell, the broadcast flag in the attendant information is set to one, and the branch flag therein is set to zero. On the other hand, when the cell is a destinated-to- neighborhood-node broadcast cell, the broadcast flag in the attendant information is set to one, and the branch flag therein is also set to one.

When the cell is a destinated-to-all-terminals broadcast cell, the routing-tag adding circuit 102 refers to the mechanical switch 105 to detect whether the network INF to which the routing-tag adding circuit 102 belongs is connected to the root or leaf side. When the root side is represented, the root-side flag in the attendant information is set to one. When the leaf side is represented, the root-side flag is set to zero. A port number representing the network INF from which the cell is input is described in the routing tag of the broadcast cell.

On the other hand, when the input cell is determined as a user cell, the routing-tag adding circuit 102 refers to the VPI/VCI values of the cell to obtain a port number from which the input cell is to be sent out and new VPI/VCI values at the time of transmission with reference to an attached routing-tag table (not shown), rewrites the VPI/VCI values, and adds the above port number to the cell as the routing tag. At this time, the broadcast flag, the branch flag, and the root-side flag in the attendant information are set to zero.

The routing-tag adding circuit 102 converts the received user or broadcast cell into an internal cell and transfers the cell to the ATM switch 20. The ATM switch 20 processes the received cell as follows and performs well-known switching of the user cell and the broadcast cell.

Figure 28:
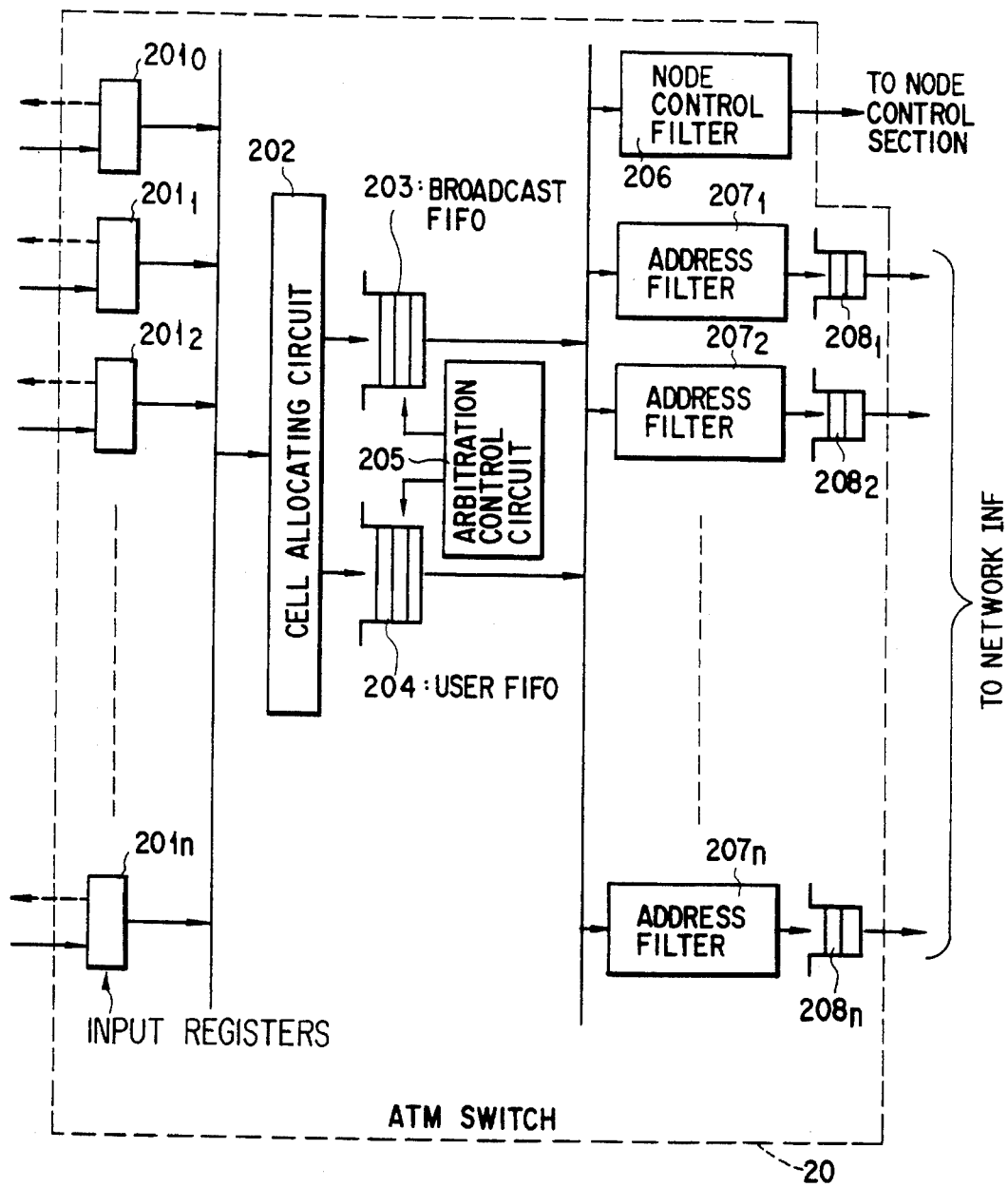
FIG. 28 shows the structure of the ATM switch incorporated in the ATM-LAN node shown in FIG. 26.

FIG. 28 is a view showing the structure of the ATM switch 20 in the node of the ATM-LAN of this embodiment. Referring to FIG. 28, an input register 2010 receives a broadcast cell prepared by the node control section 30 from the sending FIFO 303 of the node control section 30. The input registers 2011, . . . , 201n receive cells from the network INFs #1 (10-1), . . . , #n (10-n). A cell allocating circuit 202 refers to the cell sent from the cell register 2010 and the input registers 2011, ..., 201n to determine whether the cell is a broadcast cell. When the cell is a broadcast cell, the cell is sent to a broadcast FIFO 203. When the cell is a user cell, the cell is sent to a user FIFO 204. The broadcast FIFO 203 10 temporarily holds the broadcast cell sent from the cell allocating circuit 202. The user FIFO 204 temporarily holds the user cell sent from the cell allocating circuit 202.

An arbitration control circuit 205 selects one of the broadcast FIFO 203 and the user FIFO 204 and outputs the cell from the selected FIFO. The node control filter 206 refers to the cell sent from one of the broadcast FIFO 203 and the user FIFO 204. When the cell is to be sent to the node control section 30, the node control filter 206 outputs the cell.

Address filters 2071, ..., 207n refer to the cell sent from one of the broadcast FIFO 203 and the user FIFO 204 and output the cell sent to the corresponding network INFs. Line buffers 2081, ... 208n temporarily hold the cells output from the address filters 2071, ..., 207n, converts the speed into a speed required by the connected network INFs, and output the cells.

Each network INF converts the cell input from the interface point into a format shown in FIG. 27, i.e., the format of an internal cell format, and sends the cell to the inlet of the ATM switch 20, to which each network INF is connected. Like the each network INF, the node control section 30 sends the cell having the internal cell format to the inlet of the ATM switch 20. One of the input registers 2010, 2011, ... , 201n is present at each inlet of the ATM switch 20. These input registers temporarily hold the input cells and sequentially transfer the cells to the cell allocating circuit 202.

Transmission of the cell between the input registers 2010, 2011, ... , 201n and the cell allocating circuit 202 is performed by the following well-known method. A time interval (cell slot) required to transfer the cells at the inlets of the input registers 2010, 2011, ..., 201n is divided into the same number of pieces (sub-cell slots) as that of input registers. Each sub-cell slot is allocated to each of the input registers 2010, 2011, ..., 201n. Each register sends a cell held in the cell allocating circuit 202 in the allocated sub-cell slot, thereby multiplexing and inputting the cell to the cell allocating circuit 202. To smoothly transfer the cells, each of the input registers 2010, 2011, ..., 201n is preferably a so-called dual buffer having a length for holding two cells. When this form is used, it should be noted that the transfer speed of the cell output from the input registers 2010, 2011, ..., 201n is n+1 times that of the cell input to the input registers 2010, 2011, ..., 201n.

The cell allocating circuit 202 refers to the effective flag of the received internal cell and performs the following operation for a cell holding significant information (i.e. this cell is not an empty cell). More specifically, when the cell allocating circuit 202 refers to the broadcast flag, and the cell is determined as a broadcast cell, the cell allocating circuit 202 sends the cell to the broadcast FIFO 203. When the cell is a user cell, the cell allocating circuit 202 sends the cell to the user FIFO 204. The broadcast FIFO 203 and the user FIFO 204 temporarily hold the sent cell. The cell is preferably transferred from the cell allocating circuit 202 to the broadcast FIFO 203 or user FIFO 204, as in input of the cell to the cell allocating circuit 202, by the method in which the cell is transferred every sub-cell slot obtained by dividing the cell slot in the input portions of the input registers.

The arbitration control circuit 205 controls transmission of a cell from the broadcast FIFO 203 and the user FIFO 204. The arbitration control circuit 205 selects every sub-cell slot obtained by dividing the cell slot in the input portions of the input registers whether the cell is sent from the broadcast FIFO 203 or user FIFO 204 in accordance with a predetermined condition and designates to output the cell. The FIFO designated to output the cell simultaneously sends the oldest cell in the held cells to the node control filter 206 and address filters 2071, ..., 207n.

The FIFO selecting method in the arbitration control circuit 205 will be described later in detail. It should be noted that, since the broadcast FIFO 203 or user FIFO 204 is selected to send the cell every sub-cell slot, a plurality of cells can be probably held in the broadcast FIFO 203 or user FIFO 204. When the cell is input to the broadcast FIFO 203 or user FIFO 204, and no area capable of holding a new cell is left, the input cell may be discarded.

The node control filter 206 and the address filters 2071, ..., 207n are operated as follows, respectively, when the cells are received from the broadcast FIFO 203 or user FIFO 204. It should be noted that the operation to be described below is performed every sub-cell slot.

The node control filter 206 is operated as follows.

The node control filter 206 refers to the attendant information of an input cell and performs the following operations for a cell which holds significant information upon detection of the set state of an effective flag.

a) Destinated-to-Neighborhood-Node Broadcast Cell.

When a broadcast flag is one and a branch flag is also one, the corresponding cell is sent.

b) Destinated-to-All-Terminals Broadcast Cell.

When a broadcast flag is one and a branch flag is zero, b-1) when a root-side flag is one, the corresponding cell is passed, or b-2) when the root-side flag is zero, the corresponding cell is discarded.

c) User Cell

When neither a broadcast flag nor a branch flag are one, the corresponding cell is discarded.

The cell sent from the node control filter 206 is transferred to a node number filter 301 in the node control section 30.

On the other hand, the address filters 2071. . . 207n are operated as follows.

The address filters 2071, ..., 207n refer to attendant information of an input cell and are operated as follows.

a) Destinated-to-All-Terminals Broadcast Cell.

When a broadcast flag is set and a branch flag is zero, the corresponding cell is sent.

b) Destinated-to-Next-Node Broadcast Cell.

When a broadcast flag is one and a branch flag is one, the corresponding cell is discarded.

c) User Cell

When neither a broadcast flag nor a branch flag are one, a routing tag is referred to. If a port number allocated to the corresponding address filter coincides with the routing tag, the corresponding cell is sent; otherwise, this cell is discarded.

Cells sent from the address filters 2071, ..., 207n are transferred to the corresponding line buffers 2081, ..., 208n. Each line buffer temporarily holds a cell every sub-cell slot and sends the cell to the corresponding network INF for each cell slot.

If a routing tag has a 12-bit length, routing-tag comparison in the address filters 2071, ..., 207n can be performed as follows.

The routing tag is divided into four 3-bit portions. A signal representing comparison between a specific divided portion and the port number allocated thereto is externally input to each address filter outside the ATM switch 20. Each of the address filters 2071, . . . , 207n compares the routing tag portion designated by this signal with the port number allocated thereto. When this function is added to the address filter, a multi-stage ATM switch can be arranged, and nodes in a relatively large ATM-LAN system can be obtained.

A user or broadcast cell output from the ATM switch 20 to the network INF is transferred to the routing-tag deleting circuit 103. The routing-tag deleting circuit 103 deletes the attendant information from the input cell, which information is added by the routing-tag adding circuit 102. The routing-tag deleting circuit 103 converts the input cell into an international standard cell having a cell format at an interface point. The routing-tag deleting circuit 103 outputs the international standard cell to the interface point. At this time, cells which satisfy the following conditions are discarded.

When the information represents that a cell is connected to the root side by the mechanical switch 105, and the root-side flag of this cell is one, the cell is discarded.

When the information represents that a cell is connected to the leaf side by the mechanical switch 105, and the root-side flag of this cell is zero, the cell is discarded.

The attendant information added to a non-discarded cell by the routing-tag adding circuit 102 is deleted therefrom to obtain the international standard format. The resultant cell is transferred to the (sending side) physical layer circuit 104. Note that if the attendant information is 2-byte information, the attendant information must be deleted, and an HEC write field must be inserted between the header portion and the information portion, as a matter of course.

The user or broadcast cell output from the routing tag deleting circuit 103 is transferred to the (sending side) physical layer circuit 104. The (sending side) physical layer circuit 104 writes a predetermined value in the HEC field of the header portion of the input cell. The resultant cell is then mapped to the frame format, thereby converting the cell into a signal level at the interface point. This cell is then sent from the interface point.

Although the node connection topology of the present invention is based on a tree structure, a traffic amount near the root increases to cause a traffic bottleneck near the root. To solve this problem, a transfer route or a plurality of physical links are set between identical nodes. In this manner, broadcast channels need not be set in all the physical links. In this case, another mechanical switch may be added to the mechanical switch 105 shown in FIG. 26 not to set a broadcast channel in a physical link accommodated by the network INF. To realize this, when the routing-tag deleting circuit 103 refers to the information of the additional mechanical switch to detect designation for inhibiting to set the broadcast channels, the routing-tag deleting circuit 103 discard all received broadcast cells which is all-terminal broad cast designation.

A route for switching a cell input from the interface point and outputting the switched cell to the interface point has been described above. The above operations are performed by the routing-tag adding circuit 102, the ATM switch 20, and the routing-tag deleting circuit 103 to realize the above broadcast channel.

When the broadcast channel is realized by the above method, the user can freely set a broadcast channel bandwidth on a physical link. More specifically, when a broadcast cell and a user cell are independently held in the ATM switch 20, and these cells are to be sent to the outlet of the ATM switch 20, the arbitration control circuit 205 determines which cell is sent to the outlet. For example, the arbitration control circuit 205 sends cells from the user FIFO 204 for nine of the ten sub-cell slots and a cell from the broadcast FIFO 203 for the remaining one sub-cell slot, thereby controlling the broadcast channel bandwidth. In this case, if a polling ratio between the broadcast FIFO 203 and the user FIFO 204 in the arbitration control circuit 205 is set from a terminal by a message which is newly defined on the broadcast channel, the user can freely set the broadcast channel bandwidth. At this time, the minimum value of the broadcast channel band width must be assured as a hardware value. That is, a broadcast channel bandwidth lower than a given value is defined not to be set. If the broadcast channel band width is set to "0", i.e., if the broadcast FIFO 204 is set not to perform polling, a terminal may erroneously set the broadcast channel 204 as described above. In this case, no designation from this terminal cannot be transferred to a node.

The arbitration control circuit 205 need not refer to the states of the receiving FIFO 302 and the line buffers 2081, . . . , 208n prior to polling of the broadcast FIFO 204. However, the arbitration control circuit 205 may refer to the states of these FIFOs. If even one of the FIFOs does not have an area capable of holding a new cell, the arbitration control circuit 205 performs control such that no cells are sent from the broadcast FIFO 204. Since extraction of cells from the receiving FIFO 302 depends on the processing speed of the microprocessor 304 in the node control section 30, the arbitration control circuit 205 may refer to the states of the line buffers 2081, . . . , 208n without referred to the state of the receiving FIFO 302 so as to prevent broadcast cell discarding in the broadcast FIFO 204. If any one of the line buffers 2081. . . , 208n does not have an area capable of holding a new cell, the arbitration control circuit 205 may perform control such that cells are not sent from the broadcast FIFO 204. At this time, if the receiving FIFO 302 does not have an area capable of holding a new cell, the sent broadcast cell is discarded by the receiving FIFO 302.

If no cell is held in a FIFO polled when the arbitration control circuit 205 polls the broadcast FIFO 203 or the user FIFO 204, an empty cell may be sent out. If the other FIFO is polled and a cell is held therein, the held cell may be sent. That is, the arbitration control circuit 205 first polls the user FIFO 204. If this FIFO is empty, a cell is sent from the broadcast FIFO 203. According to this method, the minimum broadcast channel bandwidth is determined by the polling ratio. For example, in ATM-LAN system initialization or the like, the above method can cope with a situation wherein a large number of broadcast cells are transferred although a large number of user cells are not transferred.

The method described above allows the user to freely set the delay of a broadcast channel. More specifically, when the length of the broadcast FIFO 203 is controlled in the ATM switch 20 of each node, the maximum wait time of the broadcast cells in each node can be controlled when the broadcast channel is busy. The maximum delay of the broadcast channel can be controlled by controlling the length of the broadcast FIFO 203. When the maximum delay amount of the broadcast channel is set small, it should be noted that the cell loss rate of the broadcast channel increases. If the length of the broadcast FIFO 203 can be set by a newly defining message from a terminal on the broadcast channel, the upper delay limit of the broadcast channel which is required by the user can be set.

The operation of the node control section 30 for a given node according to an embodiment of the present invention will be described below.

A node of an embodiment of the present invention sets and chains VP/VC links in accordance with designation from a terminal. In response to a request from the terminal, the node setting process of each node controls the node. For this reason, the node control section 30 must have a function capable of receiving a broadcast cell which transfers designation from the terminal. The node control section 30 must also have a function of sending, to the terminal, a broadcast cell representing that this designation has been executed. For this purpose, the node number filter 301, the receiving FIFO 302, and the sending FIFO 303 are arranged in the node control section 30.

A broadcast cell is output from the outlet of the ATM switch 20 connected to the node control section 30 upon switching the ATM switch 20 in accordance with information added by the routing-tag adding circuit 102. The node number filter 301 refers to the destination field of the output broadcast cell. If the destination field coincides with the node number allocated to the node number filter 301 at the manufacturing time, the node number filter 301 outputs the cell to the receiving FIFO 302. If the destination field of the received broadcast cell is different from the node number assigned to itself, the corresponding cell is discarded so as not to cause an unnecessary broadcast cell to interrupt the operation of the microprocessor 304. The receiving FIFO 302 temporarily holds the received broadcast cell.

The microprocessor 304 executes a program code written in the ROM 305. This allows the microprocessor 304 to operate a node setting process. When the microprocessor 304 detects that the broadcast cell is held in the receiving FIFO 302, the microprocessor 304 designates to transmit this broadcast cell from the receiving FIFO 302 to the RAM 306. When the DMAC 307 receives designation from the microprocessor 304, the DMAC 307 transfers the broadcast cell held in the receiving FIFO 302 to the RAM 306. Upon completion of the transfer, the DMAC 307 informs the microprocessor 304 of the end of transfer. In this case, the microprocessor 304 analyzes the broadcast cell and performs an operation designated by the analyzed message.

The microprocessor 304 uses the input port number in the routing-tag field in the broadcast cell. The port number is written by the routing-tag adding function as described above. It should be noted that a specific port from which the received broadcast cell is input can be known. This function is used to recognize a connection relationship between each port and a corresponding cell during initialization of the ATM-LAN.

A method of causing the microprocessor 304 to detect that a message is held in the receiving FIFO 302 may be a method of causing the microprocessor 304 to poll the receiving FIFO 302 at a predetermined period or a method of causing the receiving FIFO 302 to output an interrupt signal to the microprocessor 304.

On the other hand, in node control of the microprocessor 304 in accordance with a program written in the ROM 305, the microprocessor 304 itself sends a broadcast cell. In this case, the microprocessor is operated as follows. First of all, the microprocessor 304 forms a target transmission broadcast cell in the RAM 306. In this case, it should be noted that the format of the target transmission broadcast cell must have an internal cell format. The attendant information is set as follows.

a) Destinated-to-All-Terminals Broadcast Cell:
Broadcast flag=one, Branch flag=zero,
Routing tag=Don't care
Root-side flag=one
b) Destinated-to-Neighborhood-Node Broadcast Cell.
Broadcast flag=zero, Branch flag=zero,
Routing tag=port number of interface point subjected to transfer,
Root-side flag=zero It should be noted that the attendant information of the destinated-to-all-terminals broadcast cell is identical to that added by the routing-tag adding circuit 102, and that of the destinated-to-neighborhood-node broadcast cell is identical to that of a user cell.

When the microprocessor 304 forms the broadcast cell, the microprocessor 304 designates the DMAC 307 to transfer the desired transmission broadcast cell from the RAM 305 to the sending FIFO 303. The DMAC 307 transfers this broadcast cell from the RAM 306 to the sending FIFO 303. The sending FIFO 303 sends the broad cast cell to the ATM switch 20.

It is assumed that the DMAC 307 transfers the broadcast cell between the receiving FIFO 302, the sending FIFO 303, and the RAM 306. However, the microprocessor 304 may transfer a broadcast cell.

In the ATM switch 20 in the node of the ATM-LAN system shown in FIG. 28, the user FIFO 204 for temporarily holding a user cell and the broadcast FIFO 203 for temporarily storing a broadcast cell on a broadcast channel are independently arranged. However, these FIFOs may be virtually realized in a single memory space to improve the utilization efficiency of the cell buffer.

In addition, since the broadcast cell is temporarily and independently held in the broadcast FIFO 203 in the ATM switch 20, so-called adaptation layer processing may be performed using the broadcast FIFO 203 to form a message on one broadcast channel by a plurality of cells. This method is effective when the length of the message content field of the broadcast cell becomes short due to an increase in information which must be set in, e.g., a polishing algorithm, at the port of a node. In this case, the broadcast FIFO 203 temporarily removes the header portion of the broadcast cell input to each input port, frames a message in accordance with, e.g., one of adaptation algorithms AAL3, AAL4, and AAL5 defined in the ITU-T standards, and refers to the destination field of the framed message to determine whether the route is branched to the corresponding node. A message determined to be branched to the corresponding node is transferred to the node control section 30; other messages are divided in the cell form by AAL3, AAL4, or AAL5 again, and a header (i.e., All−1 in this embodiment) which represents a broadcast cell is added to each of these messages. The resultant message is transferred to the address filters 2071 to 207n.

In case of a message from the node control section, the message on the broadcast channel is directly sent from the node control section 30 to the broadcast FIFO 203. The broadcast FIFO 203 divides the sent message in accordance with the cell form by AAL3, AAL4, or AAL5, and a header representing a broadcast cell is added to the divided message. The resultant message is sent to the address filters 2071 to 207n.

In this case, a message externally input to the node and appearing on the broadcast channel must be merged to a message sent from the node control section 30. A merging method varies depending on an adaptation protocol used in this embodiment. If an AAL5 is used, cell interleaving on the broadcast channel disables normal message construction on the receiving side. A merging method of sending a cell originated from the next message upon sending a cell originated from one message must be employed. On the other hand, when AAL3 or AAL4 is used, the broadcast FIFO 203 determines an MID value for each received message to form a message using the MID field at the receiving side. Whereas the cell made from plural messages are merged and sent from the broadcast FIFO 203, these messages can be framed in the neighborhood node normally. As a result, message interleaving can be performed to minimize the transfer delay of an average message. However, an algorithm such as the AAL3 or AAL4 is more complex than the AAL5 to result in high cost. An appropriate algorithm is selected in accordance with the characteristics of an ATM-LAN system. In addition, two types of messages are reserved for, e.g., broadcast channel VPI/VCI values. One message serves as a message (single cell) on a broadcast channel, and the other message serves as a message representing the length for receiving adaptation.

If adaptation may result in high cost, a new message can be defined using a message number field. When the length of a supervisory parameter of a function such as polishing increases to disable settings of information factors requiring a connection setting request message and a node setting request message in a 20-octet message content field, a terminal may send a bandwidth setting request, which is a new message on the broadcast channel and a terminal which receives this message may send a polishing setting request message, which is another new message on the broadcast channel, to a necessary node independently of VP/VC linking. When each node receives the polishing setting request message, it controls the polishing function in accordance with the input message. Since only one of the output and input VPI/VCI links can be designated to increase the number of bits which can be used to designate a traffic parameter, as compared to the node setting request message. At this time, for example, basic broadcast cells may be transferred by a broadcast channel represented by VPI/VCI=all−1, and other expanded broadcast cells may be transferred by a broadcast channel represented by VPI/VCI values except for VCI/VPI=all−1. The basic broadcast cell is a broadcast cell associated with structure recognition or a cell associated with VP/VC link setting/chaining. When a message for setting VPI/VCI values representing the expanded broadcast cell in each node or a message for downloading a program describing processing of the expanded node is defined in the basic broadcast cell, a more preferable form is obtained.

This embodiment has described the ATM-LAN node which uses an algorithm for realizing a broadcast channel such that a broadcast cell is routed to the root of the broadcast tree. Another embodiment having another method of realizing a broadcast channel will be described below.

Figure 29:
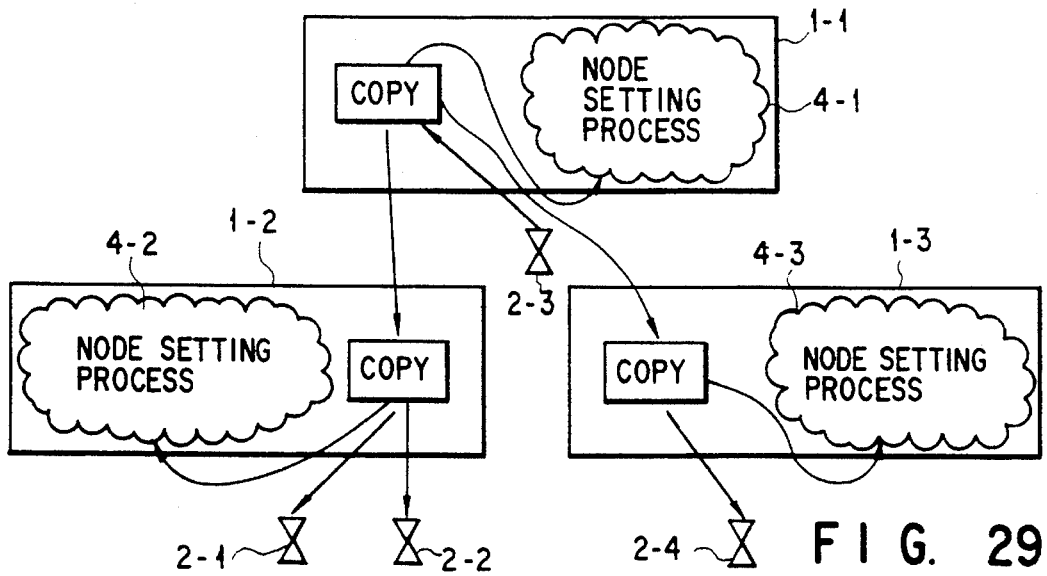
FIG. 29 is a diagram explaining a method of operating another type of a broadcast channel for used in the ATM-LAN.

FIG. 29 shows another method of realizing a broadcast channel in an ATM-LAN node of an embodiment of the present invention. FIG. 29 shows a method of transferring a broadcast cell sent from a terminal 2-3 to another terminal or a node setting process.

Each node sends an input broadcast cell to all interface points except for an interface point where the cell was input. As a result, the broadcast cell sent from the terminal 2-3 can be transferred to another terminal or the node setting process.

This method can reduce the number of nodes through which a broadcast cell passes, as compared to the method shown in FIGS. 32A and 32B. For this reason, a broadcast channel delay can be further reduced. In the method shown in FIGS. 32A and 32B, the entire system fails if the root of the broadcast tree fails. To the contrary, in the method shown in FIG. 29, even if the root fails, the system is simply divided into two ATM-LAN systems which can be independently operated. In addition, this ATM-LAN system is connected to another ATM communication system having no broadcast channels, the method shown in FIGS. 32A and 32B requires a broadcast cell loopback function. However, in the method of FIG. 29, it is only expected that this another ATM communication system discards a cell (i.e., a broadcast cell) having VPI/VCI=all−1 (all "1"s).

On the other hand, the order of all broadcast cells sent from all the terminals/node setting processes cannot be defined (i.e., the order of broadcast cells received by a given terminal is different from that by another terminal), the terminals must be undesirably synchronized with each other. Process synchronization is an important function in a distributed OS (Operating System).

In the broadcast channel structuring method shown in FIG. 29, root-side information and leaf-side information in another broadcast channel realizing method are not used to define the broadcast tree. For this reason, in the ATM-LAN system, when the node connection method is limited to only the tree structure, the mechanical switch 105 can be omitted. However, in ATM communication, a communication scheme requiring network synchronization such as an SDH is generally required, and a mechanical switch representing a master port to which other ports serve as slave ports to realize network synchronization may be arranged in each network INF. The user operates this mechanical switch during system installation to present information representing the master-slave port relationship to the node.

To realize the broadcast channel shown in FIG. 29, a routing-tag adding circuit 102, a routing-tag deleting circuit 103, and an ATM switch 20 of each node are arranged to perform the following operation.

Prior to a description of the operations of these components, information for controlling the operations of these components will be described below.

Figure 30:
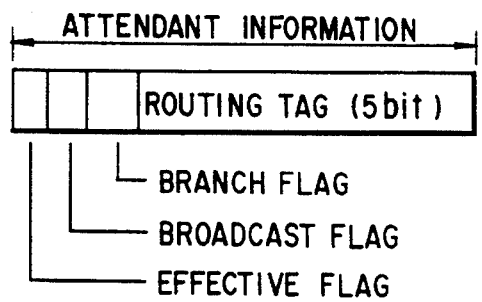
FIG. 30 illustrates the format of the attendant information of an internal cell for use in another method of operating a broadcast channel for use in the ATM-LAN.

Attendant information added to an input cell by the routing-tag adding circuit 102 is shown in FIG. 30.

The first bit of the attendant information is an effective flag representing whether the following 431-bit information is significant information. If this flag is set to one, the following 431-bit information is determined as the significant information. If the flag, however, is set to zero, the 431-bit information does not serve as significant information.

One bit next to the effective flag is a broadcast flag representing whether the corresponding cell is a broadcast cell. If this flag is set to one, the cell is represented as a broadcast cell. However, if the flag is set to zero, the cell is represented as a user cell.

One bit next to the broadcast flag is a branch flag representing whether the corresponding cell is output to a node control section 30. The branch flag is used to distinguish the destinated-to-neighborhood-node broadcast cell from the destinated-to-all-terminals broadcast cell. If the branch flag is set to one, the cell is represented as the destinated-to-neighborhood-node broadcast cell. However, if the branch flag is set to zero, the cell is represented as the designated-to-all-terminals broadcast cell.

The last five bits represent a routing tag representing an interface point number to send this cell. If an input cell is a broadcast cell, this 5-bit portion represents the number of the interface point to which this broadcast cell is input.

When the input cell is the broadcast cell, a CLP bit represents whether the cell is the destinated-to-all-terminals broadcast cell or the designated-to-neighborhood-node broadcast cell in the same manner as in the previous embodiment.

The operations of the components operated with reference to this attendant information will be described below.

First of all, the operation of the routing-tag adding circuit 102 will be described below.

When the routing-tag adding circuit 102 receives a cell input from an interface point, it adds attendant information to the start of a cell whose write field is input. The routing-tag adding circuit 102 then refers to VPI/VCI values. When the VPI/VCI values of the input cell are predetermined values, i.e., when not all the bits are set at "1" in this embodiment, the routing-tag adding circuit 102 determines that the input cell is a user cell.

When the input cell is determined as a user cell, the routing-tag adding circuit 102 refers to the VPI/VCI values of the input cell to detect a port number from which the input cell is sent out, and new VPI/VCI values at the transmission time with reference to an attached routing-tag table (not shown), thereby rewriting the VPI/VCI values. The port number is added to the cell as the routing tag in the same manner as in the previous embodiment. At this time, the broadcast flag and the branch flag in the attendant information are set to zero.

On the other hand, when the routing-tag adding circuit 102 determines that the input cell is the broadcast cell, it refers to the CLP bit to determine whether the broadcast cell is the destinated-to-all-terminals broadcast cell or the designated-to-neighborhood-node broadcast cell. If the broadcast cell is determined as the destinated-to-all-terminals broadcast cell, the broadcast flag in the attendant information is set to one, and the branch flag therein is set to zero. However, when the broadcast cell is determined as the destinated-to-neighborhood-node broadcast cell, the broadcast flag in the attendant information is set to one, and the branch flag therein is also set to one. The number of the interface point to which this cell is input is written in the routing tag of the broadcast cell.

When the above operations are completed, the routing-tag adding circuit 102 transfers the cells to the ATM switch 20. Upon reception of this cell, the ATM switch 20 temporarily classifies the cells in accordance with broadcast or user cell and stores an FIFO assigned thereto, i.e., a broadcast FIFO 203 or a user FIFO 204. An output operation of such a FIFO is controlled by a arbitration control circuit 205. A cell is sent out from one of the FIFOs and simultaneously transferred to a node control filter 206 and address filters 2071, . . . , 207n.

Cells input to the node control filter 206 are sent to the node control section 30 or discarded as follows.

The input cell is the user cell (i.e., the broadcast flag is reset), this cell is discarded.

If the input cell is the destinated-to-all-terminals broadcast cell (i.e., the broadcast flag is zero and the branch flag is zero, the routing tag is referred to. If the broadcast cell coincides with the port number allocated to this node control filter 206, the input cell is discarded; otherwise, the cell is sent out.

When the input cell is the destinated-to-neighborhood-node broadcast cell (i.e., the broadcast flag is one, and the branch flag is one, this input cell is sent.

On the other hand, the address filters 2071, . . . , 207n send the input cells to line buffers 2081, . . . , 208n or discard them as follows.

If the input cell is a user cell, the routing tag is referred to. If the user cell coincides with the port number (i.e., the number of the interface outputting this user cell) assigned to each address filter, this user cell is sent out; otherwise, it is discarded.

If the input cell is the destinated-to-all-terminals broadcast cell, the routing tag is referred to. If the broadcast cell coincides with the port number assigned to each address filter, this broadcast cell is discarded; otherwise, it is sent.

If the input cell is the destinated-to-neighborhood-node broadcast cell, this broadcast cell is discarded.

The transfer speed is decreased to the transfer speed at the interface point, and the cell sent to the line buffer 2081 is transferred to a routing-tag deleting circuit 103. The routing-tag deleting circuit 103 deletes the attendant information added by the routing-tag adding circuit 102. The resultant information is transferred to a (sending side) physical layer circuit 104.

Note that the attendant information of the broadcast cell sent by the node control section 30 is as follows.

When the cell is the destinated-to-neighborhood-node broadcast cell, the broadcast flag is set to zero, and the branch flag is set to zero. This cell is processed in the same manner as the user cell in the ATM switch 20. At this time, the routing tag describes a port number of a port from which the cell is sent. However, if the input cell is the destinated-to-all-terminals broadcast cell, the broadcast flag is set to one, and the branch flag is set to zero. The port number allocated to the node control filter 206 is described in the routing tag.

When the node connection method is not limited to only the tree structure, a mechanical switch may be arranged in each network INF, and information representing whether a broadcast channel is set on a physical link accommodated in this network INF may be set by the user at the system installation time. In this case, the routing-tag deleting circuit 103 refers to this mechanical switch and determines that the broadcast channel is not set on the physical link accommodated in this network INF, the destinated-to-all-terminals broadcast cell may be discarded.

In the method of realizing the broadcast channel, information representing the master port is additionally required to achieve network synchronization, as described above. For example, the user may sets a binary port number with a mechanical switch at the time of node setting, or a mechanical switch used in the first broadcast channel realizing method for determining the leaf-side information or root-side information may be arranged in each port. In the latter method, mechanical switch information representing a link in which a broadcast channel is set and information required to realize the first broadcast channel are obtained. Therefore, the described two algorithms can be implement as discussed following. When the value of the message type field in a broadcast cell is larger than a predetermined value, the first broadcast channel realizing method is used; otherwise, the second broadcast channel realizing method is used. The second broadcast channel realizing method can be used for a connection setting request message and a node setting request message which have an importance in latency. However, the first broadcast channel realizing method can be used for a synchronization message between the processes in the terminals, i.e., a message having an importance in the order of all identical messages. Therefore, a more preferable form can be obtained.

When a plurality of physical links are arranged between two nodes, one of the plurality of physical links is selected to allocate a broadcast channel in the selected link. However, to obtain more reliability, the following method can be applied. The priority order is assigned to the plurality of physical links arranged between identical nodes. If a physical link having a higher priority fails, e.g., is disconnected, the broadcast channel may be set on a physical link having a lower priority.

In the ATM-LAN of this embodiment, when the processor in each node detects the failure of a physical link having a higher priority, an output port from which broadcast cell is transferred is changed to realize the above function. When this is realized, even if a link failure occurs, the ATM-LAN is kept desirably operated. On the other hand, the new function described above must be assigned to each node of the ATM-LAN system, thereby increasing the cost of the ATM-LAN node. Whether this technique is employed changes depending on an installation environment and applications to which ATM-nodes are applied.

A method of providing the mechanical switch information for realizing the broadcast channel and the mechanical switch information representing the network synchronization receiving by the processor for controlling the node is not limited to the mechanical switches. Information may be written in a non-volatile memory such as an EP-ROM. When these pieces of information are supplied using an EP-ROM, the present can be practiced using a neat case having a front panel from which mechanical switches do not appear.

When realization of a broadcast channel upon power-ON is taken into consideration, an EP-ROM in which information is correctly written at the time of node installation must be inserted in a node. When viewed from a user, an EP-ROM writer is undesirably required to install an ATM-LAN node. A nonvolatile RAM may be used in place of the EP-ROM. In this case, a path for writing information in the nonvolatile RAM is required. For this purpose, an RS-232C terminal must be additionally prepared to cause an RS-232C port to communicate with the node, resulting in inconvenience. At the power-ON time, a node autonomously determines a physical link in which a broadcast channel may be set, and these pieces of information may be written in the nonvolatile RAM. In this case, although this arrangement has an advantage in that the user need not set a mechanical switch, an information processing capacity required for the node increases to result in high cost. Moreover, a time from the power-ON operation to the start of operation of the broadcast channel changes depending on the ATM-LAN size. Therefore, the operation of the overall system becomes unstable.

In the ATM-LAN of this embodiment, the definition of the broadcast channel on a tree structure requires attention to broadcast channel realization using an ATM-LAN node by a bus structure which is a special form as the tree structure.

According to the above embodiment, FIFOs are arranged to separately hold a user cell and a broadcast cell. The period of sending the cells from these FIFOs is determined by polling in the arbitration control function. For this reason, the bandwidth of the broadcast channel can be changed by changing the polling period. Controlling the length of the broadcast FIFO provides an ATM-LAN system node capable of arbitrarily control ling a transmission delay. In addition, according to this embodiment, since there is provided a broadcast channel realizing method in which a broadcast cell is not temporarily transferred to the route of a broadcast tree, an ATM-LAN system node having a minimum broadcast channel delay can be provided.

Still another embodiment of the present invention will be described in detail with reference to FIG. 33.

Figure 33:
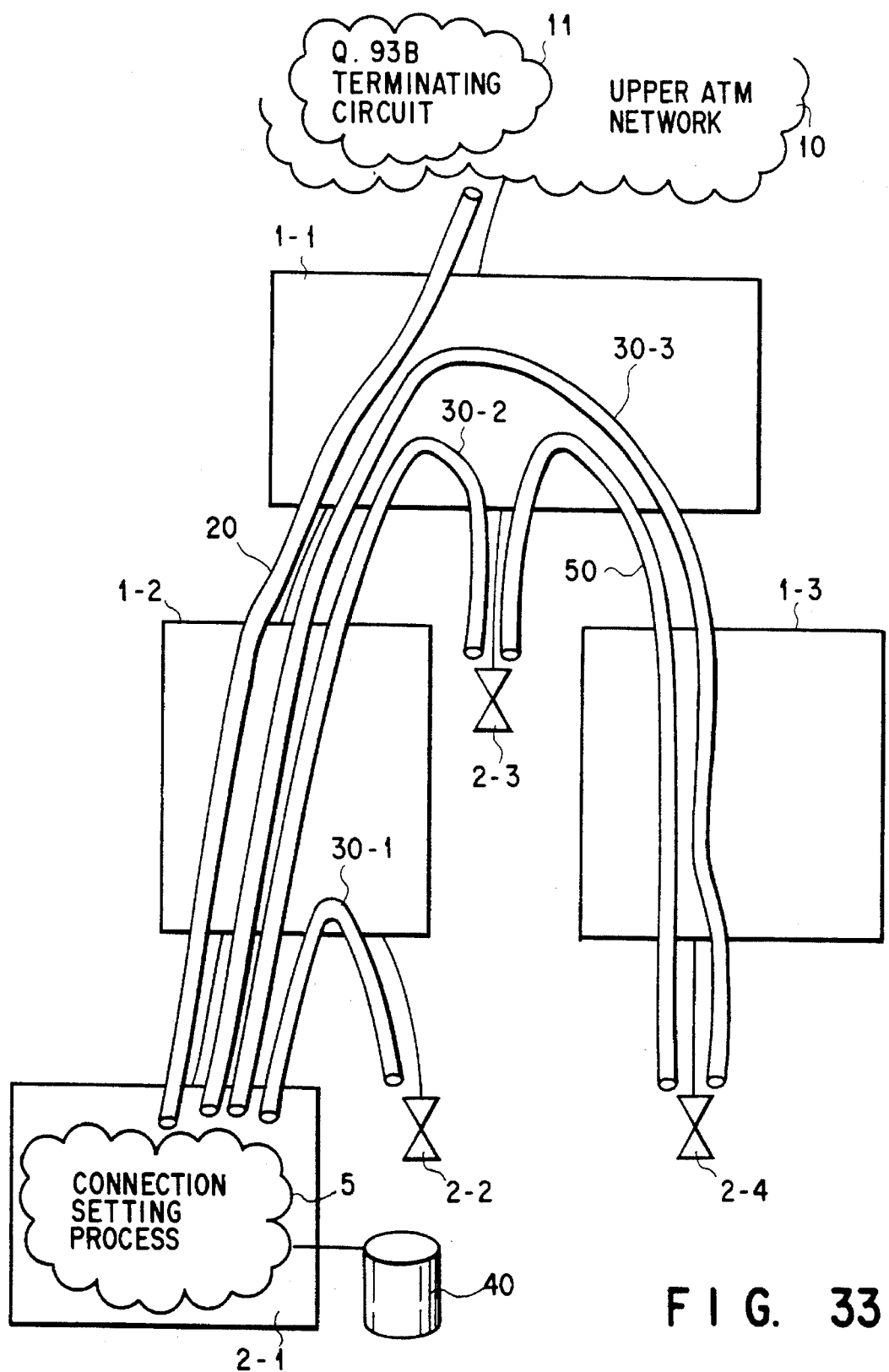
FIG. 33 is a diagram explaining how to set a connection in the ATM-LAN system.

FIG. 33 shows connections set at the initialization time of an ATM-LAN system. Referring to FIG. 33, reference numerals 1-1, 1-2, and 1-3 denote nodes of ATM-LAN systems. Terminals 2-1, 2-2, 2-3, and 2-4 are connected to these nodes. A connection setting process 5 sets connections on the ATM-LAN system. An upper ATM network 10 is connected to the ATM-LAN system. A Q.93B terminating circuit 11 terminates a call setting message, included in the upper ATM network 10, from a UNI. A signaling VC 20 connects the connection setting process 5 to the Q.93B terminating circuit 11. Signaling VCs 30-1, 30-2, and 30-3 connect the connection setting process 5 to the terminals 2-2, 2-3, and 2-4. A data base 40 holds the ATM-LAN structures used by the connection setting process 5. A connection 50 transfers an operation program from the terminal 2-3 to the terminal 2-4.

Although a broadcast channel 3 is not illustrated in FIG. 33, the nodes 1-1, 1-2, and 1-3 assign a broadcast channel function to each terminal and each node in accordance with the functions of the nodes 1-1, 1-2, and 1-3 in the same manner as in FIGS. 32A and 32B. Although not shown, a node setting process is also included as in FIG. 31.

This embodiment will be described in detail with reference to the accompanying drawings.

In this case, a terminal for performing connection settings using the Q.93B (standard terminals), all of which are defined as terminals which cannot process messages on the broadcast channel 3 disclosed in the embodiment of FIG. 31 corresponding to the embodiment of FIG. 1, are connected to the ATM-LAN in the embodiment of FIG. 31. The connection settings in this case will be described below.

The terminal 2-1 is a relatively high-performance terminal (e.g., a workstation) executed by the connection setting process 5. The terminals 2-2 and 2-3 are standard terminals for performing connection settings using the Q.93B. The terminal 2-4 is a terminal operated upon reception of an operation program transferred from the terminal 2-3.

In the ATM-LAN system shown in FIG. 31, using a protocol defined on the broadcast channel 3, the connection setting process 5 can detect an ATM-LAN system structure in a range wherein the connection setting process 5 can perform connection settings. That is, the connection setting process 5 can detect a connection of a specific port of a specific node to another specific port. In other words, the structure recognition can be performed. The ATM-LAN system structure as a result of structure recognition is held in the data base 40.

Upon structure recognition, the signaling VC 20 is set between the connection setting process 5 and the port of the node whose connection to the upper ATM network 10 is recognized. This signaling VC 20 is used to exchange a connection setting request from the upper ATM network 10 or thereto between the connection setting process 5 and the Q.93B terminating circuit 11 in the upper ATM network 10. VPI/VCI values assigned to this signaling VC are set such that connection points between the upper ATM network 10 and the node and between the node and the terminal 2-1 on the connection setting process 5 are set to VPI=0 and VCI=5. VPI/VCI values between other nodes may be arbitrarily determined by the connection setting process.

To cope with connection settings to the upper ATM network 10 and arrival of a connection from the ATM network 10, an address having the same space as that of an address (e.g., an E.164 or IP address) of the layer 3 used in the upper ATM network may be assumed to be allocated to each terminal. In a terminal capable of processing a message on the broadcast channel of this embodiment, a correspondence relationship between the address of the layer 3 and the node number serving as the address (assigned to each terminal at the manufacturing time) on the broadcast channel 3 may be held in the data base 40 in practice. In addition, this relationship between the node number and the address of the layer 3 may be set by a command input to the data base 40 by a network operator.

In the ATM-LAN of this embodiment, network control information is exchanged on the broadcast channel 3 using the node number serving as the address thereof. If each terminal detects the node number upon power-ON, it can start communication. For this reason, each terminal need not hold the address of the layer 3, e.g., the E.164 address. Note that a file representing the relationship between the node number and the address of the layer 3 is prepared in the data base, and the command is entered to update the file when the network operator requires the data base. When the E.164 address is assigned to a terminal in advance, a protocol for causing the terminal to automatically register the E.164 address using the connection between the terminal and the connection setting process may be used.

The terminals 2-2 and 2-3 are the standard terminals which cannot translate the message on the broadcast channel 3. Each terminal cannot inform the connection setting process 5 of the fact that it connects to the ATM-LAN, in accordance with structure recognition. After the ATM-LAN operator physically connects the terminals 2-2 and 2-3, he issues a command representing that the standard terminal has been connected by a standard terminal connection command to the connection setting process 5. These commands may be entered at the terminal 2-1 or another terminal (not shown) capable of processing the message on the broadcast channel. These commands include, as entry data, node and port numbers connected to the standard terminal and the address of the layer 3 added to the standard terminal.

when the standard terminal connection command representing that the standard terminal has been connected is informed, the connection setting process 5 adds information representing connection of the standard terminal to a given port to information associated with the given port of the node connected to the standard terminal. The connection setting process 5 also registers the address of the layer 3 added to the standard terminal. In addition, the signaling VCs 30-1, 30-2, and 30-3 are set between the given port and the connection setting process 5. The VPI and VCI values assigned to the signaling VC at the port connected to the standard terminal are preferably 0 and 5, respectively. On the other hand, the connection setting process is set to determine a signaling VC for a port connected to a specific standard terminal in accordance with the VPI/VCI values (e.g., predetermined VPI values are assigned to the signaling VCs for the standard terminals, and VCI values are sequentially assigned to the signaling VCs already assigned with the VPI values). In this case, different values are preferably assigned to the signaling VCs. The VPI/VCI values between the nodes of these connections may be arbitrarily determined by the connection setting process 5.

The terminal 2-4 is assumed to be operated upon program transfer from the terminal 2-3. For this reason, the program transfer connection 50 must be set in addition to the signaling VC 30-3 between the terminal 2-4 by the connection setting process 5.

When the network operator connects the terminal 2-4 to a node, he enters the standard terminal connection command to inform the data base 40 of the node and port numbers of the node and port connected to the terminal 2-4 and the address of the layer 3 assigned to the terminal 2-4. The data in the data base 40 are updated in accordance with this command.

The network operator then sets the program transfer connection 50 in the connection setting process 5 and enters an initial connection setting/registering command so as to register the connection to the data base 40. This command preferably includes, as entry data, node and port numbers of nodes and ports respectively connected to a pair (the terminals 2-3 and 2-4 in FIG. 1) of terminals whose connections are set at the network initialization time, and VPI/VCI values added to the connections on physical links between the terminals and the network.

When the initial connection setting/registering command is entered, the connection setting process sets the connection 50 between the terminals 2-3 and 2-4. The connection 50 is registered in the data base 40 as the connection which should be preset at the network initialization time.

Note that the network operator informs the VPI/VCI between the terminals 2-3 and 2-4 and the node using the initial connection setting/registering command. At this time, the VPI/VCI values defined by the program transfer protocol between the terminals 2-3 and 2-4 must be selected, as a matter of course. VPI/VCI values between the nodes may be arbitrarily selected by the connection setting process 5. The terminal 2-4 requests program transfer every predetermined time interval in accordance with the program transfer protocol from the power-ON operation. When the connection 50 is set, a request associated with program transfer is transferred to the terminal 2-3. Upon reception of the program transfer request, the terminal 2-3 transfers its own program to the terminal 2-4. Upon reception of the transferred program, the terminal 2-4 loads it in its own memory. When program loading is completed, the terminal 2-4 starts execution of the loaded program. As a result, the terminal 2-4 can perform Q.93B connection settings using the signaling VC 30-3.

By the above operations, the data base 40 registers information associated with the connection which should be preset in network initialization. In the next initialization, upon completion of structure recognition, the connection setting process 40 refers to these pieces of registered information to preset a connection group shown in FIG. 26.

A connection setting operation using these signaling VCs will be described in detail below.

A connection setting operation sequence in the ATM-LAN is shown in FIG. 34. This sequence exemplifies a case wherein the terminal 2-2 shown in FIG. 33 sends a request of connection to the terminal 2-3.

Note that in the following description, the message names defined in Q.93B standard are not used because different type message have same name and it is complicate to distinguish these messages.

The terminal 2-2 transfers a calling request message M201 to the connection setting process 5 in the Q.93B form using the signaling VC 30-1. (In Q.93B, this message is called "SETUP" from caller to network). Upon reception of this calling request message M201, the connection setting process 5 transfers a call setting message M202 to the terminal 2-2 using the signaling VC 30-1. (In Q.93B, this message is called "CALL PROCEEDING" from network to callee).

The address of the layer 3 representing the terminal 2-3 is extracted from the call request message M201. The route for setting a connection is analyzed with reference to the data base 40. The VPI/VCI values on the route are sequentially determined. Node setting request (M203 and M204) are output to the nodes 1-1 and 1-2, respectively, to set and chain the VC links. A series of protocol steps starting from the node setting request are defined on the broadcast channel 3, and details thereof may be the ones disclosed in FIGS. 1 and 31.

When the node setting on the route of connections to be set is completed, the connection setting process 5 transfers a call arriving message M205 defined in the Q.93B form to the terminal 2-3 using the signaling VC 30-2. (In Q.93B, this message is called "SETUP" from network to callee). When the terminal 2-3 responds to the incoming call, the terminal 2-3 returns a call acknowledge message M206 to the connection setting process 5 using the signaling VC 30-2. (In Q.93B, this message is called "SETUP" from callee to network).

Upon reception of the call acknowledge message M206, the connection setting process 5 transfers a connection message M207 using the signaling VC 30-1. (In Q.93B, this message is called "CONNECT" from network to caller). Upon reception of the connection message M207, the terminal 2-2 starts communicating with the terminal 2-3.

By the above protocol, connections can be set for a terminal complying with the Q.93B in the ATM-LAN systems disclosed in FIGS. 1 and 31. Connection cancel processing can be performed in the same manner as described above, as can be apparent to those who are skilled in the art.

FIG. 35 shows a sequence for causing the terminal 2-2 to request to set connections to the upper ATM network 10.

The terminal 2-2 transfers a Q.93B calling message M301 to the connection setting process 5 using the signaling VC 30-1. Upon reception of the calling message M301, the connection setting process 5 transfers a call setting message M303 to the terminal 2-2 using the signaling VC 30-1. The connection setting process 5 analyzes the receiving address of the received calling message. When the connection setting process 5 recognizes necessity of setting connections through the upper ATM network 10, the connection setting process 5 transfers a copy of the calling message M301 to the Q.93B terminating circuit 11 as a calling message M302 from the connection setting process 5 using the signaling VC 20. Upon reception of the calling message M302, the Q.93B terminating circuit 11 transfers a call setting message M304 to the connection setting process 5 using the signaling VC 20. For example, connection setting necessity through the upper ATM network 10 is acknowledged as follows.

That is, this necessity may be recognized such that the address of the layer 3 of the received calling message is not registered in the data base 40. In another case, when position information is not included in the address system, like the E.164 address, necessity of connection setting through the upper ATM network 10 can be recognized with reference to only this address (e.g., a toll number).

The connection setting through the upper ATM network is completed, the Q.93B terminating circuit 11 transfers a connection message M305 to the connection setting process using the signaling VC 20. This allows to inform VPI/VCI values between the upper ATM network and the node connected directly to the upper ATM network. The connection setting process 5 analyzes the route for setting connections with reference to the data base 40 to sequentially determine the VPI/VCI values on the route. The connection setting process 5 sends node setting request messages (M306 and M307) to the nodes 1-1 and 1-2, respectively, thereby setting and linking the VC links. A series of protocol steps starting from this node setting request are defined on the broadcast channel 3, and details thereof may be the ones described with reference to the embodiment in FIG. 1.

When the necessary node settings are completed, the connection setting process 5 sends a connection message M308 to the terminal 2-2. Upon reception of the connection message M308, the terminal 2-2 starts communication.

By the above procedures, connection settings to the upper ATM network 10 can be requested. A connection release request can be made in the same manner as described above, as can be apparent from those who are skilled in the art. A call from a terminal which sets/cancels connections using the broadcast channel 3 does not comply with the Q.93B communication between the connection setting process 5 and the terminal, but with the communication on the broadcast channel 3 shown in the embodiment of FIG. 1, as a matter of course.

In this case, not a node number for designating a communication partner but a connection setting request message for designating the E.164 address must be newly defined on the broadcast channel 3. When position information is not included in the address system, like a node number, which is the main characteristic feature of the ATM-LAN of this embodiment, connection settings required for the upper ATM network 10 can be requested as follows. Connection setting processes of the ATM-LAN systems connected using the ATM network 10 can be mesh-connected using ATM connections. Upon reception of the connection setting request message, if the node number designated by the connection setting request message is not stored in the data base 40, it is inquired whether the connection setting processes connected by the above ATM connections manage a terminal having the above node number. If an ATM-LAN system having the terminal having this node number is found, connection settings to this ATM-LAN system are requested to the upper ATM network 10.

Figure 36:
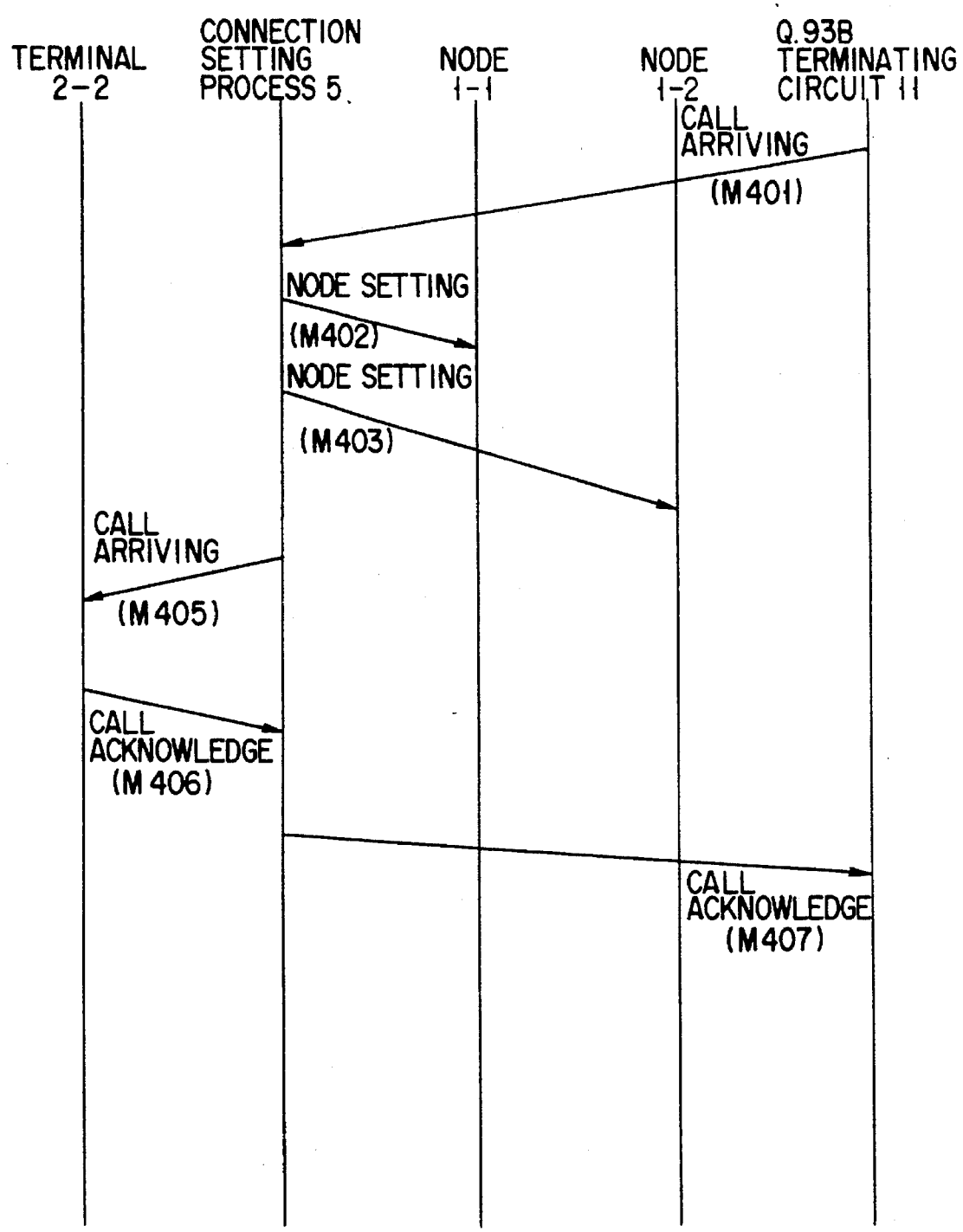
FIG. 36 shows the sequence of steps in which the host ATM requests that the ATM-LAN set a connection in accordance with Q.93B.

FIG. 36 shows a sequence performed when connection settings to the terminal 2-2 are requested from the upper ATM network 10.

The Q.93B terminating circuit 11 in the upper ATM network 10 transfers a call arriving message M401 to the connection setting process 5 using the signaling VC 20. Upon reception of the call arriving message M401, the connection setting process 5 accesses the data base 40 at the address of the layer 3 in this message. As a result, the connection setting process 5 detects a receiving terminal requested by the arriving message. The connection setting process 5 refers to the data base 40 to search for a route for the receiving terminal, analyzes the route for setting the connections, and sequentially determines the VPI/VCI values on the route. The connection setting process 5 outputs node setting request messages (M402 and M403) to the nodes 1-1 and 1-2, respectively, thereby setting and linking the VC links. A series of protocol steps starting with this node setting request are defined on the broadcast channel 3, and details thereof may be the ones disclosed in the embodiment of FIG. 1.

When necessary node settings are completed, the connection setting process 5 sends a call arriving message M405 to the terminal 2-2 using the signaling VC 30-1. Upon reception of the arriving message M405, the terminal 2-2 determines whether connections set by the call arriving message M405 are possible. If so, the terminal 2-2 transfers a call acknowledge message 406 using the signaling VC 30-1. Upon reception of the call acknowledge message, the connection setting process 5 sends a call acknowledge message M407 to the Q.93B terminating circuit using the signaling VC 20.

By the above procedures, the connection setting request from the upper ATM network 10 can be responded. Similarly, a connection release request can be responded in the same manner as described above, as can be apparent to those who are skilled in the art. A call from a terminal to which a connection is set and from the connection is released using the broadcast channel 3 does not comply with the Q.93B communication between the connection setting process 5 and the terminal, but with the communication on the broadcast channel 3 shown in the embodiment of FIGS. 1 and 6, as a matter of course. The address of the layer 3 included in the call arriving message is used to access the data base 40 to detect the node number of the terminal which has received the call, and a series of operations on the broadcast channel 3 are performed using the detected node number. In a terminal capable of processing a message on the broadcast channel 3, when a layer-3 address retrieval message is newly defined on the broad cast channel 3, the address of the layer 3 need not be registered in the data base 40. The connection setting process sends the address retrieval message including the layer-3 address of the receiving on the broadcast channel 3, and the terminal having the layer-3 address included in the address retrieval message forms a response message of the address retrieval message and outputs the response message onto the broadcast channel 3. If the node number is set to be included in the response message, the connection setting process can perform the subsequent processing operations. In the terminal capable of processing a message on the broadcast channel 3, when the address registering message including the layer-3 address of the terminal is defined on the broadcast channel 3, registering of the layer-3 address to the data base 40 can be automatically performed when the address registering message is sent onto the broad cast channel 3 at the power-ON time.

In the above embodiment, a method of accommodating Q.93B compatible terminals in the ATM-LAN system and a method of setting program transfer connections between the terminals in the ATM-LAN have been described above. If each of the terminals 2-3 and 2-4 has a function of processing a message on the broadcast channel 3, the connection 50 for transferring a program from the terminal 2-3 to the terminal 2-4 can be set in a preferable form because the network operator need not enter a command to the data base 40 even if these terminals are moved to any locations.

FIG. 37 shows a sequence of a preferable method of setting program transfer connections.

The terminal 2-4 which receives a transferred program sends a service retrieval message M501 to the broadcast channel 3. This service retrieval message is a message representing a kind of service on the broadcast channel 3 disclosed in the embodiments of FIGS. 1 and 31. More specifically, the service retrieval message is a message sent out to find an offerer offering any service. The service retrieval message output from the terminal 2-4 is a message for searching a code offer service, and its entry data preferably include one of numerical values respectively assigned to a code name (e.g., a Q.93B processing program or an operating system code) and the version number of this program.

The service retrieval message M501 sent to the broad cast channel 3 is transferred to all terminals connected to the broadcast channel. When the service retrieval message M501 is transferred, each terminal determines whether to offer a service designated by this message. If each terminal determines that it can offer this service, it outputs a service retrieval response message M502. In this case, the terminal 2-3 outputs the service retrieval response message M502. This service retrieval response message includes the node number of the terminal 2-3 and is received by the terminal 2-4.

Next, to grasp the position of the connection setting process 5, the terminal 2-4 sends out a service retrieval message M503 for searching a connection setting service to the broadcast channel 3. The connection setting process 5 forms a service retrieval response message M504 in response to this input message and sends it out to the broadcast channel 3. This service retrieval response message M504 includes the node number of the terminal 2-1 which is executing the connection setting process 5. The message M504 is received by the terminal 2-4.

By the above operations, the terminal 2-4 can detect the offerer of the code offer service and the offerer of the connection setting service. Using these pieces of information, the terminal 2-4 outputs a connection setting request message M505 onto the broadcast channel 3 so as to request the connection settings to the terminal 2-3 to the connection setting process 5. Upon reception of the connection setting request message M505, the connection setting process 5 analyzes the connection route with reference to the data base 40 and determines VPI/VCI values. The connection setting process 5 then sends out node setting request messages (M506 and M507) to the nodes 1-1 and 1-3, respectively, thereby setting and linking the VC links. A series of protocol steps starting with this node setting request are defined on the broadcast channel 3, and details thereof may be the ones described in the embodiments of FIGS. 1 and 31.

when the node settings on the route for connections to be set are completed, the connection setting process 5 transfers a connection arriving message M508 to the terminal 2-3 through the broadcast channel 3. Upon reception of the connection arriving message M508, the terminal 2-3 sends out a connection acknowledge message M509 to the connection setting process 5. Upon reception of the connection acknowledge message M509, the connection setting process 5 sends out a connection setting completion message M510 to the terminal 2-2.

A series of operations associated with the connection settings are thus completed. Upon reception of the connection setting complete message, the terminal 2-2 starts executing the program transfer protocol with the terminal 2-3 using the set connections.

The method of setting the program transfer connection 50 using the broadcast channel has been described above.

Terminals which cannot process a message on the broadcast channels 3 shown in the embodiments of FIGS. 1 and 31 are exemplified as the terminal for performing connection settings using the Q.93B form and the standard terminals, and these terminals are connected to the ATM-LANs shown in FIGS. 1 and 31. However, if the connection setting process 5 supports another layer 3 protocol and connections between the terminal and the connection setting process 5 are set in the ATM layer, this layer 3 protocol can be supported, as can be apparent to those who are skilled in the art. In this case, the connection setting process 5 determines a specific protocol corresponding to a specific message, using information representing a source connection through which the specific message is input.

In the correspondence between the layer-3 address stored in the data base 40 and the node number, one of a plurality of layer-3 addresses can be caused to correspond to one node number, like a correspondence between the E.164 and IP addresses. In this case, there is provided an excellent ATM-LAN in which a call arriving using a plurality of protocols can be transmitted to a single terminal. When an IP address is used, compatibility with connectionless communication must be considered. In this case, the connection setting process may receive a message from the upper ATM network and performs routing. The connection-less message may be transferred to a terminal using the preset connection, or a necessary connection may be set upon reception of the connection-less message. In the latter scheme, the connection release timing may be the end of transfer of the received message or may be determined such that the newly set connection may be kept held for a predetermined period of time at the end of transfer of the received message. In the latter case, the connection setting process may cancel the connection when the message for performing message transfer using the newly set connection is not received within a predetermined period of time.

In the ATM-LAN of each embodiment described above, it is assumed that the connection setting process is arranged in each terminal, thereby providing a framework in which an ATM-LAN operator can freely rewrite or change the connection setting process. However, as can be apparent from the characteristic of the broadcast channel 3, the connection setting process need not be arranged in each terminal so as to normally operate the ATM-LAN system. For example, it should be noted that the ATM-LAN system can be normally operated even if a connection setting process is arranged in a node or a upper ATM-LAN network. In particular, when the connection setting process is arranged in the upper ATM network, it is possible to arrange the ATM-LAN of this embodiment as an ATM-LAN front-end network complying with the ITU-T or ATM Forum standards.

In this case, transfer is required in the ATM-LAN complying with the ITU-T/ATM Forum standards on the broadcast channel of the ATM-LAN of this embodiment. To transfer a message on the broadcast channel to the connection setting process in the ATM-LAN complying with the ITU-T/ATM Forum standards to the connection setting process, connections to the connection setting process may be set from the connection point between the ATM-LAN of this embodiment and the ATM-LAN complying with the ITU-T/ATM Forum standards. With this arrangement, at the connection point with the ATM-LAN of this embodiment in the ATM-LAN complying with the ITU-T/ATM Forum standards, polishing is preferably performed for the message on the broadcast channel.

In this case, it should be noted that on the ATM-LAN side of this embodiment, the header of the broadcast cell is updated in the VPI/VCI values assigned to the connections to the connection setting process. A destinated-to-neighborhood-node broadcast cell is not branched in the ATM-LAN complying with the ITU-T/ATM Forum standards and may be transferred directly to the connection setting process. In this case, it should also be noted that the CLP bit of the destinated-to-neighborhood-node broadcast cell must be updated to "0" so as not to receive CLP processing in the ATM-LAN complying with the ITU-T/ATM Forum standards. A designated-to-all-terminals broadcast cell may be also transferred directly to the connection setting process.

As described above, when the connection setting process is arranged in the upper ATM network, for example, the connection setting process in the upper ATM network performs a basic point-to-point connection, and the connection setting process in the ATM-LAN performs a service connection beyond the basic connection, e.g., a point-to-multipoint connection or a connection compatible with a connection service. At this time, these connection setting processes communicate with each other to perform exclusive control so as to maintain consistency in access corresponding to each node. The communication for maintaining consistency in access may be performed by setting a connection therebetween or defining a new message on the broadcast channel and using this message.

The above embodiment has exemplified the signaling VCs. However, the present invention is also applicable to connections used in a management system called an ILMI. In this case, the MIB of each input port is held in the data base 40 of the connection setting process, as a matter of course.

According to the above embodiment of the present invention, the connection setting process sets a virtual channel with a predetermined terminal. In a Q.93B terminal which requests call settings using a protocol except for the protocol defined on the broadcast channel, a message can be transferred to the connection setting process using the preset virtual channel. As a result, a protocol terminated at this terminal can be temporarily terminated by the connection setting process, and therefore the terminal which cannot process the message on the broadcast channel can be connected.

An ATM-LAN according to still another embodiment of the present invention will be described in detail with reference to FIG. 38.

Referring to FIG. 38, nodes 1111, 1112, 1113, and 1114 constitute the ATM-LAN. Terminals 1121 and 1122 are terminals accommodated in the ATM-LAN. Zone forming sections 1131 and 1132 accommodate radio zones accommodated in the ATM-LAN. Mobile terminals 1141, 1142, 1143, and 1144 are accommodated in the ATM-LAN. Radio zones 1151 and 1152 are radio zones in which a mobile terminal can receive an ATM-LAN service. A connection setting process 11211 controls the ATM-LAN. The operations of the nodes 1111, . . . , 1114, the terminals 1121 and 1122, and the connection setting process 11211 are the same as those in the above embodiment, and a detailed description thereof will be omitted.

The zone forming sections 1131 and 1132 are arranged to accommodate the mobile terminals 1141, . . . , 1144 in the ATM-LAN. These zone forming sections are installed in places where ATM-LAN services are offered to a working room or any other mobile areas. These sections transmit a medium (e.g., a radio wave or infrared ray) capable of transmitting information in a free space to from the radio zones 1151 and 1152 where the mobile terminals can receive the services. The zone forming sections also receive the medium sent from the mobile terminal to exchange information with the mobile terminal. In the following description, a radio wave is assumed as the medium forming the mobile zones.

Services offered to mobile terminals in the radio zones may be identical to or different from each other.

If services offered in the respective radio zones are different from each other, the following application method is available.

The ATM-LAN as the embodiment of the present invention is set in a department store, and radio zones are set in sales counters, respectively. Information for each sales counter (e.g., good buy information of each counter) which is held in the terminal 1122 is announced to the corresponding sales counter using the corresponding radio zone. When a customer who requested to use a mobile terminal at the entrance of the department store takes out the mobile terminal at a desired sales counter, he or she can obtain information of the sales counter where he or she stays.

In the above application, pieces of information obtained in the respective radio zones in which the customer enters are different from each other. In this case, the services offered in the respective radio zones are said to be different from each other.

Since information that the customer wants to know is generally information associated with a sales counter where the customer stays, a function of selecting information of the desired sales counter from all the sales counter information in the department store is not required. On the department store side, when different pieces of information to be announced in the respective radio zones are different from each other, the customer need not select desired information. That is, an operation for the mobile terminal by the customer can be reduced. As a result, there can be provided a mobile terminal which can be used by even a customer who does not have specialized knowledge (the customer takes out the mobile terminal and looks at the display as needed).

The method of reducing the operation for the radio terminal by limiting services offered to the respective radio zones to specific services assigned to only the corresponding radio zones can be employed in other aspects such as operational supports in factories and telephone offices in addition to the applications in the department store.

A factory manufacturing equipment such as an NC and an equipment in a telephone office, such as a switching unit can be almost remote-controlled, but some functions cannot be remote-controlled. To control the functions which cannot be remote-controlled, maintenance personnel must actually come to these equipments. The maintenance personnel usually come to these equipments with instruction manuals if they do not memorize information associated with functions to be maintained. In this case, if an instruction manual is electronically stored in the terminal 1122, and a person who is in charge of maintenance carries this mobile terminal. He can read the instruction manual through the mobile terminal in front of the equipment to be maintained. This is an application of the above embodiment. It is also possible to cause the terminal 1122 to simulate, through the mobile terminal, what will happen in response to operations to be performed for the equipment.

When the above applications are taken into consideration, radio zones are set in front of the respective equipments as maintenance targets, different instruction manuals accessible to the mobile terminal may be prepared for the respective equipments, or an equipment as a simulation target may be selected. In general, the person who is in charge of maintenance wants to read the instruction manual of the equipment in front of him or performs a simulation for the equipment in front of him. For this purpose, when different instruction manuals or simulation targets are prepared for the respective radio zones set in front of the corresponding equipments, the person who is in charge of maintenance need not select the desired instruction manual from a variety of instruction manuals or need not select one of the large number of simulated equipments.

Figure 39:
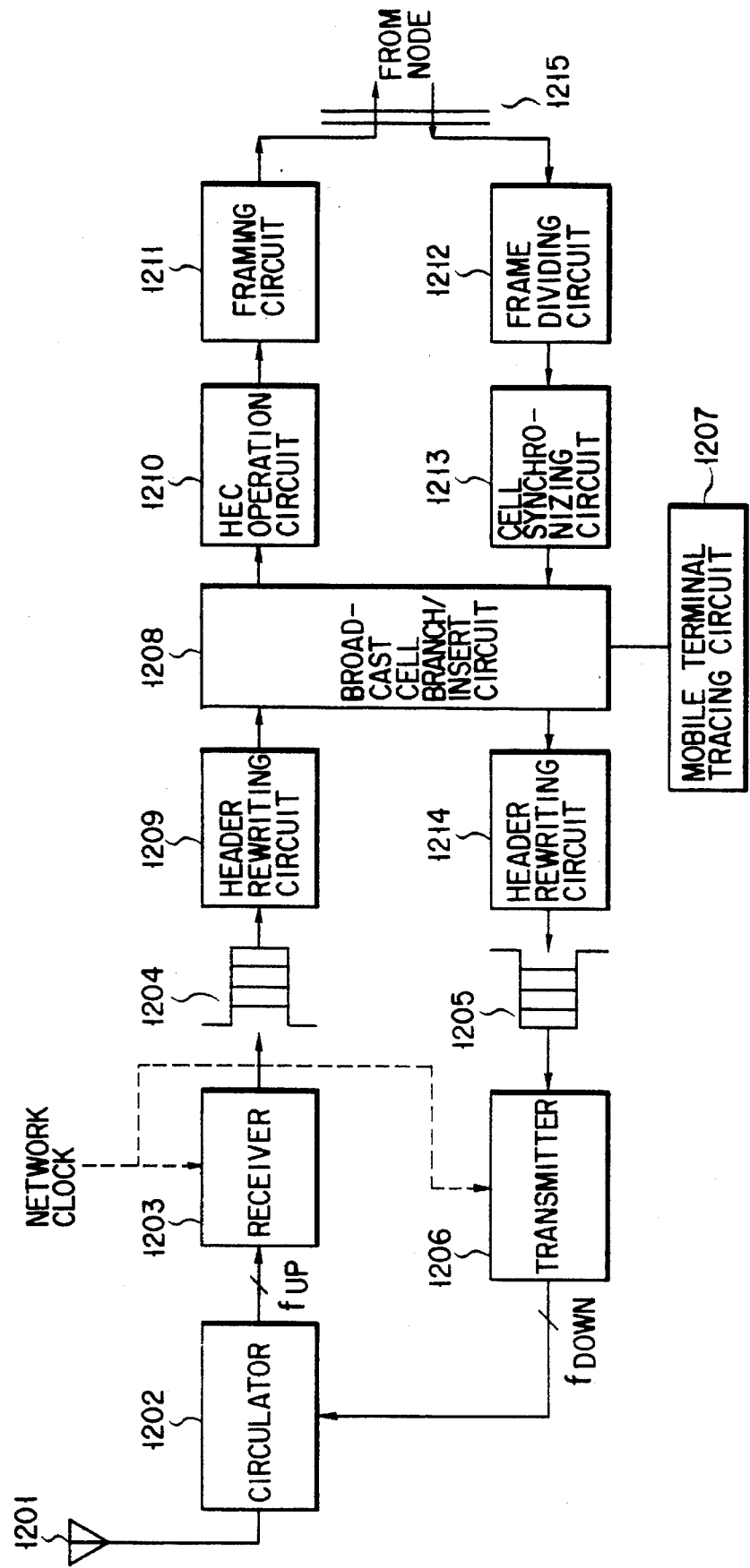
FIG. 39 is a function block diagram of a zone preparing function section.

A method of providing different services for the respective radio zones can be achieved by a method of changing information which can be actually obtained by a user in each radio zone or by the following method. Information accessed by a user at each mobile terminal is formed into a hierarchical directory structure having a tree structure so as to be practiced in an operating system such as UNIX and is stored in the terminal. When a given mobile terminal enters into a radio zone, the mobile terminal performs a login operation for the terminal. During the login operation, the first found directory, i.e., the default directory is determined for each mobile terminal or user in the analogy from the UNIX. However, the default directory may be determined for each radio zone. In this case, although the number of operations for the mobile terminal, which must be memorized by the user, increases, the user can trace this directory structure to read the instruction manual of another equipment in front of a given equipment. It is possible for the user to leave a memo on each page of the instruction manual in the form of a bit image. In this manner, different services may be offered to the respective users. In this case, the mobile terminal must have a function of informing the network of a user ID. FIG. 39 shows the arrangements of the zone forming sections 1131 and 1132. Referring to FIG. 39, an antenna 1201 transmits a radio wave to a radio zone formed by each zone forming section and receives a radio wave from the radio zone. A circulator 1202 transmits the radio wave received by the antenna 1201 to a receiver 1203 and at the same time transmits the radio wave generated by a transmitter 1206 to the antenna 1201. The receiver 1203 demodulates the received radio wave transferred from the circulator 1202 to reproduce a digital waveform. The receiver 1203 then reproduces a cell stream from the reproduced digital waveform. A first cell buffer 1204 temporarily holds the cell stream received from the receiver 1203, converts the cell stream into a cell stream speed at an interface point to a node, and outputs cell stream speed data. A second buffer 1205 receives and temporarily holds the cell stream speed data of the interface point to the node. The second buffer 1205 converts the cell stream speed into a transmission speed of the antenna 1201 and outputs transmission speed data. The transmitter 1206 performs an HEC operation of the cell stream received from the second cell buffer 1205 and writes the operation result in the HEC field. The transmitter 1206 then buries the cell stream in the pay load portion of a predetermined frame. The transmitter 1206 modulates the resultant structure into a radio wave and transmits the radio wave to the circulator 1202.

A mobile terminal tracing circuit 1207 monitors each mobile terminal which enters into, stays in, or moves out from each radio zone. A broadcast cell branch/insert circuit 1208 branches a broadcast cell required for the mobile terminal tracing circuit 1207 from a cell stream input from the antenna or the interface point and transfers the branched broadcast cell to the mobile terminal tracing circuit 1207. The broadcast cell branch/insert circuit 1208 also inserts a broadcast cell transmitted from the mobile terminal tracing circuit 1207 into the cell stream to the antenna 1201 or the interface point.

A first header rewriting circuit 1209 rewrites the header portion of each cell constituting the cell stream output from the first cell buffer 1204 into a header value which is to be sent to the interface point. The first header rewriting circuit 1209 outputs the resultant cell. An HEC operation circuit 1210 calculates the HEC value of the header portion of the cell stream output from the first header rewriting circuit 1209 and passing through the broadcast cell branch/insert circuit 1208, writes the resultant HEC value in the HEC field, and outputs the resultant cell. A framing circuit 1211 receives the cell from the HEC operation circuit 1210, buries the cell in a predetermined frame, and outputs the frame to the interface point. A frame dividing circuit 1212 refers to a bit string input from the interface point, detects a frame separation from the bit string, uses the detected frame separation to extract a frame portion in which the cells are buried, and outputs the extracted cells. A cell synchronizing circuit 1213 refers to the bit string output from the frame dividing circuit 1212, detects the cell separation from the bit string to convert the bit string into a cell stream, and outputs the converted cell stream.

A second header rewriting circuit 1214 rewrites the header portion of the cell output from the cell synchronizing circuit 1213 and passing through the broadcast cell branch/ insert circuit 1208 into a value for outputting the data from the antenna 1201. An interface point 1215 is a connection point between a node constituting the ATM-LAN.

Prior to a description of the operations of the zone forming sections 1031 and 1032, the radio channel structure for accommodating mobile terminals in the ATM-LAN of this embodiment will be described in detail below.

The ATM-LAN capable of accommodating mobile terminals has the following characteristic feature that a cell is transmitted through a radio channel in a radio zone in accordance with the following structure so as to cope with a multimedia structure.

In a radio channel, it is most important to prevent collision, i.e., a phenomenon in which a plurality of mobile terminals simultaneously transmit radio waves and transmission information cannot be demodulated due to collision of the radio waves.

The first method of preventing collision is to use each transmitter using a specific frequency different from those of the remaining transmitters. In the ATM-LAN according to an embodiment of the present invention, this technique is employed in a download link, i.e., an information transfer route from the zone forming sections 1131 and 1132 to the mobile terminals 1141, . . . , 1144 through the radio zones 1151 and 1152.

If each transmitter has a specific frequency different from those of the remaining transmitters, no collision occurs, and the throughput of the radio channels can increase. However, when information reception from a large number of the mobile terminals 1141, . . . , 1144 is taken into consideration, a large number of transmitters are required. Other problems are posed to establish transmission frequency negotiation between the mobile terminals. For this reason, in the upload ATM-LAN link, i.e., in the information transfer route from the mobile terminals 1141, . . . , 1144 to the zone forming sections 1131 and 1132, each mobile terminal transmits information using the same frequency. If collision has occurred, cell discarding is performed. The radio zones 1151 and 1152 formed by the zone forming sections 1131 and 1132 of the ATM-LAN are assumed to have small service ranges. In this case, the number of mobile terminals present in one radio zone is not so large, and an algorithm for performing scheduling to prevent collision is not employed.

Figure 40:
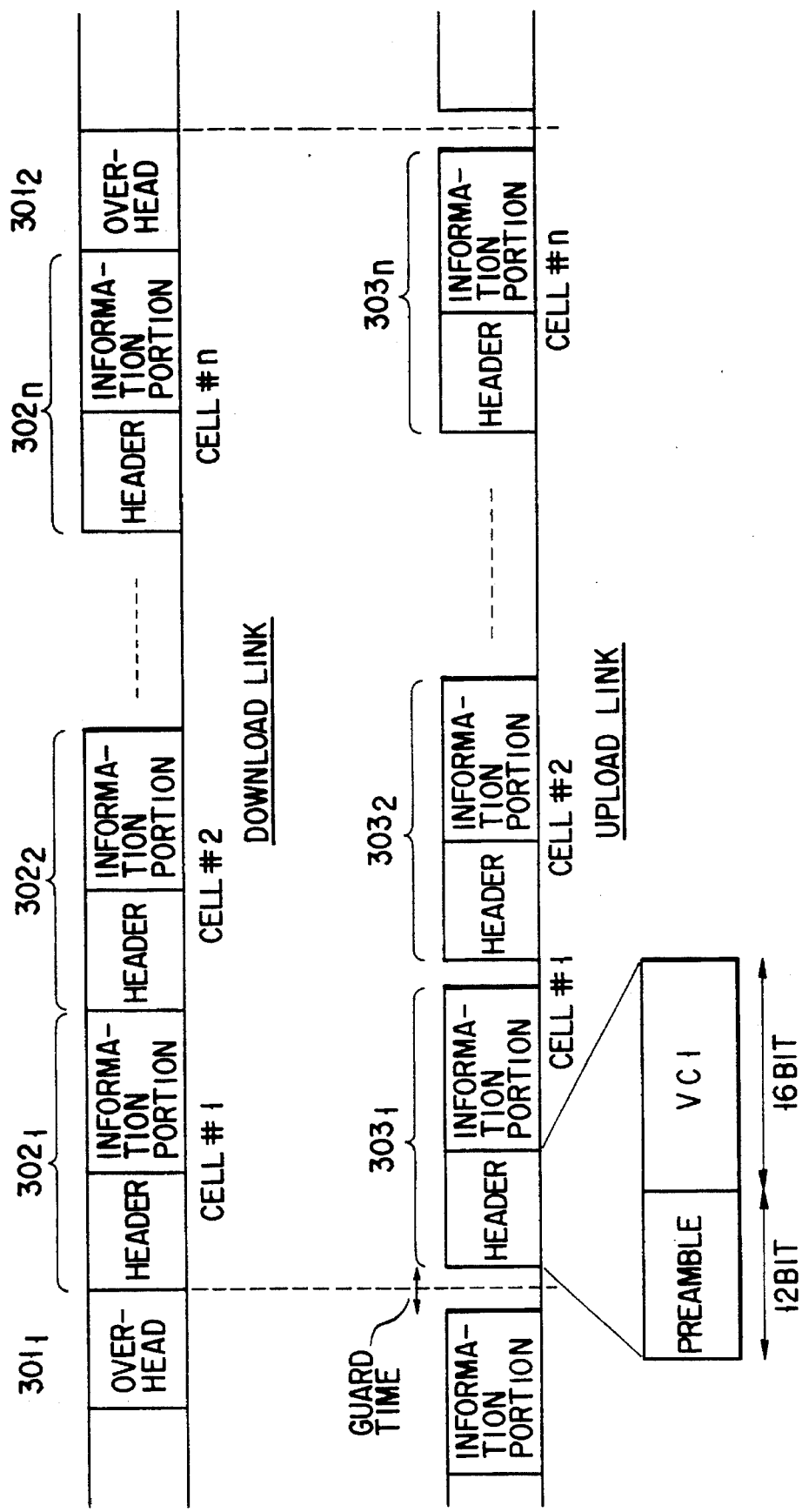
FIG. 40 is a diagram representing the format of a radio channel.

FIG. 40 shows a radio channel structure for accommodating mobile terminals in the ATM-LAN according to an embodiment of the present invention.

The upload and download links use different frequencies to realize full duplex communication using a single antenna.

In the download link, overheads 3011 and 3012 are periodically transmitted. During this period, n cells 3021, 3022, . . . , 302n are continuously transferred. The overhead 3011 and the subsequent cells 3021, 3022, . . . , 302n constitute one frame. That is, as in a physical link between nodes, information is transferred on the download link of the radio channel in the form of mapping a cell to the pay load portion of the frame. In this case, the length of the pay load portion of the frame is preferably an integer multiple of the cell length, as shown in FIG. 40. The optimal value of cells included in the frame changes depending on the radio channel characteristics. This does not influence effectiveness of the present invention at all. The following description will be made without limiting the optimal number of cells to any specific value.

The overhead includes a bit pattern for identifying the start of a frame, other information required to maintain and manage the network, and OAM information. There are various kinds of information required as the actual OAM information (e.g., an error correction code of the pay load portion of the frame). These kinds of information do not influence the effectiveness of the present invention. For this reason, the following description will be made such that the bit pattern for identifying the start of the frame is regarded to be included in the overhead, and the OAM information is not limited to a specific one.

When the zone forming sections 1131 and 1132 do not have cells to be transmitted, empty cells are sent to the download link of the radio channel. This is the same as in the physical link between the nodes, thereby facilitating clock extraction on each mobile terminal side.

Each mobile terminal extracts a clock from a bit pattern on the download link formed by each zone forming section to form a bit pattern on the upload link in accordance with the extracted clock. As far as the operation clock is concerned, each mobile terminal is subordinated to each zone forming section. The start position of the frame is found from the bit pattern on the download link formed by each zone forming section in accordance with a well-known method for searching the bit pattern for identifying the start of the frame. Each mobile terminal can identify the start and end positions of the frame. That is, frame synchronization can be achieved.

On the other hand, a plurality of slots having a length corresponding to one cell are defined on the upload link of the radio channel. If each mobile terminal has information to be transmitted, it transmits this information to one slot of the upload link of the radio channel in the form of a cell. When a plurality of mobile terminals send cells to the same slot, i.e., when collision has occurred, the cells on this slot cannot be reproduced by the zone forming sections. That is, a plurality of cells sent to the same slot are discarded.

The slots on the upload link are defined by timings at which the overhead of the download link appears. More specifically, as shown in FIG. 40, a point at which the overhead of the download link appears is defined as the start point of a virtual frame, and the frame on the upload link is divided, from the start, into cells, the number of which corresponds to that of cells in the pay load portion of the frame on the download link, thereby defining the slots of the upload link.

A distance between each mobile terminal and each zone forming section is not predetermined. That is, time at which the overhead on the download link at one terminal does not strictly coincide with that at another terminal. For this reason, when the slots on the upload link are continuously defined as in cell transmission on the download link, one terminal outputs one cell while another terminal continuously outputs two cells. As is known well, if this state is allowed, the throughput of the radio channels greatly decreases. To prevent this, a guard time is provided between the slots defined on the upload link in the ATM-LAN of this embodiment. This guard time is defined to have a length a/n [bits] where a [bits] represents the length of the overhead of the download link and n represents the number of cells of the pay load portion of the frame on the download link. In this case, the value a/n is not dividable, a guard time after the last slot in the frame virtually defined on the upload link is prolonged to preferably make the total bit count of the frame virtually defined on the upload link coincide with the total bit count of the frame defined on the download link.

When viewed from each zone forming section, a cell of a time slot on the upload link is received without any bit synchronization because the distance between each mobile terminal and each zone forming section is not predetermined. That is, in each zone forming section, the clock phase required to sample cells on the upload radio channel can change every slot. For this reason, a so-called preamble, i.e., a bit pattern for performing phase-matching in the PLL of the zone forming section, must be added to a cell of each slot on the upload link. According to one embodiment of the present invention, a preamble is inserted in the VPI field (first 12 bits) of an ITU-T standard I.361 NNI cell, and the connection is identified in accordance with a VCI field, i.e., 16 bits following the VPI field. A method of adding a preamble is a method of adding a preamble to the start of 53-byte cell defined by the I.361 in addition to the above method. This method does not influence the effectiveness of the present invention, and the following description will be made, provided that the above method is used to add a preamble. The pattern of a preamble may be, e.g., "101010101010". However, the following description will be made without limiting the pattern to this because an optimal pattern changes depending on a transmission line coding on the radio channel and the PLL structure.

In the ATM-LAN of this embodiment, as described above, radio channels are also formed into ATM cells, and mobile terminals can be accommodated in the ATM-LAN in a so-called seamless manner. For example, each mobile terminal can easily have an information transmission capacity for processing multimedia such as a motion picture and audio information. A mobile terminal can request a service using a broadcast channel as the characteristic feature of the ATM-LAN of this embodiment as in a terminal connected through a physical link. In addition, since collision on a radio channel is regarded as cell discarding, a cell discarding recovery protocol provided on a wired ATM-LAN system, such as a protocol for transmitting noise upon occurrence of cell discarding in audio communication and retransmitting a cell upon occurrence of cell discarding in data communication is used to assure an apparent transmission bandwidth provided to a terminal. Therefore, a radio channel suitable for a mobile terminal for performing multimedia communication can be provided.

When all the mobile terminals do not have cells to be transmitted, the slots on the upload links are set in a non-radio-wave state. I.361 empty cells are not transmitted. If such an empty cell is transmitted, a protocol for determining that a specific terminal in a specific radio zone transmits an empty cell must be executed. The empty cell need not be transmitted by execution of such a protocol because the empty cell is a cell having no significant information.

Based on the radio channel structure described above, the detailed operations of the zone forming sections 1131 and 1132 will be described with reference to FIG. 39.

Radio waves for realizing the upload links in the radio zones 1151 and 1152 are received by the antenna 1201. These radio waves have a frequency fup. The circulator 1202 supplies the radio wave having the frequency fup to the receiver 1203. A radio wave for realizing the download link in each radio zone is transmitted by the antenna 1201. This radio wave has a frequency fdown. The circulator 1202 supplies the radio wave having the frequency fdown to the antenna 1201. The circulator 1202 can be constituted by a so-called passive filter.

A bit stream input from an interface point 1215 between one node constituting the ATM-LAN is input to the frame dividing circuit 1212 to establish frame synchronization. At the same time, the frame dividing circuit 1212 extracts and outputs the pay load portion of the frame in accordance with the frame structure at the interface point. In this case, OAM information of frame level which is sent from the opposing node is extracted and transferred to controllers (not shown) of the zone forming sections 1031 and 1032.

The frame dividing circuit 1212 also extracts a clock from the input bit stream. In synchronism with this clock, the zone forming circuits are operated to establish network synchronization.

The bit stream output from the frame dividing circuit 1212 is input to the cell synchronizing circuit 1213 and subjected to cell synchronization. The bit stream is then output as a cell stream. The cells output from the cell synchronizing circuit 1213 are input to the broadcast cell branch/insert circuit 1208. The broadcast cell branch/insert circuit 1208 transfers a cell stream from the cell synchronizing circuit 1213 and at the same time branches a broadcast cell required for the mobile terminal tracing circuit 1207. The branched broadcast cell is transferred to the mobile terminal tracing circuit 1207. An empty cell is placed at the position of the branched broadcast cell. The mobile terminal tracing circuit 1207 detects an empty cell from the cell stream directed to the header rewriting circuit 1214 to replace the broadcast cell output to the antenna 1201 with the empty cell. The branched broadcast cell is a broadcast cell having the node number added to the zone forming section as a destination. The mobile terminal tracing circuit 1207 can know an instruction from the connection setting process 10211 in accordance with this broadcast cell.

The broadcast cell inserted here is a cell for causing the mobile terminal tracing circuit 1207 to communicate with a mobile terminal in a radio zone controlled by this circuit 1207, and a detailed description thereof will be made later.

The cell stream from the broadcast cell branch/insert circuit 1208 to the antenna 1201 is input to the second header rewriting circuit 1214. The second header rewriting circuit 1214 converts the cell format (in this case, an ITU-T I.361 UNI cell is assumed) at the interface point with the node into a cell format on the download link of the radio channel. The resultant information is output to the second cell buffer 1205.

The cell format on the download link of the radio channel may be identical to that at the interface point. However, in this case, the cell format is matched with that on the upload link. That is, the VPI field is set to "don't care", and information for identifying the connection is set in only the VCI field. The "don't care" VPI field has, e.g., the same pattern as that of the preamble. For this reason, information of the VPI field (the first eight bits from the fifth bit of the cell) serving as a connection identifier and the VCI field at the interface point must be mapped into only the VCI field. The second header rewriting circuit 1214 performs this operation with reference to a table held therein. The mobile terminal tracing circuit 1207 may rewrite and update this table by an instruction upon reception of the instruction from the connection setting process 10211 in the form of a broadcast cell. The radio channel header value of a broadcast cell as the characteristic feature of the ATM-LAN of this embodiment is set such that all the bits of the VCI field are "1"s. The second header rewriting circuit 1214 converts the broadcast cell header value at the interface point with the node and the VPI and VCI values as all "1"s into the VPI value as the preamble pattern and the VCI value as all "1"s.

The second cell buffer 1205 converts the cell transfer speed of the interface point 1215 with the node into a speed for transmitting information from the antenna 1201 and outputs the resultant speed data to the transmitter 1206. This speed conversion is performed by appropriately adding/deleting empty cells. In general, the cell transfer speed at the interface point 1215 with the node is higher than the cell transfer speed on the radio channel. For this reason, speed conversion is performed by mainly deleting empty cells. When a cell is to be extracted from the second cell buffer, a clock having a frequency equal to the speed for transmitting information from the antenna 1201 is required. This clock is generated based on the clock extracted at the interface point for the node. The radio channel bit clock can be synchronized with the network clock.

The transmitter 1206 calculates the HEC values of the respective cells received from the second cell buffer 1205 to update the HEC fields of the corresponding cells. These cells are formatted into the frame structure of the download link shown in FIG. 40, and the resultant structure is modulated. The modulated cells are converted into a radio wave having the frequency fdown which allows transmission from the antenna 1201. The radio wave is then output to the circulator 1202. The circulator 1202 supplies the radio wave to the antenna 1201, and the radio wave is transmitted from the antenna 1201. A possible radio wave range serves as a radio zone formed by the zone forming section.

On the other hand, the radio wave having the frequency fup received by the antenna 1201 and output from the circulator 1202 is input to the receiver 1203 and demodulated into a digital bit stream. In this bit stream, a preamble is added to the start of each cell. In the receiver 1203, the PLL is operated using the pattern of this preamble to sample a demodulated digital bit stream. A cell is obtained as a result of sampling, and error detection/correction of the header portion of this cell is performed by the HEC. The resultant cell is written in the first cell buffer 1204.

The cell held in the first cell buffer 1204 is read out at a speed equal to a cell transmission speed at the interface point for the node and is transferred to the first header rewriting circuit 1209. Cell read access is started at the same period as that of the cell at the interface point 1215 for the node. When any cell is not held in the first cell buffer 1204 at the start of cell read access, an empty cell is output from the first cell buffer. Therefore, the cell transfer speed of the radio channel is converted into the cell transfer speed at the interface point 1215 for the node.

The first header rewriting circuit 1209 refers to the VCI field of the input cell and converts it into a header pattern at the interface point 1215 for the node. The first header rewriting circuit 1209 performs this operation with reference to its own table in the same manner as in the second header rewriting circuit 1214. As in the second header rewriting circuit 1214, the mobile terminal tracing circuit 1207 rewrites and updates this table in accordance with an instruction upon reception of the instruction from the connection setting process 102211 in the form of a broadcast cell. The header pattern of the broadcast cell input from the antenna 1201 is given such that the VPI field is a preamble pattern and the VCI value is all "1"s. The first header rewriting circuit 1209 modifies a broadcast cell whose VCI value is set to all "1"s into a broadcast cell whose VPI and VCI values are set to all "1"s. The first header rewriting circuit 1209 then outputs the resultant broadcast cell.

The cell output from the first header rewriting circuit 1209 is input to the broadcast cell branch/insert circuit 1208. The broadcast cell branch/insert circuit 1208 transmits the cell stream transferred from the first header rewriting circuit 1209 to the HEC operation circuit 1210, branches a broadcast cell required for the mobile terminal tracing circuit 1207, and transfers the branched broadcast cell to the mobile terminal tracing circuit 1207. An empty cell is placed at the position where the cell is branched. The mobile terminal tracing circuit 1207 detects an empty cell from the cell stream directed to the HEC operation circuit 1210 to replace the broadcast cell output from the interface point 1215 to the node with the empty cell.

The branched broadcast cell is a cell to cause the mobile terminal to respond in response to an inquiry from the mobile terminal tracing circuit 1207. This cell has a destination as a neighborhood node branching designation. By this broadcast cell, the mobile terminal tracing circuit 1207 detects whether the mobile terminal stays in, newly enters into, or moves out from the radio zone controlled by this tracing circuit 1207, and this operation will be described in detail later.

The broadcast cell inserted here is mainly a response from the mobile terminal tracing circuit 1207 in response to the instruction from the connection setting process 10211.

The cell stream output from the broadcast cell branch/insert circuit 1208 to the interface point for the node is transferred to the HEC operation circuit 1210. In this case, the HEC value of each input cell is calculated from the corresponding header, and the calculated HEC value is written in the HEC field. The resultant cell stream is then output.

The cell stream output from the HEC operation circuit 1210 is transferred to the framing circuit 1211 and mapped to the pay load portion of the frame structure formed by the framing circuit 1211. The resultant cell stream is output to the interface point 1215 for the node.

On the other hand, the mobile terminals accommodated in the ATM-LAN of this embodiment may have the following structure.

Figure 41:
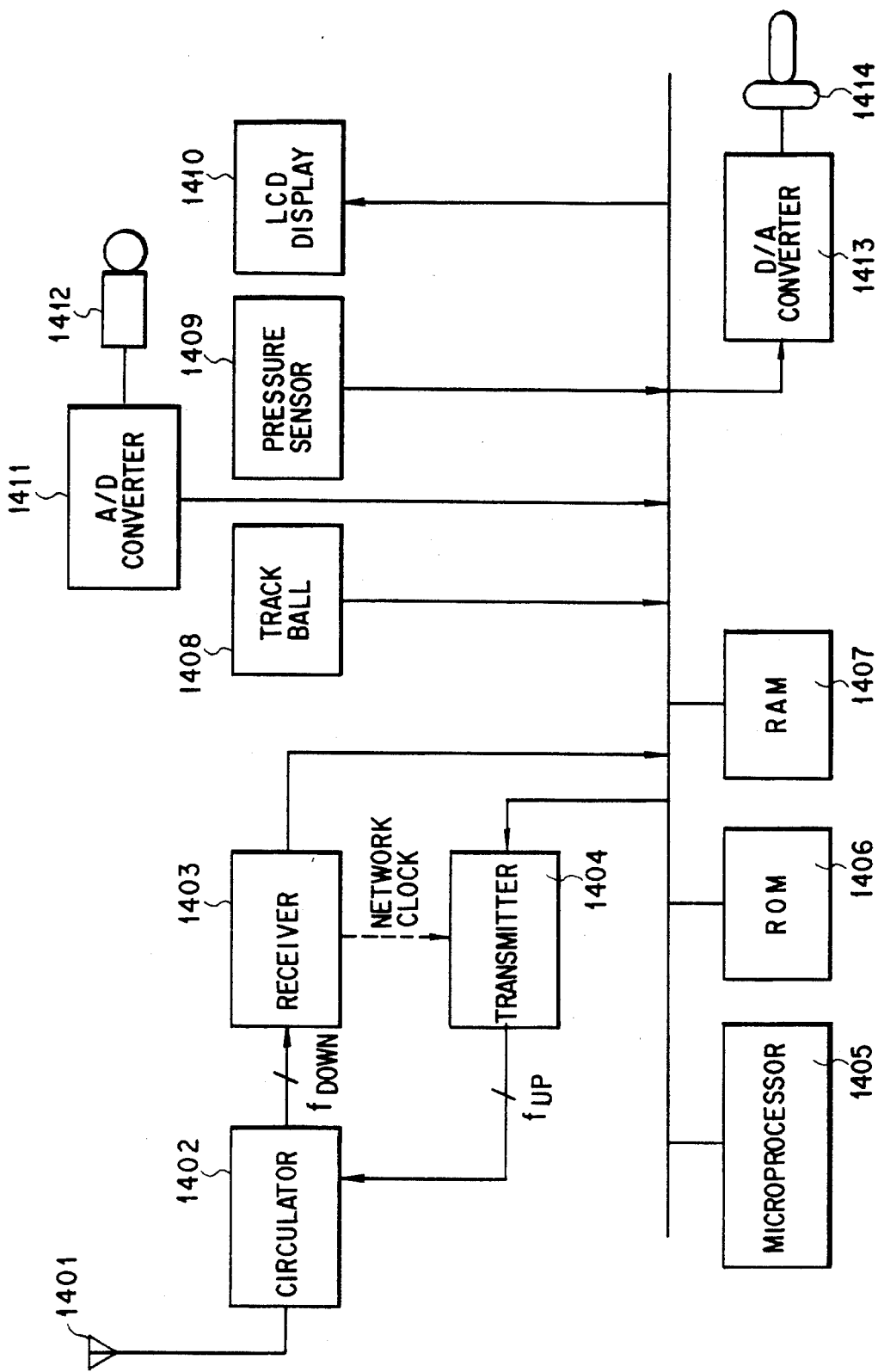
FIG. 41 is a block diagram of an example of a mobile terminal.

FIG. 41 shows the structure of a mobile terminal accommodated in the ATM-LAN of this embodiment. Referring to FIG. 41, an antenna 1401 transmits a radio wave to a radio zone in which this terminal is present, and receives a radio wave from this radio zone. A circulator 1402 supplies the radio wave received by the antenna 1401 to a receiver 1403 and at the same time supplies the radio wave generated by a transmitter 1404 to the antenna 1401. The receiver 1403 demodulates the received radio wave transferred from the circulator 1402 to reproduce a digital waveform. The receiver 1403 then performs frame synchronization and cell synchronization of the digital waveform to convert the digital waveform into a cell stream. At the same time, the receiver 1403 extracts a network clock from the digital waveform and outputs the network clock to the transmitter 1404. The transmitter 1404 receives the cell sent by the mobile terminal from the microprocessor 1405 and temporarily holds it. The transmitter 1404 reads out the temporarily held cells in synchronism with network clock pulses from the receiver 1403 and modulates the cells. The modulated cells are sent to the circulator 1402.

A microprocessor 1405 performs information processing executed by the mobile terminal. A ROM 1406 holds programs executed by the microprocessor 1405. A RAM 1407 serves as a working area for the microprocessor 1405 to execute a program.

A track ball 1408 is used to cause a user to enter position shift information to the mobile terminal. A pressure sensor 1409 is used to cause the user to enter a character or the like. An LCD (liquid crystal) display 1410 is used to cause the mobile terminal to output graphic and character patterns to the user. An A/D converter 1411 digitizes audio information input by the user into digital data which is then output to the mobile terminal. A microphone 1412 is used to cause the user to input audio information to the mobile terminal.

- 255 A D/A converter 1413 causes the mobile terminal to convert digital information into analog audio information which is then output to the user. An earphone 1414 is used to reproduce the audio information output from the mobile terminal to the user.

The ATM-LAN of this embodiment has a characteristic feature that cells are transferred on a radio channel, and information such as audio data, graphic data, and computer data can be transferred through a standard interface. The mobile terminal defined herein has a structure capable of simultaneously processing these pieces of information so as to enhance the above characteristic feature.

FIG. 42 is a view showing the outer appearance of the mobile terminal.

The mobile terminal preferably has a portable size. In the mobile terminal shown in FIG. 42, its case preferably has a size of about 9.5 cm (length), 5.5 cm (width), and 2 cm (thickness), like the size of a pack of 20 cigarettes. If the case of the mobile terminal has this size, the user can carry it in a chest pocket.

The antenna 1401 is located at the upper left corner of the upper side surface of the case. The illustrated antenna is a so-called vertical antenna and is retracted into the case when the mobile terminal is not in use. When the mobile terminal is to be used, the user pulls the distal end of the antenna 1401 upward to extend the antenna 1401 to obtain a state in FIG.

17. When the mobile terminal is powered on upon pulling the antenna 1401 from the case, and the mobile terminal is powered off upon retracting the antenna 1401 into the case, the power switch need not be arranged on the surface of the mobile terminal. The mobile terminal may not be accidentally powered on while user carries it, resulting in a desirable mounting form.

The screen of the LCD display 1410 is located on the front surface of the case. The pressure sensor 1409 is located on the front surface of the screen of the LCD display 1410. The pressure sensor 1409 is transparent, and the user can watch character and graphic patterns displayed on the screen of the LCD display 1410 through the pressure sensor 1409. When the user touches the screen with a pen rod 1501, the microprocessor 1405 causes the pressure sensor 1409 to read coordinates of a screen point in contact with the pen rod 1501. For example, a graphic pattern drawn by the user with the pen rod 1501 can be directly displayed on the LCD display 1410, and a menu displayed on the LCD display 1410 is touched with the pen rod 1501 to cause the user to input a command to the mobile terminal. The pen rod 1501 can be desirably stored at the right side of the upper side surface of the case.

The track ball 1408 is located at the left side surface of the case. As is well known, the track ball is arranged such that part of a rubber or plastic ball rotatably held by a bearing is exposed from the surface of the case. A sensor for detecting a rotation amount is mounted on the rotating shaft of part of the bearing. The user touches the ball portion exposed from the surface of the case and can rotate the ball in all directions. Rotation amounts of the ball in the X and Y directions are detected by the sensor arranged in part of the bearing and informed to the microprocessor 1405. The microprocessor 1405 shifts the screen display position of a character or the like displayed on the LCD display 1410 in the X and Y directions in proportion to, e.g., the rotation amounts of the ball in the X and Y directions. When the rotation amount in the X direction exceeds a predetermined amount, information displayed on the LCD screen is changed. The mobile terminal shown in FIG. 42 has a size for allowing the user to hold the terminal in his hand. The user holds the mobile terminal in his left hand and the pen rod 1501 with the fingers of the right hand. At the same time, the user rotates the track ball with his left hand. For this reason, the track ball is located at a position accessible to the thumb of the left hand.

The microphone 1412 and the earphone 1414 are connected to terminals (not shown) located on the lower surface of the case of the mobile terminal. The microphone 1412 and the earphone 1414 are preferably arranged in the form of a so-called head set, so that the user can hold them without using his hands. The terminals connected to the microphone 1412 and the earphone 1414 are desirably arranged at a position which does not interfere with an operation of causing the user to hold the mobile terminal with his left hand. In this embodiment, the lower surface of the case is selected as the position of arranging these terminals.

The operation of the mobile terminal of this embodiment will be described in detail with reference to FIGS. 41 and 42.

A program executed by the microprocessor 1405 is stored in the ROM 1406. When the mobile terminal is powered on, the microprocessor 1405 transfers the program from the ROM 1406 to the RAM 1407 and causes the RAM 1407 to execute this program. Different programs are executed for the services offered by the respective mobile terminals. For this reason, the ROM 1406 is more preferably detachable as a so-called IC card.

The radio wave of the download link of the radio channel, i.e., the radio wave having the frequency fdown is received by the antenna 1401 and supplied to the receiver 1403 through the circulator 1402. The radio wave on the upload link of the radio channel, i.e., the radio wave having the frequency fup is generated by the transmitter 1404 and supplied to the antenna 1401 through the circulator 1402. The radio wave is then transmitted from the antenna 1401. It should be noted that the circulator 1402 of the mobile terminal can be realized by a passive filter as in the circulator 202 in the zone forming section.

Upon reception of the radio wave having the frequency fdown, the receiver 1403 demodulates this radio wave and converts it into a digital signal. Since this digital signal is a continuous bit stream, as shown in FIG. 40, the clock can be easily extracted from the digital signal. It should be noted that the clock extracted from this bit stream is synchronized with the network clock for operating the ATM-LAN which accommodates this mobile terminal. The extracted clock is used to perform the subsequent operations of the receiver 1403 and transferred as a network clock to the transmitter 1404. In the latter case, the clock is used as a clock for transmitting a cell from the mobile terminal to the ATM-LAN, thereby establishing network synchronization of the entire ATM-LAN system including the mobile terminal. When network synchronization is established, the overflow and underflow states of elastic stores installed at the respective portions of the ATM-LAN system can be prevented, and the stable operation of the entire ATM-LAN system can be assured. When the network synchronization cannot be established, the transmission speed of information transmitted from the mobile terminal cannot be strictly set equal to the reception speed of information from the mobile terminal at the ATM-LAN. As a result, during exchange of information (this information is generally called CBR (Continuous Bit Rate) information) transmitted at a constant speed, like audio information, the overflow or underflow of the elastic store occurs, e.g., once per second. As a result, an undesirable phenomenon occurs such that the user can hear noise once per second.

When the receiver 1403 demodulates a bit stream from the received radio wave, the receiver 1403 then searches for a bit string representing the start of a frame from the demodulated bit stream, thereby establishing frame synchronization. When frame synchronization is established, the structure of the download link (FIG. 40) present in the received bit stream can be recognized. When frame synchronization is established, the receiver 1403 extracts a cell from the pay load portion of the frame. The receiver 1403 calculates the HEC value of the header portion of the extracted cell. The calculated value is compared with the value of the HEC field of the extracted cell, thereby performing error detection/correction. If an error is detected and cannot be corrected, the corresponding cell is discarded. The bit error rate of the radio channel is much higher than that of an optical fiber, so that the error detection/correction is an important operation. As is known well, the error detection/correction method of the information portion of the cell is preferably changed depending on a service offered by this cell. There are various known error detection/correction methods for the information portion of the cell. Such a method does not influence effectiveness of the present invention, and the following description will be made without limiting this method to a specific one.

A cell in which the header portion is error-detected/corrected is written in the RAM 1407. The microprocessor 1405 refers to the cell header written in the RAM 1407, acquires the information portions of the cells belonging to the same connection in order to reproduce a message, and performs a predetermined operation of each connection and/or each message.

A cell having a connection used to transfer audio information, which is immediately reproduced as audio information at a mobile terminal, is subjected to AAL1 processing executed by the microprocessor 1405. The resultant cells are sequentially transferred to the D/A converter 1413 and converted into analog information. This analog information is transferred to the earphone 1414 and reproduced as audio sounds.

For example, a cell having a connection used to transfer a bit image displayed on the LCD display is subjected to, e.g., AAL5 processing executed by the microprocessor 1405. The processed cells are sequentially transferred to the LCD display 1410. The bit image transferred to the LCD display 1410 is displayed on the screen at the front surface of the case of the mobile terminal. It should be noted that the bit image displayed on the LCD display 1410 is not only an image transferred through a radio channel, but also an image generated by the program executed by the microprocessor 1405.

On the other hand, for example, the audio information picked up by the microphone 1412 is converted into digital information by the A/D converter 1411 and modified into the form of a cell in accordance with AAL1 processing executed by the microprocessor 1405. The digital information is then transferred to the transmitter 1404. At this time, the cell transferred to the transmitter 1404 may be a cell including not only the information portion but also the header portion having a correct HEC value. When the cell is transferred from the microprocessor 1405 to the transmitter 1404, the transmitter 1404 temporarily holds the cell in its own cell buffer.

Every time the receiver 1403 starts the slot on the upload channel defined as a result of establishment of the frame synchronization, the transmitter 1404 refers to its own cell buffer. If this cell buffer has a cell, the cell is read out from the cell buffer in response to a network clock transferred from the receiver. The readout cell is modulated into a radio wave having the frequency fup. The radio wave is transmitted from the antenna 1401 through the circulator 1402.

Information transferred by means of a cell is not limited to audio information picked up by the microphone 1412, but may be information representing, e.g., the X/Y shift amount detected by the track ball 1408 or information representing the movement of the pen rod 1501 on the screen, which is picked up by the pressure sensor 1409. In addition, information may be bit map information described on the LCD display 1410 by the microprocessor 1405 upon tracing the movement of the pen rod 1501 on the screen.

The pen rod 1501 is moved on the pressure sensor 1409 on the front surface of the LCD display 1410 to input bit map information to the mobile terminal. If a handwritten character recognition function using this bit map information is provided, character information can be input without using a keyboard.

On the other hand, the track ball 1408 can also be used as a page advance instruction to display information in the form of a book like the instruction manual of an equipment on the LCD display 1401 in addition to movement of an icon displayed on the LCD display 1410.

When the zone-forming sections and the mobile terminal which have the arrangements as described above are prepared, the mobile terminal can be accommodated in the ATM-LAN system.

The interaction between the mobile terminal, the zone-forming section, and the connection setting process in the ATM-LAN system which accommodates the mobile terminal according to this embodiment will be described in detail. FIG. 43 shows a sequence of messages exchanged between the mobile terminal 1141, the zone-forming section 1132, and the connection setting process 11211 when a given mobile terminal, i.e., the mobile terminal (#1) 1141 enters and moves out from the radio zone (#2) 1152. It should be noted that the radio channel of the ATM-LAN capable of accommodating the mobile terminal performs communication in units of cells, and a control signal is transferred as a broadcast cell in the ATM-LAN to which the present invention is applied. A message newly introduced herein has the form of a broadcast cell shown in FIGS. 1 and 31. To realize communication by means of a broadcast cell, the node number is added to the zone-forming section and the mobile terminal at the manufacturing time in the same number space as in the terminal, the node, the ATM-LAN interface unit which constitute the ATM-LAN shown in FIGS. 1 and 31. This method can be practiced because each radio channel performs cell-based transmission. It should be noted that the node number of the mobile terminal can be used as an identifier representing a user when the user using the mobile terminal is predetermined.

The zone-forming section 1132 transmits a zone number informing message (M601) to its own radio zone at a predetermined period. The zone number informing message at least has the identifier and the zone number of a radio zone in which the message is received. When each mobile terminal is powered on, it receives this message. The mobile terminal receives information representing that this mobile terminal currently stays in a given radio zone having a specific ordinal number. The mobile terminal can detect that it continuously stays in the radio zone or has moved to a new radio zone in accordance with the zone number. The mobile terminal can inform the user of movement in the radio zone. Various operations which must be performed upon movement in the radio zone can be activated. The zone number informing message is formed by the mobile terminal tracing circuit 1207 of the zone forming section 1132 and is inserted in the cell stream directed from the broadcast cell branch/insert circuit 1208 to the antenna 1201. The destination address of this message is the all-terminal broadcast designation. In this case, all terminals here mean all mobile terminals present in the radio zone formed by the zone-forming section.

When the mobile terminal recognizes that it has entered into a new radio zone, the mobile terminal 1141 transmits a node number informing message (M602) toward the upload link. The destination of the node number informing message is a neighborhood node branch designation. The broadcast cell branch/insert circuit 1208 of the zone-forming section 1132 refers to the destination address to branch this message to the mobile terminal tracing circuit 1207. At least the node number of the mobile terminal which has transmitted this message is described in the message. The mobile terminal tracing circuit 1207 of the zone forming section 1132 identifies a mobile terminal which has newly entered into the radio zone in accordance with this node number.

When a plurality of mobile terminals simultaneously enter into a radio zone, they may simultaneously transmit node number informing messages as response messages to the zone number informing message (M601). In this case, collision occurs, and the mobile terminal tracing circuit 1207 cannot recognize that these mobile terminals have entered into the radio zone. A method of preventing this collision will be described in detail later.

Upon reception of the node number informing message (M602), the mobile terminal tracing circuit 1207 of the zone forming section 1132 transmits, to the interface point 1215, a mobile terminal registering request message (M603) including at least its own zone number and the node number of a mobile terminal which has newly entered into the radio zone. The designation of the mobile terminal registering request message is the connection setting process 11211 of the terminal (#1) 1121. This message is transferred to the connection setting process 11211. To know the node number of the terminal (#1) 1121 where the connection setting process is present, the mobile terminal tracing circuit 1207 of the zone forming section 1132 may output a service search request in advance.

Upon reception of the mobile terminal registered request message (M603), the connection setting process 11211 adds a terminal newly requested for registering to the information related to the mobile terminals registered therein. The information related to the mobile terminals registered in the connection setting process 11211 is, for example, shown in FIG. 44. The information related to the mobile terminals is divided into two kinds of information. The first information is information called as registered mobile terminal management information having a structure capable of retrieving a set of <a node number, a zone number, an E.164 address> using the node number or the E.164 address as a key. The second information is a set of <a node number of a zone forming function for forming a radio zone having the zone number, a list of node numbers of fixed/mobile terminals present in the zone>using the zone number as a key.

The registered mobile terminal management information has a data structure capable of detecting a zone to which a mobile terminal having a receiving address designated by the E.164 corresponding to the node number or Q.93B belongs. Both the node numbers and E.164 addresses are discrete addresses, and a search operation can be omitted by, e.g., the following tree structure.

A node number is divided into 4-bit portions from the least significant bit, and each 4-bit portion is used as a search key. From the root of the tree structure, i.e., the first layer node, a second layer node is designated by a branch whose identifier is assigned by the 4-bit value including the least significant bit. The identifier assigned to the branch includes a node number in which a bit pattern at the corresponding position includes a node number coinciding with the identifier. The identifier represents that a set of three elements, i.e., the node number, the zone number, and the E.164 address, are present at the distal end of the branch. When the number of sets each including the above three elements is smaller than a predetermined value, the second layer node represents these sets. If the number of sets exceeding the predetermined number is to be registered, a third layer node is represented by a 4-bit identifier adjacent to the four bits used as the branch identifier from the first layer node. Similarly, a tree structure is formed up to the nth layer node, thereby obtaining a data structure for searching for sets each including the above three elements. According to an embodiment of the present invention, the node number includes 10 octets, and a maximum of 20 layers are obtained.

It should be noted that this tree structure forming method can be applied not only to the node number but also to the E.164 address. The E.164 address has a maximum of 15 digits, and the number of layers of the tree structure is 15 at maximum.

The ATM-LAN operator may register the correspondence between the node number and the E.164 address for forming the registered mobile terminal management information in the connection setting process 11211, or the E.164 address may be added to each terminal at the manufacturing time as in the node number. In the latter case, the E.164 address retrieval message is defined on the broadcast channel, and the connection setting process transmits the E.164 address retrieval message to the broadcast channel using the desired node number as a receiving.

On the other hand, the zone management information is information representing a specific zone forming section which forms a radio zone including the mobile terminal as a destination, which zone is obtained as a result of search of the registered mobile terminal management information, or is information representing a specific terminal present in this radio zone. The connection setting process can set connections to the zone forming section accommodating the receiving mobile terminal in accordance with the zone management information. For example, the receiving may be changed to a fixed terminal present in the same radio zone. Therefore, the user need not input information related to its own position to the ATM-LAN. A call to the user can be terminated to the fixed terminal present near the user. In this case, the user using the mobile terminal must be assumed to be a fixed terminal.

Assuming that a user number is assigned to a user, that the user number is registered in a mobile terminal, and that the user number is included in the node number informing message (M602), a user using a mobile terminal need not be predetermined. However, to realize this, a more complex data structure must be used to manage the mobile terminal.

When a terminal newly requested for registering is added to the information managed by the connection setting process 11211, the connection setting process 11211 sends a mobile terminal registering completion message M604. The destination of the mobile terminal registering completion message is the zone forming section 1032. The broadcast cell branch/insert circuit 1208 of the zone forming section 1032 refers to the destination of this message and acknowledges that the message is sent to this broadcast cell branch/insert circuit 1208. The broadcast cell branch/insert circuit 1208 branches this message to the mobile terminal tracing circuit 1207.

Upon reception of the mobile terminal registering completion message, the mobile terminal tracing circuit 1207 of the zone forming section 1032 inserts an insert-completion informing message (M605) in a cell stream directed to the antenna 1201. The destination of the insert-completion informing message (M605) is a mobile terminal from which the corresponding node number informing message was output. Upon reception of the 10 insert-completion informing message (M605), the mobile terminal may inform the user of the usable state of the mobile terminal in accordance with any method such that a green LED is turned on the surface of the case or a message is displayed on the LCD screen.

By the above operations, the mobile terminal can enjoy ATM-LAN services of this embodiment using the broadcast channel as in other terminals. As far as a connection setting/release request is concerned, the designation is not the node setting process 10211, but neighborhood node branching is performed. These messages are temporarily branched by the mobile terminal tracing circuit 1207 of the zone forming section 1032. The mobile terminal tracing circuit 1207 temporarily receives these messages to recognize a specific terminal which requests connection settings. The mobile terminal tracing circuit 1207 issues a connection setting request to the connection setting process 10211 again (Steps M606 and M607). Even if a mobile terminal moves out from a radio zone at any time, the connection used by this mobile terminal should be released. To realize this, the mobile terminal tracing circuit 1207 can uniquely manage VCIs, on a radio channel, having headers different from that at the interface point 1215 for the node.

The destination of a connection setting completion message (M608) corresponding to the connection setting request message (M607) supplied to the connection setting process 11211 is the zone forming section 1132. Upon reception of the connection setting completion message (M608), the zone forming section 1132 determines a VCI value used on the radio channel to update the tables in the first header rewriting circuit 1209 and the second header rewriting circuit 1214. The zone forming section 1132 outputs a connection setting completion message (M609) to the mobile terminal from which the connection setting request (M606) was output.

A mobile terminal cannot expect the time when it moves out from a radio zone. It is important for the network to recognize the presence of the mobile terminal in the radio zone. The mobile terminal tracing circuit 1207 of the zone forming section 1032 outputs a presence-recognition request message (M610) to the mobile terminal in the home radio zone to perform polling, thereby recognizing the mobile terminal. The destination of the presence-recognition request message is a mobile terminal whose presence is to be recognized. Upon reception of the present-recognition request message, the mobile terminal forms a presence-recognition response message (M611) and outputs it onto a radio channel. The destination of the presence-recognition response message is a neighborhood node branch. The broadcast cell branch/insert circuit 1208 of the zone forming section 1032 branches this message destined to the neighborhood node branch from the cell stream and supplies the branched message to the mobile terminal tracing circuit 1207. Upon reception of the presence-recognition response message, the mobile terminal tracing circuit 1207 determines that the mobile terminal indicated by the source field of the received message is still present in the radio zone.

The mobile terminal tracing circuit 1207 outputs the presence-recognition request message to a mobile terminal assumed to be present in the home radio zone every predetermined interval, e.g., every second, thereby polling each mobile terminal. If the presence-recognition response message as a response to the presence-recognition request message is not responded a predetermined period of time, e.g., 0.5 second, after the presence-recognition request message is output, i.e., if the time-out of the response message to the presence-recognition request message (M612) is set (M613), the mobile terminal tracing circuit 1207 determines that the polled mobile terminal is powered off or moves out from the radio zone, i.e., that a given mobile terminal is not present in the radio zone.

when the mobile terminal tracing circuit 1207 determines that the given mobile terminal is not present in the radio zone, and a non-released connection used by the given mobile terminal is still left, the mobile terminal tracing circuit 1207 outputs a connection release request message (M614) and waits for a connection release completion message (M615) from the connection setting process 11211.

Next, the mobile terminal tracing circuit 1207 outputs a mobile terminal deleting request message (M616) to designate to delete information related to a radio terminal which is not present in the radio zone. When the connection setting process deletes this information, it outputs a mobile terminal deleting completion message (M617) to the zone forming section 1132, thereby informing the process of it.

The zone forming section 1132 has the leadership for registering/releasing the mobile terminal because the zone forming section 1132 outputs the presence-recognition request message. This method is employed because tracing of a mobile station as a work having a relatively heavy load is separated to reduce the load of the connection setting process. Since the zone forming section has the leadership for registering/releasing the mobile terminal, the zone forming section 1132 may have an additional message for requesting the list of mobile terminals registered in the connection setting process 11211 for the home radio zone.

If the connection setting process 11211 can stand such a load, it can execute a work related to registering/releasing of the mobile terminal because radio channels are formed into ATM cells in the ATM-LAN of this embodiment. In this case, as the connection setting process 11211 itself can disconnect unnecessary connections, consistency of data for managing the registered mobile terminals can be easily maintained.

The presence-recognition response message serving as a response message to the presence-recognition request message may be lost due to collision because it passes through the upload link of the radio channel when this message is lost, the mobile terminal is regarded not to be present in the radio zone. The zone forming section 1132 undesirably cancels the connections. That is, collision must be prevented for the presence-recognition response message. To suppress collision, some slot reservation is required. In the ATM-LAN of this embodiment, the presence-recognition response message slot is reserved as follows, using the fact that the frame defined by the upload link of the radio channel is synchronized with the virtual frame defined to disconnect slots for each cell on the download link.

That is, the slot for responding to the presence-recognition request message is reserved on the upload link at the position where the presence-recognition request message appears on the download link.

Figure 45:
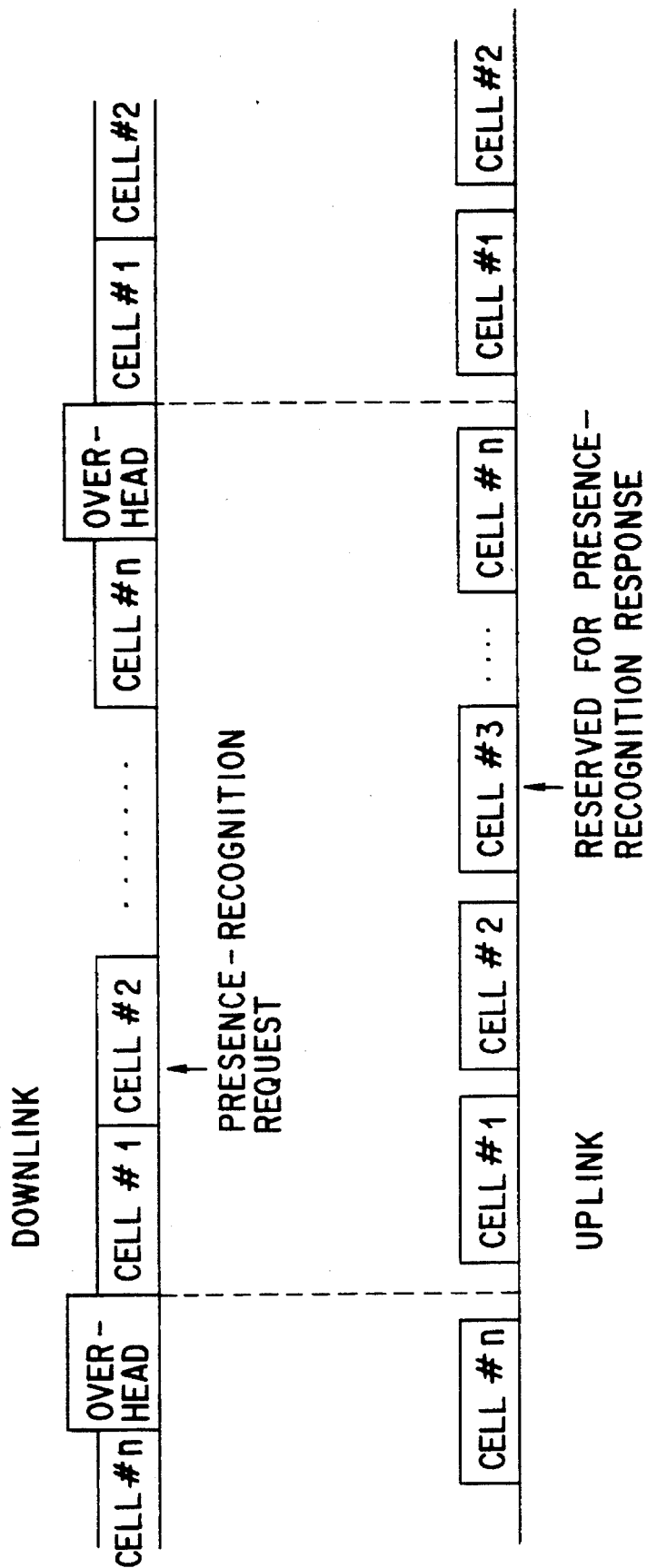
FIG. 45 is a diagram explaining the principle of reserving a slot on an up link in a radio channel.

FIG. 45 shows the principle of this slot reservation. The pay load portion of the frame of the download link is a portion surrounded by two overheads. A total of n cells are included in the pay load portion. The upload link slots are obtained by dividing a time interval from the end of the overhead of the download link to the end of the next overhead by n. The cells in the pay load portion of the download link are numbered as 1, 2, 3, ..., n. The slots on the upload link are numbered as 1, 2, 3, ..., n from the start of the virtual frame.

Assume that a cell representing the presence-recognition request message appears at the position of the second cell slot after the end of the first overhead. On the upload link, for example, a slot numbered as "3" in the same frame is reserved for the presence-recognition response message. That is, only a mobile terminal serving as the destination of the presence-recognition request message outputs the presence-recognition response message in this slot, and other mobile terminals do not output cells in this slot. It is thus guaranteed that the presence-recognition response message is output in the slot free from collision. Note that even if a presence-recognition request message appears at the ith position of the frame, the position of the slot reserved for the presence-recognition response message may be the (i+1) position or a position away from this. This depends on the processing time required by the microprocessor 1405 to output the presence-recognition response message upon reception of the presence-recognition request message.

When the collision preventing method shown in FIG. 45 can be expanded as follows. Like a node-number informing message (M602) serving as a response message to a zone-number informing message (M601), collision of the response message to messages appearing on the download link in all-terminal broadcasting designation can also be prevented. That is, if a download link slot position where the zone-number informing message appears is defined as i, the upload link slot for outputting a message responding to this message is changed for each mobile terminal. That is, a response message to the zone-number informing message is output in an upload link slot i+a where a is a predetermined value for each mobile terminal.

The predetermined value a may be determined by a random number generated by a mobile terminal every time a zone-number informing message is received, or the value of a few lower bits of the node number assigned to the mobile terminal may be used without any change. When a mobile terminal receives a zone-number informing message again before it receives an insert-completion informing message (M605), the node-number informing message (M602) output by this mobile terminal may be regarded to be discarded by collision or the like, and the mobile terminal may output the node-number informing message again.

With the above-described method, the number of antennas and receiving circuits can be reduced as compared to the case where collision is detected by a mobile terminal, and a node-number informing message is sent again, thus enabling an decrease in cost of mobile terminals.

It should be noted that the above-described protocol for avoiding the collision can be applied not only for the zone-number informing message, the presence-recognition request message, and the response messages thereto, but also to the messages on other broadcast channels, transmitted by a mobile terminal. Particularly, when a broadcast-cell-send promoting message is introduced newly on a broadcast channel, and a mobile terminal group is polled by the zone forming section at an appropriate interval, the collision can be avoided, and a message can be transmitted as for messages which may serve as a trigger for the operation of ATM-LAN system output by a mobile terminal, such as connection-setting request message, by sending the message using the slot reserved by the broadcast-cells-end promoting message.

Apart from the case of a so-called ATM switch, the collision on the upload link of a radio channel is directly associated with the discard of a cell (since there is no cell buffer on a radio channel). In order to decrease the cell discard rate due to the above, the following method may be employed. That is, each mobile terminal reserves a slot which can transmit a cell toward an upload link. According to the reservation, for example, only when the lower i bit of the node number of a mobile terminal and the lower i bit assigned to the upload link slot, coincide with each other, a cell is output to the upload link. This mode corresponds to the high-speed operation of the ATM switch, of the mode for reducing the cell discard rate of the ATM switch.

Although the content of service expected from a network may vary depending on the program written in the ROM used in each mobile terminal, in the case of the ATM-LAN of this embodiment, it should be noted that a service necessary in the ATM-LAN can be retrieved mainly by a mobile terminal. In this case, when the message of "destinated-to-all-terminals broadcast" such as the service retrieval message output by another mobile terminal or a fixed terminal, is received from the interface point 1215 of a node, the node forming mode is able to select, in terms of system, whether or not the destinated-to-all-terminals-broadcast message is transferred into a radio zone over the broadcast cell branch/insert circuit 1208.

Generally, the bit error rate of a radio channel is relatively high, and the 24-hour operation of a mobile terminal is difficult since it operates on a battery. Therefore, the idea that a mobile terminal provides a service is not desirable. The destinated-to-all-terminals-broadcast message input from the interface point is transferred only to the mobile terminal tracing circuit 1207, not towards the antenna 1201. However, in consideration of the unity with respect to the physical link between a radio channel and a node, and the idea that a radio channel is introduced to facilitate the setting-up of the physical link, it is preferable that the destinated-to-all-terminals-broadcast message be supplied to the mobile terminal tracing circuit 1207, and at the same time, allowed to pass towards the antenna 1201. The selection should be determined on the basis of the data transmission speed of the radio channel and the characteristics of the system.

Moreover, it is also a possibility that frequencies used as f up and f down in adjacent radio zones are varied in order to avoid crossover between spatially adjacent radio zones. In this case, it is necessary for a mobile terminal to search which one of the frequencies on which a zone-number informing message may be used. By fixing the combination of the f up and f down values used in each radio zone (i.e. determining an f up value used in the radio zone of an f down value), the system can be set up so that it suffices merely to have the mobile terminal judge only the frequency used as the download link.

Figure 46:
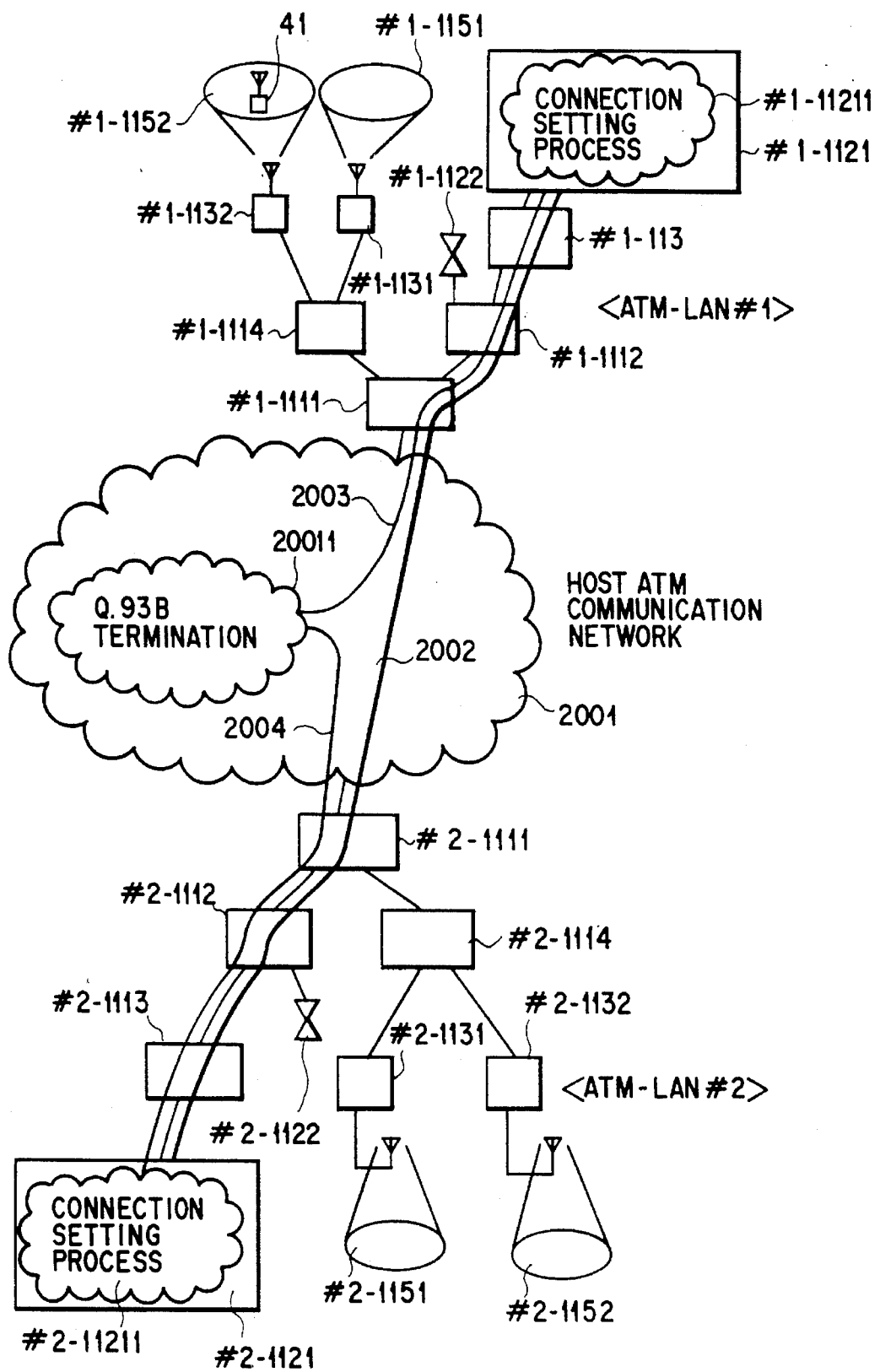
FIG. 46 is a diagram showing an ATM-LAN connected to an upper ATM communication network.

In order to support the mobile terminal, it is necessary to maintain a fix on the position of the mobile terminal, and the like, in a number of ATM-LANs connected to each other via the upper ATM communication network such as public network. FIG. 46 illustrates an example of such a situation. In this figure, two ATM-LANs having the structure shown in FIG. 38 are connected to each other via the upper ATM communication network 2001. The mobile terminal 1141 present in the radio zone #1 (#1-1152) of the ATM-LAN #1 is about to obtain a service provided by the terminal #2-1142 of the ATM-LAN #2. A message on a broadcast channel is closed in each of the ATM-LAN, and therefore it should be noted that a service retrieval message output from the mobile terminal 1141 does not reach the terminal #2-1122 of the ATM-LAN #2, and the terminal #2-1122 cannot respond directly to the service retrieval message. Although it is possible to employ a method in which all broadcast messages are transferred to all ATM-LANs, it is preferable that a message on a broadcast channel should be closed in the ATM-LAN from which the message was output, because thus the bandwidth necessary for the broadcast channel can be narrowed in each physical link/radio channel.

There are two possible cases for a mobile terminal 1141; one is that the terminal knows only the service identification number of a service provided by the terminal #2-1122, and the other is that it knows the node number of the terminal #2-1122. In the case where only the service identification number is known, the operation for obtaining the node number of the terminal #2-1122 must be performed. First, the method in which the mobile terminal 1141 in the radio zone #1-1152 of the ATM-LAN #1 recognizes the node number of the terminal for which a service is provided in the ATM-LAN #2, will be described.

The connection setting process #1-11211 of the ATM-LAN #1 and the connection setting process #2-11211 of the ATM-LAN #2 are connected to each other by a connection 2002, via the upper ATM communication network 2001 set by the network manager of the ATM-LANs. A service provided in an ATM-LAN controlled by the controller itself, and the terminal for which the service is provided are seized by referring to a service retrieval message and a service retrieval response message exchanged in the ATM-LAN.

Even if a mobile terminal 1141 outputs a service retrieval message to obtain a service of a terminal #2-1122, there may not be a terminal which can provide the service in the ATM-LAN #1, in other words, therefore there may not be a terminal which responds to the service retrieval message. The connection setting process #1-11211 inquires the connection setting process #2-11211 of the ATM-LAN #2 by the connection 2002 whether or not the ATM-LAN #2 provides the service having a service identification number designated by the service retrieval message, when the service having a service identification number designated by the service retrieval message is regarded to be not provided in the ATM-LAN #1. There are several cases in which a service is regarded to be not provided, for example, 1) a table of services provided in an ATM-LAN is prepared in advance by always referring to a service retrieval message and a service retrieval response message, and when a service retrieval message is received, the service identification number designated by the service retrieval message does not appear on the table; 2) a service retrieval response message corresponding to a service retrieval message does not appear after a predetermined period of time; and 3) after the case of 2) has been established, the connection setting process #1-11211 outputs a service retrieval message again in order to search the service, but a service retrieval response message corresponding to the newly output service retrieval message does not reach after a predetermined period of time. There are also several methods for the above cases, but each method has its merits and demerits. Therefore, the selection of a method should be determined on the basis of the characteristics of the ATM-LAN system.

When receiving an inquiry from the connection setting process #1-11211, the connection setting process #2-11211 refers to the table formed by itself of service retrieval messages and service retrieval response messages to check if the inquired service is provided by the terminal #2-1122. In order to confirm that the inquired service is available, the connection setting process #2-1122 may output a service retrieval message to the ATM-LAN #2. The connection setting process #2-11211 informs the connection setting process #1-11211 of the node number of the terminal #2-1122 through the connection 2002.

The connection setting process #1-11211 forms a service retrieval response message and outputs it to the broadcast channel when the node number of the terminal #2-1122 is notified. The service retrieval response message is sent to the mobile terminal 1141 via a radio channel. Thus, the mobile terminal 1141 is able to recognize the node number of the terminal #2-1122.

Figure 47:
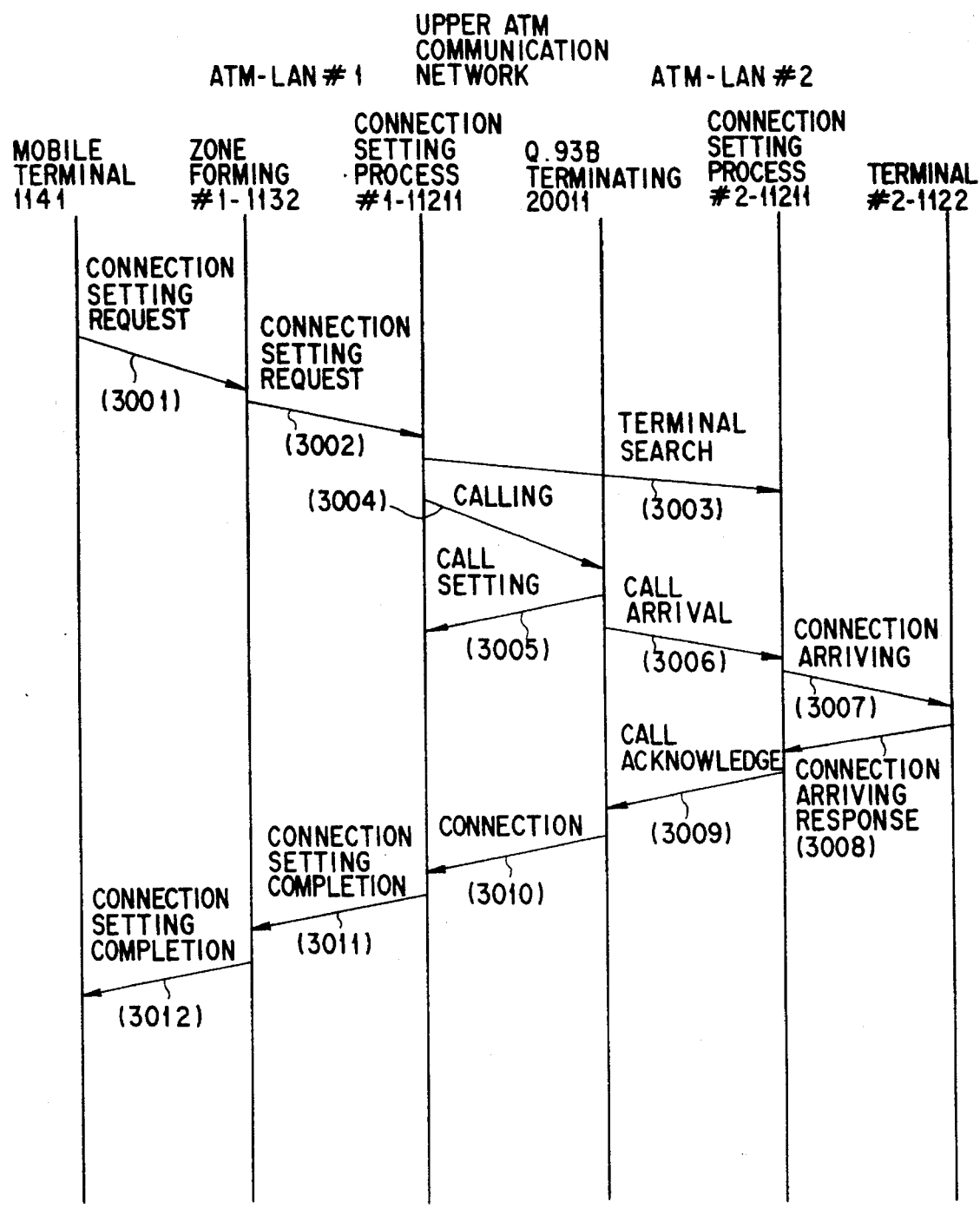
FIG. 47 is a diagram illustrating the sequence of exchanging messages in the ATM-LAN connected to the host ATM communication network.

Next, regarding the ATM-LAN of this embodiment, the operation of requesting the connection setting with respect to a terminal in the case where the mobile terminal 1141 in a radio zone #1-1152 of the ATM-LAN #1 knows the node number of the terminal #2-1122 in the ATM-LAN #2 will be described with reference to FIG. 47. FIG. 47 illustrates a message sequence of the above case.

A mobile terminal 1141 sends a connection setting request message containing the node number of a partner terminal (terminal #2-1122) to a zone forming section #1-1132 via a radio channel (3001). The zone forming section #1-1132 passes the connection setting request message to the connection setting process #1-11211 via a broad cast channel (3002). When the connection setting process #1-11211 receives the connection setting request message (3002), it refers to the node number in the message to check if the partner terminal is present in the ATM-LAN maintained by itself.

In the case where the partner terminal is not present in the ATM-LAN maintained by itself, the connection setting process #1-11211 inquires (3003) whether or not there is a terminal having a node number contained in its connection setting request message (3002), from the connection setting process #2-11211 by using a connection 2002. The connection setting process #2-11211 refers to the data base formed by the result of the structure recognition, in order to check if there is such a terminal, and to obtain E.164 address as signed separately to the terminal by the maintenance person. The connection setting process #2-1211 notifies the E.164 address assigned to the terminal as a response to the inquiry from the connection setting process #1-11211, by the connection 2002.

when the E.164 address of the partner terminal is obtained, the connection setting process #1-1132 sends a call message (3004) to a Q.93B terminating section 20011 of the upper ATM communication network 2001 by using a connection 2003, in accordance with the Q.93S protocol. The Q.93B terminating section 20011 returns the call setting message to the connection setting process #1-11211 via the connection 2003.

E.164 address used in each ATM-LAN is registered in Q.93B terminating unit 20011 beforehand. Upon receipt of the call message (3004), Q.93B terminating unit 20011 refers to E.164 address contained in the calling message, finding that E.164 address is used in ATM-LAN #2. Then, Q.93B terminating unit 20011 sets an ATM connection between the UNIs to which ATM-LAN #1 and ATM-LAN #2 are connected, respectively. Then, Q.93B terminating unit transmits a call arriving message (3006) via the connection 2004. Upon receipt of the call arriving message (3006), the connection setting process #2-11211 determines the node number of the call arriving terminal, from E.164 address contained in the call arriving message (3006), and sets an ATM connection between the terminal #2-1122 and the interface point with the upper ATM communication network. Thereafter, the connection setting process #2-11211 transmits a connection setting informing message (3007) to the terminal #2-1122.

When the terminal #2-1122 receives the connection setting informing message (3007), it sets up the process which utilizes the connection identified by the message (3007) and transfers a connection setting response message (3008) to the connection setting process #2-11211.

Upon receipt of the connection setting response message (3008), the connection setting process #2-11211 transfers the call acknowledge message (3009) defined in Q93B to Q.93B terminating unit 20011 through the connection 2004. Upon receipt of the call acknowledge message (3009), Q.93B terminating unit 20011 transfers the connection message (3010) to the connection setting process #1-11211, by using the connection 2003.

when the connection setting process #1-11211 receives the connection message (3010), it sets an ATM connection between the zone forming unit #1-1132 and the interface point with the upper ATM communication network. Then, the connection setting process #1-11211 transmits a connection setting completion message (3011) to the zone forming unit #1-1132.

After determining the VCI to be used in a radio channel, the zone forming unit #1-1132 updates the table in the first header rewriting circuit 1209 and the table in the second header rewriting circuit 1214. Then, the unit #1-1132 transfers the connection setting completion message (3012) to the mobile terminal 1141. As a result, the mobile terminal 1141 is connected to the terminal #2-1122 by the upper ATM communication network 2001.

The system may include a connection setting process which works effectively in the case the destination terminal defined by E.164 address contained in the call arriving message is a mobile terminal. If so, the operation of the connection setting process #2-11211 which is activated by the call arriving message (3006) may have the following additional steps:

107

Step 1: The process #2-11211 refers to the registered mobile-terminal control information shown in FIG. 44 by using E.164 address, thereby to determine whether or not the mobile terminal exists in any one of the radio zones which are under the control of the process #2-1121.

Step 2: If No in Step 1, the process #2-11211 asks the partner connection setting process, via the connection 2002, whether or not there is a terminal which has E.164 address.

Step 3: The process #2-11211 forms a call request, thereby requesting again Q93B terminating unit 20011 that a connection be set for connection with an ATM-LAN which includes a terminal having E.164 address.

Step 4: The process #2-11211 connects the new connection thus set, to the connection which has been informed of the setting of the new connection by virtue of the call arriving message (3006).

In this case, one of E.164 addresses allocated to each ATM-LAN may be assigned for use in calling a mobile terminal. Thus, the response message to the inquiry made via the connection 2002 as to the presence of that mobile terminal may contain E.164 address assigned to the mobile terminal. This E.164 address is a call-arrival-side E.164 address and is contained in the call message formed in the step of forming E.164 address assigned to the calling of the mobile terminal and then requesting Q93B terminating unit 20011 that a next new connection be set. Further, the call message may also contain an E.164 address for a mobile terminal existing in the ATM-LAN controlled by the connection setting process which has formed the call message. In this case, this E.164 address is used for a terminal transmitting the new call message.

Upon receipt of the call arriving message containing the address for use in calling a mobile terminal (i.e., a call arriving side address), the connection setting process determines that this call arriving message has been generated by Q.93B terminating unit 20011. This is because the mobile terminal approaches the connection setting process from the home ATM-LAN registered in Q.93B terminating unit 20011 after a mobile terminal present in any radio zone controlled by the connection setting process has received a call, and the home ATM-LAN therefore transmits a connection setting request to the connecting setting process. After determining that the call arriving message has been generated by Q.93B terminating unit 20011, the connection setting process performs the following operations.

The connection setting process which has received a call arriving message containing an address for calling a mobile terminal shall be called "away-side connection setting process," and the connection setting process which has formed a call message, i.e., the source of the call arriving message, shall be called "home-side connection setting process." The away-side connection setting analyzes the calling-side address contained in the call arriving message, thereby recognizing the home-side connection setting process; it also sends the call number contained in the call arriving message to the home-side connection setting process through the connection extending between both connection setting processes. From the call number the home-side connection setting process determines which mobile terminal has been called, and sends the node number of this mobile terminal to the away-side connection setting process. Based on the node number the way-side connection setting process recognizes the radio zone including the mobile terminal which has received the call. Then, the away-side connection setting process sets a connection between the mobile terminal and the interface point with the host ATM communication network.

108

Illustrated in FIG. 46 is a system in which two ATM-LANs are connected by an upper ATM communication network to interface the mobile terminals. However, the system may execute interfacing, using three or more ATM-LANs. In such a system, connections are set among connection setting processes forming a mesh topology. If these connections are not set because the mesh topology is considered too expensive to set, it will be necessary to select and use some of the processes to set connections. The ATM-LANs, to which each connection setting process can access to determine the position to which any mobile terminal in the ATM-LANs has moved, and to search for any ATM-LAN that includes a terminal offering service, may be limited to those for which the selected connection setting process has set connections.

As described above, mobile terminals can move from one ATM-LAN to another in the ATM-LAN of the present embodiment. Hence, a protocol is required which determines in which radio zone a mobile terminal is present. Since the radio channels are provided in the form of cells, a presence-recognition request message and a presence-recognition response message are defined for poling each mobile terminal. It should be noted that these messages can be utilized by the connection setting process to determine whether or not each node is operating in the ATM-LAN.

Figure 48:
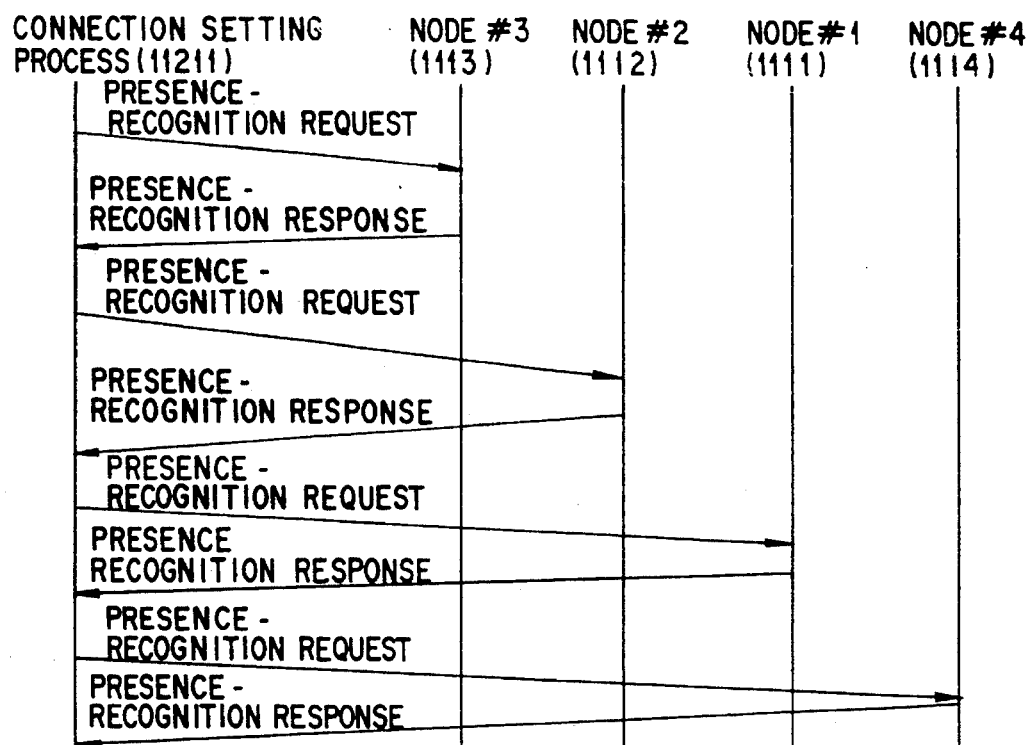
FIG. 48 is a diagram depicting a first sequence of steps for confirming the existence of a node.

FIG. 48 shows a method of recognizing the presence of a node in an ATM-LAN which has the structure shown in FIG. 38 and which uses the second broadcast algorithm for realizing a broadcast channel. As shown in FIG. 48, the connection setting process has a data base concerning the method of connecting the nodes included in the ATM-LAN. In order to recognize the presence of a node in an ATM-LAN, the connection setting process transfers a presence-recognition request message to the nodes, first to the nearest node, then to the second nearest node, and so forth, via the broadcast channel. Any node that receives the presence-recognition request message returns the message to the connection setting process through the broadcast channel.

Unless the connection setting process does not receive the presence-recognition request message from any node within a predetermined period of time, the process determines that the node has some trouble such as disconnection of a link. Hence, the process can locate any link which has been disconnected.

Figure 49:
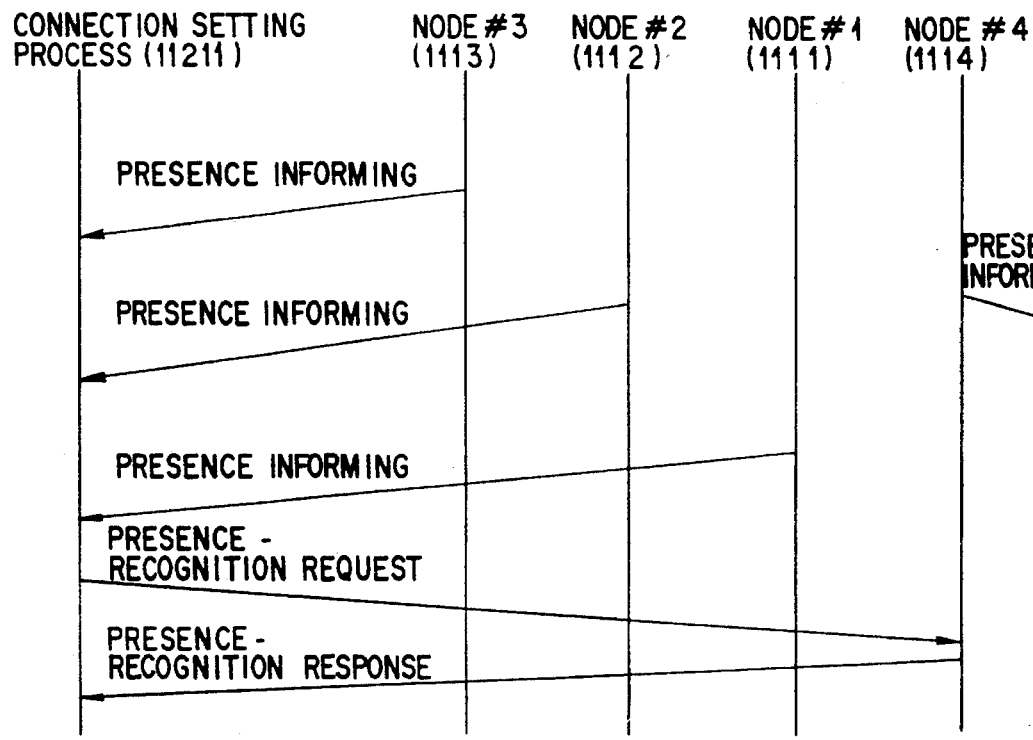
FIG. 49 is a diagram depicting a second sequence of steps for confirming the existence of the node.

FIG. 49 shows a method of recognizing the presence of a node in an ATM-LAN which has the structure shown in FIG. 38 and which uses the first broadcast algorithm for realizing a broadcast channel.

In the case where the first broadcast algorithm is used, the broadcast cell transmitted by the connection setting process cannot be broadcast at all if any trouble occurs in the path which extends between the process and the root node (i.e., note #1) of an ATM-LAN and which includes terminals #1, node #3, node #2 and node #1. Therefore it is desirable for the process to determine that a trouble is occurring in the path, when the process ceases to receive the presence informing message which each node automatically transmits via the port designated as a leaf-side one. The presence informing message contains the number of the node which has formed the presence informing message. The connection setting process compares the presence informing message it has received with the data base obtained by the structure recognition, and determines where in the path the trouble is occurring. Since the presence informing message transmitted from any node outside that path does not reach the connection setting process, the process will perform the poling of this node by transmitting a presence-recognition request message and receiving a presence-recognition response message.

Also in the case where the second broadcast algorithm is used, each node may transmit a presence informing message. If so, however, the traffic of this message would increase particularly when the ATM-LAN is of a large scale. Hence, it is desirable that the connection setting process perform polling, if possible, thereby to locate the site of trouble.

The embodiment described above can realize a cell-based radio channel. Hence, like a fixed terminal, a mobile terminal can retrieve network service it requires and can request a connection setting for the source of the network service. This helps to provide an ATM-LAN which can include mobile terminals and in which various services can be offered to each mobile terminal in a flexible manner.

The embodiment described above provides with FIFO capable of holding user cells and broadcast cells independently and an arbitration control unit for determining, by means of poling, the cycle in accordance with which the cells are transmitted from the FIFO. Hence, there can be provided a node for use in an ATM-LAN system which can change the bandwidth for the broadcast channel by altering the poling cycle or freely control the transmission delay by varying the length of the FIFO for holding broadcast cells. Furthermore, the present invention can provide a broadcast channel through which no broadcast cells are transferred for some time to the root of a broadcast tree. The broadcast channel serves to provide a node for use in an ATM-LAN system, whose transmission delay is minimal.

Since the connection setting process sets a virtual channel extending from it to a designated terminal, any terminal, which has requested for call setting, etc., by utilizing the protocols (e.g., Q.93B) other than those defined on the broadcast channel, can transfer messages to the connection setting process via the virtual channel. As a result, the connection setting process can terminate the protocol of the terminal, whereby a terminal incapable of processing the messages on the broadcast channel can be connected to the connection setting process.

Since a cell-based radio channel can be realized, the present invention can provide an ATM-LAN capable of interfacing the mobile terminals, each capable, like a fixed terminal, of retrieving the network service it requires and requesting a connection setting for the source of the network service, and wherein various services can be offered to each mobile terminal in a flexible manner.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An ATM-LAN system comprising:
   a plurality of nodes each having assigned thereto a globally unique identifier:
   a plurality of terminals connected by said plurality of nodes with communication among said terminals being effected in asynchronous transfer mode, each of said terminals having assigned thereto a globally unique identifier and processing and sending out broadcast cells;
   connection setting process means incorporated in at least one of said terminals, for transmitting a link setting request for setting links of virtual paths or virtual channels, and also a link chaining request for connecting the links;
   a broadcast channel for connecting all of said nodes in said ATM-LAN system and said terminals therein and for transferring a message from said connection setting process means to said nodes, said message containing the link setting request, the link chaining request, and the globally unique identifier as a part of the destination address; and
   node setting process means incorporated in each of said nodes, for receiving the link setting request, the link chaining request and the globally unique identifier from said broadcast channel, for recognizing said terminals on the basis of the globally unique identifier, and for setting and connecting said links in accordance with the link setting request and the linking chaining request.

2. The ATM-LAN system according to claim 1, wherein said broadcast channel is a communication path formed in accordance with information which a user has set for each port of each of said nodes.

3. The ATM-LAN system according to claim 2, wherein said information shows whether the node is connected to a root side or leaf side of a tree structure constituting the communication path formed in said broadcast channel, and the node transfers a message on said broadcast channel to a port designated as the leaf side, and transfers messages input from a port designated as the leaf side to all ports designated as the root side.

4. The ATM-LAN system according to claim 2, wherein said information indicates whether said broadcast channel is set in the each port, and the node transmits a message on said broadcast channel which is input from a ports designated when said broadcast channel is set, to said ports designated without the port from which the said cell is input.

5. The ATM-LAN system according to claim 1, wherein a broadcast address common to all of said terminals and nodes and a neighborhood node branching address are reserved as the destination address of the message on said broadcast channel.

6. The ATM-LAN system according to claim 1, comprising an identifier of process means for processing the message, where said identifier is pre-assigned by the terminal or node which incorporates process means for processing the message is used as a part of a destination address of the message on said broadcast channel.

7. The ATM-LAN system according to claim 6, wherein said identifier is reserved for transferring the message on said broadcast channel to all process means incorporated in said nodes and the terminal incorporating said process means.

8. The ATM-LAN system according to claim 1, wherein a layer-3 address corresponds to said globally unique identifier.

9. The ATM-LAN system according to claim 1, wherein said connection setting process means sets a virtual channel connecting said connection setting process means to a predetermined one of said terminals, when the ATM-LAN system is set up.

10. The ATM-LAN system according to claim 1, wherein a zone-forming means is connected to at least one of ports of each node, and mobile terminals are thereby incorporated in the ATM-LAN system, for transmitting messages to the zone-preparing means, said messages being of the same type as a message on said broadcast channel.

11. The ATM-LAN system according to claim 10, wherein said zone-forming means prepares a radio zone having a down link and an up link, said down link assumes a frame structure including overheads which have predetermined lengths and between which a prescribed number of cells exist, said up link includes slots formed by dividing time intervals, which are equal in length to the frame defined on said down link, into as many units as the cells contained in the frame structure, and a mobile terminal existing in the radio zone freely transmits cells onto the slots defined on the up link without assigning of the slots from said ATM-LAN.

12. The ATM-LAN system according to claim 10, wherein said zone-forming means prepares a radio zone having a down link and an up link, said down link assumes a frame structure including overheads which have predetermined lengths and between which a prescribed number of cells exist, said up link includes slots formed by dividing time intervals, which are synchronous with the frame defined on said down link, into as many units as the cells contained in the frame structure, and a mobile terminal existing in the radio zone freely transmits cells onto the slots defined on the up link without assigning of the slots from said ATM-LAN.

13. The ATM-LAN system according to claim 10, wherein a physical address effective in an upper ATM communication network is allocated to each mobile terminal, a home ATM-LAN is defined for said mobile terminal, said upper ATM communication network is controlled to transfer a call to said connection process provided for said home ATM-LAN, in response to a call arriving, and said connection setting process means of said home ATM-LAN determines said ATM-LAN to which said mobile terminal receiving a call arriving has moved, by utilizing the connection between said connection setting process means, when said mobile terminal receives the call arriving after moving from said home ATM-LAN; and said connection setting process means of said home ATM-LAN requests that said upper ATM communication network set connection in an ATM-LAN away from said home ATM-LAN.

14. The ATM-LAN system according to claim 1, wherein each of said nodes contains a plurality of ports connected in the form of a tree and a plurality of switches, each for connecting one port to a node side or a leaf side of the tree.

15. The ATM-LAN system according to claim 1, wherein each of said nodes has two independent lines, one for transferring a broadcast cell and the other for transferring a cell of another type, and a pressure applying means for applying a back pressure on a stream of other type cells in order to insert the broadcast cell into the stream of the other type cells.

16. An ATM-LAN system comprising:

a plurality of nodes;

a plurality of terminals connected by said plurality of nodes with communication among the terminals being effected in asynchronous transfer mode;

connection setting process means incorporated in at least one of said terminals, for transmitting a link setting request for setting links of virtual paths or virtual channels, and also a link chaining request for connecting the links;

a broadcast channel for connecting said nodes and said terminals, which has a communication path formed in accordance with information which a user has sets for each port of each of said nodes, and for transferring a message from said connection setting process means to said nodes, said message containing the link setting request and the link chaining request; and a plurality of node setting process means incorporated in said nodes, respectively, for receiving the link setting request and the link chaining request from said broadcast channel and for setting and connecting said links in accordance with the link setting request and the link chaining request.

17. An ATM-LAN system comprising:

a plurality of nodes;

a plurality of terminals connected to said plurality of nodes with communication among the terminals being effected in asynchronous transfer mode;

connection setting process means incorporated in at least one of said terminals, for transmitting a link setting request for setting links of virtual paths or virtual channels, and also a link chaining request for connecting the links;

a broadcast channel for connecting said nodes and said terminals and for transferring a message from said connection setting process means to said nodes, said message containing the link setting request and the link chaining request; and node setting process means incorporated in each of said nodes, for receiving the link setting request and the link chaining request from said broadcast channel and for setting and connecting said links in accordance with the link setting request and the link chaining request.

18. An ATM-LAN system comprising:

a plurality of nodes;

a plurality of terminals connected by said plurality of nodes with communication among the terminals being effected in asynchronous transfer mode;

connection setting process means incorporated in at least one of said terminals, for transmitting a link setting request for setting links of virtual paths or virtual channels, and also a link chaining request for connecting the links;

a broadcast channel for connecting said nodes and said terminals and for transferring a message from said connection setting process means to said nodes, said message containing the link setting request and the link chaining request;

node setting process means incorporated in each of said nodes, for receiving the link settling request and the link chaining request from said broadcast channel and for setting and connecting said links in accordance with the link setting request and the link chaining request;

zone-forming means connected to at least one of ports of at least one of said nodes, for preparing a zone within which a mobile terminal is able to be communicated with said zone-forming means; and message-transmitting means incorporated in the mobile terminal, for transmitting messages to the zone-forming means, said messages being of the same type as a message on said broadcast channel.

19. An ATM-LAN system comprising:

plurality of nodes;

a plurality of terminals connected by said plurality of nodes with communication among the terminals being effected in asynchronous transfer mode;

wherein each of said nodes is designed to transfer a broadcast cell from one of said terminals to another of said terminals and node setting process means for controlling the nodes, and to transfer a user cell from/to other terminal along a connection set between any selected ones of said terminals, and each of said nodes comprises an ATM switch for exchanging user cells, a bus for exchanging broadcast cells, and means for supplying the cell to an output port corresponding to said ATM switch in order to output the cell to an interface point.

20. An ATM-LAN system comprising:

a plurality of nodes; and a plurality of terminals connected by said plurality of nodes with communication among the terminals being effected in asynchronous transfer mode; and wherein each of said nodes is designed to transfer a broadcast cell from one of said terminals to another of said terminals and a node setting process means controlling the nodes, and to transfer a user cell from/to other terminal along a connection set between any selected ones of said terminals, and each of said nodes comprises a first FIFO for holding a user cell, a second FIFO for holding a broadcast cell, and an arbitration control means for determining which cell should be transferred to a target interface point, the broadcast cell held in said first FIFO or the user cell held in said second FIFO.

21. An ATM-LAN system comprising:

a plurality of nodes;

a plurality of terminals connected by said plurality of nodes with communication among the terminals being effected in a synchronous transfer mode;

connection setting process means incorporated in at least one of said terminals, for transmitting a link setting request for setting links of virtual paths or virtual channels, and also a link chaining request for connecting the links;

a broadcast channel for connecting said nodes and said terminals and for transferring a message from said request sending means to said nodes, said message containing the link setting request and the link chaining request; and node setting process means incorporated in each of said nodes, for receiving the link setting request and the link chaining request from said broadcast channel and for setting and connecting said links in accordance with the link setting request and the link chaining request; and wherein each of said terminals and nodes has assigned thereto a globally unique identifier used as a part of a destination address of the message on said broadcast channel, and a broadcast address common to all of said terminals and a neighborhood node branching address are reserved as the destination address of the message on said broadcast channel.

22. An ATM-LAN system comprising:

a plurality of nodes;

a plurality of terminals connected by said plurality of nodes with communication among said terminals being effected in asynchronous transfer mode;

connection setting process means incorporated in at least one of said terminals, for transmitting a link setting request for setting links of virtual paths or virtual channels, and also a link chaining request for connecting the links;

a broadcast channel for connecting all of said nodes in said ATM-LAN system and said terminals therein and for transferring a message from said request sending means to said nodes, said message containing the link setting request and the link chaining request; and node setting process means incorporated in each of said nodes, for receiving the link setting request and the link chaining request from said broadcast channel and for setting and connecting said links in accordance with the link setting request and the link chaining request, and wherein when said connection setting process means receives the connection setting request message from one of said terminals, it determines the nodes and transmission lines through which the requested connection passes and a virtual path identifier or a set of a virtual path and a virtual channel to be allocated to the connection every determined transmission line, and sending out the link setting request and the link chaining request which include the virtual path identifier or the set of the virtual path and the virtual channel determined for each of said node setting process means of said nodes through which the requested connection passes.

23. An ATM-LAN system comprising:

a plurality of nodes;

a plurality of terminals connected by said plurality of nodes, communication among the terminals is effected in asynchronous transfer mode;

connection setting process means incorporated in at least one of said terminals, for transmitting a link setting request for setting links of virtual paths or virtual channels, and also a link chaining request for connecting the links;

a broadcast channel for connecting said nodes and said terminals and for transferring a message from said request sending means to said nodes, said message containing the link setting request and the link chaining request; and node setting process means incorporated in each of said nodes, for receiving the link setting request and the link chaining request from said broadcast channel and for setting and connecting said links in accordance with the link setting request and the link chaining request; and wherein each of said terminals and nodes has assigned thereto a globally unique identifier used as a part of a destination address of the message on said broadcast channel, and a broadcast address common to all of said terminals and a neighborhood node branching address are reserved as the destination address of the message on said broadcast channel, and wherein when said connection setting process means receives the connection setting request message from one of said terminals, determines the nodes and transmission tines through which the requested connection passes and a virtual path identifier or a set of a virtual path and a virtual channel to be allocated to the connection every determined transmission line, and sends out the link setting request and the link chaining request which include the virtual path identifier or the set of the virtual path and the virtual channel determined for each of said node setting process means of said nodes through which the requested connection passes.

* * * * *